US012340075B2

(12) United States Patent
Brown et al.

(10) Patent No.: US 12,340,075 B2
(45) Date of Patent: Jun. 24, 2025

(54) DEVICE, METHOD, AND GRAPHICAL USER INTERFACE FOR SELECTING USER INTERFACE OBJECTS

(71) Applicant: Apple Inc., Cupertino, CA (US)

(72) Inventors: Matthew I. Brown, New York, NY (US); Jeffrey Traer Bernstein, San Francisco, CA (US); Avi E. Cieplinski, San Francisco, CA (US); May-Li Khoe, San Francisco, CA (US); Julian Missig, Burlingame, CA (US); Nicholas Zambetti, Largo, FL (US)

(73) Assignee: Apple Inc., Cupertino, CA (US)

( * ) Notice: Subject to any disclaimer, the term of this patent is extended or adjusted under 35 U.S.C. 154(b) by 813 days.

(21) Appl. No.: 17/172,032

(22) Filed: Feb. 9, 2021

(65) Prior Publication Data

US 2021/0191602 A1 Jun. 24, 2021

Related U.S. Application Data

(63) Continuation of application No. 16/145,954, filed on Sep. 28, 2018, now Pat. No. 10,969,945, which is a
(Continued)

(51) Int. Cl.
*G06F 3/04842* (2022.01)
*G06F 3/041* (2006.01)
(Continued)

(52) U.S. Cl.
CPC ........ *G06F 3/04842* (2013.01); *G06F 3/0412* (2013.01); *G06F 3/0486* (2013.01);
(Continued)

(58) Field of Classification Search
CPC .. G06F 3/04842; G06F 3/0412; G06F 3/0486; G06F 3/0488; G06F 3/04883; G06F 3/04886; G06F 1/3234
See application file for complete search history.

(56) References Cited

U.S. PATENT DOCUMENTS 4,864,520 A 9/1989 Setoguchi et al.
5,184,120 A 2/1993 Schultz
(Continued)

FOREIGN PATENT DOCUMENTS

CA 2780765 A1 5/2011
CN 1356493 A 7/2002
(Continued)

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
(Continued)

*Primary Examiner* — Cao H Nguyen
(74) *Attorney, Agent, or Firm* — Morgan, Lewis & Bockius LLP

(57) ABSTRACT

An electronic device with a display and touch-sensitive surface displays a plurality of user interface objects. The device enables multiple objects to be selected by a user, in succession, with a single gesture that remains in contact with the touch-sensitive surface, moving from object to object of the plurality of user interface objects, with separate press inputs for selecting each additional object while maintaining selection of objects previously selected using the same gesture.

21 Claims, 100 Drawing Sheets

Related U.S. Application Data continuation of application No. 14/536,267, filed on Nov. 7, 2014, now Pat. No. 10,095,391, which is a continuation of application No. PCT/US2013/040101, filed on May 8, 2013.

(60) Provisional application No. 61/778,413, filed on Mar. 13, 2013, provisional application No. 61/747,278, filed on Dec. 29, 2012, provisional application No. 61/688,227, filed on May 9, 2012.

(51) Int. Cl.
*G06F 3/0486* (2013.01)
*G06F 3/0488* (2022.01)
*G06F 3/04883* (2022.01)
*G06F 3/04886* (2022.01)

(52) U.S. Cl.
CPC ........ *G06F 3/0488* (2013.01); *G06F 3/04883* (2013.01); *G06F 3/04886* (2013.01)

(56) References Cited

U.S. PATENT DOCUMENTS 5,374,787 A 12/1994 Miller et al.
5,428,730 A 6/1995 Baker et al.
5,463,722 A 10/1995 Venolia
5,510,813 A 4/1996 Makinwa et al.
5,555,354 A 9/1996 Strasnick et al.
5,559,301 A 9/1996 Bryan, Jr. et al.
5,589,855 A 12/1996 Blumstein et al.
5,664,210 A 9/1997 Fleming et al.
5,710,896 A 1/1998 Seidl
5,717,438 A 2/1998 Kim et al.
5,793,360 A 8/1998 Fleck et al.
5,793,377 A 8/1998 Moore
5,801,692 A 9/1998 Muzio et al.
5,805,144 A 9/1998 Scholder et al.
5,805,167 A 9/1998 Van Cruyningen
5,809,267 A 9/1998 Moran et al.
5,819,293 A 10/1998 Comer et al.
5,825,352 A 10/1998 Bisset et al.
5,844,560 A 12/1998 Crutcher et al.
5,872,922 A 2/1999 Hogan et al.
5,946,647 A 8/1999 Miller et al.
5,956,032 A 9/1999 Argiolas
5,973,670 A 10/1999 Barber et al.
6,002,397 A 12/1999 Kolawa et al.
6,031,989 A 2/2000 Cordell
6,088,019 A 7/2000 Rosenberg
6,088,027 A 7/2000 Konar et al.
6,111,575 A 8/2000 Martinez et al.
6,121,960 A 9/2000 Carroll et al.
6,208,329 B1 3/2001 Ballare
6,208,340 B1 3/2001 Amin et al.
6,219,034 B1 4/2001 Elbing et al.
6,223,188 B1 4/2001 Albers et al.
6,232,891 B1 5/2001 Rosenberg
6,243,080 B1 6/2001 Molne
6,252,594 B1 6/2001 Xia et al.
6,300,936 B1 10/2001 Braun et al.
6,313,836 B1 11/2001 Russell, Jr. et al.
6,396,523 B1 5/2002 Segal et al.
6,429,846 B2 8/2002 Rosenberg et al.
6,448,977 B1 9/2002 Braun et al.
6,459,442 B1 10/2002 Edwards et al.
6,489,978 B1 12/2002 Gong et al.
6,512,530 B1 1/2003 Rzepkowski et al.
6,563,487 B2 5/2003 Martin et al.
6,567,102 B2 5/2003 Kung
6,583,798 B1 6/2003 Hoek et al.
6,590,568 B1 7/2003 Astala et al.
6,661,438 B1 12/2003 Shiraishi et al.
6,734,882 B1 5/2004 Becker
6,735,307 B1 5/2004 Volckers
6,750,890 B1 6/2004 Sugimoto
6,806,893 B1 10/2004 Kolawa et al.
6,822,635 B2 11/2004 Shahoian et al.
6,906,697 B2 6/2005 Rosenberg
6,919,927 B1 7/2005 Hyodo
6,943,778 B1 9/2005 Astala et al.
7,036,088 B2 4/2006 Tunney
7,138,983 B2 11/2006 Wakai et al.
7,312,791 B2 12/2007 Hoshino et al.
7,411,575 B2 8/2008 Hill et al.
7,434,177 B1 10/2008 Ording et al.
7,453,439 B1 11/2008 Kushler et al.
7,471,284 B2 12/2008 Bathiche et al.
7,479,949 B2 1/2009 Jobs et al.
7,516,404 B1 4/2009 Colby et al.
7,533,352 B2 5/2009 Chew et al.
7,552,397 B2 6/2009 Holecek et al.
7,577,530 B2 8/2009 Vignalou-Marche
7,614,008 B2 11/2009 Ording
7,619,616 B2 11/2009 Rimas Ribikauskas et al.
7,629,966 B2 12/2009 Anson
7,656,413 B2 2/2010 Khan et al.
7,683,889 B2 3/2010 Rimas Ribikauskas et al.
7,702,733 B2 4/2010 Fleck et al.
7,743,348 B2 6/2010 Robbins et al.
7,760,187 B2 7/2010 Kennedy
7,787,026 B1 8/2010 Flory et al.
7,797,642 B1 9/2010 Karam et al.
7,801,950 B2 9/2010 Eisenstadt et al.
7,812,826 B2 10/2010 Ording et al.
7,890,862 B2 2/2011 Kompe et al.
7,900,035 B2 3/2011 Yoshida et al.
7,903,090 B2 3/2011 Soss et al.
7,952,566 B2 5/2011 Poupyrev et al.
7,956,847 B2 6/2011 Christie
7,973,778 B2 7/2011 Chen
8,000,694 B2 8/2011 Labidi et al.
8,040,142 B1 10/2011 Bokma et al.
8,059,104 B2 11/2011 Shahoian et al.
8,059,105 B2 11/2011 Rosenberg et al.
8,106,856 B2 1/2012 Matas et al.
8,125,440 B2 2/2012 Guyot-Sionnest et al.
8,125,492 B1 2/2012 Wainwright et al.
RE43,448 E 6/2012 Kimoto et al.
8,209,628 B1 6/2012 Davidson
8,271,900 B2 9/2012 Walizaka et al.
8,300,005 B2 10/2012 Tateuchi et al.
8,325,398 B2 12/2012 Satomi et al.
8,363,020 B2 1/2013 Li et al.
8,390,583 B2 3/2013 Forutanpour et al.
8,423,089 B2 4/2013 Song et al.
8,446,376 B2 5/2013 Levy et al.
8,453,057 B2 5/2013 Stallings et al.
8,456,431 B2 6/2013 Victor
8,466,889 B2 6/2013 Tong et al.
8,482,535 B2 7/2013 Pryor
8,499,243 B2 7/2013 Yuki
8,504,946 B2 8/2013 Williamson et al.
8,508,494 B2 8/2013 Moore
8,542,205 B1 9/2013 Keller
8,553,092 B2 10/2013 Tezuka et al.
8,570,296 B2 10/2013 Birnbaum et al.
8,581,870 B2 11/2013 Bokma et al.
8,587,542 B2 11/2013 Moore
8,593,415 B2 11/2013 Han et al.
8,593,420 B1 11/2013 Buuck
8,625,882 B2 1/2014 Backlund et al.
8,635,545 B2 1/2014 Kim et al.
8,638,311 B2 1/2014 Kang et al.
8,665,227 B2 3/2014 Gunawan
8,669,945 B2 3/2014 Coddington
8,698,765 B1 4/2014 Keller
8,706,172 B2 4/2014 Priyantha et al.
8,713,471 B1 4/2014 Rowley et al.
8,717,305 B2 5/2014 Williamson et al.
8,726,198 B2 5/2014 Rydenhag et al.
8,743,069 B2 6/2014 Morton et al.
8,760,425 B2 6/2014 Crisan
8,769,431 B1 7/2014 Prasad

(56) References Cited

U.S. PATENT DOCUMENTS 8,773,389 B1 7/2014 Freed
8,788,964 B2 7/2014 Shin et al.
8,793,577 B2 7/2014 Schellingerhout et al.
8,799,816 B2 8/2014 Wells et al.
8,816,989 B2 8/2014 Nicholson et al.
8,830,188 B2 9/2014 Verthein et al.
8,854,316 B2 10/2014 Shenfield
8,872,729 B2 10/2014 Lyons et al.
8,872,773 B2 10/2014 Mak et al.
8,875,044 B2 10/2014 Ozawa et al.
8,881,062 B2 11/2014 Kim et al.
8,914,732 B2 12/2014 Jun et al.
8,952,987 B2 2/2015 Momeyer et al.
8,954,889 B2 2/2015 Fujibayashi
8,959,430 B1 2/2015 Spivak et al.
8,963,853 B2 2/2015 Sirpal et al.
8,976,128 B2 3/2015 Moore
9,026,932 B1 5/2015 Dixon
9,030,419 B1 5/2015 Freed
9,030,436 B2 5/2015 Ikeda
9,032,321 B1 5/2015 Cohen et al.
9,043,732 B2 5/2015 Nurmi et al.
9,046,999 B1 6/2015 Teller et al.
9,052,820 B2 6/2015 Jarrett et al.
9,052,925 B2 6/2015 Chaudhri
9,063,563 B1 6/2015 Gray et al.
9,063,731 B2 6/2015 Heo et al.
9,069,460 B2 6/2015 Moore
9,086,755 B2 7/2015 Cho et al.
9,086,757 B1 7/2015 Desai et al.
9,092,058 B2 7/2015 Kasahara et al.
9,098,188 B2 8/2015 Kim
9,104,260 B2 8/2015 Marsden et al.
9,111,076 B2 8/2015 Park et al.
9,116,569 B2 8/2015 Stacy et al.
9,116,571 B2 8/2015 Zeliff et al.
9,122,364 B2 9/2015 Kuwabara et al.
9,128,605 B2 9/2015 Nan et al.
9,146,914 B1 9/2015 Dhaundiyal
9,164,779 B2 10/2015 Brakensiek et al.
9,170,607 B2 10/2015 Bose et al.
9,170,649 B2 10/2015 Ronkainen
9,178,971 B2 11/2015 Nemoto
9,218,105 B2 12/2015 Mansson et al.
9,230,393 B1 1/2016 Davies et al.
9,244,562 B1 1/2016 Rosenberg et al.
9,244,576 B1 1/2016 Vadagave et al.
9,244,601 B2 1/2016 Kim et al.
9,244,606 B2 1/2016 Kocienda et al.
9,246,487 B2 1/2016 Casparian et al.
9,262,002 B2 2/2016 Momeyer et al.
9,280,286 B2 3/2016 Commarford et al.
9,304,668 B2 4/2016 Rezende et al.
9,307,112 B2 4/2016 Molgaard et al.
9,349,552 B2 5/2016 Huska et al.
9,361,018 B2 6/2016 Defazio et al.
9,383,887 B1 7/2016 Khafizov et al.
9,389,718 B1 7/2016 Letourneur
9,389,722 B2 7/2016 Matsuki et al.
9,395,800 B2 7/2016 Liu et al.
9,400,581 B2 7/2016 Bokma et al.
9,405,367 B2 8/2016 Jung et al.
9,405,428 B2 8/2016 Roh et al.
9,417,754 B2 8/2016 Smith
9,423,938 B1 8/2016 Morris
9,436,344 B2 9/2016 Kuwabara et al.
9,448,694 B2 9/2016 Sharma et al.
9,451,230 B1 9/2016 Henderson et al.
9,471,145 B2 10/2016 Langlois et al.
9,477,393 B2 10/2016 Zambetti et al.
9,513,765 B2 12/2016 Miyazaki et al.
9,542,013 B2 1/2017 Dearman et al.
9,547,436 B2 1/2017 Ohki et al.
9,569,093 B2 2/2017 Lipman et al.
9,582,178 B2 2/2017 Grant et al.
9,600,114 B2 3/2017 Milam et al.
9,600,116 B2 3/2017 Tao et al.
9,612,741 B2 4/2017 Brown et al.
9,619,076 B2 4/2017 Bernstein et al.
9,619,113 B2 4/2017 Mark
9,625,987 B1 4/2017 LaPenna et al.
9,645,722 B1 5/2017 Stasior et al.
9,665,762 B2 5/2017 Thompson et al.
9,671,943 B2 6/2017 Van der Velden
9,678,571 B1 6/2017 Robert et al.
9,733,716 B2 8/2017 Shaffer
9,740,381 B1 8/2017 Chaudhri et al.
9,753,527 B2 9/2017 Connell et al.
9,760,241 B1 9/2017 Lewbel
9,785,305 B2 10/2017 Alonso Ruiz et al.
9,798,443 B1 10/2017 Gray
9,804,665 B2 10/2017 DeBates et al.
9,829,980 B2 11/2017 Lisseman et al.
9,891,747 B2 2/2018 Jang et al.
10,037,138 B2 7/2018 Bernstein et al.
10,055,066 B2 8/2018 Lynn et al.
10,057,490 B2 8/2018 Shin et al.
10,095,396 B2 10/2018 Kudershian et al.
10,133,388 B2 11/2018 Sudou
10,133,397 B1 11/2018 Smith
10,180,722 B2 1/2019 Lu
10,222,980 B2 3/2019 Alonso Ruiz et al.
10,235,023 B2 3/2019 Gustafsson et al.
10,275,087 B1 4/2019 Smith
10,331,769 B1 6/2019 Hill et al.
10,386,960 B1 8/2019 Smith
10,469,767 B2 11/2019 Shikata
10,496,151 B2 12/2019 Kim et al.
10,547,895 B1 1/2020 Morris
10,564,792 B2 2/2020 Kim et al.
10,739,896 B2 8/2020 Kim et al.
10,782,871 B2 9/2020 Bernstein et al.
11,112,961 B2 9/2021 Ikeda et al.
2001/0024195 A1 9/2001 Hayakawa et al.
2001/0045965 A1 11/2001 Orbanes et al.
2002/0006822 A1 1/2002 Krintzman
2002/0008691 A1 1/2002 Hanajima et al.
2002/0015064 A1 2/2002 Robotham et al.
2002/0042925 A1 4/2002 Ebisu et al.
2002/0054011 A1 5/2002 Bruneau et al.
2002/0057256 A1 5/2002 Flack
2002/0101447 A1 8/2002 Carro
2002/0109668 A1 8/2002 Rosenberg et al.
2002/0109678 A1 8/2002 Marmolin et al.
2002/0128036 A1 9/2002 Yach et al.
2002/0140680 A1 10/2002 Lu
2002/0140740 A1 10/2002 Chen
2002/0163498 A1 11/2002 Chang et al.
2002/0180763 A1 12/2002 Kung
2002/0186257 A1 12/2002 Cadiz et al.
2003/0001869 A1 1/2003 Nissen
2003/0013492 A1 1/2003 Bokhari et al.
2003/0058241 A1 3/2003 Hsu
2003/0068053 A1 4/2003 Chu
2003/0086496 A1 5/2003 Zhang et al.
2003/0112269 A1 6/2003 Lentz et al.
2003/0117440 A1 6/2003 Hellyar et al.
2003/0122779 A1 7/2003 Martin et al.
2003/0128242 A1 7/2003 Gordon
2003/0151589 A1 8/2003 Bensen et al.
2003/0184574 A1 10/2003 Phillips et al.
2003/0189552 A1 10/2003 Chuang et al.
2003/0189647 A1 10/2003 Kang
2003/0201914 A1 10/2003 Fujiwara et al.
2003/0206169 A1 11/2003 Springer et al.
2003/0222915 A1 12/2003 Marion et al.
2004/0015662 A1 1/2004 Cummings
2004/0021643 A1 2/2004 Hoshino et al.
2004/0056849 A1 3/2004 Lohbihler et al.
2004/0108995 A1 6/2004 Hoshino et al.
2004/0138849 A1 7/2004 Schmidt et al.
2004/0141010 A1 7/2004 Fitzmaurice et al.
2004/0150631 A1 8/2004 Fleck et al.
2004/0150644 A1 8/2004 Kincaid et al.

(56) References Cited

U.S. PATENT DOCUMENTS

| | | | |
|---|---|---|---|
| 2004/0155869 A1 | 8/2004 | Robinson et al. | |
| 2004/0168131 A1 | 8/2004 | Blumberg | |
| 2004/0174399 A1 | 9/2004 | Wu et al. | |
| 2004/0219969 A1 | 11/2004 | Casey et al. | |
| 2004/0267877 A1 | 12/2004 | Shiparo et al. | |
| 2005/0012723 A1 | 1/2005 | Pallakoff | |
| 2005/0039141 A1 | 2/2005 | Burke et al. | |
| 2005/0064911 A1 | 3/2005 | Chen et al. | |
| 2005/0066207 A1 | 3/2005 | Fleck et al. | |
| 2005/0076256 A1 | 4/2005 | Fleck et al. | |
| 2005/0078093 A1 | 4/2005 | Peterson, Jr. et al. | |
| 2005/0091604 A1 | 4/2005 | Davis | |
| 2005/0110769 A1 | 5/2005 | DaCosta et al. | |
| 2005/0114785 A1 | 5/2005 | Finnigan et al. | |
| 2005/0125742 A1 | 6/2005 | Grotjohn et al. | |
| 2005/0134578 A1 | 6/2005 | Chambers et al. | |
| 2005/0156892 A1 | 7/2005 | Grant | |
| 2005/0183017 A1 | 8/2005 | Cain | |
| 2005/0190280 A1 | 9/2005 | Haas et al. | |
| 2005/0204295 A1 | 9/2005 | Voorhees et al. | |
| 2005/0223338 A1 | 10/2005 | Partanen | |
| 2005/0229112 A1 | 10/2005 | Clay et al. | |
| 2005/0283726 A1 | 12/2005 | Lunati | |
| 2005/0289476 A1 | 12/2005 | Tokkonen | |
| 2006/0001650 A1 | 1/2006 | Robbins et al. | |
| 2006/0001657 A1 | 1/2006 | Monney et al. | |
| 2006/0012577 A1 | 1/2006 | Kyrola | |
| 2006/0022955 A1 | 2/2006 | Kennedy | |
| 2006/0026536 A1 | 2/2006 | Hotelling et al. | |
| 2006/0031776 A1 | 2/2006 | Glein et al. | |
| 2006/0036945 A1 | 2/2006 | Radtke et al. | |
| 2006/0036971 A1 | 2/2006 | Mendel et al. | |
| 2006/0059436 A1 | 3/2006 | Nurmi | |
| 2006/0067677 A1 | 3/2006 | Tokiwa et al. | |
| 2006/0101347 A1 | 5/2006 | Runov et al. | |
| 2006/0101581 A1 | 5/2006 | Blanchard et al. | |
| 2006/0109252 A1 | 5/2006 | Kolmykov-Zotov et al. | |
| 2006/0109256 A1 | 5/2006 | Grant et al. | |
| 2006/0119586 A1 | 6/2006 | Grant et al. | |
| 2006/0132455 A1 | 6/2006 | Rimas-Ribikauskas et al. | |
| 2006/0132456 A1 | 6/2006 | Anson | |
| 2006/0132457 A1 | 6/2006 | Rimas-Ribikauskas et al. | |
| 2006/0136834 A1 | 6/2006 | Cao et al. | |
| 2006/0136845 A1 | 6/2006 | Rimas-Ribikauskas et al. | |
| 2006/0161861 A1 | 7/2006 | Holecek et al. | |
| 2006/0161870 A1 | 7/2006 | Hotelling et al. | |
| 2006/0187215 A1 | 8/2006 | Rosenberg et al. | |
| 2006/0190834 A1 | 8/2006 | Marcjan | |
| 2006/0195438 A1 | 8/2006 | Galuten | |
| 2006/0197753 A1 | 9/2006 | Hotelling | |
| 2006/0210958 A1 | 9/2006 | Rimas-Ribikauskas et al. | |
| 2006/0212812 A1 | 9/2006 | Simmons et al. | |
| 2006/0213754 A1 | 9/2006 | Jarrett et al. | |
| 2006/0224989 A1 | 10/2006 | Pettiross et al. | |
| 2006/0233248 A1 | 10/2006 | Rynderman et al. | |
| 2006/0236263 A1 | 10/2006 | Bathiche et al. | |
| 2006/0274042 A1 | 12/2006 | Krah et al. | |
| 2006/0274086 A1 | 12/2006 | Forstall et al. | |
| 2006/0277469 A1 | 12/2006 | Chaudhri et al. | |
| 2006/0282778 A1 | 12/2006 | Barsness et al. | |
| 2006/0284858 A1 | 12/2006 | Rekimoto | |
| 2006/0290681 A1 | 12/2006 | Ho et al. | |
| 2007/0003134 A1 | 1/2007 | Song et al. | |
| 2007/0024595 A1 | 2/2007 | Baker et al. | |
| 2007/0024646 A1 | 2/2007 | Saarinen et al. | |
| 2007/0036456 A1 | 2/2007 | Hooper | |
| 2007/0080953 A1 | 4/2007 | Lii | |
| 2007/0113681 A1 | 5/2007 | Nishimura et al. | |
| 2007/0120834 A1 | 5/2007 | Boillot | |
| 2007/0120835 A1 | 5/2007 | Sato | |
| 2007/0124699 A1 | 5/2007 | Michaels | |
| 2007/0152959 A1 | 7/2007 | Peters | |
| 2007/0157089 A1 | 7/2007 | Van Os et al. | |
| 2007/0157173 A1 | 7/2007 | Klein et al. | |
| 2007/0168369 A1 | 7/2007 | Bruns | |
| 2007/0168890 A1 | 7/2007 | Zhao et al. | |
| 2007/0176904 A1 | 8/2007 | Russo | |
| 2007/0182999 A1 | 8/2007 | Anthony et al. | |
| 2007/0183142 A1 | 8/2007 | Bollman et al. | |
| 2007/0186178 A1 | 8/2007 | Schiller | |
| 2007/0200713 A1 | 8/2007 | Weber et al. | |
| 2007/0222768 A1* | 9/2007 | Geurts | G06F 3/0482 345/173 |
| 2007/0229455 A1 | 10/2007 | Martin et al. | |
| 2007/0229464 A1 | 10/2007 | Hotelling et al. | |
| 2007/0236450 A1 | 10/2007 | Colgate et al. | |
| 2007/0236477 A1 | 10/2007 | Ryu et al. | |
| 2007/0245241 A1 | 10/2007 | Bertram et al. | |
| 2007/0257821 A1 | 11/2007 | Son et al. | |
| 2007/0270182 A1 | 11/2007 | Gulliksson et al. | |
| 2007/0288862 A1 | 12/2007 | Ording | |
| 2007/0294295 A1 | 12/2007 | Finkelstein et al. | |
| 2007/0299923 A1 | 12/2007 | Skelly et al. | |
| 2008/0001924 A1 | 1/2008 | de los Reyes et al. | |
| 2008/0010610 A1 | 1/2008 | Lim et al. | |
| 2008/0024459 A1 | 1/2008 | Poupyrev et al. | |
| 2008/0034306 A1 | 2/2008 | Ording | |
| 2008/0034331 A1 | 2/2008 | Josephsoon et al. | |
| 2008/0036743 A1 | 2/2008 | Westerman et al. | |
| 2008/0051989 A1 | 2/2008 | Welsh | |
| 2008/0052945 A1 | 3/2008 | Matas et al. | |
| 2008/0066010 A1 | 3/2008 | Brodersen et al. | |
| 2008/0094367 A1 | 4/2008 | Van De Ven et al. | |
| 2008/0094368 A1 | 4/2008 | Ording et al. | |
| 2008/0094398 A1 | 4/2008 | Ng et al. | |
| 2008/0106523 A1 | 5/2008 | Conrad | |
| 2008/0109753 A1 | 5/2008 | Karstens | |
| 2008/0136790 A1 | 6/2008 | Hio | |
| 2008/0155415 A1 | 6/2008 | Yoon et al. | |
| 2008/0163119 A1 | 7/2008 | Kim et al. | |
| 2008/0165141 A1 | 7/2008 | Christie | |
| 2008/0165146 A1 | 7/2008 | Matas | |
| 2008/0165160 A1 | 7/2008 | Kocienda et al. | |
| 2008/0168379 A1 | 7/2008 | Forstall et al. | |
| 2008/0168395 A1 | 7/2008 | Ording et al. | |
| 2008/0168403 A1 | 7/2008 | Westerman et al. | |
| 2008/0168404 A1 | 7/2008 | Ording | |
| 2008/0189605 A1 | 8/2008 | Kay et al. | |
| 2008/0202824 A1 | 8/2008 | Philipp et al. | |
| 2008/0204427 A1 | 8/2008 | Heesemans et al. | |
| 2008/0219493 A1 | 9/2008 | Tadmor | |
| 2008/0222569 A1 | 9/2008 | Champion et al. | |
| 2008/0225007 A1 | 9/2008 | Nakadaira et al. | |
| 2008/0244448 A1 | 10/2008 | Goering et al. | |
| 2008/0259046 A1 | 10/2008 | Carsanaro | |
| 2008/0263452 A1 | 10/2008 | Tomkins | |
| 2008/0284866 A1 | 11/2008 | Mizutani | |
| 2008/0294984 A1 | 11/2008 | Ramsay et al. | |
| 2008/0297475 A1 | 12/2008 | Woolf et al. | |
| 2008/0303795 A1 | 12/2008 | Lowles et al. | |
| 2008/0303799 A1 | 12/2008 | Schwesig et al. | |
| 2008/0307335 A1 | 12/2008 | Chaudhri et al. | |
| 2008/0307359 A1 | 12/2008 | Louch et al. | |
| 2008/0307361 A1 | 12/2008 | Louch et al. | |
| 2008/0317378 A1 | 12/2008 | Steinberg et al. | |
| 2008/0320419 A1 | 12/2008 | Matas et al. | |
| 2009/0007017 A1 | 1/2009 | Anzures et al. | |
| 2009/0016645 A1 | 1/2009 | Sako et al. | |
| 2009/0028359 A1 | 1/2009 | Terada et al. | |
| 2009/0046110 A1 | 2/2009 | Sadler et al. | |
| 2009/0058828 A1 | 3/2009 | Jiang et al. | |
| 2009/0061837 A1 | 3/2009 | Chaudhri et al. | |
| 2009/0064031 A1 | 3/2009 | Bull et al. | |
| 2009/0066668 A1 | 3/2009 | Kim et al. | |
| 2009/0073118 A1 | 3/2009 | Yamaji et al. | |
| 2009/0075738 A1 | 3/2009 | Pearce | |
| 2009/0083665 A1 | 3/2009 | Anttila et al. | |
| 2009/0085878 A1 | 4/2009 | Heubel et al. | |
| 2009/0085881 A1 | 4/2009 | Keam | |
| 2009/0085886 A1 | 4/2009 | Huang et al. | |
| 2009/0089293 A1 | 4/2009 | Garritano et al. | |
| 2009/0100343 A1 | 4/2009 | Lee et al. | |
| 2009/0102804 A1* | 4/2009 | Wong | G06F 3/03547 345/173 |

(56) References Cited

U.S. PATENT DOCUMENTS

2009/0102805 A1 4/2009 Meijer et al.
2009/0114079 A1 5/2009 Egan
2009/0140985 A1 6/2009 Liu
2009/0150775 A1 6/2009 Miyazaki et al.
2009/0158198 A1 6/2009 Hayter et al.
2009/0160793 A1 6/2009 Rekimoto
2009/0160814 A1 6/2009 Li et al.
2009/0164905 A1 6/2009 Ko
2009/0167507 A1 7/2009 Maenpaa
2009/0167508 A1 7/2009 Fadell et al.
2009/0167509 A1 7/2009 Fadell et al.
2009/0167701 A1 7/2009 Ronkainen
2009/0167704 A1 7/2009 Terlizzi et al.
2009/0169061 A1 7/2009 Anderson et al.
2009/0178008 A1 7/2009 Herz et al.
2009/0187824 A1 7/2009 Hinckley et al.
2009/0189866 A1 7/2009 Haffenden et al.
2009/0195959 A1 8/2009 Ladouceur et al.
2009/0198767 A1 8/2009 Jakobson et al.
2009/0201260 A1 8/2009 Lee et al.
2009/0219294 A1 9/2009 Young et al.
2009/0225037 A1 9/2009 Williamson et al.
2009/0228842 A1 9/2009 Westerman et al.
2009/0237374 A1 9/2009 Li et al.
2009/0244357 A1 10/2009 Huang
2009/0247112 A1 10/2009 Lundy et al.
2009/0247230 A1 10/2009 Lundy et al.
2009/0251410 A1 10/2009 Mori et al.
2009/0251421 A1 10/2009 Bloebaum
2009/0256947 A1 10/2009 Ciurea et al.
2009/0259975 A1 10/2009 Asai et al.
2009/0267906 A1 10/2009 Schroderus
2009/0273563 A1 11/2009 Pryor
2009/0276730 A1 11/2009 Aybes et al.
2009/0280860 A1 11/2009 Dahlke
2009/0282360 A1 11/2009 Park et al.
2009/0284478 A1 11/2009 De la Torre Baltierra et al.
2009/0288032 A1 11/2009 Chang et al.
2009/0289779 A1 11/2009 Braun et al.
2009/0293009 A1 11/2009 Meserth et al.
2009/0295713 A1 12/2009 Piot et al.
2009/0295739 A1 12/2009 Nagara
2009/0295943 A1 12/2009 Kim et al.
2009/0298546 A1 12/2009 Kim et al.
2009/0303187 A1 12/2009 Pallakoff
2009/0307583 A1 12/2009 Tonisson
2009/0307633 A1 12/2009 Haughay, Jr. et al.
2009/0322893 A1 12/2009 Stallings et al.
2009/0325566 A1 12/2009 Bell et al.
2010/0005390 A1 1/2010 Bong
2010/0007926 A1 1/2010 Imaizumi et al.
2010/0011304 A1 1/2010 Van Os
2010/0013613 A1 1/2010 Weston
2010/0013777 A1 1/2010 Baudisch et al.
2010/0017710 A1 1/2010 Kim et al.
2010/0020035 A1 1/2010 Ryu et al.
2010/0020221 A1 1/2010 Tupman et al.
2010/0026640 A1* 2/2010 Kim .................... G06F 3/04886 345/173
2010/0026647 A1 2/2010 Abe et al.
2010/0039446 A1 2/2010 Hillis et al.
2010/0044121 A1 2/2010 Simon et al.
2010/0045619 A1 2/2010 Birnbaum et al.
2010/0057235 A1* 3/2010 Wang .................... G06F 1/1626 715/810
2010/0058231 A1 3/2010 Duarte et al.
2010/0060548 A1 3/2010 Choi et al.
2010/0060605 A1 3/2010 Rimas-Ribikauskas et al.
2010/0061637 A1 3/2010 Mochizuki et al.
2010/0062803 A1 3/2010 Yun et al.
2010/0070908 A1 3/2010 Mori et al.
2010/0073329 A1 3/2010 Raman et al.
2010/0083116 A1 4/2010 Akifusa et al.
2010/0085302 A1 4/2010 Fairweather et al.
2010/0085314 A1 4/2010 Kwok
2010/0085317 A1 4/2010 Park et al.
2010/0088596 A1 4/2010 Griffin et al.
2010/0088634 A1 4/2010 Tsuruta et al.
2010/0088654 A1 4/2010 Henhoeffer
2010/0110082 A1 5/2010 Myrick et al.
2010/0111434 A1 5/2010 Madden
2010/0127983 A1 5/2010 Irani et al.
2010/0128002 A1 5/2010 Stacy et al.
2010/0138776 A1 6/2010 Korhonen
2010/0141606 A1 6/2010 Bae et al.
2010/0148999 A1 6/2010 Casparian et al.
2010/0149096 A1 6/2010 Migos et al.
2010/0153876 A1 6/2010 Kim et al.
2010/0153879 A1 6/2010 Rimas-Ribikauskas et al.
2010/0156807 A1 6/2010 Stallings et al.
2010/0156809 A1 6/2010 Nutaro et al.
2010/0156813 A1 6/2010 Duarte et al.
2010/0156818 A1 6/2010 Burrough et al.
2010/0156823 A1 6/2010 Paleczny et al.
2010/0156825 A1 6/2010 Sohn et al.
2010/0156830 A1 6/2010 Homma et al.
2010/0159995 A1 6/2010 Stallings et al.
2010/0171713 A1 7/2010 Kwok et al.
2010/0175023 A1 7/2010 Gatlin et al.
2010/0180225 A1 7/2010 Chiba et al.
2010/0188327 A1 7/2010 Frid et al.
2010/0199227 A1 8/2010 Xiao et al.
2010/0211872 A1 8/2010 Rolston et al.
2010/0214135 A1 8/2010 Bathiche et al.
2010/0214239 A1 8/2010 Wu
2010/0218663 A1 9/2010 Choi
2010/0220065 A1 9/2010 Ma
2010/0225456 A1 9/2010 Eldering
2010/0225604 A1 9/2010 Homma et al.
2010/0231533 A1 9/2010 Chaudhri
2010/0231534 A1 9/2010 Chaudhri et al.
2010/0231539 A1 9/2010 Cruz-Hernandez et al.
2010/0235118 A1 9/2010 Moore et al.
2010/0235726 A1 9/2010 Ording et al.
2010/0235733 A1 9/2010 Drislane et al.
2010/0235746 A1 9/2010 Anzures
2010/0240415 A1 9/2010 Kim et al.
2010/0241955 A1 9/2010 Price et al.
2010/0248787 A1 9/2010 Smuga et al.
2010/0251168 A1 9/2010 Fujita et al.
2010/0259500 A1 10/2010 Kennedy
2010/0271312 A1 10/2010 Alameh et al.
2010/0271500 A1 10/2010 Park et al.
2010/0277419 A1 11/2010 Ganey et al.
2010/0277496 A1 11/2010 Kawanishi et al.
2010/0281379 A1 11/2010 Meaney et al.
2010/0281385 A1 11/2010 Meaney et al.
2010/0283746 A1 11/2010 Vuong et al.
2010/0287486 A1 11/2010 Coddington
2010/0289807 A1 11/2010 Yu et al.
2010/0293460 A1 11/2010 Budelli
2010/0295789 A1 11/2010 Shin et al.
2010/0295805 A1 11/2010 Shin et al.
2010/0302177 A1 12/2010 Kim et al.
2010/0302179 A1 12/2010 Ahn et al.
2010/0306702 A1 12/2010 Warner
2010/0308983 A1 12/2010 Conte et al.
2010/0309147 A1 12/2010 Fleizach et al.
2010/0313050 A1 12/2010 Harrat et al.
2010/0313124 A1 12/2010 Privault et al.
2010/0313156 A1 12/2010 Louch et al.
2010/0313158 A1 12/2010 Lee et al.
2010/0313166 A1 12/2010 Nakayama et al.
2010/0315417 A1 12/2010 Cho et al.
2010/0315438 A1 12/2010 Horodezky et al.
2010/0317410 A1 12/2010 Song et al.
2010/0321301 A1 12/2010 Casparian et al.
2010/0321312 A1 12/2010 Han et al.
2010/0325578 A1 12/2010 Mital et al.
2010/0328229 A1 12/2010 Weber et al.
2010/0330972 A1 12/2010 Angiolillo
2011/0010626 A1 1/2011 Fino et al.
2011/0012851 A1 1/2011 Ciesla et al.
2011/0016390 A1 1/2011 Oh et al.

(56) References Cited

U.S. PATENT DOCUMENTS

| | | | |
|---|---|---|---|
| 2011/0018695 | A1 | 1/2011 | Bells et al. |
| 2011/0026099 | A1 | 2/2011 | Kwon et al. |
| 2011/0035145 | A1 | 2/2011 | Yamasaki |
| 2011/0037706 | A1 | 2/2011 | Pasquero et al. |
| 2011/0038552 | A1 | 2/2011 | Lam |
| 2011/0039602 | A1 | 2/2011 | McNamara et al. |
| 2011/0047368 | A1 | 2/2011 | Sundaramurthy et al. |
| 2011/0047459 | A1 | 2/2011 | Van Der Westhuizen |
| 2011/0050576 | A1 | 3/2011 | Forutanpour et al. |
| 2011/0050588 | A1 | 3/2011 | Li et al. |
| 2011/0050591 | A1 | 3/2011 | Kim et al. |
| 2011/0050594 | A1 | 3/2011 | Kim et al. |
| 2011/0050628 | A1 | 3/2011 | Homma et al. |
| 2011/0050629 | A1 | 3/2011 | Homma et al. |
| 2011/0050630 | A1 | 3/2011 | Ikeda |
| 2011/0050653 | A1 | 3/2011 | Miyazawa et al. |
| 2011/0050687 | A1 | 3/2011 | Alyshev et al. |
| 2011/0054837 | A1 | 3/2011 | Ikeda |
| 2011/0055135 | A1 | 3/2011 | Dawson et al. |
| 2011/0055741 | A1 | 3/2011 | Jeon et al. |
| 2011/0057886 | A1 | 3/2011 | Ng et al. |
| 2011/0057903 | A1 | 3/2011 | Yamano et al. |
| 2011/0061021 | A1 | 3/2011 | Kang et al. |
| 2011/0061029 | A1 | 3/2011 | Yeh et al. |
| 2011/0063236 | A1 | 3/2011 | Arai et al. |
| 2011/0063248 | A1 | 3/2011 | Yoon |
| 2011/0069012 | A1 | 3/2011 | Martensson |
| 2011/0069016 | A1 | 3/2011 | Victor |
| 2011/0074697 | A1 | 3/2011 | Rapp et al. |
| 2011/0080349 | A1 | 4/2011 | Holbein et al. |
| 2011/0080350 | A1 | 4/2011 | Almalki et al. |
| 2011/0080367 | A1 | 4/2011 | Marchand et al. |
| 2011/0084910 | A1 | 4/2011 | Almalki et al. |
| 2011/0087982 | A1 | 4/2011 | McCann et al. |
| 2011/0087983 | A1 | 4/2011 | Shim |
| 2011/0093815 | A1 | 4/2011 | Gobeil |
| 2011/0093817 | A1 | 4/2011 | Song et al. |
| 2011/0102829 | A1 | 5/2011 | Jourdan |
| 2011/0107272 | A1 | 5/2011 | Aquilar |
| 2011/0109617 | A1 | 5/2011 | Snook et al. |
| 2011/0116716 | A1 | 5/2011 | Kwon et al. |
| 2011/0119610 | A1 | 5/2011 | Hackborn et al. |
| 2011/0126139 | A1 | 5/2011 | Jeong et al. |
| 2011/0138295 | A1 | 6/2011 | Momchilov et al. |
| 2011/0141031 | A1 | 6/2011 | McCullough et al. |
| 2011/0141052 | A1 | 6/2011 | Bernstein et al. |
| 2011/0144777 | A1 | 6/2011 | Firkins et al. |
| 2011/0145752 | A1 | 6/2011 | Fagans |
| 2011/0145753 | A1 | 6/2011 | Prakash |
| 2011/0145759 | A1 | 6/2011 | Leffert et al. |
| 2011/0145764 | A1 | 6/2011 | Higuchi et al. |
| 2011/0149138 | A1 | 6/2011 | Watkins |
| 2011/0154199 | A1 | 6/2011 | Maffitt et al. |
| 2011/0163971 | A1 | 7/2011 | Wagner et al. |
| 2011/0163978 | A1 | 7/2011 | Park et al. |
| 2011/0169765 | A1 | 7/2011 | Aono |
| 2011/0175826 | A1 | 7/2011 | Moore et al. |
| 2011/0175832 | A1 | 7/2011 | Miyazawa et al. |
| 2011/0181521 | A1 | 7/2011 | Reid et al. |
| 2011/0181526 | A1 | 7/2011 | Shaffer et al. |
| 2011/0181538 | A1 | 7/2011 | Aono |
| 2011/0181751 | A1 | 7/2011 | Mizumori |
| 2011/0185299 | A1 | 7/2011 | Hinckley et al. |
| 2011/0185300 | A1 | 7/2011 | Hinckley et al. |
| 2011/0185316 | A1 | 7/2011 | Reid et al. |
| 2011/0191675 | A1 | 8/2011 | Kauranen |
| 2011/0193788 | A1 | 8/2011 | King et al. |
| 2011/0193809 | A1 | 8/2011 | Walley et al. |
| 2011/0193881 | A1 | 8/2011 | Rydenhag |
| 2011/0197160 | A1 | 8/2011 | Kim et al. |
| 2011/0201387 | A1 | 8/2011 | Paek et al. |
| 2011/0202834 | A1 | 8/2011 | Mandryk et al. |
| 2011/0202853 | A1 | 8/2011 | Mujkic |
| 2011/0202879 | A1 | 8/2011 | Stovicek et al. |
| 2011/0205163 | A1 | 8/2011 | Hinckley et al. |
| 2011/0209088 | A1 | 8/2011 | Hinckley et al. |
| 2011/0209093 | A1 | 8/2011 | Hinckley et al. |
| 2011/0209097 | A1 | 8/2011 | Hinckley et al. |
| 2011/0209099 | A1 | 8/2011 | Hinckley et al. |
| 2011/0209104 | A1 | 8/2011 | Hinckley et al. |
| 2011/0210834 | A1 | 9/2011 | Pasquero et al. |
| 2011/0210926 | A1 | 9/2011 | Pasquero et al. |
| 2011/0210931 | A1 | 9/2011 | Shai |
| 2011/0215914 | A1 | 9/2011 | Edwards |
| 2011/0221684 | A1 | 9/2011 | Rydenhag |
| 2011/0221776 | A1 | 9/2011 | Shimotani et al. |
| 2011/0231789 | A1 | 9/2011 | Bukurak et al. |
| 2011/0234491 | A1 | 9/2011 | Nurmi |
| 2011/0234639 | A1 | 9/2011 | Shimotani et al. |
| 2011/0238690 | A1 | 9/2011 | Arrasvouri et al. |
| 2011/0239110 | A1 | 9/2011 | Garrett et al. |
| 2011/0242029 | A1 | 10/2011 | Kasahara et al. |
| 2011/0246801 | A1 | 10/2011 | Seethaler et al. |
| 2011/0246877 | A1 | 10/2011 | Kwak et al. |
| 2011/0248916 | A1 | 10/2011 | Griffin et al. |
| 2011/0248930 | A1 | 10/2011 | Kwok et al. |
| 2011/0248942 | A1 | 10/2011 | Yana et al. |
| 2011/0248948 | A1 | 10/2011 | Griffin et al. |
| 2011/0252346 | A1 | 10/2011 | Chaudhri |
| 2011/0252357 | A1 | 10/2011 | Chaudhri |
| 2011/0252362 | A1 | 10/2011 | Cho et al. |
| 2011/0252369 | A1 | 10/2011 | Chaudhri |
| 2011/0252380 | A1 | 10/2011 | Chaudhri |
| 2011/0258537 | A1 | 10/2011 | Rives et al. |
| 2011/0260994 | A1 | 10/2011 | Saynac et al. |
| 2011/0263298 | A1 | 10/2011 | Park |
| 2011/0265035 | A1 | 10/2011 | Lepage et al. |
| 2011/0267530 | A1 | 11/2011 | Chun |
| 2011/0279380 | A1 | 11/2011 | Weber et al. |
| 2011/0279381 | A1 | 11/2011 | Tong et al. |
| 2011/0279395 | A1 | 11/2011 | Kuwabara et al. |
| 2011/0279852 | A1 | 11/2011 | Oda et al. |
| 2011/0285656 | A1 | 11/2011 | Yaksick et al. |
| 2011/0285659 | A1 | 11/2011 | Kuwabara et al. |
| 2011/0291945 | A1 | 12/2011 | Ewing, Jr. et al. |
| 2011/0291951 | A1 | 12/2011 | Tong |
| 2011/0296334 | A1 | 12/2011 | Ryu et al. |
| 2011/0296351 | A1 | 12/2011 | Ewing, Jr. et al. |
| 2011/0304559 | A1 | 12/2011 | Pasquero |
| 2011/0304577 | A1 | 12/2011 | Brown et al. |
| 2011/0310049 | A1 | 12/2011 | Homma et al. |
| 2011/0319136 | A1 | 12/2011 | Labowicz et al. |
| 2012/0001856 | A1 | 1/2012 | Davidson |
| 2012/0005622 | A1 | 1/2012 | Park et al. |
| 2012/0007857 | A1 | 1/2012 | Noda et al. |
| 2012/0011437 | A1 | 1/2012 | James et al. |
| 2012/0013541 | A1 | 1/2012 | Boka et al. |
| 2012/0013542 | A1 | 1/2012 | Shenfield |
| 2012/0013607 | A1 | 1/2012 | Lee |
| 2012/0019448 | A1 | 1/2012 | Pitkanen et al. |
| 2012/0023591 | A1 | 1/2012 | Sahita et al. |
| 2012/0026110 | A1 | 2/2012 | Yamano |
| 2012/0030623 | A1 | 2/2012 | Hoellwarth |
| 2012/0032979 | A1 | 2/2012 | Blow et al. |
| 2012/0036441 | A1 | 2/2012 | Basir et al. |
| 2012/0036556 | A1 | 2/2012 | LeBeau et al. |
| 2012/0038580 | A1 | 2/2012 | Sasaki |
| 2012/0044153 | A1 | 2/2012 | Arrasvouri et al. |
| 2012/0047380 | A1 | 2/2012 | Nurmi |
| 2012/0056837 | A1 | 3/2012 | Park et al. |
| 2012/0056848 | A1 | 3/2012 | Yamano et al. |
| 2012/0060123 | A1 | 3/2012 | Smith |
| 2012/0062470 | A1 | 3/2012 | Chang |
| 2012/0062564 | A1 | 3/2012 | Miyashita et al. |
| 2012/0062604 | A1 | 3/2012 | Lobo |
| 2012/0062732 | A1 | 3/2012 | Marman et al. |
| 2012/0066630 | A1 | 3/2012 | Kim et al. |
| 2012/0066636 | A1 | 3/2012 | Kaprani et al. |
| 2012/0066648 | A1 | 3/2012 | Rolleston et al. |
| 2012/0081326 | A1 | 4/2012 | Heubel et al. |
| 2012/0081375 | A1 | 4/2012 | Robert et al. |
| 2012/0084644 | A1 | 4/2012 | Robert et al. |
| 2012/0084689 | A1 | 4/2012 | Ledet et al. |
| 2012/0084713 | A1 | 4/2012 | Desai et al. |

(56) References Cited

U.S. PATENT DOCUMENTS

| | | | |
|---|---|---|---|
| 2012/0089932 | A1 | 4/2012 | Kano et al. |
| 2012/0089942 | A1 | 4/2012 | Gammon |
| 2012/0089951 | A1 | 4/2012 | Cassidy |
| 2012/0092381 | A1 | 4/2012 | Hoover et al. |
| 2012/0096393 | A1 | 4/2012 | Shim et al. |
| 2012/0096400 | A1 | 4/2012 | Cho |
| 2012/0098780 | A1 | 4/2012 | Fujisawa et al. |
| 2012/0102437 | A1 | 4/2012 | Worley et al. |
| 2012/0105358 | A1 | 5/2012 | Momeyer et al. |
| 2012/0105367 | A1 | 5/2012 | Son et al. |
| 2012/0106852 | A1 | 5/2012 | Khawand et al. |
| 2012/0113007 | A1 | 5/2012 | Koch et al. |
| 2012/0113023 | A1 | 5/2012 | Koch et al. |
| 2012/0126962 | A1 | 5/2012 | Ujii et al. |
| 2012/0131495 | A1 | 5/2012 | Goossens et al. |
| 2012/0139844 | A1 | 6/2012 | Ramstein et al. |
| 2012/0139864 | A1 | 6/2012 | Sleeman et al. |
| 2012/0144330 | A1 | 6/2012 | Flint |
| 2012/0146945 | A1 | 6/2012 | Miyazawa et al. |
| 2012/0147052 | A1 | 6/2012 | Homma et al. |
| 2012/0154303 | A1 | 6/2012 | Lazaridis et al. |
| 2012/0154328 | A1 | 6/2012 | Kono |
| 2012/0158629 | A1 | 6/2012 | Hinckley et al. |
| 2012/0159380 | A1 | 6/2012 | Kocienda et al. |
| 2012/0169646 | A1 | 7/2012 | Berkes et al. |
| 2012/0169716 | A1 | 7/2012 | Mihara |
| 2012/0169768 | A1 | 7/2012 | Roth et al. |
| 2012/0176403 | A1 | 7/2012 | Cha et al. |
| 2012/0179967 | A1 | 7/2012 | Hayes |
| 2012/0180001 | A1 | 7/2012 | Griffen et al. |
| 2012/0182226 | A1 | 7/2012 | Tuli |
| 2012/0183271 | A1 | 7/2012 | Forutanpour et al. |
| 2012/0192108 | A1 | 7/2012 | Kolb |
| 2012/0192114 | A1 | 7/2012 | DeLuca |
| 2012/0200528 | A1 | 8/2012 | Ciesla et al. |
| 2012/0203544 | A1 | 8/2012 | Kushler |
| 2012/0206393 | A1 | 8/2012 | Hillis et al. |
| 2012/0216114 | A1 | 8/2012 | Privault et al. |
| 2012/0218203 | A1 | 8/2012 | Kanki |
| 2012/0235912 | A1 | 9/2012 | Laubach |
| 2012/0236037 | A1 | 9/2012 | Lessing et al. |
| 2012/0240044 | A1 | 9/2012 | Johnson et al. |
| 2012/0242584 | A1 | 9/2012 | Tuli |
| 2012/0245922 | A1 | 9/2012 | Koslova et al. |
| 2012/0249575 | A1 | 10/2012 | Krolczyk et al. |
| 2012/0249853 | A1 | 10/2012 | Krolczyk et al. |
| 2012/0250598 | A1 | 10/2012 | Lonnfors et al. |
| 2012/0256829 | A1 | 10/2012 | Dodge |
| 2012/0256846 | A1 | 10/2012 | Mak |
| 2012/0256847 | A1 | 10/2012 | Mak et al. |
| 2012/0256857 | A1 | 10/2012 | Mak |
| 2012/0257071 | A1 | 10/2012 | Prentice |
| 2012/0260208 | A1 | 10/2012 | Jung |
| 2012/0260219 | A1 | 10/2012 | Piccolotto |
| 2012/0260220 | A1 | 10/2012 | Griffin |
| 2012/0274578 | A1 | 11/2012 | Snow et al. |
| 2012/0274591 | A1 | 11/2012 | Rimas-Ribikauskas et al. |
| 2012/0274662 | A1 | 11/2012 | Kim et al. |
| 2012/0278744 | A1 | 11/2012 | Kozitsyn et al. |
| 2012/0284673 | A1 | 11/2012 | Lamb et al. |
| 2012/0293449 | A1 | 11/2012 | Dietz |
| 2012/0293551 | A1 | 11/2012 | Momeyer et al. |
| 2012/0297041 | A1 | 11/2012 | Momchilov |
| 2012/0303548 | A1 | 11/2012 | Johnson et al. |
| 2012/0304108 | A1 | 11/2012 | Jarrett et al. |
| 2012/0304132 | A1 | 11/2012 | Sareen et al. |
| 2012/0304133 | A1 | 11/2012 | Nan et al. |
| 2012/0306632 | A1 | 12/2012 | Fleizach et al. |
| 2012/0306748 | A1 | 12/2012 | Fleizach et al. |
| 2012/0306764 | A1 | 12/2012 | Kamibeppu |
| 2012/0306765 | A1 | 12/2012 | Moore |
| 2012/0306766 | A1 | 12/2012 | Moore |
| 2012/0306772 | A1 | 12/2012 | Tan et al. |
| 2012/0306778 | A1 | 12/2012 | Wheeldreyer et al. |
| 2012/0306927 | A1 | 12/2012 | Lee et al. |
| 2012/0311429 | A1 | 12/2012 | Decker et al. |
| 2012/0311437 | A1 | 12/2012 | Weeldreyer et al. |
| 2012/0311498 | A1 | 12/2012 | Kluttz et al. |
| 2012/0311504 | A1 | 12/2012 | van Os et al. |
| 2012/0313847 | A1 | 12/2012 | Boda et al. |
| 2012/0327098 | A1 | 12/2012 | Cheng |
| 2013/0002561 | A1 | 1/2013 | Wakasa |
| 2013/0011065 | A1 | 1/2013 | Yoshida |
| 2013/0014057 | A1 | 1/2013 | Reinpoldt et al. |
| 2013/0016042 | A1 | 1/2013 | Makinen et al. |
| 2013/0016056 | A1 | 1/2013 | Shinozaki et al. |
| 2013/0016122 | A1 | 1/2013 | Bhatt et al. |
| 2013/0019158 | A1 | 1/2013 | Watanabe |
| 2013/0019174 | A1 | 1/2013 | Gil et al. |
| 2013/0031514 | A1 | 1/2013 | Gabbert |
| 2013/0036386 | A1 | 2/2013 | Park et al. |
| 2013/0042199 | A1 | 2/2013 | Fong et al. |
| 2013/0044062 | A1 | 2/2013 | Bose et al. |
| 2013/0047100 | A1 | 2/2013 | Kroeger et al. |
| 2013/0050131 | A1 | 2/2013 | Lee et al. |
| 2013/0050143 | A1 | 2/2013 | Kim et al. |
| 2013/0061172 | A1 | 3/2013 | Huang et al. |
| 2013/0063364 | A1 | 3/2013 | Moore |
| 2013/0063389 | A1 | 3/2013 | Moore |
| 2013/0067383 | A1 | 3/2013 | Kataoka et al. |
| 2013/0067513 | A1 | 3/2013 | Takami |
| 2013/0067527 | A1 | 3/2013 | Ashbook et al. |
| 2013/0069889 | A1 | 3/2013 | Pearce et al. |
| 2013/0069991 | A1 | 3/2013 | Davidson |
| 2013/0074003 | A1 | 3/2013 | Dolenc |
| 2013/0076649 | A1 | 3/2013 | Myers et al. |
| 2013/0076676 | A1 | 3/2013 | Gan |
| 2013/0077804 | A1 | 3/2013 | Glebe et al. |
| 2013/0082824 | A1 | 4/2013 | Colley |
| 2013/0082937 | A1 | 4/2013 | Liu et al. |
| 2013/0086056 | A1 | 4/2013 | Dyor et al. |
| 2013/0088455 | A1 | 4/2013 | Jeong |
| 2013/0093691 | A1 | 4/2013 | Moosavi |
| 2013/0093764 | A1 | 4/2013 | Andersson et al. |
| 2013/0097520 | A1 | 4/2013 | Lewin et al. |
| 2013/0097521 | A1 | 4/2013 | Lewin et al. |
| 2013/0097534 | A1 | 4/2013 | Lewin et al. |
| 2013/0097539 | A1 | 4/2013 | Mansson et al. |
| 2013/0097556 | A1 | 4/2013 | Louch |
| 2013/0097562 | A1 | 4/2013 | Kermoian et al. |
| 2013/0100045 | A1 | 4/2013 | Honji et al. |
| 2013/0102366 | A1 | 4/2013 | Teng et al. |
| 2013/0111345 | A1 | 5/2013 | Newman et al. |
| 2013/0111378 | A1 | 5/2013 | Newman et al. |
| 2013/0111398 | A1 | 5/2013 | Lu et al. |
| 2013/0111415 | A1 | 5/2013 | Newman et al. |
| 2013/0111579 | A1 | 5/2013 | Newman et al. |
| 2013/0113715 | A1 | 5/2013 | Grant et al. |
| 2013/0113720 | A1 | 5/2013 | Van Eerd et al. |
| 2013/0113760 | A1 | 5/2013 | Gossweiler, III et al. |
| 2013/0120278 | A1 | 5/2013 | Cantrell |
| 2013/0120280 | A1 | 5/2013 | Kukulski |
| 2013/0120295 | A1 | 5/2013 | Kim et al. |
| 2013/0120306 | A1 | 5/2013 | Furukawa |
| 2013/0125039 | A1 | 5/2013 | Murata |
| 2013/0127755 | A1 | 5/2013 | Lynn et al. |
| 2013/0135243 | A1 | 5/2013 | Hirsch et al. |
| 2013/0135288 | A1 | 5/2013 | King et al. |
| 2013/0135499 | A1 | 5/2013 | Song |
| 2013/0141364 | A1 | 6/2013 | Lynn et al. |
| 2013/0141396 | A1 | 6/2013 | Lynn et al. |
| 2013/0145290 | A1 | 6/2013 | Weber et al. |
| 2013/0145313 | A1 | 6/2013 | Roh et al. |
| 2013/0154948 | A1 | 6/2013 | Schediwy et al. |
| 2013/0154959 | A1 | 6/2013 | Lindsay et al. |
| 2013/0155018 | A1 | 6/2013 | Dagdeviren |
| 2013/0159893 | A1 | 6/2013 | Lewis et al. |
| 2013/0159930 | A1 | 6/2013 | Paretti et al. |
| 2013/0162603 | A1 | 6/2013 | Peng et al. |
| 2013/0162667 | A1 | 6/2013 | Eskolin et al. |
| 2013/0169549 | A1 | 7/2013 | Seymour et al. |
| 2013/0174049 | A1 | 7/2013 | Townsend et al. |
| 2013/0174089 | A1 | 7/2013 | Ki |
| 2013/0174094 | A1 | 7/2013 | Heo et al. |

(56) References Cited

U.S. PATENT DOCUMENTS

2013/0174179 A1 7/2013 Park et al.
2013/0179840 A1 7/2013 Fisher et al.
2013/0185642 A1 7/2013 Gammons
2013/0187869 A1 7/2013 Rydenhag et al.
2013/0191791 A1 7/2013 Rydenhag et al.
2013/0194217 A1 8/2013 Lee et al.
2013/0194480 A1 8/2013 Fukata et al.
2013/0198690 A1 8/2013 Barsoum et al.
2013/0201139 A1 8/2013 Tanaka
2013/0205243 A1 8/2013 Rivera et al.
2013/0212515 A1 8/2013 Eleftheriou
2013/0212541 A1 8/2013 Dolenc et al.
2013/0215079 A1 8/2013 Johnson et al.
2013/0222274 A1 8/2013 Mori et al.
2013/0222323 A1 8/2013 McKenzie
2013/0222333 A1 8/2013 Miles et al.
2013/0222671 A1 8/2013 Tseng et al.
2013/0225238 A1 8/2013 He
2013/0227413 A1 8/2013 Thorsander et al.
2013/0227419 A1 8/2013 Lee et al.
2013/0227450 A1 8/2013 Na et al.
2013/0228023 A1 9/2013 Drasnin et al.
2013/0232353 A1 9/2013 Belesiu et al.
2013/0232402 A1 9/2013 Lu et al.
2013/0234929 A1 9/2013 Libin
2013/0239057 A1 9/2013 Ubillos et al.
2013/0246954 A1 9/2013 Gray et al.
2013/0249814 A1 9/2013 Zeng
2013/0257793 A1 10/2013 Zeliff et al.
2013/0257817 A1 10/2013 Yliaho
2013/0265246 A1 10/2013 Tae
2013/0265452 A1 10/2013 Shin et al.
2013/0268875 A1 10/2013 Han et al.
2013/0271395 A1 10/2013 Tsai et al.
2013/0275422 A1 10/2013 Silber et al.
2013/0278520 A1 10/2013 Weng et al.
2013/0293496 A1 11/2013 Takamoto
2013/0305184 A1 11/2013 Kim et al.
2013/0307790 A1 11/2013 Konttori et al.
2013/0307792 A1 11/2013 Andres et al.
2013/0314359 A1 11/2013 Sudou
2013/0314434 A1 11/2013 Shetterly et al.
2013/0321340 A1 12/2013 Seo et al.
2013/0321457 A1 12/2013 Bauermeister et al.
2013/0325342 A1 12/2013 Pylappan et al.
2013/0326420 A1 12/2013 Liu et al.
2013/0326421 A1 12/2013 Jo
2013/0326583 A1 12/2013 Freihold et al.
2013/0328770 A1 12/2013 Parham
2013/0328793 A1 12/2013 Chowdhury
2013/0328796 A1 12/2013 Al-Dahle et al.
2013/0332836 A1 12/2013 Cho
2013/0332892 A1 12/2013 Matsuki
2013/0335373 A1 12/2013 Tomiyasu
2013/0338847 A1 12/2013 Lisseman et al.
2013/0339001 A1 12/2013 Craswell et al.
2013/0339909 A1 12/2013 Ha
2014/0002355 A1 1/2014 Lee et al.
2014/0002374 A1 1/2014 Hunt et al.
2014/0002386 A1 1/2014 Rosenberg et al.
2014/0013271 A1 1/2014 Moore et al.
2014/0015784 A1 1/2014 Oonishi
2014/0024414 A1 1/2014 Fuji
2014/0026098 A1 1/2014 Gilman
2014/0026099 A1 1/2014 Andersson Reimer et al.
2014/0028554 A1 1/2014 De Los Reyes et al.
2014/0028571 A1 1/2014 St. Clair
2014/0028601 A1 1/2014 Moore
2014/0028606 A1 1/2014 Giannetta
2014/0035804 A1 2/2014 Dearman
2014/0035826 A1 2/2014 Frazier et al.
2014/0049483 A1 2/2014 Kim
2014/0049491 A1 2/2014 Nagar et al.
2014/0053116 A1 2/2014 Smith et al.
2014/0055367 A1 2/2014 Dearman et al.
2014/0055377 A1 2/2014 Kim
2014/0059460 A1 2/2014 Ho
2014/0059485 A1 2/2014 Lehrian et al.
2014/0063316 A1 3/2014 Lee et al.
2014/0063541 A1 3/2014 Yamazaki
2014/0067293 A1 3/2014 Parivar et al.
2014/0068475 A1 3/2014 Li et al.
2014/0071060 A1 3/2014 Santos-Gomez
2014/0072281 A1 3/2014 Cho et al.
2014/0072283 A1 3/2014 Cho et al.
2014/0078318 A1 3/2014 Alameh
2014/0078343 A1 3/2014 Dai et al.
2014/0082536 A1 3/2014 Costa et al.
2014/0092025 A1 4/2014 Pala et al.
2014/0092030 A1 4/2014 Van der Velden
2014/0092031 A1 4/2014 Schwartz et al.
2014/0108936 A1 4/2014 Khosropour et al.
2014/0109016 A1 4/2014 Ouyang et al.
2014/0111456 A1 4/2014 Kashiwa et al.
2014/0111480 A1 4/2014 Kim et al.
2014/0111670 A1 4/2014 Lord et al.
2014/0118268 A1 5/2014 Kuscher
2014/0123080 A1 5/2014 Gan
2014/0139456 A1 5/2014 Wigdor et al.
2014/0139471 A1 5/2014 Matsuki
2014/0145970 A1 5/2014 Cho
2014/0152581 A1 6/2014 Case et al.
2014/0157203 A1 6/2014 Jeon et al.
2014/0160063 A1 6/2014 Yairi et al.
2014/0160073 A1 6/2014 Matsuki
2014/0160168 A1 6/2014 Ogle
2014/0164955 A1 6/2014 Thiruvidam et al.
2014/0164966 A1 6/2014 Kim et al.
2014/0165006 A1 6/2014 Chaudhri et al.
2014/0168093 A1 6/2014 Lawrence
2014/0168110 A1 6/2014 Araki et al.
2014/0168153 A1 6/2014 Deichmann et al.
2014/0173517 A1 6/2014 Chaudhri
2014/0179377 A1 6/2014 Song et al.
2014/0184526 A1 7/2014 Cho
2014/0201660 A1 7/2014 Clausen et al.
2014/0208271 A1 7/2014 Bell et al.
2014/0210741 A1 7/2014 Komatsu et al.
2014/0210758 A1 7/2014 Park et al.
2014/0210760 A1 7/2014 Aberg et al.
2014/0210798 A1 7/2014 Wilson
2014/0223376 A1 8/2014 Tarvainen et al.
2014/0223381 A1 8/2014 Huang et al.
2014/0232669 A1 8/2014 Ohlsson et al.
2014/0237408 A1 8/2014 Ohlsson et al.
2014/0245202 A1 8/2014 Yoon et al.
2014/0245367 A1 8/2014 Sasaki et al.
2014/0253305 A1 9/2014 Rosenberg et al.
2014/0267114 A1 9/2014 Lisseman et al.
2014/0267135 A1 9/2014 Chhabra
2014/0267362 A1 9/2014 Kocienda et al.
2014/0267363 A1 9/2014 Kocienda et al.
2014/0282084 A1 9/2014 Murarka et al.
2014/0282211 A1 9/2014 Ady et al.
2014/0282214 A1 9/2014 Shirzadi et al.
2014/0298258 A1 10/2014 Doan et al.
2014/0300569 A1 10/2014 Matsuki et al.
2014/0304599 A1 10/2014 Alexandersson
2014/0304646 A1 10/2014 Rossman
2014/0304651 A1 10/2014 Johansson et al.
2014/0306897 A1 10/2014 Cueto
2014/0306899 A1 10/2014 Hicks
2014/0310638 A1 10/2014 Lee et al.
2014/0313130 A1 10/2014 Yamano et al.
2014/0333551 A1 11/2014 Kim et al.
2014/0333561 A1 11/2014 Bull et al.
2014/0337791 A1 11/2014 Agnetta et al.
2014/0344765 A1 11/2014 Hicks et al.
2014/0351744 A1 11/2014 Jeon et al.
2014/0354845 A1 12/2014 Molgaard et al.
2014/0354850 A1 12/2014 Kosaka et al.
2014/0359438 A1 12/2014 Matsuki
2014/0359528 A1 12/2014 Murata
2014/0361982 A1 12/2014 Shaffer

(56) References Cited

U.S. PATENT DOCUMENTS

| | | | |
|---|---|---|---|
| 2014/0365882 | A1 | 12/2014 | Lemay |
| 2014/0365945 | A1 | 12/2014 | Karunamuni et al. |
| 2014/0365956 | A1 | 12/2014 | Karunamuni et al. |
| 2014/0368436 | A1 | 12/2014 | Abzarian et al. |
| 2014/0380247 | A1 | 12/2014 | Tecarro et al. |
| 2015/0002664 | A1 | 1/2015 | Eppinger et al. |
| 2015/0012861 | A1 | 1/2015 | Loginov |
| 2015/0015763 | A1 | 1/2015 | Lee et al. |
| 2015/0019997 | A1 | 1/2015 | Kim et al. |
| 2015/0020032 | A1 | 1/2015 | Chen |
| 2015/0020033 | A1 | 1/2015 | Newham et al. |
| 2015/0020036 | A1 | 1/2015 | Kim et al. |
| 2015/0022328 | A1 | 1/2015 | Choudhury |
| 2015/0022482 | A1 | 1/2015 | Hewitt et al. |
| 2015/0026584 | A1 | 1/2015 | Kobayakov et al. |
| 2015/0026592 | A1 | 1/2015 | Mohammed et al. |
| 2015/0026642 | A1 | 1/2015 | Wilson et al. |
| 2015/0029149 | A1 | 1/2015 | Andersson et al. |
| 2015/0033184 | A1 | 1/2015 | Kim et al. |
| 2015/0040065 | A1 | 2/2015 | Bianco et al. |
| 2015/0042588 | A1 | 2/2015 | Park |
| 2015/0046876 | A1 | 2/2015 | Goldenberg |
| 2015/0049033 | A1 | 2/2015 | Kim et al. |
| 2015/0052464 | A1 | 2/2015 | Chen et al. |
| 2015/0055890 | A1 | 2/2015 | Lundin et al. |
| 2015/0058723 | A1 | 2/2015 | Cieplinski et al. |
| 2015/0062046 | A1 | 3/2015 | Cho et al. |
| 2015/0062052 | A1 | 3/2015 | Bernstein et al. |
| 2015/0062068 | A1 | 3/2015 | Shih et al. |
| 2015/0067495 | A1 | 3/2015 | Bernstein et al. |
| 2015/0067496 | A1 | 3/2015 | Missig et al. |
| 2015/0067497 | A1 | 3/2015 | Cieplinski et al. |
| 2015/0067513 | A1 | 3/2015 | Zambetti et al. |
| 2015/0067519 | A1 | 3/2015 | Missig et al. |
| 2015/0067534 | A1 | 3/2015 | Choi et al. |
| 2015/0067559 | A1 | 3/2015 | Missig et al. |
| 2015/0067560 | A1 | 3/2015 | Cieplinski et al. |
| 2015/0067563 | A1 | 3/2015 | Bernstein et al. |
| 2015/0067596 | A1 | 3/2015 | Brown et al. |
| 2015/0067601 | A1 | 3/2015 | Bernstein et al. |
| 2015/0067602 | A1 | 3/2015 | Bernstein et al. |
| 2015/0067605 | A1 | 3/2015 | Zambetti et al. |
| 2015/0071547 | A1 | 3/2015 | Keating et al. |
| 2015/0082162 | A1 | 3/2015 | Cho et al. |
| 2015/0082238 | A1 | 3/2015 | Meng |
| 2015/0116205 | A1 | 4/2015 | Westerman et al. |
| 2015/0121218 | A1 | 4/2015 | Kim et al. |
| 2015/0121225 | A1 | 4/2015 | Somasundaram et al. |
| 2015/0128092 | A1 | 5/2015 | Lee et al. |
| 2015/0135108 | A1 | 5/2015 | Pope et al. |
| 2015/0135109 | A1 | 5/2015 | Zambetti et al. |
| 2015/0138126 | A1 | 5/2015 | Westerman |
| 2015/0138155 | A1 | 5/2015 | Bernstein et al. |
| 2015/0139605 | A1 | 5/2015 | Wiklof |
| 2015/0143273 | A1 | 5/2015 | Bernstein et al. |
| 2015/0143284 | A1 | 5/2015 | Bennett et al. |
| 2015/0143294 | A1 | 5/2015 | Piccinato et al. |
| 2015/0143299 | A1 | 5/2015 | Kim et al. |
| 2015/0143303 | A1 | 5/2015 | Sarrazin et al. |
| 2015/0149899 | A1 | 5/2015 | Bernstein et al. |
| 2015/0149964 | A1 | 5/2015 | Bernstein et al. |
| 2015/0149967 | A1 | 5/2015 | Bernstein et al. |
| 2015/0153897 | A1 | 6/2015 | Huang et al. |
| 2015/0153929 | A1 | 6/2015 | Bernstein et al. |
| 2015/0160729 | A1 | 6/2015 | Nakagawa |
| 2015/0169059 | A1 | 6/2015 | Behles et al. |
| 2015/0185840 | A1 | 7/2015 | Golyshko et al. |
| 2015/0193099 | A1 | 7/2015 | Murphy |
| 2015/0193951 | A1 | 7/2015 | Lee et al. |
| 2015/0205495 | A1 | 7/2015 | Koide et al. |
| 2015/0205775 | A1 | 7/2015 | Berdahl et al. |
| 2015/0234446 | A1 | 8/2015 | Nathan et al. |
| 2015/0234493 | A1 | 8/2015 | Parivar et al. |
| 2015/0253866 | A1 | 9/2015 | Amm et al. |
| 2015/0268786 | A1 | 9/2015 | Kitada |
| 2015/0268802 | A1 | 9/2015 | Kim et al. |
| 2015/0268813 | A1 | 9/2015 | Bos |
| 2015/0309573 | A1 | 10/2015 | Brombach et al. |
| 2015/0321607 | A1 | 11/2015 | Cho et al. |
| 2015/0332107 | A1 | 11/2015 | Paniaras |
| 2015/0332607 | A1 | 11/2015 | Gardner, Jr. et al. |
| 2015/0378519 | A1 | 12/2015 | Brown et al. |
| 2015/0378982 | A1 | 12/2015 | McKenzie et al. |
| 2015/0381931 | A1 | 12/2015 | Uhma et al. |
| 2016/0004373 | A1 | 1/2016 | Huang |
| 2016/0004393 | A1 | 1/2016 | Faaborg et al. |
| 2016/0004427 | A1 | 1/2016 | Zambetti et al. |
| 2016/0004428 | A1 | 1/2016 | Bernstein et al. |
| 2016/0004430 | A1 | 1/2016 | Missig et al. |
| 2016/0004431 | A1 | 1/2016 | Bernstein et al. |
| 2016/0004432 | A1 | 1/2016 | Bernstein et al. |
| 2016/0011725 | A1 | 1/2016 | D'Argenio et al. |
| 2016/0011771 | A1 | 1/2016 | Cieplinski |
| 2016/0019718 | A1 | 1/2016 | Mukkamala et al. |
| 2016/0021511 | A1 | 1/2016 | Jin et al. |
| 2016/0041750 | A1 | 2/2016 | Cieplinski et al. |
| 2016/0048326 | A1 | 2/2016 | Kim et al. |
| 2016/0062466 | A1 | 3/2016 | Moussette et al. |
| 2016/0062598 | A1 | 3/2016 | Kocienda et al. |
| 2016/0062619 | A1 | 3/2016 | Reeve et al. |
| 2016/0070401 | A1 | 3/2016 | Kim et al. |
| 2016/0077721 | A1 | 3/2016 | Laubach et al. |
| 2016/0085385 | A1 | 3/2016 | Gao et al. |
| 2016/0092071 | A1 | 3/2016 | Lawson et al. |
| 2016/0117147 | A1 | 4/2016 | Zambetti et al. |
| 2016/0124924 | A1 | 5/2016 | Greenberg et al. |
| 2016/0125234 | A1 | 5/2016 | Ota et al. |
| 2016/0132139 | A1 | 5/2016 | Du et al. |
| 2016/0188181 | A1 | 6/2016 | Smith |
| 2016/0188186 | A1 | 6/2016 | Yea |
| 2016/0196028 | A1 | 7/2016 | Kenney et al. |
| 2016/0210025 | A1 | 7/2016 | Bernstein et al. |
| 2016/0246478 | A1 | 8/2016 | Davis et al. |
| 2016/0259412 | A1 | 9/2016 | Flint et al. |
| 2016/0259413 | A1 | 9/2016 | Anzures et al. |
| 2016/0259495 | A1 | 9/2016 | Butcher et al. |
| 2016/0259496 | A1 | 9/2016 | Butcher et al. |
| 2016/0259498 | A1 | 9/2016 | Foss et al. |
| 2016/0259499 | A1 | 9/2016 | Kocienda et al. |
| 2016/0259516 | A1 | 9/2016 | Kudurshian et al. |
| 2016/0259517 | A1 | 9/2016 | Butcher et al. |
| 2016/0259518 | A1 | 9/2016 | King et al. |
| 2016/0259519 | A1 | 9/2016 | Foss et al. |
| 2016/0259527 | A1 | 9/2016 | Kocienda et al. |
| 2016/0259528 | A1 | 9/2016 | Foss et al. |
| 2016/0259536 | A1 | 9/2016 | Kudurshian et al. |
| 2016/0259548 | A1 | 9/2016 | Ma |
| 2016/0274686 | A1 | 9/2016 | Ruiz et al. |
| 2016/0274728 | A1 | 9/2016 | Luo et al. |
| 2016/0274761 | A1 | 9/2016 | Ruiz et al. |
| 2016/0283054 | A1 | 9/2016 | Suzuki |
| 2016/0306507 | A1 | 10/2016 | Defazio et al. |
| 2016/0320906 | A1 | 11/2016 | Bokma et al. |
| 2016/0357368 | A1 | 12/2016 | Federighi et al. |
| 2016/0357389 | A1 | 12/2016 | Dakin et al. |
| 2016/0357390 | A1 | 12/2016 | Federighi et al. |
| 2016/0357404 | A1 | 12/2016 | Alonso Ruiz et al. |
| 2016/0360116 | A1 | 12/2016 | Penha et al. |
| 2017/0045981 | A1 | 2/2017 | Karunamuni et al. |
| 2017/0046039 | A1 | 2/2017 | Karunamuni et al. |
| 2017/0046058 | A1 | 2/2017 | Karunamuni et al. |
| 2017/0046059 | A1 | 2/2017 | Karunamuni et al. |
| 2017/0046060 | A1 | 2/2017 | Karunamuni et al. |
| 2017/0075520 | A1 | 3/2017 | Bauer et al. |
| 2017/0075562 | A1 | 3/2017 | Bauer et al. |
| 2017/0075563 | A1 | 3/2017 | Bauer et al. |
| 2017/0090617 | A1 | 3/2017 | Jang et al. |
| 2017/0090699 | A1 | 3/2017 | Pennington et al. |
| 2017/0091153 | A1 | 3/2017 | Thimbleby |
| 2017/0109011 | A1 | 4/2017 | Jiang |
| 2017/0115867 | A1 | 4/2017 | Bargmann |
| 2017/0123497 | A1 | 5/2017 | Yonezawa |
| 2017/0124699 | A1 | 5/2017 | Lane |
| 2017/0139565 | A1 | 5/2017 | Choi |

(56) References Cited

U.S. PATENT DOCUMENTS

| | | | |
|---|---|---|---|
| 2017/0315694 | A1 | 11/2017 | Alonso Ruiz et al. |
| 2017/0357403 | A1 | 12/2017 | Geary et al. |
| 2018/0024681 | A1 | 1/2018 | Bernstein et al. |
| 2018/0059866 | A1 | 3/2018 | Drake et al. |
| 2018/0082522 | A1 | 3/2018 | Bartosik |
| 2018/0188920 | A1 | 7/2018 | Bernstein et al. |
| 2018/0342103 | A1 | 11/2018 | Schwartz et al. |
| 2018/0349362 | A1 | 12/2018 | Sharp et al. |
| 2018/0364898 | A1 | 12/2018 | Chen |
| 2019/0012059 | A1 | 1/2019 | Kwon et al. |
| 2019/0018562 | A1 | 1/2019 | Bernstein et al. |
| 2019/0042075 | A1 | 2/2019 | Bernstein et al. |
| 2019/0042078 | A1 | 2/2019 | Bernstein et al. |
| 2019/0065043 | A1 | 2/2019 | Zambetti et al. |
| 2019/0121493 | A1 | 4/2019 | Bernstein et al. |
| 2019/0121520 | A1 | 4/2019 | Cieplinski et al. |
| 2019/0138101 | A1 | 5/2019 | Bernstein |
| 2019/0138102 | A1 | 5/2019 | Missig |
| 2019/0138189 | A1 | 5/2019 | Missig |
| 2019/0146643 | A1 | 5/2019 | Foss et al. |
| 2019/0155503 | A1 | 5/2019 | Alonso Ruiz et al. |
| 2019/0158727 | A1 | 5/2019 | Penha et al. |
| 2019/0163358 | A1 | 5/2019 | Dascola et al. |
| 2019/0171353 | A1 | 6/2019 | Missig et al. |
| 2019/0171354 | A1 | 6/2019 | Dascola et al. |
| 2019/0212896 | A1 | 7/2019 | Karunamuni et al. |
| 2019/0332257 | A1 | 10/2019 | Kudurshian et al. |
| 2019/0364194 | A1 | 11/2019 | Penha et al. |
| 2019/0391658 | A1 | 12/2019 | Missig et al. |
| 2020/0081614 | A1 | 3/2020 | Zambetti |
| 2020/0142548 | A1 | 5/2020 | Karunamuni et al. |
| 2020/0201472 | A1 | 6/2020 | Bernstein et al. |
| 2020/0210059 | A1 | 7/2020 | Hu et al. |
| 2020/0218445 | A1 | 7/2020 | Alonso Ruiz et al. |
| 2020/0301556 | A1 | 9/2020 | Alonso Ruiz et al. |
| 2020/0333936 | A1 | 10/2020 | Khoe et al. |
| 2020/0371683 | A1 | 11/2020 | Zambetti et al. |
| 2020/0394413 | A1 | 12/2020 | Bhanu et al. |
| 2020/0396375 | A1 | 12/2020 | Penha et al. |
| 2021/0081082 | A1 | 3/2021 | Dascola et al. |
| 2021/0191975 | A1 | 6/2021 | Lu et al. |
| 2021/0311598 | A1 | 10/2021 | Bernstein et al. |
| 2021/0326039 | A1 | 10/2021 | Alonso Ruiz et al. |
| 2021/0382613 | A1 | 12/2021 | Kudurshian et al. |
| 2022/0011932 | A1 | 1/2022 | Khoe et al. |
| 2022/0070359 | A1 | 3/2022 | Clarke et al. |
| 2022/0129076 | A1 | 4/2022 | Bernstein et al. |
| 2022/0187985 | A1 | 6/2022 | Dascola et al. |
| 2022/0261131 | A1 | 8/2022 | Bernstein et al. |
| 2022/0365671 | A1 | 11/2022 | Bernstein et al. |
| 2023/0133870 | A1 | 5/2023 | Penha et al. |
| 2024/0019999 | A1 | 1/2024 | Dascola et al. |
| 2024/0103694 | A1 | 3/2024 | Foss et al. |
| 2024/0126425 | A1 | 4/2024 | King et al. |
| 2024/0152210 | A1 | 5/2024 | Khoe et al. |
| 2024/0302954 | A1 | 9/2024 | Bernstein |
| 2024/0385729 | A1 | 11/2024 | Cieplinski et al. |
| 2025/0028429 | A1 | 1/2025 | Alonso Ruiz et al. |

FOREIGN PATENT DOCUMENTS

| | | | |
|---|---|---|---|
| CN | 1534991 | A | 6/2004 |
| CN | 1620327 | A | 5/2005 |
| CN | 1808362 | A | 7/2006 |
| CN | 101068310 | A | 7/2007 |
| CN | 101118469 | A | 2/2008 |
| CN | 101192097 | A | 6/2008 |
| CN | 101202866 | A | 6/2008 |
| CN | 101222704 | A | 7/2008 |
| CN | 101227764 | A | 7/2008 |
| CN | 101241397 | A | 8/2008 |
| CN | 101320303 | A | 12/2008 |
| CN | 101356493 | A | 1/2009 |
| CN | 101384977 | A | 3/2009 |
| CN | 101390039 | A | 3/2009 |
| CN | 101421707 | A | 4/2009 |
| CN | 101464777 | A | 6/2009 |
| CN | 101498979 | A | 8/2009 |
| CN | 101526876 | A | 9/2009 |
| CN | 101527745 | A | 9/2009 |
| CN | 101562703 | A | 10/2009 |
| CN | 101593077 | A | 12/2009 |
| CN | 101609380 | A | 12/2009 |
| CN | 101620507 | A | 1/2010 |
| CN | 101627359 | A | 1/2010 |
| CN | 101630230 | A | 1/2010 |
| CN | 101685370 | A | 3/2010 |
| CN | 101692194 | A | 4/2010 |
| CN | 101727179 | A | 6/2010 |
| CN | 101739206 | A | 6/2010 |
| CN | 101763193 | A | 6/2010 |
| CN | 101784981 | A | 7/2010 |
| CN | 101809526 | A | 8/2010 |
| CN | 101840299 | A | 9/2010 |
| CN | 101896962 | A | 11/2010 |
| CN | 101937304 | A | 1/2011 |
| CN | 101945212 | A | 1/2011 |
| CN | 101952796 | A | 1/2011 |
| CN | 101971603 | A | 2/2011 |
| CN | 101998052 | A | 3/2011 |
| CN | 102004575 | A | 4/2011 |
| CN | 102004576 | A | 4/2011 |
| CN | 102004577 | A | 4/2011 |
| CN | 102004593 | A | 4/2011 |
| CN | 102004602 | A | 4/2011 |
| CN | 102004604 | A | 4/2011 |
| CN | 102016777 | A | 4/2011 |
| CN | 102053790 | A | 5/2011 |
| CN | 102067068 | A | 5/2011 |
| CN | 102112946 | A | 6/2011 |
| CN | 102150018 | A | 8/2011 |
| CN | 102160021 | A | 8/2011 |
| CN | 102171629 | A | 8/2011 |
| CN | 102195514 | A | 9/2011 |
| CN | 102203702 | A | 9/2011 |
| CN | 102214038 | A | 10/2011 |
| CN | 102223476 | A | 10/2011 |
| CN | 102243662 | A | 11/2011 |
| CN | 102257460 | A | 11/2011 |
| CN | 102301322 | A | 12/2011 |
| CN | 102349038 | A | 2/2012 |
| CN | 102349040 | A | 2/2012 |
| CN | 102354269 | A | 2/2012 |
| CN | 102365666 | A | 2/2012 |
| CN | 102375605 | A | 3/2012 |
| CN | 102385478 | A | 3/2012 |
| CN | 102388351 | A | 3/2012 |
| CN | 102438092 | A | 5/2012 |
| CN | 102483666 | A | 5/2012 |
| CN | 102483677 | A | 5/2012 |
| CN | 102546925 | A | 7/2012 |
| CN | 102566908 | A | 7/2012 |
| CN | 102576251 | A | 7/2012 |
| CN | 102576282 | A | 7/2012 |
| CN | 102625931 | A | 8/2012 |
| CN | 102646013 | A | 8/2012 |
| CN | 102662571 | A | 9/2012 |
| CN | 102662573 | A | 9/2012 |
| CN | 102722312 | A | 10/2012 |
| CN | 102752441 | A | 10/2012 |
| CN | 102792255 | A | 11/2012 |
| CN | 102819331 | A | 12/2012 |
| CN | 102819401 | A | 12/2012 |
| CN | 102841677 | A | 12/2012 |
| CN | 102880417 | A | 1/2013 |
| CN | 103019586 | A | 4/2013 |
| CN | 103092386 | A | 5/2013 |
| CN | 103092406 | A | 5/2013 |
| CN | 103097992 | A | 5/2013 |
| CN | 103139473 | A | 6/2013 |
| CN | 103186345 | A | 7/2013 |
| CN | 103201714 | A | 7/2013 |
| CN | 103268184 | A | 8/2013 |
| CN | 103279295 | A | 9/2013 |

(56) References Cited

FOREIGN PATENT DOCUMENTS

| | | | |
|---|---|---|---|
| CN | 103299262 | A | 9/2013 |
| CN | 103390017 | A | 11/2013 |
| CN | 103518176 | A | 1/2014 |
| CN | 103562828 | A | 2/2014 |
| CN | 103562841 | A | 2/2014 |
| CN | 103581544 | A | 2/2014 |
| CN | 103620531 | A | 3/2014 |
| CN | 103649885 | A | 3/2014 |
| CN | 103699292 | A | 4/2014 |
| CN | 103699295 | A | 4/2014 |
| CN | 103777850 | A | 5/2014 |
| CN | 103777886 | A | 5/2014 |
| CN | 103793134 | A | 5/2014 |
| CN | 103838465 | A | 6/2014 |
| CN | 103870190 | A | 6/2014 |
| CN | 103888661 | A | 6/2014 |
| CN | 103970474 | A | 8/2014 |
| CN | 103984501 | A | 8/2014 |
| CN | 104011637 | A | 8/2014 |
| CN | 104020868 | A | 9/2014 |
| CN | 104020955 | A | 9/2014 |
| CN | 104021021 | A | 9/2014 |
| CN | 104024985 | A | 9/2014 |
| CN | 104038838 | A | 9/2014 |
| CN | 104049861 | A | 9/2014 |
| CN | 104077014 | A | 10/2014 |
| CN | 104090979 | A | 10/2014 |
| CN | 104142798 | A | 11/2014 |
| CN | 104160362 | A | 11/2014 |
| CN | 104205098 | A | 12/2014 |
| CN | 104238904 | A | 12/2014 |
| CN | 104246678 | A | 12/2014 |
| CN | 104267902 | A | 1/2015 |
| CN | 104270565 | A | 1/2015 |
| CN | 104331239 | A | 2/2015 |
| CN | 104349124 | A | 2/2015 |
| CN | 104392292 | A | 3/2015 |
| CN | 104412201 | A | 3/2015 |
| CN | 104471521 | A | 3/2015 |
| CN | 104487928 | A | 4/2015 |
| CN | 104487929 | A | 4/2015 |
| CN | 104487930 | A | 4/2015 |
| CN | 105264476 | A | 1/2016 |
| DE | 100 59 906 | A1 | 6/2002 |
| EP | 0 364178 | A2 | 4/1990 |
| EP | 0 859 307 | A1 | 3/1998 |
| EP | 0 880 090 | A2 | 11/1998 |
| EP | 1 028 583 | A1 | 8/2000 |
| EP | 1 406 150 | A1 | 4/2004 |
| EP | 1 674 977 | A2 | 6/2006 |
| EP | 1 882 902 | A1 | 1/2008 |
| EP | 2 000 896 | A2 | 12/2008 |
| EP | 2 017 701 | A1 | 1/2009 |
| EP | 2 028 583 | A2 | 2/2009 |
| EP | 2 112 586 | A1 | 10/2009 |
| EP | 2 141 574 | A2 | 1/2010 |
| EP | 2 175 357 | A1 | 4/2010 |
| EP | 2 196 893 | A2 | 6/2010 |
| EP | 2 214 087 | A1 | 8/2010 |
| EP | 2 226 715 | A2 | 9/2010 |
| EP | 2 284 675 | A2 | 2/2011 |
| EP | 2 299 351 | A2 | 3/2011 |
| EP | 2 302 496 | A1 | 3/2011 |
| EP | 2 363 790 | A1 | 9/2011 |
| EP | 2 375 309 | A1 | 10/2011 |
| EP | 2 375 314 | A1 | 10/2011 |
| EP | 2 386 935 | A1 | 11/2011 |
| EP | 2 407 868 | A1 | 1/2012 |
| EP | 2 420 924 | A2 | 2/2012 |
| EP | 2 426 580 | A2 | 3/2012 |
| EP | 2 445 182 | A2 | 4/2012 |
| EP | 2 447 818 | A1 | 5/2012 |
| EP | 2 527 966 | A2 | 11/2012 |
| EP | 2 530 677 | A2 | 12/2012 |
| EP | 2 541 376 | A1 | 1/2013 |
| EP | 2 555 500 | A1 | 2/2013 |
| EP | 2 615 535 | A1 | 7/2013 |
| EP | 2 631 737 | A1 | 8/2013 |
| EP | 2 674 834 | A2 | 12/2013 |
| EP | 2 674 846 | A2 | 12/2013 |
| EP | 2 708985 | A1 | 3/2014 |
| EP | 2 733 578 | A2 | 5/2014 |
| EP | 2 808 764 | A1 | 12/2014 |
| EP | 2 809 058 | A1 | 12/2014 |
| EP | 2 813 938 | A1 | 12/2014 |
| EP | 3 664 092 | A1 | 6/2020 |
| GB | 2 402 105 | A | 12/2004 |
| JP | 58-182746 | | 10/1983 |
| JP | H05-204583 | | 8/1993 |
| JP | H06-161647 | A | 6/1994 |
| JP | H07-098769 | A | 4/1995 |
| JP | H07-104915 | | 4/1995 |
| JP | H07-151512 | A | 6/1995 |
| JP | H08-227341 | A | 9/1996 |
| JP | H09-269883 | A | 10/1997 |
| JP | H09-330175 | A | 12/1997 |
| JP | H11-203044 | A | 7/1999 |
| JP | 2001-078137 | A | 3/2001 |
| JP | 2001-202192 | A | 7/2001 |
| JP | 2001-222355 | A | 8/2001 |
| JP | 2001-306207 | A | 11/2001 |
| JP | 2002-044536 | A | 2/2002 |
| JP | 2002-149312 | A | 5/2002 |
| JP | 3085481 | U | 5/2002 |
| JP | 2002-182855 | A | 6/2002 |
| JP | 2003-157131 | A | 5/2003 |
| JP | 2003-186597 | A | 7/2003 |
| JP | 2004-054861 | A | 2/2004 |
| JP | 2004-061523 | A | 2/2004 |
| JP | 2004-062648 | A | 2/2004 |
| JP | 2004-070492 | A | 3/2004 |
| JP | 2004-078957 | A | 3/2004 |
| JP | 2004-086733 | A | 3/2004 |
| JP | 2004-120576 | A | 4/2004 |
| JP | 2004-152217 | A | 5/2004 |
| JP | 2004-288208 | A | 10/2004 |
| JP | 2005-031786 | A | 2/2005 |
| JP | 2005-092386 | A | 4/2005 |
| JP | 2005-102106 | A | 4/2005 |
| JP | 2005-135106 | A | 5/2005 |
| JP | 2005-157842 | A | 6/2005 |
| JP | 2005-196810 | A | 7/2005 |
| JP | 2005-317041 | A | 11/2005 |
| JP | 2005-352927 | | 12/2005 |
| JP | 2006-059238 | A | 3/2006 |
| JP | 2006-185443 | A | 7/2006 |
| JP | 2007-116384 | A | 5/2007 |
| JP | 2007-148104 | A | 6/2007 |
| JP | 2007-264808 | A | 10/2007 |
| JP | 2008-009759 | A | 1/2008 |
| JP | 2008-015890 | A | 1/2008 |
| JP | 2008-033739 | A | 2/2008 |
| JP | 2008-516348 | A | 5/2008 |
| JP | 2008-146453 | A | 6/2008 |
| JP | 2008-191086 | A | 8/2008 |
| JP | 2008-537615 | A | 9/2008 |
| JP | 2008-305174 | A | 12/2008 |
| JP | 2009-500761 | A | 1/2009 |
| JP | 2009-110243 | A | 5/2009 |
| JP | 2009-129171 | A | 6/2009 |
| JP | 2009-129443 | A | 6/2009 |
| JP | 2009-169452 | A | 7/2009 |
| JP | 2009-211704 | A | 9/2009 |
| JP | 2009-217543 | A | 9/2009 |
| JP | 2009-294688 | A | 12/2009 |
| JP | 2009-545805 | A | 12/2009 |
| JP | 2010-009321 | A | 1/2010 |
| JP | 2010-503126 | A | 1/2010 |
| JP | 2010-503130 | A | 1/2010 |
| JP | 2010-055274 | A | 3/2010 |
| JP | 2010-097353 | A | 4/2010 |
| JP | 2010-146507 | A | 7/2010 |
| JP | 2010-152716 | A | 7/2010 |
| JP | 2010-176174 | A | 8/2010 |

(56) References Cited

FOREIGN PATENT DOCUMENTS

| | | | |
|---|---|---|---|
| JP | 2010-176337 | A | 8/2010 |
| JP | 2010-181934 | A | 8/2010 |
| JP | 2010-181940 | A | 8/2010 |
| JP | 2010-198385 | A | 9/2010 |
| JP | 2010-536077 | A | 11/2010 |
| JP | 2010-541071 | A | 12/2010 |
| JP | 2011-501307 | A | 1/2011 |
| JP | 2011-028635 | A | 2/2011 |
| JP | 2011-048023 | A | 3/2011 |
| JP | 2011-048666 | A | 3/2011 |
| JP | 2011-048686 | A | 3/2011 |
| JP | 2011-048762 | A | 3/2011 |
| JP | 2011-048832 | A | 3/2011 |
| JP | 2011-053831 | A | 3/2011 |
| JP | 2011-053972 | A | 3/2011 |
| JP | 2011-053973 | A | 3/2011 |
| JP | 2011-053974 | A | 3/2011 |
| JP | 2011-054196 | A | 3/2011 |
| JP | 2011-059821 | A | 3/2011 |
| JP | 2011-070342 | A | 4/2011 |
| JP | 2011-100290 | A | 5/2011 |
| JP | 2011-107823 | A | 6/2011 |
| JP | 2011-123773 | A | 6/2011 |
| JP | 2011-141868 | A | 7/2011 |
| JP | 2011-170538 | A | 9/2011 |
| JP | 2011-192179 | A | 9/2011 |
| JP | 2011-192215 | A | 9/2011 |
| JP | 2011-197848 | A | 10/2011 |
| JP | 2011-221640 | A | 11/2011 |
| JP | 2011-232947 | A | 11/2011 |
| JP | 2011-242386 | A | 12/2011 |
| JP | 2011-250004 | A | 12/2011 |
| JP | 2011-253556 | A | 12/2011 |
| JP | 2011-257941 | A | 12/2011 |
| JP | 2011-530101 | A | 12/2011 |
| JP | 2012-027940 | A | 2/2012 |
| JP | 2012-033061 | A | 2/2012 |
| JP | 2012-043266 | A | 3/2012 |
| JP | 2012-043267 | A | 3/2012 |
| JP | 2012-053687 | A | 3/2012 |
| JP | 2012-053754 | | 3/2012 |
| JP | 2012-053926 | A | 3/2012 |
| JP | 2012-073785 | A | 4/2012 |
| JP | 2012-073873 | A | 4/2012 |
| JP | 2012-509605 | A | 4/2012 |
| JP | 2012-093820 | A | 5/2012 |
| JP | 2012-118825 | A | 6/2012 |
| JP | 2012-118993 | A | 6/2012 |
| JP | 2012-123564 | A | 6/2012 |
| JP | 2012-128825 | A | 7/2012 |
| JP | 2012-168620 | A | 9/2012 |
| JP | 2012-212473 | A | 11/2012 |
| JP | 2012-527685 | A | 11/2012 |
| JP | 2013-025357 | A | 2/2013 |
| JP | 2013-030050 | A | 2/2013 |
| JP | 2013-058149 | A | 3/2013 |
| JP | 2013-077270 | A | 4/2013 |
| JP | 2013-080521 | A | 5/2013 |
| JP | 2013-093020 | A | 5/2013 |
| JP | 2013-098826 | A | 5/2013 |
| JP | 2013-101465 | A | 5/2013 |
| JP | 2013-105410 | A | 5/2013 |
| JP | 2013-520727 | A | 6/2013 |
| JP | 2013-131185 | A | 7/2013 |
| JP | 2013-529339 | A | 7/2013 |
| JP | 2013-200879 | A | 10/2013 |
| JP | 2013-236298 | A | 11/2013 |
| JP | 2013-542488 | A | 11/2013 |
| JP | 2013-250602 | A | 12/2013 |
| JP | 2014-504419 | | 2/2014 |
| JP | 2014-052852 | A | 3/2014 |
| JP | 2014-130567 | A | 7/2014 |
| JP | 2014-140112 | A | 7/2014 |
| JP | 2014-149833 | A | 8/2014 |
| JP | 2014-519109 | A | 8/2014 |
| JP | 2014-529137 | A | 10/2014 |
| JP | 2014-232347 | A | 12/2014 |
| JP | 2015-099555 | A | 5/2015 |
| JP | 2015-521315 | A | 7/2015 |
| JP | 2015-153420 | A | 8/2015 |
| JP | 2015-185161 | A | 10/2015 |
| KR | 20020041828 | A | 6/2002 |
| KR | 2006-0071353 | A | 6/2006 |
| KR | 2006-0117870 | A | 11/2006 |
| KR | 100807738 | B1 | 2/2008 |
| KR | 20080026138 | A | 3/2008 |
| KR | 2008-0045143 | A | 4/2008 |
| KR | 100823871 | B1 | 4/2008 |
| KR | 2008-0054346 | A | 6/2008 |
| KR | 2009-0066319 | A | 6/2009 |
| KR | 2009-0108065 | A | 10/2009 |
| KR | 2010-0010860 | A | 2/2010 |
| KR | 2010-0014095 | A | 2/2010 |
| KR | 2010 0133246 | A | 12/2010 |
| KR | 2011 0026176 | A | 3/2011 |
| KR | 2011 0086501 | A | 7/2011 |
| KR | 20120130972 | A | 1/2012 |
| KR | 2012 0103670 | A | 9/2012 |
| KR | 20120135488 | A | 12/2012 |
| KR | 20120135723 | A | 12/2012 |
| KR | 20130027017 | A | 3/2013 |
| KR | 20130076397 | A | 7/2013 |
| KR | 2013 0099647 | A | 9/2013 |
| KR | 20130135871 | A | 12/2013 |
| KR | 2014 0016495 | A | 2/2014 |
| KR | 2014 0029720 | A | 3/2014 |
| KR | 2014 0043760 | A | 4/2014 |
| KR | 2014 0067965 | A | 6/2014 |
| KR | 2014 0079110 | A | 6/2014 |
| KR | 2014 0122000 | A | 10/2014 |
| KR | 20150013263 | A | 2/2015 |
| KR | 20150021977 | A | 3/2015 |
| RU | 2007145218 | A | 7/2009 |
| RU | 2503989 | C2 | 1/2014 |
| TW | 201447740 | A | 12/2014 |
| WO | WO 2005/106637 | A2 | 11/2005 |
| WO | WO 2006/013485 | A2 | 2/2006 |
| WO | WO 2006/042309 | A1 | 4/2006 |
| WO | WO 2006/094308 | A2 | 9/2006 |
| WO | WO 2007/121557 | A1 | 11/2007 |
| WO | WO 2008/030976 | A2 | 3/2008 |
| WO | WO 2008/064142 | A2 | 5/2008 |
| WO | WO 2009/155981 | A1 | 12/2009 |
| WO | WO 2009/158549 | A2 | 12/2009 |
| WO | WO 2010/013876 | A1 | 2/2010 |
| WO | WO 2010/032598 | A1 | 3/2010 |
| WO | WO 2010/090010 | A1 | 8/2010 |
| WO | WO 2010/122813 | A1 | 10/2010 |
| WO | WO 2010/134729 | A2 | 11/2010 |
| WO | WO 2011/024389 | A1 | 3/2011 |
| WO | WO 2011/024465 | A1 | 3/2011 |
| WO | WO 2011/024521 | A1 | 3/2011 |
| WO | WO 2011/093045 | A1 | 8/2011 |
| WO | WO 2011/105009 | A1 | 9/2011 |
| WO | WO 2011/108190 | A1 | 9/2011 |
| WO | WO 2011/115187 | A1 | 9/2011 |
| WO | WO 2011/121375 | A1 | 10/2011 |
| WO | WO 2012/021417 | A1 | 2/2012 |
| WO | WO 2012/037664 | A1 | 3/2012 |
| WO | WO 2012/096804 | A2 | 7/2012 |
| WO | WO 2012/108213 | A1 | 8/2012 |
| WO | WO 2012/114760 | A1 | 8/2012 |
| WO | WO 2012/137946 | A1 | 10/2012 |
| WO | WO 2012/150540 | A2 | 11/2012 |
| WO | WO 2012/153555 | A1 | 11/2012 |
| WO | WO 2013/022486 | A1 | 2/2013 |
| WO | WO 2013/035725 | A1 | 3/2013 |
| WO | WO 2013/112453 | A1 | 8/2013 |
| WO | WO 2013/127055 | A1 | 9/2013 |
| WO | WO 2013/169302 | A1 | 11/2013 |
| WO | WO 2013/169845 | A1 | 11/2013 |
| WO | WO 2013/169846 | A1 | 11/2013 |
| WO | WO 2013/169849 | A2 | 11/2013 |
| WO | WO 2013/169851 | A2 | 11/2013 |

(56) References Cited

FOREIGN PATENT DOCUMENTS

| | | |
|---|---|---|
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2013/173838 A2 | 11/2013 |
| WO | WO 2014/034706 A1 | 3/2014 |
| WO | WO 2014/105275 A1 | 7/2014 |
| WO | WO 2014/105276 A1 | 7/2014 |
| WO | WO 2014/105277 A2 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/152601 A1 | 9/2014 |
| WO | WO 2014/200733 A1 | 12/2014 |
| WO | WO 2013/145804 | 12/2015 |
| WO | WO 2016/200584 A2 | 12/2016 |

OTHER PUBLICATIONS

Angelov, "Sponsor Flip Wall with Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "Acer Liquid Z5 Duo User's Manual", https://global-download.acer.com, Feb. 21, 2014, 65 pages.
Anonymous, "Android—What Should Status Bar Toggle Button Behavior Be?", https://ux.stackechange.com/questions/34814, Jan. 15, 2015, 2 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Anonymous, "[new] WMP12 with Taskbar Toolbar for Windows 7—Windows Customization—WinMatrix", http://www.winmatrix.com/forums/index/php?/topic/25528-new-wmp12-with-taskbar-toolbar-for-windows-7, Jan. 27, 2013, 6 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Apple, "Apple—September Event 2014", https://www.youtube.com/watch?v=38lqQpqwPe7s, Sep. 10, 2014, 5 pages.
Azundris, "A Fire in the Pie," http://web.archive.org/web/20140722062639/http://blog.azundrix.com/archives/168-A-fire-in-the-sky.html, Jul. 22, 2014, 8 pages.
Billibi, "Android 5.0 Lollipop", https://www.bilibili.comvideo/av1636046?from=search&seid=3128140235778895126, Oct. 19, 2014, 6 pages.
B-log—betriebsraum weblog, "Extremely Efficient Menu Selection: Marking Menus for the Flash Platform," http://www.betriebsraum.de/blog/2009/12/11/extremely-efficient-menu-selection-marking -for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Boring, "The Fat Thumb: Using the Thumb's Contact Size for Single-Handed Mobile Interaction", https://www.youtube.com/watch?v=E9vGU5R8nsc&feature=youtu.be, Jun. 14, 2012, 2 pages.
Borowska, "6 Types of Digital Affordance that Impact Your Ux", https://www.webdesignerdepot.com/2015/04/6-types-of-digital-affordance-that-implact-your-ux, Apr. 7, 2015, 6 pages.
Brewster, "The Design and Evaluation of a Vibrotactile Progress Bar", Glasgow Interactive Systems Group, University of Glasgow, Glasgow, G12 8QQ, UK, 2005, 2 pages.
Brownlee, "Android 5.0 Lollipop Feature Review!", https//www.youtube.com/watch?v=pEDQ1z1-PvU, Oct. 27, 2014, 5 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gestures," http://techcrunch.com/2011/08/25/microsoft-awarded-patents-for-multi-screen-multi-touch-gestures/, Aug. 25, 2011, 8 pages.
Cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Dzyre, "10 Android Notification Features You Can Fiddle With", http://www.hongkiat.com/blog/android-notification-features, Mar. 10, 2014, 10 pages.
Easton-Ellett, "Three Free Cydia Utilities to Remove iOS Notification Badges", http://www.ijailbreak.com/cydia/three-free-cydia-utilies-to-remove-ios-notification-badges, Apr. 14, 2012, 2 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs-Preview and Convert Pictures From Windows Context Menu", https://web.addictivetips.com/windows-tips/sagethumbs-preview-and-convert-photos-from-windows-context-menu, Aug. 8, 2011, 5 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flaherty, "Is Apple Watch's Pressure-Sensitive Screen a Bigger Deal Than The Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
Gardner, "Recenz—Recent Apps in One Tap", You Tube, https://www.youtube.com/watch?v-qailSHRgsTo, May 15, 2015, 1 page.
Geisler, "Enriched Links: A Framework for Improving Web Navigation Using Pop-Up Views", Journal of the American Society for Information Science, Chapel Hill, NC, Jan. 1, 2000, 13 pages.
Gonzalo et al., "Zliding: Fluid Zooming and Sliding for High Precision Parameter Manipulation", Department of Computer Science, University of Toronto, Seattle, Washington, Oct. 23, 2005, 10 pages.

(56) References Cited

OTHER PUBLICATIONS

Google-Chrome, "Android 5.0 Lollipop", http://androidlover.net/android-os/android-5-0-lollipop/android-5-0-lollipop-recent-apps-card-google-search.html, Oct. 19, 2014, 10 pages.
Grant, "Android's Notification Center", https://www.objc.io/issues/11-android/android-notifications, Apr. 30, 2014, 26 pages.
Gurman, "Force Touch on iPhone 6S Revealed: Expect Shortcuts, Faster Actions, iOS", 9To5Mac Aug. 10, 2015, 31 pages.
IBM et al., "Pressure-Sensitive Icons", IBM Technical Disclosure Bulletin, vol. 33, No. 1B, Jun. 1, 1990, 3 pages.
ICIMS Recruiting Software, "Blackberry Playbook Review," http://www.tested.com/tech.tablets/5749-blackberry-playbook-review/, 2015, 11 pages.
IPhonehacksTV, "Confero allows you to easily manage your Badge notifications—iPhone Hacks", youtube, https://wwwyoutube.com/watch?v=JCk61pnL4SU, Dec. 26, 2014, 3 pages.
IPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
IPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Jauregui, "Design and Evaluation of 3D Cursors and Motion Parallax for the Exploration of Desktop Virtual Environments", IEEE Symposium on 3D User Interfaces 2012, Mar. 4, 2012, 8 pages.
Jones, "Touch Screen with Feeling", IEEE Spectrum, , spectrum.ieee.org/commuting/hardware/touch-screens-with-feeling, May 1, 2009, 2 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
Kost, "LR3-Deselect All Images But One", Julieanne Kost's Blog, blogs.adobe.com/jkost/2011/12/lr3-deselect-all-images-but-one.html, Dec. 22, 2011, 1 page.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
MacKenzie et al., "The Tactile Touchpad", Chi '97 Extended Abstracts on Human Factors in Computing Systems Looking to the Future, Chi '97, Mar. 22, 1997, 5 pages.
Mahdi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Matthew, "How to Preview Photos and Images From Right-Click Context Menue in Windows [Tip]", http://www.dottech.org/159009/add-image-preview-in-windows-context-menu-tip, Jul. 4, 2014, 5 pages.
McGarry, "Everything You Can Do With Force Touch on Apple Watch", Macworld, www.macworld.com, May 6, 2015, 4 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Lumia—How to Personalize Your Start Screen", https://www.youtube.com/watch?v=6GI5Z3TrSEs, Nov. 11, 2014, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics the *Sandpaper* System for Synthesizing Texture for a Force-Feedback Display," Massachusetts Institute of Technology, Jun. 1978, 217 pages.
Mitroff, "Google Android 5.0 Lollipop, " http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NILS Lock Screen Notifications / Floating Panel—Review", https://www.youtube.com/watch?v=McT4QnS9TDY, Feb. 3, 2014, 4 pages.
Neuburg, "Detailed Explanation iOS SDK", Oreilly Japan, Dec. 22, 2014, vol. 4, p. 175-186, 15 pages.
Nickinson, How to Use Do Not Disturb on the HTC One M8, https://www.androidcentral.com/how-to-use-do-not-disturb-htc-one-m8, Apr. 7, 2014, 9 pages.
Nickinson, "Inside Android 4.2: Notifications and Quick Settings", https://www.andrloidcentral.com/inside-android-42-notifications-and-quick-settings, Nov. 3, 2012, 3 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Nishino, "A Touch Screen Interface Design with Tactile Feedback", Computer Science, 2011 International Conference on Complex, Intelligent, and Software Intensive Systems, 2011, 4 pages.
Ogino, "iOS 7 Design Standard", Japan, Impress Japan Corporation, 1st edition, Nov. 21, 2013, 2 pages.
Oh, et al., "Moving Objects with 2D Input Devices in CAD Systems and Desktop Virtual Environments", Proceedings of Graphics Interface 2005, 8 pages, May 2005.
O'Hara, et al., "Pressure-Sensitive Icons", ip.com Journal, ip.com Inc., West Henrietta, NY, US, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
Phonebuff, "How to Pair Bluetooth on the iPhone", https://www.youtube.com/watch?v=LudNwEar9A8, Feb. 8, 2012, 3 pages.
Plaisant et al, "Touchscreen Toggle Design", Proceedings of CHI '92, pp. 667-668, May 3-7, 1992, 2 pages.
PoliceOne.com, "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Rekimoto, et al., "SmartPad: A Finger-Sensing Keypad for Mobile Interaction", CHI 2003, Ft. Lauderdale, Florida, ACM 1-58113-637—Apr. 5-10, 2003, 2 pages.
Ritchie, "How to see all the unread message notifications on your iPhone, all at once, all in the same place | iMore", https://www.

(56) References Cited

OTHER PUBLICATIONS imore.com/how-see-all-unread-message-notifications-your-iphone-all-once-all-same-place, Feb. 22, 2014, 2 pages.
Roth et al., "Bezel Swipe: Conflict-Free Scrolling and Miltiple Selection on Mobile Touch Screen Devices," Chi 2009, Boston, Massachusetts, USA, Apr. 4-9, 2009, 4 pages.
Rubino et al., "How to Enable 'Living Images' on your Nokia Lumia with Windows Phone 8.1", https://www.youtube.com/watch?v=RX7vpoFy1Dg, Jun. 6, 2014, 5 pages.
Sony, "Intelligent Scene Recognition," https://www.sony-asia.com/article/252999/section/product/product/dsc-t77, downloaded on May 20, 2016, 5 pages.
Sood, "MultitaskingGestures", http://cydia.saurik.com/package/org.thebigboxx.multitaskinggestures/, Mar. 3, 2014, 2 pages.
Stewart, et al., "Characteristics of Pressure-Based Input for Mobile Devices", Proceedings of the SIGCHI Conference on Human Factors in Computing Systems, Apr. 2010, 10 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product- resourses/axon_body_product_manual.pdf, Oct. 1, 2013, 24 pages.
Tidwell, "Designing Interfaces," O'Reilly Media, Inc., USA, Nov. 2005, 348 pages.
Tweak, "QuickCenter—Add 3D-Touch Shortcuts to Control Center", https://www.youtube.com/watch?v=8rHOFpGvZFM, Mar. 22, 2016, 2 pages.
Tweak, "iOS 10 Tweak on iOS 9.0.2 Jailbread & 9.2.1-9.3 Support: QuickCenter 3D, Touch Cydia Tweak!" https://wwwyoutube.com/watch?v=opOBr30_Fkl, Mar. 6, 2016, 3 pages.
UpDown-G, "Using Multiple Selection Mode in Android 4.0 / Getting Started", https://techbooster.org/android/13946, Mar. 7, 2012, 7 pages.
Vgjfeliz, "How to Master Android Lollipop Notifications in Four Minutes!", https://www.youtube.com/watch?v=S-zBRG7GJgs, Feb. 8, 2015, 5 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
Viticci, "Apple Watch: Our Complete Overview—MacStories" https://www.macstories.net, Sep. 10, 2014, 21 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
Wilson, et al., "Augmenting Tactile Interaction with Pressure-Based Input", School of Computing Science, Glasgow, UK, Nov. 15-17, 2011, 2 pages.
Yang, et al., "Affordance Application on Visual Interface Design of Desk-Top Virtual Experiments", 2014 International Conference on Information Science, Electronics and Electrical Engineering, IEEE, vol. 1, Apr. 26, 2014, 5 pages.
Yatani, et al., SemFeel: A User Interface with Semantic Tactile Feedback for Mobile Touch-Screen Devices, Proceedings of the 22nd annual ACM symposium on user interface software and technology (UIST '09), Oct. 2009, 10 pages.
YouTube, "Android Lollipop Lock-Screen Notification Tips", https://www.youtube.com/watch?v=LZTxHBOwzIU, Nov. 13, 2014, 3 pages.
YouTube, "Blackberry Playbook bezel interaction," https://www.youtube.com/watch?v=YGkzFqnOwXI, Jan. 10, 2011, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "HTC One Favorite Camera Features", http://www.youtube.com/watch?v=sUYHfcjl4RU, Apr. 28, 2013, 3 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in a Tap", https://www.youtube.com/watch?v=qailSHRgsTo, May 15, 2015, 1 page.
Zylom, "House Secrets", http://game.zylom.com/servlet/Entry?g=38&s=19521&nocache=1438641323066, Aug. 3, 2015, 1 page.
Office Action, dated Mar. 15, 2017, received in U.S. Appl. No. 14/535,671, 13 pages.
Office Action, dated Nov. 30, 2017, received in U.S. Appl. No. 14/535,671, 21 pages.
Notice of Allowance, dated Sep. 5, 2018, received in U.S. Appl. No. 14/535,671, 5 pages.
Office Action, dated Jun. 29, 2017, received in U.S. Appl. No. 14/608,895, 30 pages.
Final Office Action, dated Feb. 22, 2018, received in U.S. Appl. No. 14/608,895, 20 pages.
Notice of Allowance, dated Jun. 26, 2018, received in U.S. Appl. No. 14/608,895, 9 pages.
Office Action, dated Dec. 18, 2015, received in Australian Patent Application No. 2013368440, which corresponds with U.S. Appl. No. 14/536,426, 3 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Office Action, dated Oct. 9, 2018, received in Chinese Patent Application No. 201380068493.6, which corresponds with U.S. Appl. No. 14/608,895, 3 pages.
Patent, dated Dec. 25, 2018, received in Chinese Patent Application No. 201380068493.6, which corresponds with U.S. Appl. No. 14/608,895, 4 pages.
Office Action, dated Jul. 21, 2016, received in European Patent Application No. 13795391.5, which corresponds with U.S. Appl. No. 14/536,426, 9 pages.
Office Action, dated Mar. 9, 2018, received in European Patent Application No. 13795391.5, which corresponds with U.S. Appl. No. 14/536,426, 4 pages.
Intention to Grant, dated Jul. 6, 2018, received in European Patent Application No. 13795391.5, which corresponds with U.S. Appl. No. 14/536,426, 5 pages.
Certificate of Grant, dated Dec. 26, 2018, received in European Patent Application No. 13795391.5, which corresponds with U.S. Appl. No. 14/536,426, 4 pages.
Office Action, dated Sep. 13, 2016, received in Japanese Patent Application No. 2015-547948, which corresponds with U.S. Appl. No. 14/536,426, 5 pages.
Patent, dated May 12, 2017, received in Japanese Patent Application No. 2015-547948, which corresponds with U.S. Appl. No. 14/536,426, 3 pages.

(56) References Cited

OTHER PUBLICATIONS

Office Action, dated Apr. 5, 2016, received in Korean Patent Application No. 10-2015-7018851, which corresponds with U.S. Appl. No. 14/536,426, 7 pages.
Office Action, dated Feb. 24, 2017, received in Korean Patent Application No. 10-2015-7018851, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Oct. 5, 2018, received in Korean Patent Application No. 2018-7028236, which corresponds with U.S. Appl. No. 14/608,895, 6 pages.
Notice of Allowance, dated May 24, 2019, received in Korean Patent Application No. 2018-7028236, which corresponds with U.S. Appl. No. 14/608,895, 4 pages.
Patent, dated Jul. 9, 2019, received in Korean Patent Application No. 2018-7028236, which corresponds with U.S. Appl. No. 14/608,895, 4 pages.
Office Action, dated Jul. 26, 2017, received in U.S. Appl. No. 14/536,235, 14 pages.
Final Office Action, dated Feb. 26, 2018, received in U.S. Appl. No. 14/536,235, 13 pages.
Notice of Allowance, dated Aug. 15, 2018, received in U.S. Appl. No. 14/536,235, 5 pages.
Office Action, dated Apr. 5, 2017, received in U.S. Appl. No. 14/536,367, 16 pages.
Notice of Allowance, dated Nov. 30, 2017, received in U.S. Appl. No. 14/536,367, 9 pages.
Notice of Allowance, dated May 16, 2018, received in U.S. Appl. No. 14/536,367, 5 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Office action, dated Aug. 3, 2017, received in U.S. Appl. No. 14/536,426, 10 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Application No. 2013259606, which corresponds with U.S. Appl. No. 14/536,426, 1 page.
Office Action, dated Nov. 18, 2015, received in Australian Patent Application No. 2015101231, which corresponds with U.S. Appl. No. 14/536,426, 3 pages.
Office Action, dated May 15, 2017, received in Australian Patent Application No. 2016216580, which corresponds with U.S. Appl. No. 14/536,426, 3 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Certificate of Grant, dated Sep. 13, 2018, received in Australian Patent Application No. 2016216580, which corresponds with U.S. Appl. No. 14/536,426, 1 page.
Office Action, dated Apr. 12, 2019, received in Australian Patent Application No. 2018223021, which corresponds with U.S. Appl. No. 14/536,426, 3 pages.
Office Action, dated Nov. 18, 2019, received in Australian Patent Application No. 2018223021, which corresponds with U.S. Appl. No. 14/536,426, 3 pages.
Office Action, dated Feb. 18, 2020, received in Australian Patent Application No. 2018223021, which corresponds with U.S. Appl. No. 14/536,426, 3 pages.
Notice of Allowance, dated Mar. 27, 2020, received in Australian Patent Application No. 2018223021, which corresponds with U.S. Appl. No. 14/536,426, 3 pages.
Certificate of Grant, dated Jul. 23, 2020, received in Australian Patent Application No. 2018223021, which corresponds with U.S. Appl. No. 14/536,426, 4 pages.
Office Action, dated Sep. 19, 2017, received in Chinese Patent Application No. 201380035982.1, which corresponds with U.S. Appl. No. 14/536,426, 5 pages.
Notice of Allowance, dated May 10, 2018, received in Chinese Patent Application No. 201380035982.1, which corresponds with U.S. Appl. No. 14/536,426, 2 pages.
Patent, dated Aug. 17, 2018, received in Chinese Patent Application No. 201380035982.1, which corresponds with U.S. Appl. No. 14/536,426, 4 pages.
Office Action, dated Sep. 20, 2017, received in Chinese Patent Application No. 201510566550.4, which corresponds with U.S. Appl. No. 14/536,426, 11 pages.
Notice of Allowance, dated Aug. 8, 2018, received in Chinese Patent Application No. 201510566550.4, which corresponds with U.S. Appl. No. 14/536,426, 3 pages.
Patent, dated Oct. 23, 2018, received in Chinese Patent Application No. 201510566550.4, which corresponds with U.S. Appl. No. 14/536,426, 4 pages.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Aug. 21, 2017, received in European Patent Application No. 15183980.0, which corresponds with U.S. Appl. No. 14/536,426, 3 pages.
Intention to Grant, dated Mar. 9, 2018, received in European Patent Application No. 15183980.0, which corresponds with U.S. Appl. No. 14/536,426, 5 pages.
Intention to Grant, dated Aug. 14, 2018, received in European Patent Application No. 15183980.0, which corresponds with U.S. Appl. No. 14/536,426, 5 pages.
Decision to Grant, dated Jan. 10, 2019, received in European Patent Application No. 15183980.0, which corresponds with U.S. Appl. No. 14/536,426, 4 pages.
Patent, dated Feb. 6, 2019, received in European Patent Application No. 15183980.0, which corresponds with U.S. Appl. No. 14/536,426, 4 pages.
Office Action, dated Sep. 6, 2019, received in European Patent Application No. 18180503.7, which corresponds with U.S. Appl. No. 14/536,426, 5 pages.
Certificate of Grant, dated Nov. 10, 2017, received in Hong Kong Patent Application No. 15107535.0, which corresponds with U.S. Appl. No. 14/536,426, 2 pages.
Certificate of Grant, dated Jul. 5, 2019, received in Hong Kong Patent Application No. 15108892.5, which corresponds with U.S. Appl. No. 14/536,426, 5 pages.
Patent, dated Nov. 22, 2019, received in Hong Kong Patent Application No. 16107033.6, which corresponds with U.S. Appl. No. 14/536,426, 6 pages.
Office Action, dated Mar. 4, 2016, received in Japanese Patent Application No. 2015-511644, which corresponds with U.S. Appl. No. 14/536,426, 3 pages.
Office Action, dated Feb. 6, 2017, received in Japanese Patent Application No. 2015-511644, which corresponds with U.S. Appl. No. 14/536,426, 6 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.

(56) References Cited

OTHER PUBLICATIONS

Office Action, dated Nov. 6, 2018, received in Japanese Patent Application No. 2018-000753, which corresponds with U.S. Appl. No. 14/536,426, 8 pages.
Office Action, dated Oct. 7, 2019, received in Japanese Patent Application No. 2018-000753, which corresponds with U.S. Appl. No. 14/536,426, 5 pages.
Office Action, dated Mar. 9, 2017, received in U.S. Appl. No. 14/536,464, 21 pages.
Final Office Action, dated Aug. 25, 2017, received in U.S. Appl. No. 14/536,464, 30 pages.
Office Action, dated Feb. 12, 2018, received in U.S. Appl. No. 14/536,464, 33 pages.
Final Office Action, dated Jun. 22, 2018, received in U.S. Appl. No. 14/536,464, 32 pages.
Notice of Allowance, dated Jan. 25, 2021, received in U.S. Appl. No. 14/536,464, 5 pages.
Office Action, dated Sep. 25, 2017, received in U.S. Appl. No. 14/536,644, 29 pages.
Final Office Action, dated May 3, 2018, received in U.S. Appl. No. 14/536,644, 28 pages.
Office Action, dated Nov. 2, 2018, received in U.S. Appl. No. 14/536,644, 24 pages.
Notice of Allowance, dated Jul. 2, 2019, received in U.S. Appl. No. 14/536,644, 5 pages.
Office Action, dated Oct. 19, 2017, received in U.S. Appl. No. 14/608,926, 14 pages.
Final Office Action, dated Jun. 6, 2018, received in U.S. Appl. No. 14/608,926, 19 pages.
Notice of Allowance, dated Apr. 10, 2019, received in U.S. Appl. No. 14/608,926, 16 pages.
Notice of Allowance, dated May 21, 2019, received in U.S. Appl. No. 14/608,926, 5 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Notice of Acceptance, dated Dec. 20, 2017, received in Australian Patent Application No. 2016201451, which corresponds with U.S. Appl. No. 14/608,926, 3 pages.
Certificate of Grant, dated May 3, 2018, received in Australian Patent Application No. 2016201451, which corresponds with U.S. Appl. No. 14/608,926, 1 page.
Office Action, dated May 4, 2017, received in Chinese Patent Application No. 201380068414.1, which corresponds with U.S. Appl. No. 14/608,926, 5 pages.
Notice of Allowance, dated Feb. 8, 2018, received in Chinese Patent Application No. 201380068414.1, which corresponds with U.S. Appl. No. 14/608,926, 2 pages.
Patent, dated May 4, 2018, received in Chinese Patent Application No. 201380068414.1, which corresponds with U.S. Appl. No. 14/608,926, 4 pages.
Office Action, dated Dec. 1, 2020, received in Chinese Patent Application No. 201810369259.1, which corresponds with U.S. Appl. No. 14/608,926, 14 pages.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Nov. 11, 2016, received in European Patent Application No. 13795392.3, which corresponds with U.S. Appl. No. 14/608,926, 6 pages.
Office Action, dated Jul. 4, 2017, received in European Patent Application No. 13795392.3, which corresponds with U.S. Appl. No. 14/608,926, 4 pages.
Oral Summons, dated Feb. 13, 2017, received in European Patent Application No. 13795392.3, which corresponds with U.S. Appl. No. 14/608,926, 11 pages.
Office Action, dated Mar. 14, 2016, received in Japanese Patent Application No. 2015-549392, which corresponds with U.S. Appl. No. 14/608,926, 4 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Patent, dated Apr. 27, 2018, received in Japanese Patent Application No. 2017-024234, which corresponds with U.S. Appl. No. 14/608,926, 3 pages.
Office Action, dated Feb. 22, 2019, received in Japanese Patent Application No. 2018-079290, which corresponds with U.S. Appl. No. 14/608,926, 7 pages.
Office Action, dated Sep. 30, 2019, received in Japanese Patent Application No. 2018-079290, which corresponds with U.S. Appl. No. 14/608,926, 5 pages.
Notice of Allowance, dated Apr. 3, 2020, received in Japanese Patent Application No. 2018-079290, which corresponds with U.S. Appl. No. 14/608,926, 5 pages.
Patent, dated Apr. 14, 2020, received in Japanese Patent Application No. 2018-079290, which corresponds with U.S. Appl. No. 14/608,926, 5 pages.
Office Action, dated May 12, 2016, received in Korean Patent Application No. 10-2015-7018853, which corresponds with U.S. Appl. No. 14/608,926, 4 pages.
Notice of Allowance, dated Mar. 31, 2017, received in Korean Patent Application No. 2015-7018853, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 2017-7018250, which corresponds with U.S. Appl. No. 14/608,926, 2 pages.
Notice of Allowance, dated Dec. 29, 2017, received in Korean Patent Application No. 2017-7018250, which corresponds with U.S. Appl. No. 14/608,926, 3 pages.
Office Action, dated Oct. 19, 2017, received in U.S. Appl. No. 14/536,646, 21 pages.
Notice of Allowance, dated Aug. 9, 2018, received in U.S. Appl. No. 14/536,646, 5 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Jun. 6, 2019, received in Australian Patent Application No. 2018256626, which corresponds with U.S. Appl. No. 14/536,646, 3 pages.
Notice of Acceptance, dated Aug. 1, 2019, received in Australian Patent Application No. 2018256626, which corresponds with U.S. Appl. No. 14/536,646, 3 pages.
Certificate of Grant, dated Dec. 5, 2019, received in Australian Patent Application No. 2018256626, which corresponds with U.S. Appl. No. 14/536,646, 3 pages.
Office Action, dated Dec. 1, 2016, received in Chinese Patent Application No. 2013800362059, which corresponds with U.S. Appl. No. 14/536,646, 3 pages.

(56) References Cited

OTHER PUBLICATIONS

Notice of Allowance, dated Oct. 9, 2017, received in Chinese Patent Application No. 2013800362059, which corresponds with U.S. Appl. No. 14/536,646, 3 pages.
Office Action, dated Jul. 3, 2020, received in Chinese Patent Application No. 201711425148.X, which corresponds with U.S. Appl. No. 14/536,646, 13 pages.
Office Action, dated Oct. 26, 2020, received in Chinese Patent Application No. 201711422092.2, which corresponds with U.S. Appl. No. 14/536,646, 20 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Notice of Allowance, dated Jan. 4, 2017, received in European Patent Application No. 13724102.2, which corresponds with U.S. Appl. No. 14/536,646, 5 pages.
Patent, dated May 26, 2017, received in European Patent Application No. 13724102.2, which corresponds with U.S. Appl. No. 14/536,646, 1 page.
Office Action, dated Feb. 29, 2016, received in Japanese Patent Application No. 2015-511645, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Certificate of Grant, dated Jan. 25, 2019, received in Hong Kong Patent Application No. 2015-511645, which corresponds with U.S. Appl. No. 14/536,646, 4 pages.
Office Action, dated Apr. 3, 2017, received in U.S. Appl. No. 14/536,141, 11 pages.
Notice of Allowance, dated Sep. 20, 2017, received in U.S. Appl. No. 14/536,141, 10 pages.
Office Action, dated Aug. 27, 2015, received in Australian Patent Application No. 2013259614, which corresponds with U.S. Appl. No. 14/536,141, 4 pages.
Notice of Allowance, dated Aug. 15, 2016, received in Australian Patent Application No. 2013259614, which corresponds with U.S. Appl. No. 14/536,141, 1 page.
Office Action, dated Jul. 21, 2017, received in Australian Patent Application No. 2016262773, which corresponds with U.S. Appl. No. 14/536,141, 3 pages.
Notice of Acceptance, dated Jul. 19, 2018, received in Australian Patent Application No. 2016262773, which corresponds with U.S. Appl. No. 14/536,141, 3 pages.
Office Action, dated Jun. 5, 2019, received in Australian Patent Application No. 2018256616, which corresponds with U.S. Appl. No. 14/536,141, 3 pages.
Notice of Acceptance, dated Jan. 22, 2020, received in Australian Patent Application No. 2018256616, which corresponds with U.S. Appl. No. 14/536,141, 3 pages.
Certificate of Grant, dated May 21, 2020, received in Australian Patent Application No. 2018256616, which corresponds with U.S. Appl. No. 14/536,141, 3 pages.
Office Action, dated Mar. 3, 2017, received in Chinese Patent Application No. 201380035893.7, which corresponds with U.S. Appl. No. 14/536,141, 8 pages.
Office Action, dated Feb. 2, 2018, received in Chinese Patent Application No. 201380035893.7, which corresponds with U.S. Appl. No. 14/536,141, 5 pages.
Notice of Allowance, dated Aug. 31, 2018, received in Chinese Patent Application No. 201380035893.7, which corresponds with U.S. Appl. No. 14/536,141, 6 pages.
Patent, dated Oct. 23, 2018, received in Chinese Patent Application No. 201380035893.7, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Aug. 31, 2016, received in European Patent Application No. 13726053.5, which corresponds with U.S. Appl. No. 14/536,141, 10 pages.
Office Action, dated Apr. 9, 2018, received in European Patent Application No. 13726053.5, which corresponds with U.S. Appl. No. 14/536,141, 9 pages.
Office Action, dated Mar. 7, 2019, received in European Patent Application No. 13726053.5, which corresponds with U.S. Appl. No. 14/536,141, 5 pages.
Intention to Grant, dated Sep. 6, 2019, received in European Patent Application No. 13726053.5, which corresponds with U.S. Appl. No. 14/536,141, 7 pages.
Decision to Grant, dated Jan. 23, 2020, received in European Patent Application No. 13726053.5, which corresponds with U.S. Appl. No. 14/536,141, 1 page.
Patent, dated Feb. 19, 2020, received in European Patent Application No. 13726053.5, which corresponds with U.S. Appl. No. 14/536,141, 4 page.
Office Action, dated Feb. 29, 2016, received in Japanese Patent Application No. 2015-511646, which corresponds with U.S. Appl. No. 14/536,141, 3 pages.
Office Action, dated Oct. 25, 2016, received in Japanese Patent Application No. 2015-511646, which corresponds with U.S. Appl. No. 14/536,141, 6 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Office Action, dated Aug. 10, 2018, received in Japanese Patent Application No. 2017-141953, which corresponds with U.S. Appl. No. 14/536,141, 6 pages.
Office Action, dated Jul. 5, 2019, received in Japanese Patent Application No. 2017-141953, which corresponds with U.S. Appl. No. 14/536,141, 6 pages.
Office Action, dated Dec. 8, 2016, received in U.S. Appl. No. 14/608,942, 9 pages.
Notice of Allowance, dated May 12, 2017, received in U.S. Appl. No. 14/608,942, 10 pages.
Office Action, dated Jan. 29, 2016, received in Australian Patent Application No. 2013368443, which corresponds with U.S. Appl. No. 14/608,942, 3 pages.
Notice of Allowance, dated Mar. 11, 2016, received in Australian Patent Application No. 2013368443, which corresponds with U.S. Appl. No. 14/608,942, 2 pages.
Certificate of Grant, dated Jul. 7, 2016, received in Australian Patent Application No. 2013368443, which corresponds with U.S. Appl. No. 14/608,942, 3 pages.
Office Action, dated Mar. 29, 2017, received in Australian Patent Application No. 2016201303, which corresponds with U.S. Appl. No. 14/608,942, 3 pages.
Notice of Acceptance, dated Mar. 7, 2018, received in Australian Patent Application No. 2016201303, which corresponds with U.S. Appl. No. 14/608,942, 3 pages.
Certificate of Grant, dated Jul. 5, 2018, received in Australian Patent Application No. 2016201303, which corresponds with U.S. Appl. No. 14/608,942, 4 pages.
Office Action, dated Jun. 16, 2017, received in Chinese Patent Application No. 201380068295.X, which corresponds with U.S. Appl. No. 14/608,942, 6 pages.
Office Action, dated Mar. 28, 2018, received in Chinese Patent Application No. 201380068295.X, which corresponds with U.S. Appl. No. 14/608,942, 5 pages.
Office Action, dated Oct. 8, 2018, received in Chinese Patent Application No. 201380068295.X, which corresponds with U.S. Appl. No. 14/608,942, 3 pages.
Notice of Allowance, dated May 7, 2019, received in Chinese Patent Application No. 201380068295.X, which corresponds with U.S. Appl. No. 14/608,942, 3 pages.

(56) References Cited

OTHER PUBLICATIONS

Patent, dated Jul. 5, 2019, received in Chinese Patent Application No. 201380068295.X, which corresponds with U.S. Appl. No. 14/608,942, 8 pages.
Office Action, dated Oct. 7, 2016, received in European Patent Application No. 13798464.7, which corresponds with U.S. Appl. No. 14/608,942, 7 pages.
Decision to Grant, dated Sep. 13, 2018, received in European Patent Application No. 13798464.7, which corresponds with U.S. Appl. No. 14/608,942, 2 pages.
Intention to Grant, dated Nov. 8, 2019, received in European Patent Application No. 18194127.9, which corresponds with U.S. Appl. No. 14/608,942, 7 pages.
Decision to Grant, dated Aug. 20, 2020, received in European Patent Application No. 18194127.9, which corresponds with U.S. Appl. No. 14/608,942, 4 pages.
Certificate of Grant, dated Jul. 26, 2019, received in Hong Kong, which corresponds with U.S. Appl. No. 14/608,942, 4 pages.
Office Action, dated Jul. 4, 2016, received in Japanese Patent Application No. 2015-549393, which corresponds with U.S. Appl. No. 14/608,942, 4 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Apr. 5, 2016, received in Korean Patent Application No. 2015-7018448, which corresponds with U.S. Appl. No. 14/608,942, 6 pages.
Office Action, dated Feb. 24, 2017, received in Korean Patent Application No. 2015-7018448, which corresponds with U.S. Appl. No. 14/608,942, 4 pages.
Notice of Allowance, dated Jan. 15, 2019, received in Korean Patent Application No. 2015-7018448, which corresponds with U.S. Appl. No. 14/608,942, 5 pages.
Patent, dated Mar. 8, 2019, received in Korean Patent Application No. 2015-7018448, which corresponds with U.S. Appl. No. 14/608,942, 4 pages.
Office Action, dated Jul. 17, 2017, received in U.S. Appl. No. 14/536,166, 19 pages.
Notice of Allowance, dated Feb. 28, 2018, received in U.S. Appl. No. 14/536,166, 5 pages.
Office Action, dated Aug. 1, 2016, received in U.S. Appl. No. 14/536,203, 14 pages.
Notice of Allowance, dated Feb. 1, 2017, received in U.S. Appl. No. 14/536,203, 9 pages.
Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259630, which corresponds with U.S. Appl. No. 14/536,203, 3 pages.
Office Action, dated Jul. 4, 2017, received in Australian Patent Application No. 2016238917, which corresponds with U.S. Appl. No. 14/536,203, 5 pages.
Notice of Acceptance, dated Jul. 19, 2018, received in Australian Patent Application No. 2016238917, which corresponds with U.S. Appl. No. 14/536,203, 3 pages.
Certificate of Grant, dated Nov. 1, 2018, received in Australian Patent Application No. 2016238917, which corresponds with U.S. Appl. No. 14/536,203, 1 page.
Office Action, dated Aug. 20, 2018, received in Australian Patent Application No. 2018250481, which corresponds with U.S. Appl. No. 14/536,203, 2 pages.
Notice of Allowance, dated Apr. 29, 2020, received in Australian Patent Application No. 2018250481, which corresponds with U.S. Appl. No. 14/536,203, 3 pages.
Certificate of Grant, dated Sep. 3, 2020, received in Australian Patent Application No. 2018250481, which corresponds with U.S. Appl. No. 14/536,203, 4 pages.
Office Action, dated Oct. 25, 2017, received in Chinese Patent Application No. 201380035977.0, which corresponds with U.S. Appl. No. 14/536,203, 5 pages.
Notice of Allowance, dated Apr. 4, 2018, received in Chinese Patent Application No. 201380035977.0, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Dec. 6, 2017, received in European Patent Application No. 13724104.8, which corresponds with U.S. Appl. No. 14/536,203, 9 pages.
Decision to Grant, dated Oct. 24, 2018, received in European Patent Application No. 13724104.8, which corresponds with U.S. Appl. No. 14/536,203, 5 pages.
Intention to Grant, dated Mar. 18, 2019, received in European Patent Application No. 13724104.8, which corresponds with U.S. Appl. No. 14/536,203, 9 pages.
Decision to Grant, dated Aug. 8, 2019, received in European Patent Application No. 13724104.8, which corresponds with U.S. Appl. No. 14/536,203, 1 page.
Certificate of Grant, dated Sep. 4, 2019, received in European Patent Application No. 15108904.1, which corresponds with U.S. Appl. No. 14/536,203, 4 pages.
Patent, dated Sep. 27, 2019, received in Hong Kong Patent Application No. 15108904.1, which corresponds with U.S. Appl. No. 14/536,203, 6 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Office Action, dated Jun. 23, 2017, received in Japanese Patent Application No. 2016173113, which corresponds with U.S. Appl. No. 14/536,203, 5 pages.
Notice of Allowance, mailed Jan. 12, 2018, received in Japanese Patent Application No. 2016173113, which corresponds with U.S. Appl. No. 14/536,203, 5 pages.
Patent, dated Feb. 16, 2018, received in Japanese Patent Application No. 2016173113, which corresponds with U.S. Appl. No. 14/536,203, 3 pages.
Office Action, dated Oct. 19, 2018, received in Japanese Patent Application No. 2018-022394, which corresponds with U.S. Appl. No. 14/536,203, 4 pages.
Office Action, dated Sep. 30, 2019, received in Japanese Patent Application No. 2018-022394, which corresponds with U.S. Appl. No. 14/536,203, 5 pages.
Office Action, dated Jan. 22, 2021, received in Japanese Patent Application No. 2018-022394, which corresponds with U.S. Appl. No. 14/536,203, 2 pages.
Office Action, dated Dec. 4, 2015, received in Korean Patent Application No. 2014-7034520, which corresponds with U.S. Appl. No. 14/536,203, 4 pages.
Notice of Allowance, dated Sep. 1, 2016, received in Korean Patent Application No. 2014-7034520, which corresponds with U.S. Appl. No. 14/536,203, 5 pages.

(56) References Cited

OTHER PUBLICATIONS

Office Action, dated Feb. 6, 2017, received in Korean Patent Application No. 2016-7033834, which corresponds with U.S. Appl. No. 14/536,203, 4 pages.
Notice of Allowance, dated Oct. 30, 2017, received in Korean Patent Application No. 2016-7033834, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Office Action, dated Oct. 20, 2017, received in U.S. Appl. No. 14/608,965, 14 pages.
Office Action, dated Jul. 2, 2018, received in U.S. Appl. No. 14/608,965, 16 pages.
Final Office Action, dated Jan. 10, 2019, received in U.S. Appl. No. 14/608,965, 17 pages.
Notice of Allowance dated Nov. 7, 2019, received in U.S. Appl. No. 14/608,965, 17 pages.
Notice of Allowance dated Jan. 2, 2020, received in U.S. Appl. No. 14/608,965, 5 pages.
Office action, dated Oct. 11, 2017, received in Chinese Patent Application No. 201380074060.1, which corresponds with U.S. Appl. No. 14/608,965, 5 pages.
Office action, dated Aug. 1, 2018, received in Chinese Patent Application No. 201380074060.1, which corresponds with U.S. Appl. No. 14/608,965, 5 pages.
Office action, dated Nov. 1, 2018, received in Chinese Patent Application No. 201380074060.1, which corresponds with U.S. Appl. No. 14/608,965, 3 pages.
Office action, dated Apr. 3, 2019, received in Chinese Patent Application No. 201380074060.1, which corresponds with U.S. Appl. No. 14/608,965, 3 pages.
Patent, dated May 17, 2019, received in Chinese Patent Application No. 201380074060.1, which corresponds with U.S. Appl. No. 14/608,965, 6 pages.
Office Action, dated Jul. 22, 2016, received in European Office Action No. 13798465.4, which corresponds with U.S. Appl. No. 14/608,965, 3 pages.
Oral Proceedings, dated Mar. 7, 2018, received in European Office Action No. 13798465.4, which corresponds with U.S. Appl. No. 14/608,965, 5 pages.
Decision to Grant, dated Sep. 6, 2018, received in European Office Action No. 13798465.4, which corresponds with U.S. Appl. No. 14/608,965, 2 pages.
Office Action, dated Oct. 20, 2016, received in U.S. Appl. No. 14/536,247, 10 pages.
Final Office Action, dated Mar. 24, 2017, received in U.S. Appl. No. 14/536,247, 14 pages.
Notice of Allowance, dated Nov. 22, 2017, received in U.S. Appl. No. 14/536,247, 6 pages.
Office Action, dated Mar. 24, 2017, received in U.S. Appl. No. 14/536,267, 12 pages.
Notice of Allowance, dated Nov. 9, 2017, received in U.S. Appl. No. 14/536,267, 8 pages.
Notice of Allowance, dated Jun. 1, 2018, received in U.S. Appl. No. 14/536,267, 5 pages.
Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.
Office Action, dated Mar. 24, 2017, received in Australian Patent Application No. 2016204411, which corresponds with U.S. Appl. No. 14/536,267, 3 pages.
Notice of Acceptance, dated Feb. 27, 2018, received in Australian Patent Application No. 2016204411, which corresponds with U.S. Appl. No. 14/536,267, 3 pages.
Certificate of Grant, dated Jun. 28, 2018, received in Australian Patent Application No. 2016204411, which corresponds with U.S. Appl. No. 14/536,267, 4 pages.
Office Action, dated Mar. 15, 2019, received in Australian Patent Application No. 2018204236, which corresponds with U.S. Appl. No. 14/5326,267, 5 pages.
Notice of Acceptance, dated Apr. 29, 2019, received in Australian Patent Application No. 2018204236, which corresponds with U.S. Appl. No. 14/5326,267, 3 pages.
Certificate of Grant, dated Aug. 28, 2019, received in Australian Patent Application No. 2018204236, which corresponds with U.S. Appl. No. 14/5326,267, 4 pages.
Office Action, dated Dec. 9, 2016, received in Chinese Patent Application No. 2016120601564130, which corresponds with U.S. Appl. No. 14/536,267, 4 pages.
Notice of Allowance, dated Jan. 29, 2018, received in Chinese Patent Application No. 201380035968.1, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Office Action, dated Nov. 28, 2018, received in Chinese Patent Application No. 201610537334.1, which corresponds with U.S. Appl. No. 14/536,267, 5 pages.
Office Action, dated Jul. 11, 2019, received in Chinese Patent Application No. 201610537334.1, which corresponds with U.S. Appl. No. 14/536,267, 3 pages.
Office Action, dated Sep. 30, 2019, received in Chinese Patent Application No. 201610537334.1, which corresponds with U.S. Appl. No. 14/536,267, 3 pages.
Office Action, dated Dec. 20, 2019, received in Chinese Patent Application No. 201610537334.1, which corresponds with U.S. Appl. No. 14/536,267, 3 pages.
Office Action, dated Apr. 20, 2020, received in Chinese Patent Application No. 201610537334.1, which corresponds with U.S. Appl. No. 14/536,267, 4 pages.
Patent, dated Sep. 29, 2020, received in Chinese Patent Application No. 201610537334.1, which corresponds with U.S. Appl. No. 14/536,267, 7 pages.
Office Action, dated Jun. 13, 2018, received in Chinese Patent Application No. 201810332044.2, which corresponds with U.S. Appl. No. 14/536,267, 2 pages.
Office Action, dated Jan. 25, 2018, received in European Patent Application No. 13724106.3, which corresponds with U.S. Appl. No. 14/536,267, 5 pages.
Intention to Grant, dated Jun. 27, 2018, received in European Patent Application No. 13724106.3, which corresponds with U.S. Appl. No. 14/536,267, 5 pages.
Decision to Grant, dated Oct. 18, 2018, received in European Patent Application No. 13724106.3, which corresponds with U.S. Appl. No. 14/536,267, 3 pages.
Grant Certificate, dated Nov. 14, 2018, received in European Patent Application No. 13724106.3, which corresponds with U.S. Appl. No. 14/536,267, 3 pages, 4 pages.
Office Action, dated Sep. 13, 2017, received in European Patent Application No. 16177863.4, which corresponds with U.S. Appl. No. 14/536,267, 6 pages.
Decision to Grant, dated Nov. 29, 2018, received in European Patent Application No. 16177863.4, which corresponds with U.S. Appl. No. 14/536,267, 4 pages.
Patent, dated Dec. 26, 2018, received in European Patent Application No. 16177863.4, which corresponds with U.S. Appl. No. 14/536,267, 4 pages.
Office Action, dated Aug. 29, 2019, received in European Patent Application No. 18183789.9, which corresponds with U.S. Appl. No. 16/262,800, 9 pages.
Office Action, dated Aug. 21, 2020, received in European Patent Application No. 18183789.9, which corresponds with U.S. Appl. No. 16/262,800, 9 pages.

(56) References Cited

OTHER PUBLICATIONS

Patent, dated Aug. 30, 2019, received in Hong Kong Patent Application No. 15107537.8, which corresponds with U.S. Appl. No. 14/536,267, 9 pages.
Patent, dated Nov. 8, 2019, received in Hong Kong Patent Application No. 15108890.7, which corresponds with U.S. Appl. No. 14/536,267, 4 pages.
Office Action, dated Jan. 29, 2016, received in Japanese Patent Application No. 2015-511652, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Patent Application No. 2016-125839, which corresponds with U.S. Appl. No. 14/536,267, 6 pages.
Notice of Allowance, dated Nov. 17, 2017, received in Japanese Patent Application No. 2016-125839, which corresponds with U.S. Appl. No. 14/536,267, 5 pages.
Office Action, dated Feb. 4, 2019, received in Japanese Patent Application No. 2017-237035, which corresponds with U.S. Appl. No. 14/536,267, 7 pages.
Notice of Allowance, dated Sep. 9, 2019, received in Japanese Patent Application No. 2017-237035, which corresponds with U.S. Appl. No. 14/536,267, 5 pages.
Patent, dated Sep. 27, 2019, received in Japanese Patent Application No. 2017-237035, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 2016-7029533, which corresponds with U.S. Appl. No. 14/536,267, 2 pages.
Notice of Allowance, dated Sep. 1, 2017, received in Korean Patent Application No. 2016-7029533, which corresponds with U.S. Appl. No. 14/536,267, 4 pages.
Patent, dated Dec. 1, 2017, received in Korean Patent Application No. 2016-7029533, which corresponds with U.S. Appl. No. 14/536,267, 2 pages.
Office Action, dated Jan. 29, 2018, received in Korean Patent Application No. 2017-7034838, which corresponds with U.S. Appl. No. 14/536,267, 4 pages.
Notice of Allowance, dated Dec. 3, 2018, received in Korean Patent Application No. 2017-7034838, which corresponds with U.S. Appl. No. 14/536,267, 5 pages.
Patent, dated Mar. 4, 2019, received in Korean Patent Application No. 2017-7034838, which corresponds with U.S. Appl. No. 14/536,267, 4 pages.
Office Action, dated Apr. 7, 2017, received in U.S. Appl. No. 14/536,291, 11 pages.
Notice of Allowance, dated Dec. 1, 2017, received in U.S. Appl. No. 14/536,291, 19 pages.
Notice of Allowance, dated Mar. 20, 2018, received in U.S. Appl. No. 14/536,291, 5 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Office Action, dated Jul. 21, 2017, received in Australian Patent Application No. 2016216658, which corresponds with U.S. Appl. No. 14/536,291, 3 pages.
Notice of Acceptance, dated Jul. 19, 2018, received in Australian Patent Application No. 2016216658, which corresponds with U.S. Appl. No. 14/536,291, 3 pages.
Patent, dated Nov. 30, 2018, received in Australian Patent Application No. 2016216658, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Oct. 23, 2017, received in Chinese Patent Application No. 201380035986.X, which corresponds with U.S. Appl. No. 14/536,291, 9 pages.
Notice of Allowance, dated Jun. 24, 2020, received in Chinese Patent Application No. 201710781246.0, which corresponds with U.S. Appl. No. 14/536,291, 5 pages.
Patent, dated Jul. 31, 2020, received in Chinese Patent Application No. 201710781246.0, which corresponds with U.S. Appl. No. 14/536,291, 6 pages.
Office Action, dated Jul. 17, 2020, received in Chinese Patent Application No. 2018100116175.X, which corresponds with U.S. Appl. No. 14/536,291, 15 pages.
Office Action, dated Nov. 17, 2020, received in Chinese Patent Application No. 2018100116175.X, which corresponds with U.S. Appl. No. 14/536,291, 16 pages.
Office Action, dated Jan. 7, 2016, received in European Patent Application No. 13724107.1, which corresponds with U.S. Appl. No. 14/536,291, 11 pages.
Office Action, dated Aug. 22, 2016, received in European Patent Application No. 13724107.1, which corresponds with U.S. Appl. No. 14/536,291, 7 pages.
Office Action, dated Mar. 23, 2017, received in European Patent Application No. 13724107.1, which corresponds with U.S. Appl. No. 14/536,291, 8 pages.
Intention to Grant, dated Jan. 8, 2019, received in European Patent Application No. 17186744.3, which corresponds with U.S. Appl. No. 14/536,291, 7 pages.
Decision to Grant, dated Oct. 31, 2019, received in European Patent Application No. 17186744.3, which corresponds with U.S. Appl. No. 14/536,291, 3 pages.
Patent, dated Nov. 27, 2019, received in European Patent Application No. 17186744.3, which corresponds with U.S. Appl. No. 14/536,291, 4 pages.
Office Action, dated Mar. 8, 2016, received in Japanese Patent Application No. 2015-511655, which corresponds with U.S. Appl. No. 14/536,291, 4 pages.
Final Office Action, dated Dec. 22, 2016, received in Japanese Patent Application No. 2015-511655, which corresponds with U.S. Appl. No. 14/536,291, 3 pages.
Office Action, dated Jun. 29, 2018, received in Japanese Patent Application No. 2017-083027, which corresponds with U.S. Appl. No. 14/536,291, 5 pages.
Patent, dated Feb. 22, 2019, received in Japanese Patent Application No. 2017-083027, which corresponds with U.S. Appl. No. 14/536,291, 3 pages.
Notice of Allowance, dated Jan. 15, 2019, received in Japanese Patent Application No. 2017-083027, which corresponds with U.S. Appl. No. 14/536,291, 5 pages.
Office Action, dated Oct. 19, 2017, received in U.S. Appl. No. 14/608,985, 13 pages.
Notice of Allowance, dated Apr. 20, 2018, received in U.S. Appl. No. 14/608,985, 5 pages.
Office Action, dated Jan. 15, 2016, received in Australian Patent Application No. 2013368445, which corresponds with U.S. Appl. No. 14/608,985, 3 pages.
Notice of Allowance, dated Jan. 18, 2017, received in Australian Patent Application No. 2013368445, which corresponds with U.S. Appl. No. 14/608,985, 3 pages.
Patent, dated May 18, 2017, received in Australian Patent Application No. 2013368445, which corresponds with U.S. Appl. No. 14/608,985, 1 page.

(56) References Cited

OTHER PUBLICATIONS

Office Action, dated May 19, 2017, received in Chinese Patent Application No. 201380068399.0, which corresponds with U.S. Appl. No. 14/608,985, 5 pages.
Notice of Allowance, dated Sep. 19, 2017, received in Chinese Patent Application No. 201380068399.0, which corresponds with U.S. Appl. No. 14/608,985, 3 pages.
Patent, dated Dec. 8, 2017, received in Chinese Patent Application No. 201380068399.0, which corresponds with U.S. Appl. No. 14/608,985, 4 pages.
Office Action, dated Jul. 25, 2016, received in European Patent Application No. 13811032.5, which corresponds with U.S. Appl. No. 14/608,985, 8 pages.
Office Action, dated Feb. 27, 2017, received in European Patent Application No. 13811032.5, which corresponds with U.S. Appl. No. 14/608,985, 6 pages.
Summons, dated Oct. 6, 2017, received in European Patent Application No. 13811032.5, which corresponds with U.S. Appl. No. 14/608,985, 6 pages.
Intention to Grant, dated Jan. 16, 2019, received in European Patent Application No. 13811032.5, which corresponds with U.S. Appl. No. 14/608,985, 9 pages.
Decision to Grant, dated Aug. 1, 2019, received in European Patent Application No. 13811032.5, which corresponds with U.S. Appl. No. 14/608,985, 2 pages.
Certificate of Grant, dated Aug. 28, 2019, received in European Patent Application No. 13811032.5, which corresponds with U.S. Appl. No. 14/608,985, 4 pages.
Certificate of Grant, dated Jun. 29, 2018, received in Hong Kong Patent Application No. 15112851.6, which corresponds with U.S. Appl. No. 14/608,985, 2 pages.
Office Action, dated Apr. 25, 2016, received in Japanese Patent Application No. 2015-550384, which corresponds with U.S. Appl. No. 14/608,985, 4 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Nov. 4, 2016, received in Korean Patent Application No. 2015-7019984, which corresponds with U.S. Appl. No. 14/608,985, 8 pages.
Notice of Allowance, dated Sep. 19, 2017, received in Korean Patent Application No. 2015-7019984, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Office Action, dated Mar. 24, 2017, received in U.S. Appl. No. 14/609,006, 13 pages.
Final Office Action, dated Sep. 21, 2017, received in U.S. Appl. No. 14/609,006, 17 pages.
Office Action, dated Mar. 20, 2018, received in U.S. Appl. No. 14/609,006, 13 pages.
Office Action, dated Oct. 11, 2018, received in U.S. Appl. No. 14/609,006, 12 pages.
Final Office Action, dated May 23, 2019, received in U.S. Appl. No. 14/609,006, 14 pages.
Office Action, dated Jan. 7, 2020, received in U.S. Appl. No. 14/609,006, 17 pages.
Final Office Action, dated Jun. 15, 2020, received in U.S. Appl. No. 14/609,006, 19 pages.
Office Action, dated Apr. 19, 2017, received in U.S. Appl. No. 14/536,296, 12 pages.
Final Office Action, dated Nov. 2, 2017, received in U.S. Appl. No. 14/536,296, 13 pages.
Notice of Allowance, dated Mar. 14, 2018, received in U.S. Appl. No. 14/536,296, 8 pages.
Office Action, dated Nov. 1, 2017, received in U.S. Appl. No. 14/536,648, 22 pages.
Final Office Action, dated Aug. 7, 2018, received in U.S. Appl. No. 14/536,648, 14 pages.
Office Action, dated Jan. 2, 2019, received in U.S. Appl. No. 14/536,648 12 pages.
Notice of Allowance, dated Jul. 2, 2019, received in U.S. Appl. No. 14/536,648, 5 pages.
Office Action, dated Jul. 21, 2017, received in Australian Patent Application No. 2016247194, which corresponds with U.S. Appl. No. 14/536,648, 3 pages.
Notice of Acceptance, dated Jul. 19, 2018, received in Australian Patent Application No. 2016247194, which corresponds with U.S. Appl. No. 14/536,648, 3 pages.
Office Action, dated Jul. 24, 2020, received in Chinese Patent Application No. 201711422121.5, which corresponds with U.S. Appl. No. 14/536,648, 10 pages.
Intention to Grant, dated Apr. 1, 2019, received in European Patent Application No. 17153418.3, which corresponds with U.S. Appl. No. 14/536,648, 7 pages.
Decision to Grant, dated Aug. 16, 2019, received in European Patent Application No. 17153418.3, which corresponds with U.S. Appl. No. 14/536,648, 3 pages.
Grant Certificate, dated Sep. 11, 2019, received in European Patent Application No. 17153418.3, which corresponds with U.S. Appl. No. 14/536,648, 3 pages.
Office Action, dated Apr. 27, 2018, received in Japanese Patent Application No. 2017-008764, which corresponds with U.S. Appl. No. 14/536,648, 5 pages.
Notice of Allowance, dated Feb. 4, 2019, received in Japanese Patent Application No. 2017-008764, which corresponds with U.S. Appl. No. 14/536,648, 5 pages.
Patent, dated Mar. 1, 2019, received in Japanese Patent Application No. 2017-008764, which corresponds with U.S. Appl. No. 14/536,648, 3 pages.
Office Action, dated Jan. 19, 2017, received in U.S. Appl. No. 14/609,042, 12 pages.
Notice of Allowance, dated Jul. 10, 2017, received in U.S. Appl. No. 14/609,042, 8 pages.
Office Action, dated Aug. 24, 2018, received in Japanese Patent Application No. 2017-113598, which corresponds with U.S. Appl. No. 14/609,042, 6 pages.
Notice of Allowance, dated Apr. 9, 2019, received in Japanese Patent Application No. 2017-113598, which corresponds with U.S. Appl. No. 14/609,042, 5 pages.
Patent, dated Apr. 19, 2019, received in Japanese Patent Application No. 2017-113598, which corresponds with U.S. Appl. No. 14/609,042, 2 pages.
Notice of Allowance, dated Dec. 17, 2018, received in Korean Patent Application No. 2017-7008614, which corresponds with U.S. Appl. No. 14/609,042, 5 pages.
Patent, dated Mar. 8, 2019, received in Korean Patent Application No. 2017-7008614, which corresponds with U.S. Appl. No. 14/609,042, 4 pages.
Office Action, dated Mar. 31, 2016, received in U.S. Appl. No. 14/864,737, 17 pages.
Notice of Allowance, dated Feb. 27, 2017, received in U.S. Appl. No. 14/864,737, 9 pages.
Notice of Allowance, dated Jun. 19, 2017, received in U.S. Appl. No. 14/864,737, 8 pages.
Office Action, dated Apr. 16, 2018, received in Australian Patent Application No. 2016233792, which corresponds with U.S. Appl. No. 14/864,737, 2 pages.
Notice of Acceptance, dated Mar. 12, 2019, received in Australian Patent Application No. 2016233792, which corresponds with U.S. Appl. No. 14/864,737, 5 pages.
Certificate of Grant, dated Jul. 4, 2019, received in Australian Patent Application No. 2016233792, which corresponds with U.S. Appl. No. 14/864,737, 1 page.
Office Action, dated Sep. 11, 2018, received in Chinese Patent Application No. 201610159295.6, which corresponds with U.S. Appl. No. 14/864,737, 6 pages.

(56) References Cited

OTHER PUBLICATIONS

Notice of Allowance, dated Apr. 17, 2019, received in Chinese Patent Application No. 201610159295.6, which corresponds with U.S. Appl. No. 14/864,737, 3 pages.
Patent, dated May 31, 2019, received in Chinese Patent Application No. 201610159295.6, which corresponds with U.S. Appl. No. 14/864,737, 7 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Grant Certificate, dated Apr. 25, 2018, received in European Patent Application No. 16710871.1, which corresponds with U.S. Appl. No. 14/864,737, 2 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Feb. 14, 2018, received in Korean Patent Application No. 2017-7030129, which corresponds with U.S. Appl. No. 14/864,737, 17 pages.
Patent, dated Dec. 26, 2018, received in Korean Patent Application No. 2017-7030129, which corresponds with U.S. Appl. No. 14/864,737, 4 pages.
Patent, dated Jul. 12, 2017, received in Dutch Patent Application No. 2016452, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Office Action, dated Nov. 5, 2018, received in Chinese Patent Application No. 201610131415.1, which corresponds with U.S. Appl. No. 14/866,981, 6 pages.
Office Action, dated Jul. 16, 2019, received in Chinese Patent Application No. 201610131415.1, which corresponds with U.S. Appl. No. 14/866,981, 4 pages.
Office Action, dated Mar. 16, 2020, received in Chinese Patent Application No. 201610131415.1, which corresponds with U.S. Appl. No. 14/866,981, 3 pages.
Notice of Allowance, dated Dec. 4, 2020, received in Chinese Patent Application No. 201610131415.1, which corresponds with U.S. Appl. No. 14/866,981, 3 pages.
Patent, dated Jan. 22, 2021, received in Chinese Patent Application No. 201610131415.1, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated Jul. 7, 2017, received in Danish Patent Application No. 201500575, 4 pages.
Patent, Nov. 16, 2017, received in Dutch Patent Application No. 2016375, which corresponds with U.S. Appl. No. 14/866,981, 2 pages.
Office Action, dated Dec. 15, 2017, received in U.S. Appl. No. 14/866,159, 35 pages.
Notice of Allowance, dated May 18, 2018, received in U.S. Appl. No. 14/866,159, 8 pages.
Office Action, dated May 19, 2016, received in Australian Patent Application No. 2016100251, which corresponds with U.S. Appl. No. 14/866,159, 5 pages.
Office Action, dated Jun. 5, 2018, received in Chinese Patent Application No. 201610137839.9, which corresponds with U.S. Appl. No. 14/866,159, 11 pages.
Notice of Allowance, dated Dec. 6, 2018, received in Chinese Patent Application No. 201610137839.9, which corresponds with U.S. Appl. No. 14/866,159, 3 pages.
Patent, dated Feb. 19, 2019, received in Chinese Patent Application No. 201610137839.9, which corresponds with U.S. Appl. No. 14/866,159, 6 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action, dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Office Action, dated Jul. 6, 2017, received in Danish Patent Application No. 201500574, which corresponds with U.S. Appl. No. 14/866,159, 3 pages.
Office Action, dated Jan. 10, 2018, received in Danish Patent Application No. 201500574, which corresponds with U.S. Appl. No. 14/866,159, 2 pages.
Notice of Allowance, dated Mar. 21, 2018, received in Danish Patent Application No. 201500574, which corresponds with U.S. Appl. No. 14/866,159, 2 pages.
Patent, dated May 22, 2018, received in Danish Patent Application No. 201500574, which corresponds with U.S. Appl. No. 14/866,159, 2 pages.
Intention to Grant, dated Oct. 28, 2019, received in European Patent Application No. 16707356.8, which corresponds with U.S. Appl. No. 14/866,159, 7 pages.
Decision to Grant, dated Mar. 5, 2020, received in European Patent Application No. 16707356.8, which corresponds with U.S. Appl. No. 14/866,159, 2 pages.

(56) References Cited

OTHER PUBLICATIONS

Patent, dated Apr. 1, 2020, received in European Patent Application No. 16707356.8, which corresponds with U.S. Appl. No. 14/866,159, 3 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated May 24, 2018, received in U.S. Appl. No. 14/868,078, 6 pages.
Innovation Patent, dated Aug. 4, 2016, received in Australian Patent Application No. 2016101201, which corresponds with U.S. Appl. No. 14/868,078, 1 page.
Office Action, dated Oct. 12, 2016, received in Australian Patent Application No. 2016101201, which corresponds with U.S. Appl. No. 14/868,078, 3 pages.
Notice of Allowance, dated Sep. 1, 2017, received in Australian Patent Application No. 2016229421, which corresponds with U.S. Appl. No. 14/868,078, 3 pages.
Certificate of Grant, dated Jan. 3, 2018, received in Australian Patent Application No. 2016229421, which corresponds with U.S. Appl. No. 14/868,078, 1 page.
Office Action, dated Feb. 7, 2019, received in Australian Patent Application No. 2017258967, which corresponds with U.S. Appl. No. 14/868,078, 3 page.
Notice of Acceptance, dated Jun. 21, 2019, received in Australian Patent Application No. 2017258967, which corresponds with U.S. Appl. No. 14/868,078, 3 pages.
Certificate of Grant, dated Oct. 17, 2019, received in Australian Patent Application No. 2017258967, which corresponds with U.S. Appl. No. 14/868,078, 4 page.
Office Action, dated Aug. 20, 2018, received in Chinese Patent Application No. 01610130348.1, which corresponds with U.S. Appl. No. 14/868,078, 6 pages.
Office Action, dated Feb. 26, 2019, received in Chinese Patent Application No. 01610130348.1, which corresponds with U.S. Appl. No. 14/868,078, 4 pages.
Notice of Allowance, dated May 6, 2019, received in Chinese Patent Application No. 01610130348.1, which corresponds with U.S. Appl. No. 14/868,078, 3 pages.
Patent, dated Jul. 5, 2019, received in Chinese Patent Application No. 201610130348.1, which corresponds with U.S. Appl. No. 14/868,078, 6 pages.
Notice of Allowance, dated Oct. 1, 2016, received in Chinese Patent Application No. 201620175847.8, which corresponds with U.S. Appl. No. 14/868,078, 1 page.
Office Action, dated Nov. 21, 2019, received in Chinese Patent Application No. 201680011338.4, which corresponds with U.S. Appl. No. 14/868,078, 8 pages.
Office Action, dated May 19, 2020, received in Chinese Patent Application No. 201680011338.4, which corresponds with U.S. Appl. No. 14/868,078, 4 pages.
Office Action, dated Jun. 30, 2020, received in Chinese Patent Application No. 201680011338.4, which correspondence with U.S. Appl. No. 14/868,078, 4 pages.
Patent, dated Dec. 11, 2020, received in Chinese Patent Application No. 201680011338.4, which correspondence with U.S. Appl. No. 14/868,078, 3 pages.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Danish Patent Application No. 201500588, which corresponds with U.S. Appl. No. 14/868,078, 9 pages.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Notice of Allowance, dated May 2, 2017, received in received in Danish Patent Application No. 201500588, which corresponds with U.S. Appl. No. 14/868,078, 2 pages.
Patent, dated Sep. 11, 2017, received in Danish Patent Application No. 201500588, which corresponds with U.S. Appl. No. 14/868,078, 5 pages.
Office Action, dated Apr. 25, 2018, received in European Patent Application No. 16708916.8, which corresponds with U.S. Appl. No. 14/868,078, 6 pages.
Intention to Grant, dated May 10, 2019, received in European Patent Application No. 16708916.8, which corresponds with U.S. Appl. No. 14/868,078, 5 pages.
Decision to Grant, dated Sep. 12, 2019, received in European Patent Application No. 16708916.8, which corresponds with U.S. Appl. No. 14/868,078, 2 pages.
Patent, dated Oct. 9, 2019, received in European Patent Application No. 16708916.8, which corresponds with U.S. Appl. No. 14/868,078, 3 pages.
Office Action, dated Oct. 25, 2018, received in European Patent Application No. 17184437.6, which corresponds with U.S. Appl. No. 14/868,078, 6 pages.
Intention to Grant, dated May 22, 2019, received in European Patent Application No. 17184437.6, which corresponds with U.S. Appl. No. 14/868,078, 7 pages.
Decision to Grant, dated Sep. 19, 2019, received in European Patent Application No. 17184437.6, which corresponds with U.S. Appl. No. 14/868,078, 2 pages.
Patent, dated Oct. 16, 2019, received in European Patent Application No. 17184437.6, which corresponds with U.S. Appl. No. 14/868,078, 3 pages.
Patent, dated Jul. 12, 2017, received in Dutch Patent Application No. 2016376, which corresponds with U.S. Appl. No. 14/868,078, 2 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Notice of Allowance, dated Apr. 27, 2017, received in U.S. Appl. No. 14/863,432, 7 pages.
Notice of Allowance, dated Sep. 18, 2017, received in U.S. Appl. No. 14/863,432, 8 pages.
Office Action, dated Aug. 19, 2016, received in Australian Patent Application No. 2016100647, which corresponds with U.S. Appl. No. 14/863,432, 5 pages.
Office Action, dated Dec. 4, 2018, received in Chinese Patent Application No. 201610342313.4, which corresponds with U.S. Appl. No. 14/863,432, 5 pages.
Office Action, dated Jun. 17, 2019, received in Chinese Patent Application No. 201610342313.4, which corresponds with U.S. Appl. No. 14/863,432, 4 pages.
Office Action, dated Nov. 5, 2019, received in Chinese Patent Application No. 201610342313.4, which corresponds with U.S. Appl. No. 14/863,432, 4 pages.
Notice of Allowance, dated Mar. 20, 2020, received in Chinese Patent Application No. 201610342313.4, which corresponds with U.S. Appl. No. 14/863,432, 6 pages.
Patent, dated May 12, 2020, received in Chinese Patent Application No. 201610342313.4, which corresponds with U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Patent, dated Feb. 8, 2017, received in Chinese Patent Application No. 201620470063.8, which corresponds with U.S. Appl. No. 14/863,432, 5 pages.
Office Action, dated Apr. 4, 2016, received in Danish Patent Application No. 201500582, which corresponds with U.S. Appl. No. 14/863,432, 10 pages.

(56) References Cited

OTHER PUBLICATIONS

Office Action, dated Oct. 7, 2016, received in Danish Patent Application No. 201500582, which corresponds with U.S. Appl. No. 14/863,432, 6 pages.
Office Action, dated Jun. 12, 2017, received in Danish Patent Application No. 201500582, which corresponds with U.S. Appl. No. 14/863,432, 5 pages.
Office Action, dated Jan. 10, 2020, received in Japanese Patent Application No. 2018-243773, which corresponds with U.S. Appl. No. 14/863,432, 6 pages.
Office Action, dated Jul. 17, 2020, received in Japanese Patent Application No. 2018-243773, which corresponds with U.S. Appl. No. 14/863,432, 5 pages.
Notice of Allowance, dated Dec. 4, 2020, received in Japanese Patent Application No. 2018-243773, which corresponds with U.S. Appl. No. 14/863,432, 5 pages.
Notice of Allowance, dated Jul. 13, 2020, received in Korean Patent Application No. 2020-7015964, which corresponds with U.S. Appl. No. 14/863,432, 6 pages.
Patent, dated Oct. 12, 2020, received in Korean Patent Application No. 2020-7015964, which corresponds with U.S. Appl. No. 14/863,432, 8 pages.
Grant, dated Jul. 21, 2017, received in Dutch Patent Application No. 2016801, which corresponds with U.S. Appl. No. 14/871,227, 8 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Notice of Allowance, dated Oct. 4, 2017, received in U.S. Appl. No. 14/866,511, 37 pages.
Office Action, dated Aug. 19, 2016, received in U.S. Appl. No. 14/291,880—to be referenced in 7294 per Robby), 19 pages.
Notice of Allowance, dated Jan. 10, 2017, received in U.S. Appl. No. 14/291,880—to be referenced in 7294 per Robby), 8 pages.
Patent, dated Aug. 8, 2016, received in Australian Patent Application 2016100653, corresponds with U.S. Appl. No. 14/866,511, 1 page.
Office Action, dated Dec. 5, 2018, received in Chinese Patent Application No. 201610342264.4, which corresponds with U.S. Appl. No. 14/866,511, 4 pages.
Office Action, dated Jul. 11, 2019, received in Chinese Patent Application No. 201610342264.4, which corresponds with U.S. Appl. No. 14/866,511, 4 pages.
Office Action, dated Sep. 17, 2019, received in Chinese Patent Application No. 201610342264.4, which corresponds with U.S. Appl. No. 14/866,511, 3 pages.
Notice of Allowance, dated Nov. 28, 2019, received in Chinese Patent Application No. 201610342264.4, which corresponds with U.S. Appl. No. 14/866,511, 3 pages.
Patent, dated Feb. 7, 2020, received in Chinese Patent Application No. 201610342264.4, which corresponds with U.S. Appl. No. 14/866,511, 7 pages.
Notice of Allowance, dated Jan. 12, 2017, received in Chinese Patent Application No. 201620470281.1, which corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated Nov. 24, 2017, received in European Patent Application No. 16727900.9, which corresponds with U.S. Appl. No. 14/866,511, 5 pages.
Office Action, dated May 24, 2018, received in European Patent Application No. 16727900.9, which corresponds with U.S. Appl. No. 14/866,511, 7 pages.
Office Action, dated Jan. 2, 2019, received in European Patent Application No. 16727900.9, which corresponds with U.S. Appl. No. 14/866,511, 5 pages.
Intention to Grant, dated Jul. 5, 2019, received in European Patent Application No. 16727900.9, which corresponds with U.S. Appl. No. 14/866,511, 5 pages.
Decision to Grant, dated Dec. 5, 2019, received in European Patent Application No. 16727900.9, which corresponds with U.S. Appl. No. 14/866,511, 2 pages.
Patent, dated Jan. 1, 2020, received in European Patent Application No. 16727900.9, which corresponds with U.S. Appl. No. 14/866,511, 3 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Office Action, dated Apr. 24, 2020, received in Korean Patent Application No. 2020-7003065, which corresponds with U.S. Appl. No. 14/866,511, 3 pages.
Notice of Allowance, dated Jul. 29, 2020, received in Korean Patent Application No. 2020-7003065, which corresponds with U.S. Appl. No. 14/866,511, 5 pages.
Patent, dated Oct. 29, 2020, received in Korean Patent Application No. 2020-7003065, which corresponds with U.S. Appl. No. 14/866,511, 5 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Notice of Acceptance, dated Aug. 23, 2018, received in Australian Patent Application No. 2018204611, which corresponds with U.S. Appl. No. 14/869,899, 3 pages.
Office Action, dated Nov. 6, 2020, received in Chinese Patent Application No. 201610871595.7, which corresponds with U.S. Appl. No. 14/869,899, 15 pages.
Office Action, dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Jul. 3, 2017, received in Danish Patent Application No. 201500592, which corresponds with U.S. Appl. No. 14/869,899, 5 pages.

(56) References Cited

OTHER PUBLICATIONS

Office Action, dated Jan. 29, 2018, received in Danish Patent Application No. 201500592, which corresponds with U.S. Appl. No. 14/869,899, 2 pages.
Notice of Allowance, dated Apr. 24, 2018, received in Danish Patent Application No. 201500592, which corresponds with U.S. Appl. No. 14/869,899, 2 pages.
Patent, dated May 28, 2018, received in Danish Patent Application No. 201500592, which corresponds with U.S. Appl. No. 14/869,899, 2 pages.
Office Action, dated Nov. 22, 2016, received in Danish Patent Application No. 201670594, which corresponds with U.S. Appl. No. 14/869,899, 9 pages.
Office Action, dated Dec. 14, 2017, received in Danish Patent Application No. 201670594, which corresponds with U.S. Appl. No. 14/869,899, 3 pages.
Office Action, dated May 1, 2018, received in Danish Patent Application No. 201670594, which corresponds with U.S. Appl. No. 14/869,899, 2 pages.
Office Action, dated Oct. 9, 2018, received in Danish Patent Application No. 201670594, which corresponds with U.S. Appl. No. 14/869,899, 2 pages.
Patent, dated Feb. 26, 2019, received in Danish Patent Application No. 201670594, which corresponds with U.S. Appl. No. 14/869,899, 3 pages.
Office Action, dated May 8, 2019, received in European Patent Application No. 18168939.9, which corresponds with U.S. Appl. No. 14/869,899, 10 pages.
Intention to Grant, dated Oct. 25, 2019, received in European Patent Application No. 18168939.9, which corresponds with U.S. Appl. No. 14/869,899, 8 pages.
Decision to Grant, dated Mar. 26, 2020, received in European Patent Application No. 18168939.9, which corresponds with U.S. Appl. No. 14/869,899, 3 pages.
Patent, dated Apr. 22, 2020, received in European Patent Application No. 18168939.9, which corresponds with U.S. Appl. No. 14/869,899, 3 pages.
Office Action, dated May 23, 2019, received in European Patent Application No. 18175195.9, which corresponds with U.S. Appl. No. 14/869,899, 10 pages.
Oral Summons, dated Dec. 6, 2019, received in European Patent Application No. 18175195.9, which corresponds with U.S. Appl. No. 14/869,899, 9 pages.
Office Action, dated Sep. 21, 2018, received in Japanese Patent Application No. 2018-100827, which corresponds with U.S. Appl. No. 14/869,899, 4 pages.
Notice of Allowance, dated Mar. 1, 2019, received in Japanese Patent Application No. 2018-100827, which corresponds with U.S. Appl. No. 14/869,899, 5 pages.
Patent, dated Apr. 5, 2019, received in Japanese Patent Application No. 2018-100827, which corresponds with U.S. Appl. No. 14/869,899, 5 pages.
Office Action, dated Oct. 5, 2018, received in Korean Patent Application No. 2018-7017213, which corresponds with U.S. Appl. No. 14/869,899, 3 pages.
Office Action, dated Mar. 22, 2019, received in Korean Patent Application No. 2018-7017213, which corresponds with U.S. Appl. No. 14/869,899, 6 pages.
Patent, dated May 10, 2019, received in Korean Patent Application No. 2018-7017213, which corresponds with U.S. Appl. No. 14/869,899, 8 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Apr. 13, 2017, received in U.S. Appl. No. 14/866,992, 34 pages.
Final Office Action, dated Oct. 3, 2017, received in U.S. Appl. No. 14/866,992, 37 pages.
Office Action, dated Jan. 29, 2018, received in U.S. Appl. No. 14/866,992, 44 pages.
Final Office Action, dated Aug. 28, 2018, received in U.S. Appl. No. 14/866,992, 52 pages.
Examiner's Answer, dated May 9, 2019, received in U.S. Appl. No. 14/866,992, 26 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Mar. 26, 2018, received in Australian Patent Application No. 2016304890, which corresponds with U.S. Appl. No. 14/866,992, 3 pages.
Notice of Acceptance, dated Mar. 12, 2019, received in Australian Patent Application No. 2016304890, which corresponds with U.S. Appl. No. 14/866,992, 5 pages.
Certificate of Grant, dated Jul. 4, 2019, received in Australian Patent Application No. 2016304890, which corresponds with U.S. Appl. No. 14/866,992, 1 page.
Office Action, dated Jan. 19, 2018, received in Australian Patent Application No. 201761478, which corresponds with U.S. Appl. No. 14/866,992, 6 pages.
Certificate of Grant, dated May 9, 2019, received in Australian Patent Application No. 201761478, which corresponds with U.S. Appl. No. 14/866,992, 3 pages.
Office Action, dated Sep. 12, 2019, received in Chinese Patent Application No. 201610658351.8, which corresponds with U.S. Appl. No. 14/866,992, 5 pages.
Office Action, dated Jan. 13, 2020, received in Chinese Patent Application No. 201610658351.8, which corresponds with U.S. Appl. No. 14/866,992, 3 pages.
Office Action, dated Jun. 30, 2020, received in Chinese Patent Application No. 201610658351.8, which corresponds with U.S. Appl. No. 14/866,992, 11 pages.
Office Action, dated Nov. 25, 2020, received in Chinese Patent Application No. 201610658351.8, which corresponds with U.S. Appl. No. 14/866,992, 9 pages.
Office Action, dated Jul. 24, 2020, received in Chinese Patent Application No. 201680041559.6, which corresponds with U.S. Appl. No. 14/866,992, 13 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Feb. 6, 2017, received in Danish Patent Application No. 201500593, which corresponds with U.S. Appl. No. 14/866,992, 4 pages.
Office Action, dated Sep. 5, 2017, received in Danish Patent Application No. 201500593, which corresponds with U.S. Appl. No. 14/866,992, 6 pages.
Office Action, dated Oct. 12, 2018, received in European Patent Application No. 16758008.3, which corresponds with U.S. Appl. No. 14/866,992, 11 pages.
Summons, dated May 8, 2019, received in European Patent Application No. 16758008.3, which corresponds with U.S. Appl. No. 14/866,992, 14 pages.
Office Action, dated Jan. 11, 2019, received in Japanese Patent Application No. 2018-506425, which corresponds with U.S. Appl. No. 14/866,992, 6 pages.
Notice of Allowance, dated Jun. 18, 2019, received in Japanese Patent Application No. 2018-506425, which corresponds with U.S. Appl. No. 14/866,992, 5 pages.
Patent, dated Jul. 26, 2019, received in Japanese Patent Application No. 2018- 506425, which corresponds with U.S. Appl. No. 14/866,992, 3 pages.

(56) References Cited

OTHER PUBLICATIONS

Notice of Allowance, dated Sep. 10, 2019, received in Korean Patent Application No. 2018-7003890, which corresponds with U.S. Appl. No. 14/866,992, 5 pages.
Patent, dated Oct. 11, 2019, received in Korean Patent Application No. 2018- 7003890, which corresponds with U.S. Appl. No. 14/866,992, 5 pages.
Office Action, dated Feb. 12, 2018, received in U.S. Appl. No. 15/009,661, 36 pages.
Final Office Action, dated Sep. 19, 2018, received in U.S. Appl. No. 15/009,661, 28 pages.
Office Action, dated Jun. 28, 2019, received in U.S. Appl. No. 15/009,661, 33 pages.
Final Office Action, dated Dec. 30, 2019, received in U.S. Appl. No. 15/009,661, 33 pages.
Office Action, dated Sep. 16, 2020, received in U.S. Appl. No. 15/009,661, 37 pages.
Office Action, dated Jan. 18, 2018, received in U.S. Appl. No. 15/009,676, 21 Pages.
Notice of Allowance, dated Aug. 3, 2018, received in U.S. Appl. No. 15/009,676, 6 pages.
Notice of Allowance, dated Nov. 15, 2018, received in U.S. Appl. No. 15/009,676, 6 pages.
Office Action, dated Jul. 15, 2020, received in Chinese Patent Application No. 201680047125.7, which corresponds with U.S. Appl. No. 15/009,676, 11 pages.
Office Action, dated Nov. 30, 2020, received in Chinese Patent Application No. 201680047125.7, which corresponds with U.S. Appl. No. 15/009,676, 11 pages.
Intention to Grant, dated Apr. 7, 2020, received in European Patent Application No. 16756866.6, which corresponds with U.S. Appl. No. 15/009,676, 8 pages.
Decision to Grant, dated Aug. 27, 2020, received in European Patent Application No. 16756866.6, which corresponds with U.S. Appl. No. 15/009,676, 4 pages.
Office Action, dated Mar. 13, 2018, received in U.S. Appl. No. 15/009,688, 10 pages.
Notice of Allowance, dated Nov. 6, 2018, received in U.S. Appl. No. 15/009,688, 10 pages.
Office Action, dated Jun. 29, 2020, received in Chinese Patent Application No. 201680047164.7, which corresponds with U.S. Appl. No. 15/009,688, 7 pages.
Notice of Allowance, dated Oct. 9, 2020, received in Chinese Patent Application No. 201680047164.7, which corresponds with U.S. Appl. No. 15/009,688, 5 pages.
Patent, dated Nov. 10, 2020, received in Chinese Patent Application No. 201680047164.7, which corresponds with U.S. Appl. No. 15/009,688, 6 pages.
Intention to Grant, dated Mar. 16, 2020, received in European Patent Application No. 16753796.8, which corresponds with U.S. Appl. No. 15/009,688, 6 pages.
Decision to Grant, dated Sep. 24, 2020, received in European Patent Application No. 16753796.8, which corresponds with U.S. Appl. No. 15/009,688, 4 pages.
Certificate of Grant, dated Oct. 21, 2020, received in European Patent Application No. 16753796.8, which corresponds with U.S. Appl. No. 15/009,688, 4 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated May 2, 2017, received in U.S. Appl. No. 14/856,517, 34 pages.
Final Office Action, dated Oct. 4, 2017, received in U.S. Appl. No. 14/856,517, 33 pages.
Notice of Allowance, dated Jun. 29, 2018, received in U.S. Appl. No. 14/856,517, 11 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated May 18, 2017, received in U.S. Appl. No. 14/856,519, 35 pages.
Final Office Action, dated Nov. 15, 2017, received in U.S. Appl. No. 14/856,519, 31 pages.
Notice of Allowance, dated Jan. 31, 2018, received in U.S. Appl. No. 14/856,519, 9 pages.
Notice of Allowance, dated May 2, 2018, received in U.S. Appl. No. 14/856,519, 10 pages.
Office Action, dated Jun. 9, 2017, received in U.S. Appl. No. 14/856,520, 36 pages.
Final Office Action, dated Nov. 16, 2017, received in U.S. Appl. No. 14/856,520, 41 pages.
Office Action, dated Nov. 20, 2018, received in U.S. Appl. No. 14/856,520, 36 pages.
Final Office Action, dated Apr. 17, 2019, received in U.S. Appl. No. 14/856,520, 38 pages.
Notice of Allowance, dated Jan. 6, 2020, received in U.S. Appl. No. 14/856,520, 5 pages.
Notice of Allowance, dated Mar. 4, 2020, received in U.S. Appl. No. 14/856,520, 6 pages.
Notice of Allowance, dated Oct. 1, 2020, received in U.S. Appl. No. 14/856,520, 5 pages.
Office Action, dated Jun. 30, 2017, received in U.S. Appl. No. 14/856,522, 22 pages.
Notice of Allowance, dated Feb. 9, 2018, received in U.S. Appl. No. 14/856,522, 9 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Notice of Allowance, dated Jun. 16, 2017, received in in U.S. Appl. No. 14/857,645, 5 pages.
Office Action, dated Nov. 30, 2017, received in U.S. Appl. No. 14/857,636, 19 pages.
Notice of Allowance, dated Aug. 16, 2018, received in U.S. Appl. No. 14/857,636, 5 pages.
Office Action, dated Jan. 17, 2018, received in Australian Patent Application No. 2017202816, which corresponds with U.S. Appl. No. 14/857,636, 3 pages.
Notice of Allowance, dated Jan. 15, 2019, received in Australian Patent Application No. 2017202816, which corresponds with U.S. Appl. No. 14/857,636, 3 pages.
Certificate of Grant, dated May 16, 2019, received in Australian Patent Application No. 2017202816, which corresponds with U.S. Appl. No. 14/857,636, 4 pages.
Office Action, dated Jul. 1, 2020, received in Chinese Patent Application No. 201711262953.5, which corresponds with U.S. Appl. No. 14/857,636, 13 pages.
Patent, dated Nov. 27, 2020, received in Chinese Patent Application No. 201711262953.5, which corresponds with U.S. Appl. No. 14/857,636, 6 pages.
Office Action, dated Sep. 22, 2017, received in Japanese Patent Application No. 2017-029201, which corresponds with U.S. Appl. No. 14/857,636, 8 pages.
Office Action, dated Jun. 25, 2018, received in Japanese Patent Application No. 2017-029201, which corresponds with U.S. Appl. No. 14/857,636, 4 pages.
Office Action, dated Jan. 20, 2020, received in Japanese Patent Application No. 2017-029201, which corresponds with U.S. Appl. No. 14/857,636, 21 pages.

(56) References Cited

OTHER PUBLICATIONS

Notice of Allowance, dated Oct. 16, 2020, received in Japanese Patent Application No. 2017-029201, which corresponds with U.S. Appl. No. 14/857,636, 4 pages.
Patent, dated Nov. 12, 2020, received in Japanese Patent Application No. 2017-029201, which corresponds with U.S. Appl. No. 14/857,636, 3 pages.
Office Action, dated Nov. 28, 2018, received in Korean Patent Application No. 20177036645, which corresponds with U.S. Appl. No. 14/857,636, 6 pages.
Notice of Allowance, dated May 10, 2019, received in Korean Patent Application No. 20177036645, which corresponds with U.S. Appl. No. 14/857,636, 4 pages.
Patent, dated Jul. 11, 2019, received in Korean Patent Application No. 20177036645, which corresponds with U.S. Appl. No. 14/857,636, 8 pages.
Office Action, dated Dec. 1, 2017, received in U.S. Appl. No. 14/857,663, 15 pages.
Notice of Allowance, dated Aug. 16, 2018, received in U.S. Appl. No. 14/857,663, 5 pages.
Office Action, dated Jul. 14, 2020, received in Chinese Patent Application No. 201711261143.8, which corresponds with U.S. Appl. No. 14/857,663, 12 pages.
Notice of Allowance, dated Dec. 2, 2020, received in Chinese Patent Application No. 201711261143.8, which corresponds with U.S. Appl. No. 14/857,663, 3 pages.
Patent, dated Jan. 22, 2021, received in Chinese Patent Application No. 201711261143.8, which corresponds with U.S. Appl. No. 14/857,663, 6 pages.
Office Action, dated Nov. 11, 2019, received in Japanese Patent Application No. 2018-201076, which corresponds with U.S. Appl. No. 14/857,663, 7 pages.
Notice of Allowance, dated Sep. 18, 2020, received in Japanese Patent Application No. 2018-201076, which corresponds with U.S. Appl. No. 14/857,663, 5 pages.
Patent, dated Oct. 19, 2020, received in Japanese Patent Application No. 2018-201076, which corresponds with U.S. Appl. No. 14/857,663, 4 pages.
Office Action, dated Mar. 31, 2017, received in U.S. Appl. No. 14/857,700, 14 pages.
Final Office Action, dated Oct. 11, 2017, received in U.S. Appl. No. 14/857,700, 13 pages.
Notice of Allowance, dated Feb. 12, 2018, received in U.S. Appl. No. 14/857,700, 13 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Notice of Allowance, dated Oct. 9, 2018, received in U.S. Appl. No. 14/864,529, 11 pages.
Office Action, dated Dec. 21, 2020, received in Korean Patent Application No. 2020-7029178, which corresponds with U.S. Appl. No. 14/870,882, 2 pages.
Grant of Patent, dated Apr. 16, 2018, received in Dutch Patent Application No. 2019215, 2 pages.
Office Action, dated Jan. 25, 2016, received in U.S. Appl. No. 14,864,580, 29 pages.
Notice of Allowance, dated May 23, 2016, received in U.S. Appl. No. 14/864,580, 9 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Office Action, dated Jul. 1, 2019, received in Australian Patent Application No. 2019200872, which corresponds with U.S. Appl. No. 14/864,580, 6 pages.
Notice of Acceptance, dated Sep. 19, 2019, received in Australian Patent Application No. 2019200872, which corresponds with U.S. Appl. No. 14/864,580, 3 pages.
Certificate of Grant, dated Jan. 23, 2020, received in Australian Patent Application No. 2019200872, which corresponds with U.S. Appl. No. 14/864,580, 3 pages.
Office Action, dated Nov. 7, 2018, received in Chinese Patent Application No. 201610342151.4, which corresponds with U.S. Appl. No. 14/864,580, 3 pages.
Notice of Allowance, dated Jun. 14, 2019, received in Chinese Patent Application No. 201610342151.4, which corresponds with U.S. Appl. No. 14/864,580, 3 pages.
Patent, dated Jul. 30, 2019, received in Chinese Patent Application No. 201610342151.4, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Apr. 8, 2016, received in Danish Patent Application No. 201500584, which corresponds with U.S. Appl. No. 14/864,580, 9 pages.
Office Action, dated Oct. 7, 2016, received in Danish Patent Application No. 201500584, which corresponds with U.S. Appl. No. 14/864,580, 3 pages.
Office Action, dated May 5, 2017, received in Danish Patent Application No. 201500584, which corresponds with U.S. Appl. No. 14/864,580, 3 pages.
Office Action, dated Dec. 15, 2017, received in Danish Patent Application No. 201500584, which corresponds with U.S. Appl. No. 14/864,580, 4 pages.
Notice of Allowance, dated Aug. 14, 2019, received in Korean Patent Application No. 2019-7018317, which corresponds with U.S. Appl. No. 14/864,580, 6 pages.
Patent, dated Nov. 12, 2019, received in Korean Patent Application No. 2019-7018317, which corresponds with U.S. Appl. No. 14/864,580, 6 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Office Action, dated Aug. 31, 2018, received in Australian Patent Application No. 2016276030, which corresponds with U.S. Appl. No. 14/864,601, 3 pages.
Certificate of Grant, dated Feb. 21, 2019, received in Australian Patent Application No. 2016276030, which corresponds with U.S. Appl. No. 14/864,601, 4 pages.
Office Action, dated Feb. 4, 2019, received in European Patent Application No. 16730554.9, which corresponds with U.S. Appl. No. 14/864,601, 10 pages.
Intention to Grant, dated Jul. 18, 2019, received in European Patent Application No. 16730554.9, which corresponds with U.S. Appl. No. 14/864,601, 5 pages.
Decision to Grant, dated Sep. 12, 2019, received in European Patent Application No. 16730554.9, which corresponds with U.S. Appl. No. 14/864,601, 2 pages.
Patent, dated Oct. 9, 2019, received in European European Patent Application No. 16730554.9, which corresponds with U.S. Appl. No. 14/864,601, 3 pages.
Notice of Allowance, dated Dec. 10, 2018, received in Japanese Patent Application No. 2017-561375, which corresponds with U.S. Appl. No. 14/864,601, 5 pages.
Patent, dated Jan. 11, 2019, received in Japanese Patent Application No. 2017-561375, which corresponds with U.S. Appl. No. 14/864,601, 3 pages.
Office Action, dated Jan. 25, 2019, received in Korean Patent Application No. 2017-7033756, which corresponds with U.S. Appl. No. 14/864,601, 8 pages.
Notice of Allowance, dated May 29, 2019, received in Korean Patent Application No. 2017-7033756, which corresponds with U.S. Appl. No. 14/864,601, 6 pages.

(56) References Cited

OTHER PUBLICATIONS

Patent, dated Jun. 25, 2019, received in Korean Patent Application No. 2017-7033756, which corresponds with U.S. Appl. No. 14/864,601, 6 pages.
Office Action, dated Apr. 19, 2016, received in U.S. Appl. No. 14/864,627, 9 pages.
Notice of Allowance, dated Jan. 31, 2017, received in U.S. Appl. No. 14/864,627, 7 pages.
Office Action, dated Apr. 8, 2016, received in Danish Patent Application No. 201500585, which corresponds with U.S. Appl. No. 14/864,627, 9 pages.
Office Action, dated Oct. 7, 2016, received in Danish Patent Application No. 201500585, which corresponds with U.S. Appl. No. 14/864,627, 3 pages.
Office Action, dated May 5, 2017, received in Danish Patent Application No. 201500585, which corresponds with U.S. Appl. No. 14/864,627, 4 pages.
Office Action, dated Dec. 15, 2017, received in Danish Patent Application No. 201500585, which corresponds with U.S. Appl. No. 14/864,627, 5 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Certificate of Examination, dated Dec. 8, 2016, received in Australian Patent Application No. 2016100292, which corresponds with U.S. Appl. No. 14/866,361, 1 page.
Office Action, dated Oct. 19, 2018, received in Chinese Patent Application No. 201610189298.4, which corresponds with U.S. Appl. No. 14/866,361, 6 pages.
Notice of Allowance, dated May 23, 2019, received in Chinese Patent Application No. 201610189298.4, which corresponds with U.S. Appl. No. 14/866,361, 3 pages.
Patent, dated Jul. 23, 2019, received in Chinese Patent Application No. 201610189298.4, which corresponds with U.S. Appl. No. 14/866,361, 7 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Office Action, dated Oct. 28, 2016, received in Danish Patent Application No. 201500579, which corresponds with U.S. Appl. No. 14/866,361, 3 pages.
Office Action, dated Jun. 15, 2017, received in Danish Patent Application No. 201500579, which corresponds with U.S. Appl. No. 14/866,361, 2 pages.
Office Action, dated Jan. 4, 2018, received in Danish Patent Application No. 201500579, which corresponds with U.S. Appl. No. 14/866,361, 2 pages.
Notice of Allowance, dated Mar. 16, 2018, received in Danish Patent Application No. 201500579, which corresponds with U.S. Appl. No. 14/866,361, 2 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Office Action, dated Jan. 30, 2019, received in European Patent Application No. 17188507.2, which corresponds with U.S. Appl. No. 14/866,361, 13 pages.
Office Action, dated Oct. 8, 2019, received in European Patent Application No. 17188507.2, which corresponds with U.S. Appl. No. 14/866,361, 6 pages.
Intention to Grant, dated Apr. 14, 2020, received in European Patent Application No. 17188507.2, which corresponds with U.S. Appl. No. 14/866,361, 7 pages.
Office Action, dated Oct. 12, 2018, received in Japanese Patent Application No. 2017-141962, which corresponds with U.S. Appl. No. 14/866,361, 6 pages.
Office Action, dated Jun. 10, 2019, received in Japanese Patent Application No. 2017-141962, which corresponds with U.S. Appl. No. 14/866,361, 6 pages.
Notice of Allowance, dated Oct. 7, 2019, received in Japanese Patent Application No. 2017-141962, which corresponds with U.S. Appl. No. 14/866,361, 5 pages.
Patent, dated Nov. 8, 2019, received in Japanese Patent Application No. 2017-141962, which corresponds with U.S. Appl. No. 14/866,361, 4 pages.
Office Action, dated Sep. 14, 2018, received in Korean Patent Application No. 2018-7013039, which corresponds with U.S. Appl. No. 14/866,361, 2 pages.
Notice of Allowance, dated Jan. 30, 2019, received in Korean Patent Application No. 2018-7013039, which corresponds with U.S. Appl. No. 14/866,361, 5 pages.
Patent, dated Apr. 3, 2019, received in Korean Patent Application No. 2018-7013039, which corresponds with U.S. Appl. No. 14/866,361, 4 pages.
Office Action, dated Jan. 22, 2018, received in U.S. Appl. No. 14/866,987, 22 pages.
Final Office Action, dated Oct. 11, 2018, received in U.S. Appl. No. 14/866,987, 20 pages.
Notice of Allowance, dated Apr. 4, 2019, received in U.S. Appl. No. 14/866,987, 5 pages.
Patent, dated Aug. 8, 2016, received in Australian Patent Application No. 2016100649, which corresponds with U.S. Appl. No. 14/866,987, 1 page.
Office Action, dated Dec. 4, 2018, received in Chinese Patent Application No. 201610342336.5, which corresponds with U.S. Appl. No. 14/866,987, 5 pages.
Rejection Decision, dated Apr. 28, 2019, received in Chinese Patent Application No. 201610342336.5, which corresponds with U.S. Appl. No. 14/866,987, 4 pages.
Office Action, dated Aug. 15, 2019, received in Chinese Patent Application No. 201610342336.5, which corresponds with U.S. Appl. No. 14/866,987, 3 pages.
Notice of Allowance, dated Dec. 3, 2019, received in Chinese Patent Application No. 201610342336.5, which corresponds with U.S. Appl. No. 14/866,987, 3 pages.
Patent, dated Jan. 31, 2020, received in Chinese Patent Application No. 201610342336.5, which corresponds with U.S. Appl. No. 14/866,987, 7 pages.
Office Action, dated Oct. 19, 2016, received in Chinese Patent Application No. 2016201470246.X, which corresponds with U.S. Appl. No. 14/866,987, 4 pages.
Patent, dated May 3, 2017, received in Chinese Patent Application No. 2016201470246.X, which corresponds with U.S. Appl. No. 14/866,987, 2 pages.
Patent, dated Sep. 19, 2016, received in German Patent Application No. 202016002908.9, which corresponds with U.S. Appl. No. 14/866,987, 3 pages.
Office Action, dated Mar. 22, 2016, received in Danish Patent Application No. 201500587, which corresponds with U.S. Appl. No. 14/866,987, 8 pages.
Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.

(56) References Cited

OTHER PUBLICATIONS

Office Action, dated Sep. 9, 2016, received in Danish Patent Application No. 201670463, which corresponds with U.S. Appl. No. 14/866,987, 7 pages.
Notice of Allowance, dated Jan. 31, 2017, received in Danish Patent Application No. 201670463, which corresponds with U.S. Appl. No. 14/866,987, 3 pages.
Office Action, dated Apr. 19, 2017, received in Danish Patent Application No. 201670463, which corresponds with U.S. Appl. No. 14/866,987, 3 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Office Action, dated May 7, 2018, received in European Patent Application No. 16189421.7, which corresponds with U.S. Appl. No. 14/866,987, 5 pages.
Office Action, dated Dec. 11, 2018, received in European Patent Application No. 16189421.7, which corresponds with U.S. Appl. No. 14/866,987, 6 pages.
Intention to Grant, dated Jun. 14, 2019, received in European Patent Application No. 16189421.7, which corresponds with U.S. Appl. No. 14/866,987, 7 pages.
Intention to Grant, dated Oct. 25, 2019, received in European Patent Application No. 16189421.7, which corresponds with U.S. Appl. No. 14/866,987, 7 pages.
Decision to Grant, dated Nov. 14, 2019, received in European Patent Application No. 16189421.7, which corresponds with U.S. Appl. No. 14/866,987, 2 pages.
Patent, dated Dec. 11, 2019, received in European Patent Application No. 16189421.7, which corresponds with U.S. Appl. No. 14/866,987, 3 pages.
Office Action, dated Feb. 3, 2020, received in European Patent Application No. 17163309.2, which corresponds with U.S. Appl. No. 14/866,987, 6 pages.
Patent, dated Jan. 8, 2021, received in Hong Kong Patent Application No. 18100151.5, which corresponds with U.S. Appl. No. 14/866,987, 6 pages.
Office Action, dated Aug. 26, 2020, received in Indian Patent Application No. 201617032291, which corresponds with U.S. Appl. No. 14/866,987, 9 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Jul. 31, 2017, received in Japanese Patent Application No. 2017126445, which corresponds with U.S. Appl. No. 14/866,987, 6 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Office Action, dated Nov. 29, 2017, received in U.S. Appl. No. 14/866,989, 31 pages.
Final Office Action, dated Jul. 3, 2018, received in U.S. Appl. No. 14/866,989, 17 pages.
Notice of Allowance, dated Jan. 17, 2019, received in U.S. Appl. No. 14/866,989, 8 pages.
Certificate of Exam, dated Jul. 21, 2016, received in Australian Patent Application No. 2016100652, which corresponds with U.S. Appl. No. 14/866,989, 1 page.
Office Action, dated Feb. 26, 2018, received in Australian Patent Application No. 2017201079, which corresponds with U.S. Appl. No. 14/866,989, 6 pages.
Notice of Acceptance, dated Feb. 14, 2019, received in Australian Patent Application No. 2017201079, which corresponds with U.S. Appl. No. 14/866,989, 3 pages.
Certificate of Grant, dated Jun. 13, 2019, received in Australian Patent Application No. 2017201079, which corresponds with U.S. Appl. No. 14/866,989, 1 page.
Office Action, dated Sep. 19, 2018, received in Chinese Patent Application No. 201610342314.9, which corresponds with U.S. Appl. No. 14/866,989, 6 pages.
Office Action, dated Feb. 25, 2019, received in Chinese Patent Application No. 201610342314.9, which corresponds with U.S. Appl. No. 14/866,989, 3 pages.
Rejection Decision, dated Apr. 24, 2019, received in Chinese Patent Application No. 201610342314.9, which corresponds with U.S. Appl. No. 14/866,989, 3 pages.
Office Action, dated Jun. 16, 2017, received in Japanese Patent Application No. 2016-233450, which corresponds with U.S. Appl. No. 14/866,989, 6 pages.
Patent, dated Mar. 9, 2018, received in Japanese Patent Application No. 2016-233450, which corresponds with U.S. Appl. No. 14/866,989, 4 pages.
Office Action, dated Apr. 1, 2016, received in Danish Patent Application No. 201500589, which corresponds with U.S. Appl. No. 14/866,989, 8 pages.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Office Action, dated Feb. 3, 2020, received in European Patent Application No. 16189425.8, which corresponds with U.S. Appl. No. 14/866,989, 6 pages.
Intention to Grant, dated Dec. 3, 2020, received in European Patent Application No. 16189425.8, which corresponds with U.S. Appl. No. 14/866,989, 7 pages.
Notice of Allowance, dated Feb. 5, 2018, received in Japanese Patent Application No. 2016-233450, which corresponds with U.S. Appl. No. 14/866,989, 5 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action, dated Jun. 23, 2020, received in Brazilian Patent Application No. 11201701119-9, which corresponds with U.S. Appl. No. 14/871,236, 9 pages.
Office Action, dated Sep. 30, 2019, received in Chinese Patent Application No. 201610871466.8, which corresponds with U.S. Appl. No. 14/871,236, 4 pages.
Notice of Allowance, dated Mar. 24, 2020, received in Chinese Patent Application No. 201610871466.8, which corresponds with U.S. Appl. No. 14/871,236, 3 pages.
Patent, dated May 19, 2020, received in Chinese Patent Application No. 201610871466.8, which corresponds with U.S. Appl. No. 14/871,236, 8 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.

(56) References Cited

OTHER PUBLICATIONS

Office Action, dated Sep. 30, 2016, received in Danish Patent Application No. 201500595, which corresponds with U.S. Appl. No. 14/871,236, 10 pages.
Office Action, dated Jun. 15, 2017, received in Danish Patent Application No. 201500595, which corresponds with U.S. Appl. No. 14/871,236, 4 pages.
Office Action, dated Jan. 29, 2018, received in Danish Patent Application No. 201500595, which corresponds with U.S. Appl. No. 14/871,236, 2 pages.
Notice of Allowance, dated Apr. 26, 2018, received in Danish Patent Application No. 201500595, which corresponds with U.S. Appl. No. 14/871,236, 2 pages.
Patent, dated Jun. 18, 2018, received in Danish Patent Application No. 201500595, which corresponds with U.S. Appl. No. 14/871,236, 3 pages.
Intention to Grant, dated Dec. 4, 2019, received in European Patent Application No. 18168941.5, which corresponds with U.S. Appl. No. 14/871,236, 8 pages.
Intention to Grant, dated Oct. 5, 2020, received in European Patent Application No. 18168941.5, which corresponds with U.S. Appl. No. 14/871,236, 8 pages.
Office Action, dated Mar. 17, 2020, received in Mx/a/2017/011610, which corresponds with U.S. Appl. No. 14/871,236, 4 pages.
Notice of Allowance, dated Sep. 7, 2020, received in Mx/a/2017/011610, which corresponds with U.S. Appl. No. 14/871,236, 12 pages.
Patent, dated Dec. 2, 2020, received in Mx/a/2017/011610, which corresponds with U.S. Appl. No. 14/871,236, 4 pages.
Office Action, dated Jul. 19, 2018, received in Russian Patent Application No. 2017131408, which corresponds with U.S. Appl. No. 14/871,236, 8 pages.
Patent, dated Feb. 15, 2019, received in Russian Patent Application No. 2017131408, which corresponds with U.S. Appl. No. 14/871,236, 2 pages.
Office Action, dated Sep. 1, 2017, received in U.S. Appl. No. 14/870,754, 22 pages.
Final Office Action, dated Mar. 9, 2018, received in U.S. Appl. No. 14/870,754, 19 pages.
Notice of Allowance, dated Jul. 2, 2018, received in U.S. Appl. No. 14/870,754, 9 pages.
Notice of Allowance, dated Dec. 3, 2018, received in U.S. Appl. No. 14/870,754, 8 pages.
Office Action, dated Nov. 14, 2017, received in U.S. Appl. No. 14/870,882, 25 pages.
Final Office Action, dated Apr. 20, 2018, received in U.S. Appl. No. 14/870,882, 7 pages.
Notice of Allowance, dated Jul. 12, 2018, received in U.S. Appl. No. 14/870,882, 5 pages.
Notice of Allowance, dated Dec. 5, 2018, received in U.S. Appl. No. 14/870,882, 8 pages.
Innovation Patent, dated Aug. 25, 2016, received in Australian Patent Application No. 2016101438, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Nov. 28, 2019, received in Chinese Patent Application No. 201610870912.3, which corresponds with U.S. Appl. No. 14/870,882, 10 pages.
Office Action, dated Aug. 3, 2020, received in Chinese Patent Application No. 201610870912.3, which corresponds with U.S. Appl. No. 14/870,882, 4 pages.
Office Action, dated Dec. 21, 2020, received in Chinese Patent Application No. 201610870912.3, which corresponds with U.S. Appl. No. 14/870,882, 5 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Notice of Allowance, dated Oct. 31, 2017, received in Danish Patent Application No. 201500596, which corresponds with U.S. Appl. No. 14/870,882, 2 pages.
Patent, dated Jan. 29, 2018, received in Danish Patent Application No. 201500596, which corresponds with U.S. Appl. No. 14/870,882, 4 pages.
Office Action, dated Feb. 11, 2019, received in European Patent Application No. 17171972.7, which corresponds with U.S. Appl. No. 14/870,882, 7 pages.
Office Action, dated Sep. 1, 2017, received in U.S. Appl. No. 14/870,988, 14 pages.
Final Office Action, dated Feb. 16, 2018, received in U.S. Appl. No. 14/870,988, 18 pages.
Notice of Allowance, dated Aug. 27, 2018, received in U.S. Appl. No. 14/870,988, 11 pages.
Office Action, dated Nov. 22, 2017, received in U.S. Appl. No. 14/871,227, 24 pages.
Notice of Allowance, dated Jun. 11, 2018, received in U.S. Appl. No. 14/871,227, 11 pages.
Office Action, dated Oct. 17, 2016, received in Australian Patent Application No. 2016203040, which corresponds with U.S. Appl. No. 14/871,227, 7 pages.
Office Action, dated Oct. 16, 2017, received in Australian Patent Application No. 2016203040, which corresponds with U.S. Appl. No. 14/871,227, 5 pages.
Notice of Acceptance, dated Oct. 30, 2018, received in Australian Patent Application No. 2016203040, which corresponds with U.S. Appl. No. 14/871,227, 4 pages.
Certificate of Grant, dated Feb. 28, 2019, received in Australian Patent Application No. 2016203040, which corresponds with U.S. Appl. No. 14/871,227, 1 page.
Office Action, dated Oct. 18, 2016, received in Australian Patent Application No. 2016101431, which corresponds with U.S. Appl. No. 14/871,227, 3 pages.
Office Action, dated Apr. 13, 2017, received in Australian Patent Application No. 2016101431, which corresponds with U.S. Appl. No. 14/871,227, 4 pages.
Office Action, dated Oct. 11, 2018, received in Australian Patent Application No. 2017245442, which corresponds with U.S. Appl. No. 14/871,227, 4 pages.
Office Action, dated Nov. 16, 2018, received in Chinese Patent Application No. 201680000466.9, which corresponds with U.S. Appl. No. 14/871,227, 5 pages.
Notice of Allowance, dated Jun. 5, 2019, received in Chinese Patent Application No. 201680000466.9, which corresponds with U.S. Appl. No. 14/871,227, 5 pages.
Patent, dated Aug. 9, 2019, received in Chinese Patent Application No. 201680000466.9, which corresponds with U.S. Appl. No. 14/871,227, 8 pages.
Intention to Grant, dated Apr. 7, 2016, received in Danish Patent Application No. 201500597, which corresponds with U.S. Appl. No. 14/871,227, 7 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Intent to Grant, dated Sep. 17, 2018, received in European Patent No. 16711743.1, which corresponds with U.S. Appl. No. 14/871,227, 5 pages.
Patent, dated Nov. 28, 2018, received in European Patent No. 16711743.1, which corresponds with U.S. Appl. No. 14/871,227, 1 page.
Office Action, dated Jul. 20, 2020, received in Indian Patent Application No. 201617032293, which corresponds with U.S. Appl. No. 14/871,227, 9 pages.
Office Action, dated Mar. 24, 2017, received in Japanese Patent Application No. 2016-533201, which corresponds with U.S. Appl. No. 14/871,227, 6 pages.

(56) References Cited

OTHER PUBLICATIONS

Office Action, dated Aug. 4, 2017, received in Japanese Patent Application No. 2016-533201, which corresponds with U.S. Appl. No. 14/871,227, 6 pages.
Notice of Allowance, dated Jan. 4, 2018, received in Japanese Patent Application No. 2016-533201, which corresponds with U.S. Appl. No. 14/871,227, 4 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Notice of Allowance, dated Oct. 1, 2018, received in Korean Patent Application No. 2016-7019816, which corresponds with U.S. Appl. No. 14/871,227, 6 pages.
Patent, dated Dec. 28, 2018, received in Korean Patent Application No. 2016-7019816, which corresponds with U.S. Appl. No. 14/871,227, 8 pages.
Office Action, dated Oct. 26, 2017, received in U.S. Appl. No. 14/871,336, 22 pages.
Final Office Action, dated Mar. 15, 2018, received in U.S. Appl. No. 14/871,336, 23 pages.
Office Action, dated Nov. 5, 2018, received in U.S. Appl. No. 14/871,336, 24 pages.
Notice of Allowance, dated Feb. 5, 2019, received in U.S. Appl. No. 14/871,336, 10 pages.
Office Action, dated Oct. 14, 2016, received in Australian Patent Application No. 2016101437, which corresponds with U.S. Appl. No. 14/871,336, 2 pages.
Office Action, dated Apr. 11, 2017, received in Australian Patent Application No. 2016101437, which corresponds with U.S. Appl. No. 14/871,336, 4 pages.
Office Action, dated Nov. 4, 2019, received in Chinese Patent Application No. 201610871323.7, which corresponds with U.S. Appl. No. 14/871,336, 12 pages.
Office Action, dated Aug. 4, 2020, received in Chinese Patent Application No. 201610871323.7, which corresponds with U.S. Appl. No. 14/871,336, 18 pages.
Office Action, dated Apr. 18, 2016, received in Danish Patent Application No. 201500601, which corresponds with U.S. Appl. No. 14/871,336, 8 pages.
Office Action, dated Oct. 18, 2016, received in Danish Patent Application No. 201500601, which corresponds with U.S. Appl. No. 14/871,336, 3 pages.
Notice of Allowance, dated Mar. 23, 2017, received in Danish Patent Application No. 201500601, which corresponds with U.S. Appl. No. 14/871,336, 2 pages.
Patent, dated Oct. 30, 2017, Danish Patent Application No. 201500601, which corresponds with U.S. Appl. No. 14/871,336, 5 pages.
Office Action, dated Feb. 12, 2019, received in European Patent Application No. 17172266.3, which corresponds with U.S. Appl. No. 14/871,336, 6 pages.
Office Action, dated Apr. 2, 2018, received in Japanese Patent Application No. 2018-020324, which corresponds with U.S. Appl. No. 14/871,336, 4 pages.
Notice of Allowance, dated Oct. 12, 2018, received in Japanese Patent Application No. 2018-020324, which corresponds with U.S. Appl. No. 14/871,336, 5 pages.
Patent, dated Nov. 16, 2018, received in Japanese Patent Application No. 2018-020324, which corresponds with U.S. Appl. No. 14/871,336, 4 pages.
Office Action, dated Oct. 16, 2017, received in U.S. Appl. No. 14/871,462, 26 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Apr. 20, 2017, received in Chinese Patent Application No. 201621044346.2, which corresponds with U.S. Appl. No. 14/871,462, 3 pages.
Intention to Grant, dated Apr. 18, 2016, received in Danish Patent Application No. 201500600, which corresponds with U.S. Appl. No. 14/871,462, 7 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Office Action, dated Nov. 13, 2017, received in Japanese Patent Application No. 2016-183289, which corresponds with U.S. Appl. No. 14/871,462, 5 pages.
Office Action, dated Apr. 29, 2016, received in U.S. Appl. No. 14/867,823, 28 pages.
Final Office Action, dated Sep. 28, 2016, received in U.S. Appl. No. 14/867,823, 31 pages.
Office Action, dated May 11, 2017, received in U.S. Appl. No. 14/867,823, 42 pages.
Final Office Action, dated Nov. 29, 2017, received in U.S. Appl. No. 14/867,823, 47 pages.
Notice of Allowance, dated Apr. 18, 2018, received in U.S. Appl. No. 14/867,823, 10 pages.
Notice of Allowance, dated Aug. 7, 2018, received in U.S. Appl. No. 14/867,823, 8 pages.
Office Action, dated Mar. 18, 2016, received in Danish Patent Application No. 201500594, which corresponds with U.S. Appl. No. 14/867,823, 10 pages.
Office Action, dated Sep. 7, 2016, received in Danish Patent Application No. 201500594, which corresponds with U.S. Appl. No. 14/867,823, 4 pages.
Office Action, dated May 15, 2017, received in Danish Patent Application No. 201500594, which corresponds with U.S. Appl. No. 14/867,823, 4 pages.
Office Action, dated Jan. 23, 2018, received in Danish Patent Application No. 201500594, which corresponds with U.S. Appl. No. 14/867,823, 8 pages.
Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, dated Jul. 6, 2017, received in U.S. Appl. No. 14/867,892, 55 pages.
Final Office Action, dated Dec. 14, 2017, received in U.S. Appl. No. 14/867,892, 53 pages.
Office Action, dated Apr. 24, 2018, received in U.S. Appl. No. 14/867,892, 63 pages.
Final Office Action, dated Oct. 17, 2018, received in U.S. Appl. No. 14/867,892, 48 pages.
Examiner's Answer, dated Jul. 18, 2019, received in U.S. Appl. No. 14/867,892, 17 pages.
Office Action, dated Mar. 21, 2016, received in Danish Patent Application No. 201500598, which corresponds with U.S. Appl. No. 14/867,892, 9 pages.
Office Action, dated Sep. 14, 2016, received in Danish Patent Application No. 201500598, which corresponds with U.S. Appl. No. 14/867,892, 4 pages.
Office Action, dated May 4, 2017, received in Danish Patent Application No. 201500598, which corresponds with U.S. Appl. No. 14/867,892, 4 pages.

(56) References Cited

OTHER PUBLICATIONS

Office Action, dated Oct. 31, 2017, received in Danish Patent Application No. 201500598, which corresponds with U.S. Appl. No. 14/867,892, 2 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,361, 26 pages.
Final Office Action, dated Oct. 4, 2018, received in U.S. Appl. No. 14/869,361, 28 pages.
Office Action, dated Feb. 27. 2019, received in U.S. Appl. No. 14/869,361, 28 pages.
Office Action, dated Mar. 1, 2017, received in U.S. Appl. No. 14/869,855, 14 pages.
Final Office Action, dated Oct. 10, 2017, received in U.S. Appl. No. 14/869,855, 16 pages.
Office Action, dated Jan. 23, 2018, received in U.S. Appl. No. 14/869,855, 24 pages.
Notice of Allowance, dated May 31, 2018, received in U.S. Appl. No. 14/869,855, 10 pages.
Office Action, dated Feb. 9, 2017, received in U.S. Appl. No. 14/869,873, 17 pages.
Final Office Action, dated Aug. 18, 2017, received in U.S. Appl. No. 14/869,873, 20 pages.
Office Action, dated Jan. 18, 2018, received in U.S. Appl. No. 14/869,873, 25 pages.
Final Office Action, dated May 23, 2018, received in U.S. Appl. No. 14/869,873, 18 pages.
Notice of Allowance, dated Jul. 30, 2018, received in U.S. Appl. No. 14/869,873, 8 pages.
Office Action, dated Jan. 11, 2018, received in U.S. Appl. No. 14/869,997, 17 pages.
Office Action, dated Sep. 7, 2018, received in U.S. Appl. No. 14/869,997, 23 pages.
Notice of Allowance, dated Apr. 4, 2019, received in U.S. Appl. No. 14/869,997, 9 pages.
Notice of Allowance, dated Jan. 17, 2018, received in U.S. Appl. No. 14/867,990, 12 pages.
Notice of Allowance, dated Mar. 30, 3018, received in U.S. Appl. No. 14/867,990, 5 pages.
Office Action, dated May 23, 2016, received in Australian Patent Application No. 2016100253, which corresponds with U.S. Appl. No. 14/867,990, 5 pages.
Notice of Allowance, dated May 21, 2019, received in Chinese Patent Application No. 201610131507.X, which corresponds with U.S. Appl. No. 14/867,990, 3 pages.
Patent, dated Jul. 19, 2019, received in Chinese Patent Application No. 201610131507.X, which corresponds with U.S. Appl. No. 14/867,990, 6 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Mar. 18, 2016, received in Danish Patent Application No. 201500581, which corresponds with U.S. Appl. No. 14/867,990, 9 pages.
Office Action, dated Sep. 26, 2016, received in Danish Patent Application No. 201500581, which corresponds with U.S. Appl. No. 14/867,990, 5 pages.
Office Action, dated May 3, 2017, received in Danish Patent Application No. 201500581, which corresponds with U.S. Appl. No. 14/867,990, 5 pages.
Office Action, dated Feb. 19, 2018, received in Danish Patent Application No. 201500581, which corresponds with U.S. Appl. No. 14/867,990, 4 pages.
Office Action, dated Feb. 21, 2020, received in European Patent Application No. 16711725.8, which corresponds with U.S. Appl. No. 14/867,990, 13 pages.
Office Action, dated Apr. 19, 2018, received in U.S. Appl. No. 14/869,703, 19 pages.
Final Office Action, dated Oct. 26, 2018, received in U.S. Appl. No. 14/869,703, 19 pages.
Notice of Allowance, dated Mar. 12, 2019, received in U.S. Appl. No. 14/869,703, 6 pages.
Office Action, dated Dec. 12, 2017, received in U.S. Appl. No. 15/009,668, 32 pages.
Final Office Action, dated Jul. 3, 2018, received in U.S. Appl. No. 15/009,668, 19 pages.
Office Action, dated Jan. 10, 2019, received in U.S. Appl. No. 15/009,668, 17 pages.
Notice of Allowance, dated May 1, 2019, received in U.S. Appl. No. 15/009,668, 12 pages.
Office Action, dated Aug. 20, 2020, received in Chinese Patent Application No. 201680046985.9, which corresponds with U.S. Appl. No. 15/009,668, 15 pages.
Office Action, dated Jan. 31, 2020, received in European Patent Application No. 16753795.0, which corresponds with U.S. Appl. No. 15/009,668, 9 pages.
Office Action, dated Nov. 25, 2016, received in U.S. Appl. No. 15/081,771, 17 pages.
Final Office Action, dated Jun. 2, 2017, received in U.S. Appl. No. 15/081,771, 17 pages.
Notice of Allowance, dated Dec. 4, 2017, received in U.S. Appl. No. 15/081,771, 10 pages.
Office Action, dated Feb. 1, 2018, received in Australian Patent Application No. 2017202058, which corresponds with U.S. Appl. No. 15/081,771, 4 pages.
Notice of Acceptance, dated Jan. 24, 2019, received in Australian Patent Application No. 2017202058, which corresponds with U.S. Appl. No. 15/081,771, 3 pages.
Certificate of Grant, dated May 23, 2019, received in Australian Patent Application No. 2017202058, which corresponds with U.S. Appl. No. 15/081,771, 1 page.
Office Action, dated Jan. 24, 2020, received in European Patent Application No. 18205283.7, which corresponds with U.S. Appl. No. 15/081,771, 4 pages.
Intention to Grant, dated Apr. 30, 2020, received in European Patent Application No. 18205283.7, which corresponds with U.S. Appl. No. 15/081,771, 7 pages.
Decision to Grant, dated Aug. 27, 2020, received in European Patent Application No. 18205283.7, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Notice of Allowance, dated Oct. 12, 2018, received in Japanese Patent Application No. 2017-086460, which corresponds with U.S. Appl. No. 15/081,771, 5 pages.
Office Action, dated Aug. 29, 2017, received in Korean Patent Application No. 2017-7014536, which corresponds with U.S. Appl. No. 15/081,771, 5 pages.
Notice of Allowance, dated Jun. 28, 2018, received in Korean Patent Application No. 2017-7014536, which corresponds with U.S. Appl. No. 15/081,771, 4 pages.
Patent, dated Sep. 28, 2018, received in Korean Patent Application No. 2017-7014536, which corresponds with U.S. Appl. No. 15/081,771, 3 pages.
Final Office Action, dated May 1, 2017, received in U.S. Appl. No. 15/136,782, 18 pages.
Notice of Allowance, dated Oct. 20, 2017, received in U.S. Appl. No. 15/136,782, 9 pages.
Office Action, dated May 4, 2018, received in Australian Patent Application No. 2018202855, which corresponds with U.S. Appl. No. 15/136,782, 3 pages.

(56) References Cited

OTHER PUBLICATIONS

Notice of Acceptance, dated Sep. 10, 2018, received in Australian Patent Application No. 2018202855, which corresponds with U.S. Appl. No. 15/136,782, 3 pages.
Certificate of Grant, dated Jan. 17. 2019, received in Australian Patent Application No. 2018202855, which corresponds with U.S. Appl. No. 15/136,782, 4 pages.
Office Action, dated Sep. 27, 2019, received in Chinese Patent Application No. 201810119007.3, which corresponds with U.S. Appl. No. 15/136,782, 6 pages.
Notice of Allowance, dated Feb. 26, 2020, received in Chinese Patent Application No. 201810119007.3, which corresponds with U.S. Appl. No. 15/136,782, 3 pages.
Patent, dated Apr. 7, 2020, received in Chinese Patent Application No. 201810119007.3, which corresponds with U.S. Appl. No. 15/136,782, 7 pages.
Office Action, dated May 23, 2017, received in Danish Patent Application No. 201770190, which corresponds with U.S. Appl. No. 15/136,782, 7 pages.
Office Action, dated Jan. 8, 2018, received in Danish Patent Application No. 201770190, which corresponds with U.S. Appl. No. 15/136,782, 2 pages.
Notice of Allowance, dated Mar. 19, 2018, received in Danish Patent Application No. 201770190, which corresponds with U.S. Appl. No. 15/136,782, 2 pages.
Patent, dated May 22, 2018, received in Danish Patent Application No. 201770190, which corresponds with U.S. Appl. No. 15/136,782, 2 pages.
Office Action, dated Apr. 17, 2019, received in European Patent Application No. 18171453.6, which corresponds with U.S. Appl. No. 15/136,782, 4 pages.
Office Action, dated Oct. 2, 2019, received in European Patent Application No. 18171453.6, which corresponds with U.S. Appl. No. 15/136,782, 5 pages.
Office Action, dated May 12, 2020, received in European Patent Application No. 18171453.6, which corresponds with U.S. Appl. No. 15/136,782, 5 pages.
Office Action, dated Jun. 1, 2018, received in Japanese Patent Application No. 2018-062161, which corresponds with U.S. Appl. No. 15/136,782, 5 pages.
Office Action, dated Nov. 12, 2018, received in Japanese Patent Application No. 2018-062161, which corresponds with U.S. Appl. No. 15/136,782, 5 pages.
Notice of Allowance, dated Feb. 18, 2019, received in Japanese Patent Application No. 2018-062161, which corresponds with U.S. Appl. No. 15/136,782, 5 pages.
Patent, dated Mar. 22, 2019, received in Japanese Patent Application No. 2018-062161, which corresponds with U.S. Appl. No. 15/136,782, 5 pages.
Office Action, dated Oct. 31, 2018, received in Korean Patent Application No. 2018-7020659, which corresponds with U.S. Appl. No. 15/136,782, 5 pages.
Notice of Allowance, dated Feb. 25, 2019, received in Korean Patent Application No. 2018-7020659, which corresponds with U.S. Appl. No. 15/136,782, 5 pages.
Patent, dated Apr. 3, 2019, received in Korean Patent Application No. 2018-7020659, which corresponds with U.S. Appl. No. 15/136,782, 5 pages.
Office Action, dated Jan. 20, 2017, received in U.S. Appl. No. 15/231,745, 21 pages.
Notice of Allowance, dated Jul. 6, 2017, received in U.S. Appl. No. 15/231,745, 18 pages.
Office Action, dated Oct. 17, 2016, received in Danish Patent Application No. 201670587, which corresponds with U.S. Appl. No. 15/231,745, 9 pages.
Office Action, dated Jun. 29, 2017, received in Danish Patent Application No. 201670587, which corresponds with U.S. Appl. No. 15/231,745, 4 pages.
Office Action, dated Feb. 22, 2018, received in Danish Patent Application No. 201670587, which corresponds with U.S. Appl. No. 15/231,745, 4 pages.
Office Action, dated Dec. 18, 2018, received in Danish Patent Application No. 201670587, which corresponds with U.S. Appl. No. 15/231,745, 4 pages.
Office Action, dated Dec. 14, 2016, received in Danish Patent Application No. 201670590, which corresponds with U.S. Appl. No. 15/231,745, 9 pages.
Office Action, dated Jul. 6, 2017, received in Danish Patent Application No. 201670590, which corresponds with U.S. Appl. No. 15/231,745, 3 pages.
Office Action, dated Jan. 10, 2018, received in Danish Patent Application No. 201670590, which corresponds with U.S. Appl. No. 15/231,745, 2 pages.
Patent, dated May 28, 2018, received in Danish Patent Application No. 201670590, which corresponds with U.S. Appl. No. 15/231,745, 2 pages.
Office Action, dated Nov. 10, 2016, received in Danish Patent Application No. 201670591, which corresponds with U.S. Appl. No. 15/231,745, 12 pages.
Office Action, dated Apr. 11, 2018, received in Danish Patent Application No. 201670591, which corresponds with U.S. Appl. No. 15/231,745, 3 pages.
Office Action, dated Nov. 23, 2018, received in Danish Patent Application No. 201670591, which corresponds with U.S. Appl. No. 15/231,745, 7 pages.
Office Action, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action, dated Jan. 30, 2018, received in Danish Patent Application No. 201670592, which corresponds with U.S. Appl. No. 15/231,745, 2 pages.
Notice of Allowance, dated Mar. 27, 2018, received in Danish Patent Application No. 201670592, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Office Action, dated Oct. 12, 2016, received in Danish Patent Application No. 201670593, which corresponds with U.S. Appl. No. 15/231,745, 7 pages.
Patent, dated Oct. 30, 2017, received in Danish Patent Application No. 201670593, which corresponds with U.S. Appl. No. 15/231,745, 3 pages.
Notice of Allowance, dated Nov. 1, 2019, received in Japanese Patent Application No. 2018-158502, which corresponds with U.S. Appl. No. 15/231,745, 5 pages.
Patent, dated Nov. 29, 2019, received in Japanese Patent Application No. 2018-158502, which corresponds with U.S. Appl. No. 15/231,745, 3 pages.
Notice of Allowance, dated Oct. 4, 2018, received in U.S. Appl. No. 15/272,327, 46 pages.
Notice of Acceptance, dated Mar. 2, 2018, received in Australian Patent Application No. 2018200705, which corresponds with U.S. Appl. No. 15/272,327, 3 pages.
Certificate of Grant, dated Jun. 28, 2018, received in Australian Patent Application No. 2018200705, which corresponds with U.S. Appl. No. 15/272,327, 4 pages.
Office Action, dated Mar. 22, 2019, received in Australian Patent Application No. 2018204234, which corresponds with U.S. Appl. No. 15/272,327, 7 pages.
Notice of Acceptance, dated Dec. 10, 2019, received in Australian Patent Application No. 2018204234, which corresponds with U.S. Appl. No. 15/272,327, 3 pages.
Certificate of Grant, dated Apr. 2, 2020, received in Australian Patent Application No. 2018204234, which corresponds with U.S. Appl. No. 15/272,327, 1 page.

(56) References Cited

OTHER PUBLICATIONS

Office Action, dated Aug. 31, 2020, received in Chinese Patent Application No. 201810151593.X, which corresponds with U.S. Appl. No. 15/272,327, 10 pages.
Office Action, dated Sep. 14, 2018, received in European Patent Application No. 15155939.4, which corresponds with U.S. Appl. No. 15/272,327, 5 pages.
Intention to Grant, dated Mar. 19, 2019, received in European Patent Application No. 15155939.4, which corresponds with U.S. Appl. No. 15/272,327, 6 pages.
Decision to Grant, dated Apr. 26, 2019, received in European Patent Application No. 15155939.4, which corresponds with U.S. Appl. No. 15/272,327, 2 pages.
Patent, dated May 22, 2019, received in European Patent Application No. 15155939.4, which corresponds with U.S. Appl. No. 15/272,327, 1 page.
Notice of Allowance, dated Jul. 30, 2018, received in Japanese Patent Application No. 2018-506989, which corresponds with U.S. Appl. No. 15/272,327, 4 pages.
Patent, dated Aug. 31, 2018, received in Japanese Patent Application No. 2018-506989, which corresponds with U.S. Appl. No. 15/272,327, 3 pages.
Office Action, dated Oct. 26, 2018, received in U.S. Appl. No. 15/272,341, 22 pages.
Final Office Action, dated Mar. 25, 2019, received in U.S. Appl. No. 15/272,341, 25 pages.
Notice of Allowance, dated Feb. 20, 2020, received in U.S. Appl. No. 15/272,341, 12 pages.
Office Action, dated Jul. 27, 2017, received in Australian Patent Application No. 2017100535, which corresponds with U.S. Appl. No. 15/272,341, 4 pages.
Notice of Allowance, dated Sep. 20, 2018, received in U.S. Appl. No. 15/272,343, 44 pages.
Office Action, dated Jun. 5, 2019, received in Chinese Patent Application No. 201810071627.4, which corresponds with U.S. Appl. No. 15/272,343, 6 pages.
Notice of Allowance, dated Dec. 11, 2019, received in Chinese Patent Application No. 201810071627.4, which corresponds with U.S. Appl. No. 15/272,343, 4 pages.
Patent, dated Mar. 3, 2020, received in Chinese Patent Application No. 201810071627.4, which corresponds with U.S. Appl. No. 15/272,343, 7 pages.
Office Action, dated Jan. 8, 2019, received in European Patent Application No. 17206374.5, which corresponds with U.S. Appl. No. 15/272,343, 5 pages.
Intention to Grant, dated May 13, 2019, received in European Patent Application No. 17206374.5, which corresponds with U.S. Appl. No. 15/272,343, 7 pages.
Decision to Grant, dated Sep. 12, 2019, received in European Patent Application No. 17206374.5, which corresponds with U.S. Appl. No. 15/272,343, 3 pages.
Patent, Oct. 9, 2019, received in European Patent Application No. 17206374.5, which corresponds with U.S. Appl. No. 15/272,343, 3 pages.
Office Action, dated Oct. 15, 2018, received in U.S. Appl. No. 15/272,345. 31 pages.
Final Office Action, dated Apr. 2, 2019, received in U.S. Appl. No. 15/272,345, 28 pages.
Notice of Allowance, dated Apr. 22, 2020, received in U.S. Appl. No. 15/272,345, 12 pages.
Notice of Acceptance, dated Mar. 2, 2018, received in Australian Patent Application No. 2016304832, which corresponds with U.S. Appl. No. 15/272,345, 3 pages.
Certificate of Grant, dated Jun. 28, 2018, received in Australian Patent Application No. 2016304832, which corresponds with U.S. Appl. No. 15/272,345, 4 pages.
Office Action, dated Oct. 22, 2019, received in Chinese Patent Application No. 201680022696.5, which corresponds with U.S. Appl. No. 15/272,345, 7 pages.
Notice of Allowance, dated Jul. 6, 2020, received in Chinese Patent Application No. 201680022696.5, which corresponds with U.S. Appl. No. 15/272,345, 5 pages.
Patent, dated Sep. 18, 2020, received in Chinese Patent Application No. 201680022696.5, which corresponds with U.S. Appl. No. 15/272,345, 6 pages.
Office Action, dated Apr. 20, 2018, received in European Patent Application No. 16756862.5, which corresponds with U.S. Appl. No. 15/272,345, 15 pages.
Office Action, dated Nov. 13, 2018, received in European Patent Application No. 16756862.5, which corresponds with U.S. Appl. No. 15/272,345, 5 pages.
Decision to Grant, dated Jan. 31, 2019, received in European Patent Application No. 16756862.5, which corresponds with U.S. Appl. No. 15/272,345, 5 pages.
Patent, dated Feb. 27, 2019, received in European Patent Application No. 16756862.5, which corresponds with U.S. Appl. No. 15/272,345, 3 pages.
Patent, dated Feb. 7, 2020, received in Hong Kong Patent Application No. 18101477.0, which corresponds with U.S. Appl. No. 15/272,345, 6 pages.
Office Action, dated Dec. 4, 2020, received in Japanese Patent Application No. 2019-212493, which corresponds with U.S. Appl. No. 15/272,345, 5 pages.
Office Action, dated Mar. 7, 2018, received in U.S. Appl. No. 15/482,618, 7 pages.
Notice of Allowance, dated Aug. 15, 2018, received in U.S. Appl. No. 15/482,618, 7 pages.
Office Action, dated Apr. 23, 2018, received in U.S. Appl. No. 15/499,691, 29 pages.
Notice of Allowance, dated Oct. 12, 2018, received in U.S. Appl. No. 15/499,693, 8 pages.
Office Action, dated May 11, 2020, received in Australian Patent Application No. 2019203776, which corresponds with U.S. Appl. No. 15/499,693, 4 pages.
Notice of Acceptance, dated Jul. 22, 2020, received in Australian Patent Application No. 2019203776, which corresponds with U.S. Appl. No. 15/499,693, 3 pages.
Certificate of Grant, dated Nov. 26, 2020, received in Australian Patent Application No. 2019203776, which corresponds with U.S. Appl. No. 15/499,693, 3 pages.
Office action, dated Nov. 20, 2020, received in Japanese Patent Application No. 2019-200174, which corresponds with U.S. Appl. No. 15/499,693, 6 pages.
Office Action, dated Aug. 2, 2019, received in Korean Patent Application No. 2019-7009439, which corresponds with U.S. Appl. No. 15/499,693, 3 pages.
Notice of Allowance, dated Dec. 27, 2019, received in Korean Patent Application No. 2019-7009439, which corresponds with U.S. Appl. No. 15/499,693, 5 pages.
Patent, dated Mar. 27, 2020, received in Korean Patent Application No. 2019-7009439, which corresponds with U.S. Appl. No. 15/499,693, 4 pages.
Office Action, dated Aug. 30, 2017, received in U.S. Appl. No. 15/655,749, 22 pages.
Final Office Action, dated May 10, 2018, received in U.S. Appl. No. 15/655,749, 19 pages.
Office Action, dated Jan. 24, 2019, received in U.S. Appl. No. 15/655,749, 25 pages.
Final Office Action, dated Jul. 1, 2019, received in U.S. Appl. No. 15/655,749 (7506), 24 pages.
Notice of Allowance, dated Feb. 20, 2020, received in U.S. Appl. No. 15/655,749, 10 pages.
Office Action, dated Feb. 3, 2020, received in Chinese Patent Application No. 201710331254.5, which corresponds with U.S. Appl. No. 15/655,749, 8 pages.
Notice of Allowance, dated Apr. 18, 2019, received in Korean Patent Application No. 2017-7034248, which corresponds with U.S. Appl. No. 15/655,749, 5 pages.
Patent, dated Jul. 3, 2019, received in Korean Patent Application No. 2017-7034248, which corresponds with U.S. Appl. No. 15/655,749, 5 pages.

(56) References Cited

OTHER PUBLICATIONS

Office Action, dated Aug. 1, 2019, received in U.S. Appl. No. 15/785,372, 22 pages.
Final Office Action, dated Feb. 5, 2020, received in U.S. Appl. No. 15/785,372, 26 pages.
Office Action, dated Jul. 23, 2020, received in U.S. Appl. No. 15/785,372, 23 pages.
Final Office Action, dated Nov. 18, 2020, received in U.S. Appl. No. 15/785,372, 27 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
Office Action, dated Apr. 11, 2019, received in U.S. Appl. No. 15/889,115, 9 pages.
Final Office Action, dated Oct. 28, 2019, received in U.S. Appl. No. 15/889,115, 12 pages.
Notice of Allowance, dated May 19, 2020, received in U.S. Appl. No. 15/889,115, 9 pages.
Office Action, dated Jul. 25, 2019, received in U.S. Appl. No. 15/979,347, 14 pages.
Final Office Action, dated Feb. 27, 2020, received in U.S. Appl. No. 15/979,347, 19 pages.
Office Action, dated Jul. 14, 2020, received in U.S. Appl. No. 15/979,347, 10 pages.
Final Office Action, dated Jan. 25, 2021, received in U.S. Appl. No. 15/979,347, 12 pages.
Office Action, dated Sep. 25, 2020, received in U.S. Appl. No. 15/994,843, 5 pages.
Notice of Allowance, dated Jan. 22, 2021, received in U.S. Appl. No. 15/994,843, 8 pages.
Office Action, dated Nov. 25, 2019, received in U.S. Appl. No. 16/049,725, 9 pages.
Notice of Allowance, dated May 14, 2020, received in U.S. Appl. No. 16/049,725, 9 pages.
Office Action, dated May 31, 2019, received in Australian Patent Application No. 2018253539, which corresponds with U.S. Appl. No. 16/049,725, 3 pages.
Notice of Acceptance, dated Apr. 2, 2020, received in Australian Patent Application No. 2018253539, which corresponds with U.S. Appl. No. 16/049,725, 3 pages.
Certificate of Grant, dated Aug. 13, 2020, received in Australian Patent Application No. 2018253539, which corresponds with U.S. Appl. No. 16/049,725, 3 pages.
Notice of Allowance, dated Oct. 10, 2019, received in U.S. Appl. No. 16/102,409, 9 pages.
Office Action, dated Nov. 29, 2019, received in U.S. Appl. No. 16/136,163, 9 pages.
Final Office Action, dated Jun. 9, 2020, received in U.S. Appl. No. 16/136,163, 10 pages.
Office Action, dated Sep. 17, 2020, received in U.S. Appl. No. 16/136,163, 13 pages.
Office Action, dated Mar. 9, 2020, received in U.S. Appl. No. 16/145,954, 15 pages.
Office Action, dated Dec. 10, 2020, received in U.S. Appl. No. 16/145,954, 5 pages.
Office Action, dated Mar. 6, 2020, received in U.S. Appl. No. 16/154,591, 16 pages.
Final Office Action, dated Oct. 1, 2020, received in U.S. Appl. No. 16/154,591, 19 pages.
Office Action, dated May 4, 2020, received in Australian Patent Application No. 2019203175, which corresponds with U.S. Appl. No. 16/154,591, 4 pages.
Office Action, dated Oct. 13, 2020, received in Australian Patent Application No. 2019203175, which corresponds with U.S. Appl. No. 16/154,591, 5 pages.
Office Action, dated Dec. 2, 2019, received in Japanese Patent Application No. 2018-202048, which corresponds with U.S. Appl. No. 16/154,591, 6 pages.
Notice of Allowance, dated Jun. 1, 2020, received in Japanese Patent Application No. 2018-202048, which corresponds with U.S. Appl. No. 16/154,591, 3 pages.
Patent, dated Jun. 25, 2020, received in Japanese Patent Application No. 2018-202048, which corresponds with U.S. Appl. No. 16/154,591, 4 pages.
Office Action, dated Aug. 20, 2019, received in Korean Patent Application No. 2019-7019946, which corresponds with U.S. Appl. No. 16/154,591, 6 pages.
Office Action, dated Feb. 27, 2020, received in Korean Patent Application No. 2019-7019946, which corresponds with U.S. Appl. No. 16/154,591, 5 pages.
Office Action, dated Nov. 25, 2019, received in U.S. Appl. No. 16/174,170, 31 pages.
Final Office Action, dated Mar. 19, 2020, received in U.S. Appl. No. 16/174,170, 25 pages.
Notice of Allowance, dated Jun. 18, 2020, received in U.S. Appl. No. 16/174,170, 19 pages.
Notice of Allowance, dated Aug. 26, 2020, received in U.S. Appl. No. 16/240,669, 18 pages.
Office Action, dated Oct. 30, 2020, received in U.S. Appl. No. 16/230,707, 20 pages.
Office Action, dated Aug. 10, 2020, received in U.S. Appl. No. 16/240,672, 13 pages.
Final Office Action, dated Nov. 27, 2020, received in U.S. Appl. No. 16/240,672, 12 pages.
Office Action, dated Sep. 24, 2020, received in Australian Patent Application No. 2019268116, which corresponds with U.S. Appl. No. 16/240,672, 4 pages.
Notice of Allowance, dated May 22, 2020, received in Japanese Patent Application No. 2019-027634, which corresponds with U.S. Appl. No. 16/240,672, 5 pages.
Patent, dated Jun. 23, 2020, received in Japanese Patent Application No. 2019-027634, which corresponds with U.S. Appl. No. 16/240,672, 4 pages.
Office Action, dated May 22, 2019, received in U.S. Appl. No. 16/230,743, 7 pages.
Notice of Allowance, dated Sep. 11, 2019, received in U.S. Appl. No. 16/230,743, 5 pages.
Office Action, dated Mar. 6, 2020, received in U.S. Appl. No. 16/243,834, 19 pages.
Notice of Allowance, dated Sep. 24, 2020, received in U.S. Appl. No. 16/243,834, 10 pages.
Office Action, dated Dec. 18, 2019, received in Australian Patent Application No. 2018282409, which corresponds with U.S. Appl. No. 16/243,834, 3 pages.
Office Action, dated Sep. 18, 2020, received in Australian Patent Application No. 2018282409, which corresponds with U.S. Appl. No. 16/243,834, 3 pages.
Notice of Acceptance, dated Oct. 21, 2020, received in Australian Patent Application No. 2018282409, which corresponds with U.S. Appl. No. 16/243,834, 3 pages.
Office Action, dated Aug. 7, 2020, received in Japanese Patent Application No. 2019-058800, which corresponds with U.S. Appl. No. 16/243,834, 8 pages.
Office Action, dated Jul. 5, 2019, received in Korean Patent Application No. 2018-7037896, which corresponds with U.S. Appl. No. 16/243,834, 2 pages.
Notice of Allowance, dated Dec. 23, 2019, received in Korean Patent Application No. 2018-7037896, which corresponds with U.S. Appl. No. 16/243,834, 6 pages.
Patent, dated Mar. 13, 2020, received in Korean Patent Application No. 2018-7037896, which corresponds with U.S. Appl. No. 16/243,834, 7 pages.
Notice of Allowance, dated Nov. 20, 2020, received in U.S. Appl. No. 16/262,784, 8 pages.
Office Action, dated Sep. 15, 2020, received in European Patent Application No. 19194439.6, which corresponds with U.S. Appl. No. 16/262,800, 6 pages.
Notice of Allowance, dated Apr. 19, 2019, received in U.S. Appl. No. 16/252,478, 11 pages.

(56) References Cited

OTHER PUBLICATIONS

Office Action, dated Jun. 11, 2020, received in Australian Patent Application No. 2019257437, which corresponds with U.S. Appl. No. 16/252,478, 3 pages.
Notice of Allowance, dated Sep. 15, 2020, received in Australian Patent Application No. 2019257437, which corresponds with U.S. Appl. No. 16/252,478, 3 pages.
Notice of Allowance, dated Dec. 13, 2019, received in Korean Patent Application No. 2019-7033444, which corresponds with U.S. Appl. No. 16/252,478, 6 pages.
Patent, dated Mar. 12, 2020, received in Korean Patent Application No. 2019-7033444, which corresponds with U.S. Appl. No. 16/252,478, 6 pages.
Office action, dated Aug. 27, 2020, received in U.S. Appl. No. 16/241,883, 11 pages.
Notice of Allowance, dated Sep. 28, 2020, received in U.S. Appl. No. 16/241,883, 10 pages.
Office Action, dated Jul. 15, 2019, received in U.S. Appl. No. 16/258,394, 8 pages.
Notice of Allowance, dated Nov. 6, 2019, received in U.S. Appl. No. 16/258,394, 8 pages.
Office Action, dated May 14, 2020, received in U.S. Appl. No. 16/354,035, 16 pages.
Notice of Allowance, dated Aug. 25, 2020, received in U.S. Appl. No. 16/354,035, 14 pages.
Office Action, dated Oct. 11, 2019, received in Australian Patent Application No. 2019202417, which corresponds with U.S. Appl. No. 16/896,141, 4 pages.
Notice of Allowance, dated Jul. 6, 2020, received in Australian Patent Application No. 2019202417, which corresponds with U.S. Appl. No. 16/896,141, 3 pages.
Certificate of Grant, dated Nov. 5, 2020, received in Australian Patent Application No. 2019202417, which corresponds with U.S. Appl. No. 16/896,141, 4 pages.
Office Action, dated Aug. 21, 2020, received in Japanese Patent Application No. 2019-047319, which corresponds with U.S. Appl. No. 16/896,141, 6 pages.
Office Action, dated Aug. 30, 2019, received in Korean Patent Application No. 2019-7019100, 2 pages.
Notice of Allowance, dated Nov. 1, 2019, received in Korean Patent Application No. 2019-7019100, 5 pages.
Patent, dated Jan. 31, 2020, received in Korean Patent Application No. 2019-7019100, 5 pages.
Office Action, dated May 14, 2020, received in U.S. Appl. No. 16/509,438, 16 pages.
Notice of Allowance, dated Jan. 6, 2021, received in U.S. Appl. No. 16/509,438, 5 pages.
Notice of Allowance, dated May 20, 2020, received in U.S. Appl. No. 16/534,214, 16 pages.
Office Action, dated Oct. 7, 2020, received in U.S. Appl. No. 16/563,505, 20 pages.
Office Action, dated Oct. 19, 2020, received in U.S. Appl. No. 16/685,773, 15 pages.
Office Action, dated Oct. 30, 2020, received in U.S. Appl. No. 16/824,490, 15 pages.
Office Action, dated Sep. 21, 2020, received in U.S. Appl. No. 16/803,904, 5 pages.
Notice of Allowance, dated Jan. 6, 2021, received in U.S. Appl. No. 16/803,904, 9 pages.
Notice of Allowance, dated May 4, 2020, received in Korean Patent Application No. 2019-7033444, 5 pages.
Patent, dated Jun. 3, 2020, received in Korean Patent Application No. 2019-7033444, 7 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
Extended European Search Report, dated Jul. 30, 2018, received in European Patent Application No. 18180503.7, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Extended European Search Report, dated Dec. 5, 2018, received in European Patent Application No. 18194127.9, which corresponds with U.S. Appl. No. 14/608,942, 8 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.

(56) References Cited

OTHER PUBLICATIONS

International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Extended European Search Report, dated Oct. 7, 2016, received in European Patent Application No. 16177863.4, which corresponds with U.S. Appl. No. 14/536,267, 12 pages.
Extended European Search Report, dated Oct. 30, 2018, received in European Patent Application No. 18183789.9, which corresponds with U.S. Appl. No. 14/536,267, 11 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Extended European Search Report, dated Nov. 24, 2017, received in European Patent Application No. 17186744.3, which corresponds with U.S. Appl. No. 14/536,291, 10 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
Extended European Search Report, dated Mar. 15, 2017, received in European Patent Application No. 17153418.3, which corresponds with U.S. Appl. No. 14/536,648, 7 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
International Search Report and Written Opinion, dated Oct. 14, 2016, received in International Patent Application No. PCT/US2016/020697, which corresponds with U.S. Appl. No. 14/866,981, 21 pages.
Search Report, dated Jun. 19, 2017, received in Dutch Patent Application No. 2016377, which corresponds with U.S. Appl. No. 14/866,159, 13 pages.
International Search Report and Written Opinion, dated Apr. 25, 2016, received in International Patent Application No. PCT/US2016/018758, which corresponds with U.S. Appl. No. 14/866,159, 15 pages.
Extended European Search Report, dated Oct. 17, 2017, received in European Patent Application No. 17184437.6, Which corresponds with U.S. Appl. No. 14/868,078, 8 pages.
Search Report, dated Apr. 13, 2017, received in Dutch Patent Application No. 2016376, which corresponds with U.S. Appl. No. 14/868,078, 15 pages.
International Search Report and Written Opinion, dated Jul. 21, 2016, received in International Patent Application No. PCT/US2016/019913, which corresponds with U.S. Appl. No. 14/868,078, 16 pages.
Search Report, dated Apr. 18, 2017, received in Dutch Patent Application No. 2016801, which corresponds with U.S. Appl. No. 14/863,432, 34 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
Extended European Search Report, dated Aug. 17, 2018, received in European Patent Application No. 18175195.9, which corresponds with U.S. Appl. No. 14/869,899, 13 pages.
International Search Report and Written Opinion, dated Aug. 29, 2016, received in International Patent Application No. PCT/US2016/021400, which corresponds with U.S. Appl. No. 14/869,899, 48 pages.
International Preliminary Report on Patentability, dated Sep. 12, 2017, received in International Patent Application No. PCT/US2016/021400, which corresponds with U.S. Appl. No. 14/869,899, 39 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
International Preliminary Report on Patentability, dated Feb. 13, 2018, received in International Patent Application No. PCT/US2016/046407, which corresponds with U.S. Appl. No. 15/009,688, 20 pages.
Search Report, dated Feb. 15, 2018, received in Dutch Patent Application No. 2019215, which corresponds with U.S. Appl. No. 14/864,529, 13 pages.
Extended European Search Report, dated Nov. 14, 2019, received in European Patent Application No. 19194418.0, which corresponds with U.S. Appl. No. 14/864,580, 8 pages.
Search Report, dated Feb. 15, 2018, received in Dutch Patent Application No. 2019214, which corresponds with U.S. Appl. No. 14/864,601, 12 pages.
Extended European Search Report, dated Oct. 10, 2017, received in European Patent Application No. 17188507.2, which corresponds with U.S. Appl. No. 14/866,361, 9 pages.

(56) References Cited

OTHER PUBLICATIONS

Extended European Search Report, dated Jun. 22, 2017, received in European Patent Application No. 16189421.7, which corresponds with U.S. Appl. No. 14/866,987, 7 pages.
Extended European Search Report, dated Sep. 11, 2017, received in European Patent Application No. 17163309.2, which corresponds with U.S. Appl. No. 14/866,987, 8 pages.
Extended European Search Report, dated Jun. 8, 2017, received in European Patent Application No. 16189425.8, which corresponds with U.S. Appl. No. 14/866,989, 8 pages.
Extended European Search Report, dated Aug. 2, 2018, received in European Patent Application No. 18168941.5, which corresponds with U.S. Appl. No. 14/871,236, 11 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Extended European Search Report, dated Dec. 21, 2016, received in European Patent Application No. 16189790.5, which corresponds with U.S. Appl. No. 14/871,462, 8 pages.
Extended European Search Report, dated Mar. 8, 2019, received in European Patent Application No. 18205283.7, which corresponds with U.S. Appl. No. 15/081,771, 15 pages.
Extended European Search Report, dated Aug. 24, 2018, received in European Patent Application No. 18171453.6, which corresponds with U.S. Appl. No. 15/136,782, 9 pages.
International Search Report and Written Opinion, dated Jan. 3, 2017, received in International Patent Application No. PCT/US2016/046214, which corresponds with U.S. Appl. No. 15/231,745, 25 pages.
Extended European Search Report, dated May 30, 2018, received in European Patent Application No. 18155939.4, which corresponds with U.S. Appl. No. 15/272,327, 8 pages.
Extended European Search Report, dated Mar. 2, 2018, received in European Patent Application No. 17206374.5, which corresponds with U.S. Appl. No. 15/272,343, 11 pages.
Extended European Search Report, dated Oct. 6, 2020, received in European Patent Application No. 20188553.0, which corresponds with U.S. Appl. No. 15/499,693, 11 pages.
Extended European Search Report, dated Oct. 28, 2019, received in European Patent Application No. 19195414.8, which corresponds with U.S. Appl. No. 16/240,672, 6 pages.
Extended European Search Report, dated Nov. 13, 2019, received in European Patent Application No. 19194439.6, which corresponds with U.S. Appl. No. 16/262,800, 12 pages.
Extended European Search Report, dated Oct. 9, 2019, received in European Patent Application No. 19181042.3, which corresponds with U.S. Appl. No. 15/272,343, 10 pages.
Apple, "Final Cut Express 4 User Manual", https://wsi.li.dl/mBGZWEQ8fh556f/, Jan. 1, 2007, 1,152 pages.
Office Action, dated Jun. 24, 2021, received in Chinese Patent Application No. 201810826224.6, which corresponds with U.S. Appl. No. 14/536,426, 3 pages.
Office Action, dated Jul. 14, 2021, received in Chinese Patent Application No. 201810369259.1, which corresponds with U.S. Appl. No. 14/608,926, 5 pages.
Office Action, dated Jun. 10, 2021, received in Chinese Patent Application No. 201711425148.X, which corresponds with U.S. Appl. No. 14/536,646, 2 pages.
Office Action, dated Jul. 19, 2021, received in Chinese Patent Application No. 201810332044.2, which corresponds with U.S. Appl. No. 14/536,267, 1 page.
Patent, dated Apr. 27, 2021, received in Chinese Patent Application No. 2018100116175.X, which corresponds with U.S. Appl. No. 14/536,291, 6 pages.
Patent, dated Jun. 4, 2021, received in Chinese Patent Application No. 201610871595.7, which corresponds with U.S. Appl. No. 14/869,899, 7 pages.
Notice of Allowance, dated Apr. 26, 2021, received in Chinese Patent Application No. 201680041559.6, which corresponds with U.S. Appl. No. 14/866,992, 1 page.
Patent, dated May 28, 2021, received in Chinese Patent Application No. 201680041559.6, which corresponds with U.S. Appl. No. 14/866,992, 7 pages.
Office Action, dated Jul. 1, 2021 received in U.S. Appl. No. 15/009,661, 52 pages.
Patent, dated Apr. 27, 2021, received in Chinese Patent Application No. 201680047125.7, which corresponds with U.S. Appl. No. 15/009,676, 8 pages.
Notice of allowance, dated Jun. 28, 2021, received in Korean Patent Application No. 2020-7029178, which corresponds with U.S. Appl. No. 14/870,882, 2 pages.
Office Action, dated Jun. 17, 2021, received in European Patent Application No. 19194418.0, which corresponds with U.S. Appl. No. 14/864,580, 7 pages.
Patent, dated May 26, 2021, received in European Patent Application No. 17188507.2, which corresponds with U.S. Appl. No. 14/866,361, 3 pages.
Patent, dated Feb. 5, 2021, received in Hong Kong Patent Application No. 1235878, which corresponds with U.S. Appl. No. 14/866,987, 6 pages.
Patent, dated Apr. 21, 2021, received in European Patent Application No. 18168941.5, which corresponds with U.S. Appl. No. 14/871,236, 3 pages.
Patent, dated May 25, 2021, received in Chinese Patent Application No. 201610870912.3, which corresponds with U.S. Appl. No. 14/870,882, 8 pages.
Office Action, dated Jun. 1, 2021, received in Chinese Patent Application No. 201610871323.7, which corresponds with U.S. Appl. No. 14/871,336, 1 page.
Notice of Allowance, dated May 26, 2021, received in U.S. Appl. No. 14/867,892, 7 pages.
Notice of Allowance, dated Jul. 13, 2021, received in U.S. Appl. No. 14/867,892, 8 pages.
Office Action, dated May 14, 2021, received in European Patent Application No. 16711725.8, which corresponds with U.S. Appl. No. 14/867,990, 7 pages.
Notice of Allowance, dated Apr. 20, 2021, received in Chinese Patent Application No. 201680046985.9, which corresponds with U.S. Appl. No. 15/009,668, 1 page.
Notice of Allowance, dated Jul. 16, 2021, received in Japanese Patent Application No. 2019-200174, which corresponds with U.S. Appl. No. 15/499,693, 2 pages.
Notice of Allowance, dated May 27, 2021, received in Chinese Patent Application No. 201710331254.5, which corresponds with U.S. Appl. No. 15/655,749, 1 page.
Patent, dated Jun. 25, 2021, received in Chinese Patent Application No. 201710331254.5, which corresponds with U.S. Appl. No. 15/655,749, 7 pages.
Notice of Allowance, dated Jul. 14, 2021, received in U.S. Appl. No. 15/785,372, 11 pages.
Final Office Action, dated May 20, 2021, received in U.S. Appl. No. 16/136,163, 13 pages.
Office Action, dated May 17, 2021, received in U.S. Appl. No. 16/240,672, 14 pages.
Office Action, dated Apr. 21, 2021, received in European Patent Application No. 19195414.8, which corresponds with U.S. Appl. No. 16/240,672, 7 pages.
Final Office Action, dated Jun. 4, 2021, received in U.S. Appl. No. 16/262,800, 65 pages.
Office Action, dated Jun. 9, 2021, received in U.S. Appl. No. 16/896,141, 21 pages.
Notice of Allowance, dated Apr. 29, 2021, received in U.S. Appl. No. 16/509,438, 9 pages.
Final Office Action, dated May 12, 2021, received in U.S. Appl. No. 16/563,505, 19 pages.
Office Action, dated May 26, 2021, received in U.S. Appl. No. 16/988,509, 25 pages.
Bognot, "Microsoft Windows 7 Aero Shake, Snap, and Peek", https://www.outube.com/watch?v=vgD7wGrsQg4, Apr. 3, 2012, 4 pages.

(56) References Cited

OTHER PUBLICATIONS

Intent to Grant, dated May 11, 2022, received in European Patent Application No. 13795392.3, which corresponds with U.S. Appl. No. 14/608,926, 7 pages.
Patent, dated May 27, 2022, received in Chinese Patent Application No. 201810332044.2, which corresponds with U.S. Appl. No. 14/536,267, 6 pages.
Office Action, dated Mar. 2, 2022, received in Chinese Patent Application No. 201811561188.1, which corresponds with U.S. Appl. No. 15/081,771, 1 page.
Office Action, dated Apr. 11, 2022, received in Japanese Patent Application No. 2019-058800, which corresponds with U.S. Appl. No. 16/243,834, 4 pages.
Notice of Allowance, dated Apr. 14, 2022, received in Russian Patent Application No. 2018146112, which corresponds with U.S. Appl. No. 16/243,834, 2 pages.
Certificate of Grant, dated Apr. 21, 2022, received in Australian Patent Application No. 2020201648, which corresponds with U.S. Appl. No. 16/262,784, 3 pages.
Patent, dated May 19, 2022, received in Australian Patent Application No. 2020267298, which corresponds with U.S. Appl. No. 16/258,394, 4pages.
Office Action, dated May 6, 2022, received in Chinese Patent Application No. 201910610331.X, 5 pages.
Office Action, dated May 17, 2022, received in Korean Patent Application No. 2020-7008888, 2 pages.
Patent, dated May 19, 2022, received in Australian Patent Application No. 2020244406, which corresponds with U.S. Appl. No. 17/003,869, 3 pages.
Notice of Allowance, dated Feb. 7, 2022, received in U.S. Appl. No. 16/988,509, 16 pages.
Office Action, dated Apr. 27, 2022, received in Australian Patent Application No. 2020257134, 3 pages.
Office Action, dated Apr. 28, 2022, received in Korean Patent Application No. 2022-7005994, 5 pages.
Final Office Action, dated May 2, 2022, received in U.S. Appl. No. 17/103,899 21 pages.
Patent, dated May 10, 2022, received in Korean Patent Application No. 2022-7003345, 8 pages.
Office Action, dated May 23, 2022, received in Korean Patent Application No. 2022-7015718, 2 pages.
Garcia-Hernandez et al., "Orientation Discrimination of Patterned Surfaces through an Actuated and Non-Actuated Tactile Display", 2011 IEEE World Haptics Conference, Istanbul, Jun. 21-24, 2011, 3 pages.
Office Action, dated Jan. 4, 2021, received in Chinese Patent Application No. 201810826224.6, which corresponds with U.S. Appl. No. 14/536,426, 6 pages.
Office Action, dated Feb. 8, 2021, received in Japanese Patent Application No. 2018-000753, which corresponds with U.S. Appl. No. 14/536,426, 2 pages.
Notice of Allowance, dated Feb. 23, 2021, received in U.S. Appl. No. 14/536,464, 5 pages.
Notice of Allowance, dated Mar. 22, 2021, received in Chinese Patent Application No. 201711422092.2, which corresponds with U.S. Appl. No. 14/536,646, 2 pages.
Certificate of Grant, dated Apr. 13, 2021, received in Chinese Patent Application No. 201711422092.2, which corresponds with U.S. Appl. No. 14/536,646, 8 pages.
Office Action, dated Mar. 10, 2021, received in Chinese Patent Application No. 201811142423.1, which corresponds with U.S. Appl. No. 14/536,141, 6 pages.
Patent, dated Sep. 16, 2020, received in European Patent Application No. 18194127.9, which corresponds with U.S. Appl. No. 14/608,942, 4 pages.
Office Action, dated Jan. 20, 2021, received in Chinese Patent Application No. 201810332044.2, which corresponds with U.S. Appl. No. 14/536,267, 15 pages.
Notice of Allowance, dated Mar. 29, 2021, received in Chinese Patent Application No. 2018100116175.X, which corresponds with U.S. Appl. No. 14/536,291, 1 page.
Notice of Allowance, dated Feb. 2, 2021, received in Chinese Patent Application No. 201711422121.5, which corresponds with U.S. Appl. No. 14/536,648, 1 page.
Patent, dated Mar. 9, 2021, received in Chinese Patent Application No. 201711422121.5, which corresponds with U.S. Appl. No. 14/536,648, 7 pages.
Patent, dated Jan. 5, 2021, received in Japanese Patent Application No. 2018-243773, which corresponds with U.S. Appl. No. 14/863,432, 4 pages.
Notice of Allowance, dated Mar. 30, 2021, received in Chinese Patent Application No. 201610871595.7, which corresponds with U.S. Appl. No. 14/869,899, 1 page.
Final Office Action, dated Feb. 26, 2021, received in U.S. Appl. No. 15/009,661, 46 pages.
Notice of Allowance, dated Feb. 24, 2021, received in Chinese Patent Application No. 201680047125.7, which corresponds with U.S. Appl. No. 15/009,676, 1 page.
Patent, dated Sep. 23, 2020, received in European Patent Application No. 16756866.6, which corresponds with U.S. Appl. No. 15/009,676, 4 pages.
Intention to Grant, dated Feb. 3, 2021, received in European Patent Application No. 17188507.2, which corresponds with U.S. Appl. No. 14/866,361, 7 pages.
Decision to Grant, dated Feb. 25, 2021, received in European Patent Application No. 16189425.8, which corresponds with U.S. Appl. No. 14/866,989, 1 page.
Decision to Grant, dated Mar. 25, 2021, received in European Patent Application No. 18168941.5, which corresponds with U.S. Appl. No. 14/871,236, 2 pages.
Notice of Allowance, dated Mar. 22, 2021, received in Chinese Patent Application No. 201610870912.3, which corresponds with U.S. Appl. No. 14/870,882, 1 pages.
Office Action, dated Feb. 9, 2021, received in Chinese Patent Application No. 201610871323.7, which corresponds with U.S. Appl. No. 14/871,336, 1 page.
Office Action, dated Mar. 19, 2021, received in European Patent Application No. 16753795.0, which corresponds with U.S. Appl. No. 15/009,668, 5 pages.
Patent, dated Sep. 23, 2020, received in European Patent Application No. 18205283.7, which corresponds with U.S. Appl. No. 15/081,771, 4 pages.
Patent, dated Feb. 5, 2021, received in Hong Kong Patent Application No. 1257553, which corresponds with U.S. Appl. No. 15/136,782, 14 pages.
Notice of Allowance, dated Jan. 27, 2021, received in Chinese Patent Application No. 201810151593.X, which corresponds with U.S. Appl. No. 15/272,327, 3 pages.
Patent, dated Mar. 19, 2021, received in Chinese Patent Application No. 201810151593.X, which corresponds with U.S. Appl. No. 15/272,327, 6 pages.
Office Action, dated Mar. 22, 2021, received in Chinese Patent Application No. 201710331254.5, which corresponds with U.S. Appl. No. 15/655,749, 4 pages.
Office Action, dated Mar. 4, 2021, received in U.S. Appl. No. 16/154,591, 20 pages.
Office Action, dated Mar. 29, 2021, received in Korean Patent Application No. 2019-7019946, which corresponds with U.S. Appl. No. 16/154,591, 6 pages.
Notice of Allowance, dated Feb. 18, 2021, received in U.S. Appl. No. 16/230,707, 9 pages.
Office Action, dated Jan. 28, 2021, received in Australian Patent Application No. 2019268116, which corresponds with U.S. Appl. No. 16/240,672, 4 pages.
Certificate of Grant, dated Feb. 18, 2021, received in Australian Patent Application No. 2018282409, which corresponds with U.S. Appl. No. 16/243,834, 3 pages.
Office Action, dated Feb. 12, 2021, received in Japanese Patent Application No. 2019-058800, which corresponds with U.S. Appl. No. 16/243,834, 2 pages.

(56) References Cited

OTHER PUBLICATIONS

Office action, dated Feb. 25, 2021, received in Australian Patent Application No. 2020201648, which corresponds with U.S. Appl. No. 16/262,784, 3 pages.
Office Action, dated Feb. 5, 2021, received in U.S. Appl. No. 16/262,800, 53 pages.
Office Action, dated Mar. 25, 2021, received in European Patent Application No. 19194439.6, which corresponds with U.S. Appl. No. 16/262,800, 5 pages.
Office Action, dated Apr. 9, 2021, received in Japanese Patent Application No. 2019-047319, which corresponds with U.S. Appl. No. 16/896,141, 2 pages.
Final Office Action, dated Feb. 2, 2021, received in U.S. Appl. No. 16/685,773, 20 pages.
Notice of Allowance, dated Feb. 24, 2021, received in U.S. Appl. No. 16/824,490, 8 pages.
Office Action, dated Feb. 23, 2021, received in Korean Patent Application No. 2020-7031330, which corresponds with U.S. Appl. No. 15/272,398, 6 pages.
Anonymous, RX-V3800AV Receiver Owner's Manual, Yamaha Music Manuals, www.Manualslib.com, Dec. 31, 2007, 169 pages.
Henderson et al., "Opportunistic User Interfaces for Augmented Reality", Department of Computer Science, New York, NY, Jan. 2010, 13 pages.
Patent, dated Nov. 12, 2021, received in Chinese Patent Application No. 201810826224.6, which corresponds with U.S. Appl. No. 14/536,426, 7 pages.
Office Action, dated Jan. 10, 2022, received in Chinese Patent Application No. 201810369259.1, which corresponds with U.S. Appl. No. 14/608,926, 4 pages.
Patent, dated Dec. 31, 2021, received in Chinese Patent Application No. 201811142423.1, which corresponds with U.S. Appl. No. 14/536,141, 6 pages.
Notice of Allowance, dated Dec. 3, 2021, received in Japanese Patent Application No. 2018-022394, which corresponds with U.S. Appl. No. 14/536,203, 2 pages.
Patent, dated Dec. 13, 2021, received in Japanese Patent Application No. 2018-022394, which corresponds with U.S. Appl. No. 14/536,203, 3 pages.
Office Action, dated Nov. 23, 2021, received in Chinese Patent Application No. 201810332044.2, which corresponds with U.S. Appl. No. 14/536,267, 2 page.
Office Action, dated Dec. 22, 2021, received in European Patent Application No. 17163309.2, which corresponds with U.S. Appl. No. 14/866,987, 4 pages.
Patent, dated Sep. 29, 2021, received in Japanese Patent Application No. 2019-212493, which corresponds with U.S. Appl. No. 15/272,345, 4 pages.
Office Action, dated Nov. 23, 2021, received in U.S. Appl. No. 16/136,163, 27 pages.
Office Action, dated Nov. 30, 2021, received in Russian Patent Application No. 2018146112, which corresponds with U.S. Appl. No. 16/243,834, 15 pages.
Notice of Allowance, dated Dec. 14, 2021, received in Australian Patent Application No. 2020201648, which corresponds with U.S. Appl. No. 16/262,784, 3 pages.
Notice of Allowance, dated Jan. 24, 2022, received in U.S. Appl. No. 16/262,800, 26 pages.
Office Action, dated Oct. 21, 2021, received in Australian Patent Application No. 2020267298, which corresponds with U.S. Appl. No. 16/258,394, 2 pages.
Final Office Action, dated Dec. 13, 2021, received in U.S. Appl. No. 16/896,141, 29 pages.
Office Action, dated Oct. 5, 2021, received in U.S. Appl. No. 16/563,505, 19 pages.
Office Action, dated Dec. 14, 2021, received in U.S. Appl. No. 16/685,773, 20 pages.
Notice of Allowance, dated Dec. 21, 2021, received in U.S. Appl. No. 16/921,083, 25 pages.
Office Action, dated Dec. 23, 2021, received in Korean Patent Application No. 2020-7031330, which corresponds with U.S. Appl. No. 15/272,398, 8 pages.
Office Action, dated Nov. 11, 2021, received in Australian Patent Application No. 2021200655, which corresponds with U.S. Appl. No. 17/103,899, 4 pages.
Office Action, dated Oct. 29, 2021, received in Korean Patent Application No. 2021-7031223, 2 pages.
International Search Report and Written Opinion, dated Jan. 11, 2022, received in International Application No. PCT/US2021/042402, which corresponds with U.S. Appl. No. 17/031,637, 50 pages.
Notice of Allowance, dated Mar. 21, 2022, received in Chinese Patent Application No. 201810332044.2, which corresponds with U.S. Appl. No. 14/536,267, 1 page.
Intent to Grant, dated Mar. 16, 2022, received in European Patent Application No. 18183789.9, which corresponds with U.S. Appl. No. 16/262,800, 7 pages.
Notice of Allowance, dated Feb. 4, 2022, received in Japanese Patent Application No. 2020-185336, which corresponds with U.S. Appl. No. 14/864,580, 2 pages.
Patent, dated Mar. 3, 2022, received in Japanese Patent Application No. 2020-185336, which corresponds with U.S. Appl. No. 14/864,580, 3 pages.
Notice of Allowance, dated Feb. 9, 2022, received in Chinese Patent Application No. 201610869950.7, which corresponds with U.S. Appl. No. 14/871,462, 1 page.
Patent, dated Mar. 8, 2022, received in Chinese Patent Application No. 201610869950.7, which corresponds with U.S. Appl. No. 14/871,462, 7 pages.
Patent, dated Jan. 27, 2022, received in Australian Patent Application No. 2019268116, which corresponds with U.S. Appl. No. 16/240,672, 3 pages.
Notice of Allowance, dated Jan. 14, 2022, received in Australian Patent Application No. 2020267298, which corresponds with U.S. Appl. No. 16/258,394, 3 pages.
Final Office Action, dated Mar. 4, 2022, received in Japanese Patent Application No. 2019-047319, which corresponds with U.S. Appl. No. 16/896,141, 2 pages.
Office Action, dated Mar. 17, 2022, received in Chinese Patent Application No. 201910718931.8, 1 page.
Notice of Allowance, dated Jan. 14, 2022, received in Australian Patent Application No. 2020244406, which corresponds with U.S. Appl. No. 17/003,869, 3 pages.
Office Action, dated Mar. 16, 2022, received in U.S. Appl. No. 17/138,676, 22 pages.
Patent, dated Jan. 27, 2022, received in Korean Patent Application No. 2021-7031223, 5 pages.
Notice of Allowance, dated Feb. 21, 2022, received in Korean Patent Application No. 2022-7003345, 2 pages.
Cheng, "iPhone 5: a little bit taller, a little bit baller", https://arstechnica.com/gadgets/2012/09/iphone-5-a-little-bit-taller-a little-bit-baller, Oct. 14, 2021, 22 pages.
Sleepfreaks, "How to Easily Play/Loop an Event Range in Cubase", https://sleepfreaks-dtm.com/for-advance-cubase/position-3/>, Apr. 4, 2011, 14 pages.
Notice of Allowance, dated Oct. 11, 2021, received in Chinese Patent Application No. 201810826224.6, which corresponds with U.S. Appl. No. 14/536,426, 1 page.
Notice of Allowance, dated Oct. 9, 2021, received in Chinese Patent Application No. 201711425148.X, which corresponds with U.S. Appl. No. 14/536,646, 2 pages.
Office Action, dated Aug. 12, 2021, received in Chinese Patent Application No. 201811142423.1, which corresponds with U.S. Appl. No. 14/536,3, 6 pages.
Office Action, dated Jan. 26, 2021, received in Chinese Patent Application No. 201810632507.7, 5 pages.
Notice of Allowance, dated Aug. 11, 2021, received in Chinese Patent Application No. 201810632507.7, which corresponds with U.S. Appl. No. 14/536,203, 1 page.
Patent, dated Oct. 22, 2021, received in Chinese Patent Application No. 201810632507.7, which corresponds with U.S. Appl. No. 14/536,203, 7 pages.

(56) References Cited

OTHER PUBLICATIONS

Patent, dated Sep. 28, 2021, received in Korean Patent Application No. 2020-7029178, which corresponds with U.S. Appl. No. 14/870,882, 3 pages.
Office Action, dated Oct. 9, 2021, received in Chinese Patent Application No. 201610869950.7, which corresponds with U.S. Appl. No. 14/871,462, 5 pages.
Notice of Allowance, dated Aug. 27, 2021, received in Japanese Patent Application No. 2019-212493, which corresponds with U.S. Appl. No. 15/272,345, 2 pages.
Patent, dated Aug. 18, 2021, received in Japanese Patent Application No. 2019-200174, which corresponds with U.S. Appl. No. 15/499,693, 3 pages.
Notice of Allowance, dated Oct. 22, 2021, received in U.S. Appl. No. 15/785,372, 11 pages.
Notice of Allowance, dated Aug. 26, 2021, received in Korean Patent Application No. 2019-7019946, which corresponds with U.S. Appl. No. 16/154,591, 2 pages.
Patent, dated Sep. 7, 2021, received in Korean Patent Application No. 2019-7019946, which corresponds with U.S. Appl. No. 16/154,591, 4 pages.
Notice of Allowance, dated Sep. 2, 2021, received in U.S. Appl. No. 16/240,672, 13 pages.
Notice of Allowance, dated Sep. 20, 2021, received in Australian Patent Application No. 2019268116, which corresponds with U.S. Appl. No. 16/240,672, 3 pages.
Office Action, dated Aug. 10, 2021, received in European Patent Application No. 19181042.3, which corresponds with U.S. Appl. No. 16/241,883, 7 pages.
Office Action, dated Oct. 1, 2021, received in Japanese Patent Applicat No. 2020-174097, which corresponds with U.S. Appl. No. 16/241,883, 2 pages.
Office Action, dated Sep. 6, 2021, received in Chinese Patent Application No. 201910718931.8, 6 pages.
Notice of Allowance, dated Oct. 25, 2021, received in U.S. Appl. No. 17/003,869, 21 pages.
Office Action, dated Aug. 30, 2021, received in Australian Patent Application No. 2020244406, which corresponds with U.S. Appl. No. 17/003,869, 4 pages.
Office Action, dated Sep. 8, 2021, received in Japanese Patent Application No. 2020-106360, 2 pages.
Final Office Action, dated Sep. 16, 2021, received in U.S. Appl. No. 16/988,509, 38 pages.
Office Action, dated Oct. 26, 2021, received in U.S. Appl. No. 17/103,899 21 pages.
Office Action, dated Mar. 2, 2023, received in Chinese Patent Application No. 202010281684.2, which corresponds with U.S. Appl. No. 14/864,601, 4 pages.
Office Action, dated Mar. 7, 2023, received in Brazilian Patent Application No. 11201701119-9, which corresponds with U.S. Appl. No. 14/871,236, 4 pages.
Office Action, dated Mar. 2, 2023, received in Indian Patent Application No. 202118003907, which corresponds with U.S. Appl. No. 16/243,834, 11 pages.
Office Action, dated Mar. 12, 2023, received in Chinese Patent Application No. 202010281127.0, which corresponds with U.S. Appl. No. 16/252,478, 4 pages.
Final Office Action, dated Feb. 24, 2023, received in U.S. Appl. No. 16/896,141, 23 pages.
Patent, dated Mar. 17, 2023, received in Chinese Patent Application No. 201910718931.8, 7 pages.
Office Action, dated Feb. 22, 2023, received in Chinese Patent Application No. 202010290361.X, which corresponds with U.S. Appl. No. 17/003,869, 4 pages.
Office Action, dated Mar. 16, 2023, received in U.S. Appl. No. 17/351,035, 23 pages.
Notice of Allowance, dated Mar. 6, 2023, received in U.S. Appl. No. 17/524,692, 14 pages.
Notice of Allowance, dated Mar. 24, 2023, received in U.S. Appl. No. 17/666,495, 28 pages.
Office Action, dated Feb. 16, 2023, received in U.S. Appl. No. 17/728,909, 12 pages.
Office Action, dated Mar. 30, 2023, received in U.S. Appl. No. 17/875,307, 15 pages.
Decision to Grant, dated Jun. 17, 2022, received in European Patent Application No. 13795392.3, which corresponds with U.S. Appl. No. 14/608,926, 7 pages.
Decision on Appeal, dated Jun. 9, 2022, received in U.S. Appl. No. 14/609,006, 11 pages.
Office Action, dated Jun. 7, 2022, received in European Patent Application No. 20188553.0, which corresponds with U.S. Appl. No. 15/499,693, 7 pages.
Patent, dated Jun. 14, 2022, received in Japanese Patent Application No. 2020-174097, which corresponds with U.S. Appl. No. 16/241,883, 3 pages.
Office Action, dated Jun. 10, 2022, received in U.S. Appl. No. 17/362,852, 12 pages.
Notice of Allowance, dated May 19, 2023, received in Japanese Patent Application No. 2021-099049, which corresponds with U.S. Appl. No. 16/243,834, 2 pages.
Patent, dated Mar. 16, 2023, received in Australian Patent Application No. 2021200655, which corresponds with U.S. Appl. No. 17/103,899, 3 pages.
Final Office Action, dated Apr. 24, 2023, received in U.S. Appl. No. 17/333,810, 12 pages.
Office Action, dated Sep. 20, 2022, received in Australian Patent Application No. 2021254568, which corresponds with U.S. Appl. No. 17/560,013, 4 pages.
Notice of Allowance, dated Apr. 27, 2023, received in U.S. Appl. No. 18/089,397, 16 pages.
Office Action, dated Aug. 10, 2023, received in Chinese Patent Application No. 201610658351.8, which corresponds with U.S. Appl. No. 14/866,992, 4 pages.
Patent, dated Aug. 4, 2023, received in Indian Patent Application No. 201617032293, which corresponds with U.S. Appl. No. 14/871,227, 4 pages.
Intent to Grant, dated Jun. 1, 2023, received in European Patent Application No. 16711725.8, which corresponds with U.S. Appl. No. 14/867,990, 8 pages.
Decision to Grant, dated Sep. 7, 2023, received in European Patent Application No. 16711725.8, which corresponds with U.S. Appl. No. 14/867,990, 4 pages.
Intent to Grant, dated Aug. 16, 2023, received in European Patent Application No. 20188553.0, which corresponds with U.S. Appl. No. 15/499,693, 10 pages.
Patent, dated Jan. 27, 2023, received in Japanese Patent Application No. 2019-058800, which corresponds with U.S. Appl. No. 16/243,834, 4 pages.
Patent, dated Jun. 19, 2023, received in Japanese Patent Application No. 2021-099049, which corresponds with U.S. Appl. No. 16/243,834, 4 pages.
Patent, dated Jul. 3, 2023, received in Mexican Patent Application No. MX/a/2020/011482, which corresponds with U.S. Appl. No. 16/243,834, 2 pages.
Final Office Action, dated Jul. 14, 2023, received in Japanese Patent Application No. 2021-132350, which corresponds with U.S. Appl. No. 16/258,394, 2 pages.
Final Office Action, dated Jul. 14, 2023, received in Japanese Patent Application No. 2019-047319, which corresponds with U.S. Appl. No. 16/896,141, 2 pages.
Notice of Allowance, dated Aug. 9, 2023, received in U.S. Appl. No. 17/103,899 7 pages.
Final Office Action, dated May 31, 2023, received in U.S. Appl. No. 17/409,573, 22 pages.
Notice of Allowance, dated Jun. 13, 2023, received in Australian Patent Application No. 2022202892, which corresponds with U.S. Appl. No. 15/113,779, 3 pages.
Office Action, dated Aug. 3, 2023, received in U.S. Appl. No. 17/560,013 (7826), 15 pages.
Office Action, dated Jun. 28, 2023, received in Australian Patent Application No. 2021254568, which corresponds with U.S. Appl. No. 17/560,013, 3 pages.

(56) References Cited

OTHER PUBLICATIONS

Patent, dated Jul. 13, 2022, received in European Patent Application No. 13795392.3, which corresponds with U.S. Appl. No. 14/608,926, 4 pages.
Patent, dated Aug. 17, 2022, received in European Patent Application No. 18183789.9, which corresponds with U.S. Appl. No. 16/262,800, 4 pages.
Intent to Grant, dated Jan. 9, 2023, received in European Patent Application No. 16711725.8, which corresponds with U.S. Appl. No. 14/867,990, 7 pages.
Intention to Grant, dated Sep. 26, 2022, received in European Patent Application No. 16753795.0, which corresponds with U.S. Appl. No. 15/009,668, 7 pages.
Decision to Grant, dated Nov. 24, 2022, received in European Patent Application No. 16753795.0, which corresponds with U.S. Appl. No. 15/009,668, 4 pages.
Patent, dated Dec. 21, 2023, received in European Patent Application No. 16753795.0, which corresponds with U.S. Appl. No. 15/009,668, 4 pages.
Notice of Allowance, dated Oct. 14, 2022, received in Japanese Patent Application No. 2021-157204, which corresponds with U.S. Appl. No. 15/272,327, 2 pages.
Notice of Allowance, dated Jan. 20, 2023, reveived in Japanese Patent Application No. 2019-058800, which corresponds with U.S. Appl. No. 16/243,834, 2 pages.
Office Action, dated Jan. 5, 2023, received in Mexican Patent Application No. MX/a/2020/011482, which corresponds with U.S. Appl. No. 16/243,834, 5 pages.
Office Action, dated Oct. 3, 2022, received in Japanese Patent Application No. 2021-132350, which corresponds with U.S. Appl. No. 16/258,394, 2 pages.
Patent, dated Nov. 25, 2022, received in Chinese Patent Application No. 201910610331.X, 7 pages.
Notice of Allowance, dated Jan. 5, 2023, received in Chinese Patent Application No. 201910718931.8, 4 pages.
Office Action, dated Dec. 16, 2022, received in Australian Patent Application No. 2022200212, 3 pages.
Office Action, dated Jan. 5, 2023, received in Japanese Patent Application No. 2022-031194, which corresponds with U.S. Appl. No. 17/003,869, 6 pages.
Patent, dated Dec. 22, 2022, received in Australian Patent Application No. 2020257134, 3 pages.
Notice of Allowance, dated Oct. 18, 2022, received in Korean Patent Application No. 2022-7005994, 5 pages.
Final Office Action, dated Jan. 24, 2023, received in U.S. Appl. No. 17/103,899 27 pages.
Notice of Acceptance, dated Nov. 10, 2022, received in Australian Patent Application No. 2021200655, which corresponds with U.S. Appl. No. 17/103,899, 4 pages.
Office Action, dated Nov. 8, 2022, received in U.S. Appl. No. 17/333,810, 9 pages.
Office Action, dated Nov. 9, 2022, received in U.S. Appl. No. 17/409,573, 20 pages.
Office Action, dated Jan. 11, 2023, received in Australian Patent Application No. 2022202892, which corresponds with U.S. Appl. No. 15/113,779, 3 pages.
Office Action, dated Nov. 28, 2022, received in U.S. Appl. No. 17/560,013, 13 pages.
Microsoft, "Windows 7 Aero Shake, Snap, and Peek", hr.msu.edu. techtipshrsds/window 7 snappeekandshake.pdf, Apr. 4, 2012, 6 pages.
Decision to Grant, dated Jul. 21, 2022, received in European Patent Application No. 18183789.9, which corresponds with U.S. Appl. No. 16/262,800, 3 pages.
Office Action, dated Jul. 29, 2022, received in Indian Patent Application No. 202118007136, which corresponds with U.S. Appl. No. 14/866,511, 9 pages.
Office Action, dated Aug. 23, 2022, received in European Patent Application No. 19194418.0, which corresponds with U.S. Appl. No. 14/864,580, 6 pages.
Office Action, dated Jul. 25, 2022, received in Japanese Patent Application No. 2021-099049, which corresponds with U.S. Appl. No. 16/243,834, 2 pages.
Office Action, dated Jul. 18, 2022, received in Mexican Patent Application No. MX/a/2020/011482, which corresponds with U.S. Appl. No. 16/243,834, 4 pages.
Final Office Action, dated Sep. 16, 2022, received in Japanese Patent Application No. 2019-047319, which corresponds with U.S. Appl. No. 16/896,141, 2 pages.
Office Action, dated Jul. 18, 2022, received in Chinese Patent Application No. 201910718931.8, 2 pages.
Final Office Action, dated Jul. 18, 2022, received in U.S. Appl. No. 16/685,773, 20 pages.
Notice of Allowance, dated Aug. 23, 2022, received in Australian Patent Application No. 2020257134, 2 pages.
Office Action, date Aug. 19, 2022, received in U.S. Appl. No. 17/103,899 24 pages.
Notice of Allowance, dated Aug. 24, 2022, received in U.S. Appl. No. 17/362,852, 9 pages.
Notice of Allowance, dated Sep. 22, 2022, received in U.S. Appl. No. 17/524,692, 22 pages.
Patent, dated Aug. 10, 2022, received in Korean Patent Application No. 2022-7015718, 6 pages.
Patent, dated Sep. 15, 2023, received in Chinese Patent Application No. 202010281684.2, which corresponds with U.S. Appl. No. 14/864,601, 7 pages.
Patent, dated Sep. 12, 2023, received in Chinese Patent Application No. 202010281127.0, which corresponds with U.S. Appl. No. 16/252,478, 8 pages.
Patent, dated Sep. 12, 2023, received in Chinese Patent Application No. 202010290361.X, which corresponds with U.S. Appl. No. 17/003,869, 7 pages.
Office Action, dated Sep. 18, 2023, received in U.S. Appl. No. 17/333,810, 12 pages.
Final Office Action, dated Sep. 21, 2023, received in U.S. Appl. No. 17/875,307, 16 pages.
Notice of Allowance, dated Sep. 21, 2023, received in Korean Patent Application No. 2023-702268, 2 pages.
Notice of Allowance, dated Jan. 8, 2024, received in Chinese Patent Application No. 201610658351.8, which corresponds with U.S. Appl. No. 14/866,992, 2 pages.
Patent, dated Feb. 27, 2024, received in Chinese Patent Application No. 201610658351.8, which corresponds with U.S. Appl. No. 14/866,992, 8 pages.
Intent to Grant, dated Feb. 16, 2024, received in European Patent Application No. 20188553.0, which corresponds with U.S. Appl. No. 15/499,693, 8 pages.
Office Action, dated Jan. 5, 2024, received in Chinese Patent Application No. 202010969867.3, which corresponds with U.S. Appl. No. 16/262,784, 2 pages.
Notice of Allowance, dated Jan. 12, 2024, received in Japanese Patent Application No. 2021-132350, which corresponds with U.S. Appl. No. 16/258,394, 2 pages.
Patent, dated Jan. 25, 2024, received in Japanese Patent Application No. 2022-031194, which corresponds with U.S. Appl. No. 17/333,810, 3 pages.
Notice of Allowance, dated Dec. 6, 2023, received in U.S. Appl. No. 17/333,810 9 pages.
Notice of Allowance, dated Mar. 1, 2024, received in U.S. Appl. No. 17/333,810, 8 pages.
Notice of Allowance, dated Mar. 14, 2024, received in U.S. Appl. No. 17/351,035, 8 pages.
Notice of Allowance, dated Feb. 2, 2024, received in U.S. Appl. No. 17/728,909, 8 pages.
Office Action, dated Dec. 13, 2023, received in Australian Patent Application No. 2023226703, which corresponds with U.S. Appl. No. 18/089,397, 2 pages.
Office Action, dated Feb. 19, 2024, received in Australian Patent Application No. 2022-283731, 5 pages.
Patent, dated Dec. 21, 2023, received in Korean Patent Application No. 2023-702268, 5 pages.

(56) References Cited

OTHER PUBLICATIONS

Office Action, dated Nov. 6, 2023, received in Chinese Patent Application No. 201610658351.8, which corresponds with U.S. Appl. No. 14/866,992, 2 pages.
Office Action, dated Oct. 30, 2023, received in European Patent Application No. 19194418.0, which corresponds with U.S. Appl. No. 14/864,580, 9 pages.
Patent, dated Nov. 6, 2023, received in Indian Patent Application No. 201617032291, which corresponds with U.S. Appl. No. 14/866,987, 4 pages.
Patent, dated Oct. 4, 2023, received in European Patent Application No. 16711725.8, which corresponds with U.S. Appl. No. 14/867,990, 2 pages.
Notice of Allowance, dated Oct. 20, 2023, received in Australian Patent Application No. 2022200212, 3 pages.
Final Office Action, dated Oct. 30, 2023, received in U.S. Appl. No. 17/351,035, 23 pages.
Notice of Allowance, dated Dec. 13, 2023, received in U.S. Appl. No. 17/409,573, 11 pages.
Patent, dated Oct. 12, 2023, received in Australian Patent Application No. 2022202892, which corresponds with U.S. Appl. No. 15/113,779, 3 pages.
Notice of Allowance, dated Nov. 22, 2023, received in U.S. Appl. No. 17/560,013, 13 pages.
Grant Certificate, dated Oct. 26, 2023, received in Australian Patent Application No. 2021254568, which corresponds with U.S. Appl. No. 17/560,013, 3 pages.
Final Office Action, dated Oct. 24, 2023, received in U.S. Appl. No. 17/728,909, 14 pages.
Office Action, dated Apr. 6, 2024, received in Indian Patent Application No. 201818015139, which corresponds with U.S. Appl. No. 15/136,782, 12 pages.
Patent, dated Feb. 14, 2024, received in Japanese Patent Application No. 2021-132350, which corresponds with U.S. Appl. No. 16/258,394, 3 pages.
Office Action, dated Mar. 22, 2024, received in Chinese Patent Application No. 202110696612,9, which corresponds with U.S. Appl. No. 16/896,141, 5 pages.
Patent, dated Feb. 8, 2024, received in Japanese Patent Application No. 2019-047319, which corresponds with U.S. Appl. No. 16/896,141, 3 pages.
Notice of Allowance, dated Apr. 2, 2024, received in U.S. Appl. No. 17/875,307, 18 pages.
Extended European Search Report, dated Oct. 7, 2024, received in European U.S. Appl. No. 16/258,394, which corresponds with U.S. Appl. No. 16/258,394, 11 pages.
Intent to Grant, dated Jan. 28, 2025, received in European U.S. Appl. No. 14/864,580, which corresponds with U.S. Appl. No. 14/864,580, 8 pages.
Grant Decision, dated Sep. 19, 2024, received in European U.S. Appl. No. 14/866,987, which corresponds with U.S. Appl. No. 14/866,987, 3 pages.
Patent, dated Oct. 16, 2024, received in European U.S. Appl. No. 14/866,987, which corresponds with U.S. Appl. No. 14/866,987, 2 pages.
Office Action, dated Jun. 18, 2024, received in Korean Patent Application No. 2023-7044331, which corresponds with U.S. Appl. No. 14/866,989, 5 pages.
Notice of Allowance, dated Aug. 28, 2024, received in Korean Patent Application No. 2023-7044331, which corresponds with U.S. Appl. No. 14/866,989, 3 pages.
Patent, dated Nov. 28, 2024, received in Korean Patent Application No. 2023-7044331, which corresponds with U.S. Appl. No. 14/866,989, 5 pages.
Office Action, dated Jun. 6, 2024, received in Brazilian Patent Application No. 11201701119-9, which corresponds with U.S. Appl. No. 14/871,236, 5 pages.
Office Action, dated Sep. 18, 2024, received in Brazilian Patent Application No. 11201701119-9, which corresponds with U.S. Appl. No. 14/871,236, 6 pages.
Office Action, dated Nov. 6, 2024, received in Brazilian Patent Application No. 11201701119-9, which corresponds with U.S. Appl. No. 14/871,236, 3 pages.
Office Action, dated Sep. 5, 2024, received in U.S. Appl. No. 18/220,785, 32 pages.
Patent, dated Oct. 24, 2024, received in Japanese Patent Application No. 2022-181211 which corresponds with U.S. Appl. No. 15/272,341, 4 pages.
Decision to Grant, dated Jun. 27, 2024, received in European Patent Application No. 20188553.0, which corresponds with U.S. Appl. No. 15/499,693, 4 pages.
Patent, dated Jul. 24, 2024, received in European Patent Application No. 20188553.0, which corresponds with U.S. Appl. No. 15/499,693, 3 pages.
Grant Certificate, dated Oct. 2, 2024, received in European Patent Application No. 19195414.8, which corresponds with U.S. Appl. No. 16/240,672, 4 pages.
Office Action, dated Sep. 6, 2024, received in Chinese Patent Application No. 202010969867.3, which corresponds with U.S. Appl. No. 16/262,784, 2 pages.
Notice of Allowance, dated Nov. 18, 2024, received in Chinese Patent Application No. 202010969867.3, which corresponds with U.S. Appl. No. 16/262,784, 2 pages.
Patent, dated Jan. 14, 2025, received in Chinese Patent Application No. 202010969867.3, which corresponds with U.S. Appl. No. 16/262,784, 4 pages.
Patent, dated Dec. 20, 2024, received in Chinese Patent Application No. 202010969866.9, which corresponds with U.S. Appl. No. 16/262,800, 5 pages.
Patent, dated Feb. 21, 2024, received in European Patent Application No. 19181042.3, which corresponds with U.S. Appl. No. 16/241,883, 4 pages.
Office Action, dated Nov. 14, 2024, received in Chinese Patent Application No. 202110696612,9, which corresponds with U.S. Appl. No. 16/896,141, 1 page.
Office Action, dated Mar. 5, 2025, received in Chinese Patent Application No. 202110696612,9, which corresponds with U.S. Appl. No. 16/896,141, 4 pages.
Notice of Allowance, dated May 20, 2024, received in Chinese Patent Application No. 202110001688.5, which corresponds with U.S. Appl. No. 16/509,438, 2 pages.
Patent, dated Aug. 2, 2024, received in Chinese Patent Application No. 202110001688.5, which corresponds with U.S. Appl. No. 16/509,438, 6 pages.
Office Action, dated Oct. 24, 2024, received in Chinese Patent Application No. 1202110688699.5, which corresponds with U.S. Appl. No. 18/906,083, 4 pages.
Notice of Allowance, dated Jun. 21, 2024, received in Japanese Patent Application No. 2023-004606, 2 pages.
Notice of Allowance, dated Oct. 7, 2024, received in Australian Patent Application No. 2023226703, which corresponds with U.S. Appl. No. 18/089,397, 5 pages.
Grant Certificate, dated Feb. 6, 2025, received in Australian Patent Application No. 2023226703, which corresponds with U.S. Appl. No. 18/089,397, 3 pages.
Notice of Allowance, dated Sep. 13, 2024, received in U.S. Appl. No. 17/875,307, 6 pages.
Office Action, dated Oct. 31, 2024, received in U.S. Appl. No. 18/527,137, 21 pages.
Final Office Action, dated Feb. 26, 2025, received in U.S. Appl. No. 18/527,137, 16 pages.
Office Action, dated Jun. 24, 2024, received in Japanese Patent Application No. 2023-098687, which corresponds with U.S. Appl. No. 18/527,137, 8 pages.
Patent, dated Jan. 31, 2025, received in Japanese Patent Application No. 2023-098687, which corresponds with U.S. Appl. No. 18/527,137, 7 pages.
Office Action, dated Jun. 17, 2024, received in U.S. Appl. No. 18/522,096, 16 pages.
Office Action, dated Dec. 5, 2024, received in U.S. Appl. No. 18/414,365, 17 pages.
Office Action, dated Dec. 17, 2024, received in U.S. Appl. No. 18/667,286, 13 pages.

(56) References Cited

OTHER PUBLICATIONS

Patent, dated Mar. 26, 2025, received in Indian Patent Application No. 202118007136, which corresponds with U.S. Appl. No. 14/866,511, 6 pages.
Notice of Allowance, dated Mar. 17, 2025, received in U.S. Appl. No. 18/220,785, 6 pages.
Notice of Allowance, dated Feb. 28, 2025, received in U.S. Appl. No. 18/522,096, 7 pages.
Grant Certificate, dated Apr. 17, 2025, received in Australian Patent Application No. 2022-283731, 3 pages.

* cited by examiner

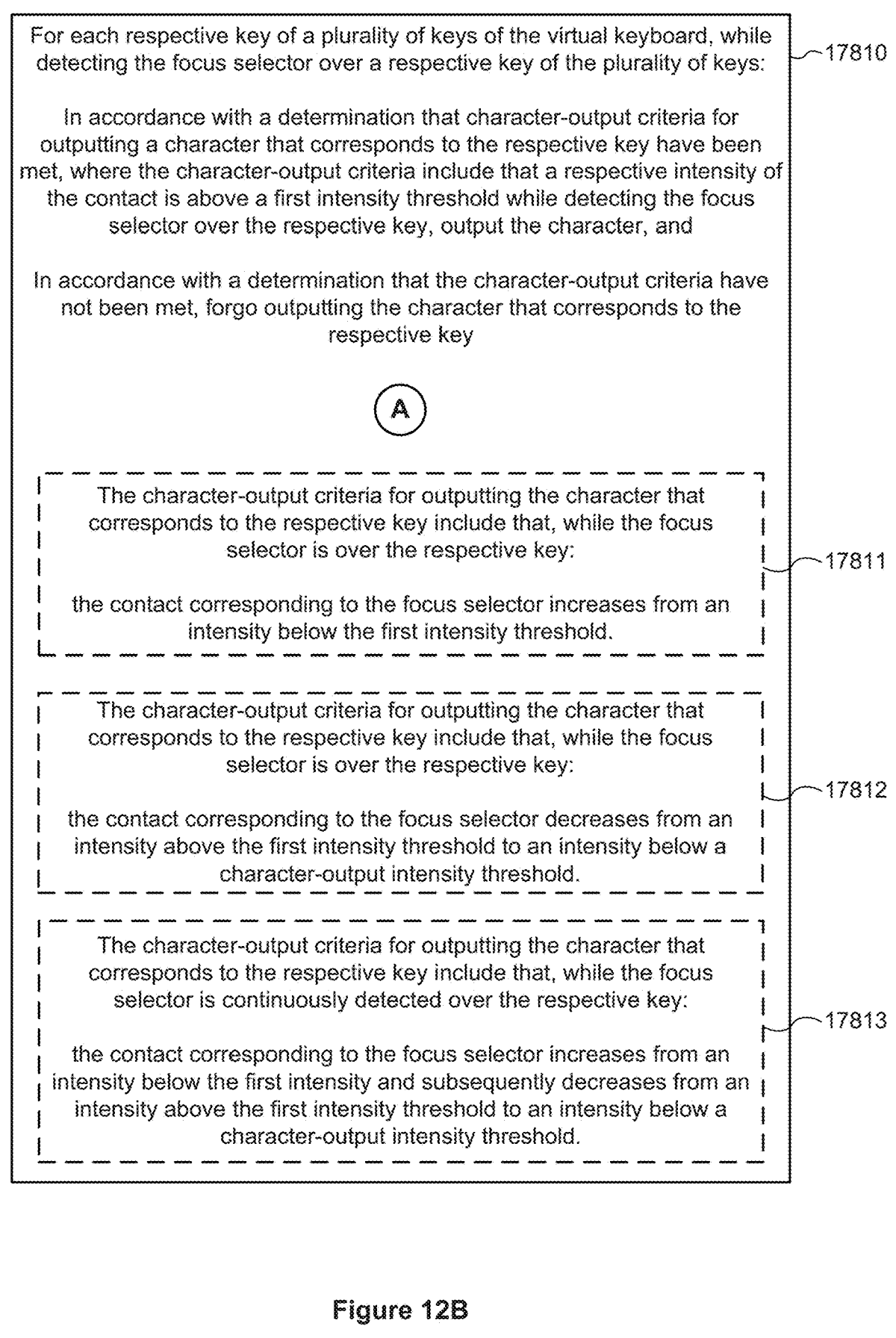

For each respective key of a plurality of keys of the virtual keyboard, while detecting the focus selector over a respective key of the plurality of keys: 17810

In accordance with a determination that character-output criteria for outputting a character that corresponds to the respective key have been met, where the character-output criteria include that a respective intensity of the contact is above a first intensity threshold while detecting the focus selector over the respective key, output the character, and In accordance with a determination that the character-output criteria have not been met, forgo outputting the character that corresponds to the respective key (A)

The character-output criteria for outputting the character that corresponds to the respective key include that, while the focus selector is over the respective key: 17811 the contact corresponding to the focus selector increases from an intensity below the first intensity threshold.

The character-output criteria for outputting the character that corresponds to the respective key include that, while the focus selector is over the respective key: 17812 the contact corresponding to the focus selector decreases from an intensity above the first intensity threshold to an intensity below a character-output intensity threshold.

The character-output criteria for outputting the character that corresponds to the respective key include that, while the focus selector is continuously detected over the respective key: 17813 the contact corresponding to the focus selector increases from an intensity below the first intensity and subsequently decreases from an intensity above the first intensity threshold to an intensity below a character-output intensity threshold.

Figure 12B

DEVICE, METHOD, AND GRAPHICAL USER INTERFACE FOR SELECTING USER INTERFACE OBJECTS

RELATED APPLICATIONS

This application is a continuation of U.S. patent application Ser. No. 16/145,954, filed Sep. 28, 2018, which is a continuation of U.S. patent application Ser. No. 14/536,267, filed Nov. 7, 2014, now U.S. Pat. No. 10,095,391, which is a continuation of PCT Patent Application Serial No. PCT/US2013/040101, filed on May 8, 2013, entitled "Device, Method, and Graphical User Interface for Selecting User Interface Objects," which claims the benefit of and priority to U.S. Provisional Patent Application Ser. No. 61/778,413, filed on Mar. 13, 2013, entitled "Device, Method, and Graphical User Interface for Selecting User Interface Objects;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, California), an image management application (e.g., Aperture or iPhoto from Apple Inc. of Cupertino, California), a digital content (e.g., videos and music) management application (e.g., iTunes from Apple Inc. of Cupertino, California), a drawing application, a presentation application (e.g., Keynote from Apple Inc. of Cupertino, California), a word processing application (e.g., Pages from Apple Inc. of Cupertino, California), a website creation application (e.g., iWeb from Apple Inc. of Cupertino, California), a disk authoring application (e.g., iDVD from Apple Inc. of Cupertino, California), or a spreadsheet application (e.g., Numbers from Apple Inc. of Cupertino, California).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for determining whether to select a user interface object or forgo selecting the user interface object. Such methods and interfaces may complement or replace conventional methods for selecting user interface objects. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes displaying a first user interface object at a first location on the display, detecting a contact with the touch-sensitive surface, and detecting first movement of the contact across the touch-sensitive surface that corresponds to movement of a focus selector toward the first location. The method further includes, in response to detecting the first movement of the contact, moving the focus selector from a location remote from the first user interface object to the first location, and determining an intensity of the contact on the touch-sensitive surface while the focus selector is at the first location. The method also includes, after detecting the first movement of the contact, detecting second movement of the contact across the touch-sensitive surface that corresponds to movement of the focus selector away from the first location. The method further includes, in response to detecting the second movement of the contact, in accordance with a determination that the contact meets selection criteria for the first user interface object, where the selection criteria for the first user interface object include that the contact meets a predefined intensity threshold while the focus selector is at the first location, moving the focus selector and the first user interface object away from the first location in accordance with the second movement of the contact; and in accordance with a determination that the contact does not meet the selection criteria for the first user interface object, moving the focus selector in accordance with the second movement of the contact without moving the first user interface object.

In accordance with some embodiments, an electronic device includes a display unit configured to display a first user interface object at a first location on the display unit, a touch-sensitive surface unit configured to detect a contact, one or more sensor units configured to detect intensity of contacts with the touch-sensitive surface unit, and a processing unit coupled to the display unit, the one or more sensor units and the touch-sensitive surface unit. The processing unit is configured to: detect first movement of the contact across the touch-sensitive surface unit that corresponds to movement of a focus selector toward the first location. In response to detecting the first movement of the contact, the processing unit is configured to: move the focus selector from a location remote from the first user interface object to the first location, and determine an intensity of the contact on the touch-sensitive surface unit while the focus selector is at the first location. The processing unit is further configured to, after detecting the first movement of the contact, detect second movement of the contact across the touch-sensitive surface unit that corresponds to movement of the focus selector away from the first location. The processing unit is also configured to, in response to detecting the second movement of the contact, in accordance with a determination that the contact meets selection criteria for the first user interface object, where the selection criteria for the first user interface object include that the contact meets a predefined intensity threshold while the focus selector is at the first location, move the focus selector and the first user interface object away from the first location in accordance with the second movement of the contact; and, in accordance with a determination that the contact does not meet the selection criteria for the first user interface object, move the focus selector in accordance with the second movement of the contact without moving the first user interface object.

Thus, electronic devices with displays, touch-sensitive surfaces and one or more sensors to detect intensity of contacts with the touch-sensitive surface are provided with faster, more efficient methods and interfaces for determining whether to select a user interface object or forgo selecting the user interface object, thereby increasing the effectiveness, efficiency, and user satisfaction with such devices. Such methods and interfaces may complement or replace conventional methods for selecting user interface objects.

There is a need for electronic devices with faster, more efficient methods and interfaces for selecting user interface objects. Such methods and interfaces may complement or replace conventional methods for selecting user interface objects. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes displaying, on the display, a plurality of user interface objects, including a first user interface object and a second user interface object. The method further includes detecting a first press input that corresponds to an increase in intensity of a contact above a first intensity threshold on the touch-sensitive surface while a focus selector is over the first user interface object. The method further includes, in response to detecting the first press input, the method includes selecting the first user interface object, and after selecting the first user interface object, detecting a second press input that corresponds to an increase in intensity of a contact above a second intensity threshold on the touch-sensitive surface while the focus selector is over the second user interface object. The method also includes, in response to detecting the second press input, selecting the second user interface object and maintaining selection of the first user interface object.

In accordance with some embodiments, an electronic device includes a display unit configured to display a plurality of user interface objects, including a first user interface object and a second user interface object; a touch-sensitive surface unit configured to detect a gesture that includes a press input from a contact; one or more sensor units configured to detect intensity of contacts with the touch-sensitive surface unit; and a processing unit coupled to the display unit, the touch-sensitive surface unit, and the one or more sensor units. The processing unit is configured to detect a first press input that corresponds to an increase in intensity of a contact above a first intensity threshold on the touch-sensitive surface unit while a focus selector is over the first user interface object. In response to detecting the first press input, the processing unit is configured to select the first user interface object and, after selecting the first user interface object, detect a second press input that corresponds to an increase in intensity of a contact above a second intensity threshold on the touch-sensitive surface unit while the focus selector is over the second user interface object. In response to detecting the second press input, the processing unit is configured to select the second user interface object and maintain selection of the first user interface object.

Thus, electronic devices with displays, touch-sensitive surfaces and one or more sensors to detect intensity of contacts with the touch-sensitive surface are provided with faster, more efficient methods and interfaces for selecting user interface objects, thereby increasing the effectiveness, efficiency, and user satisfaction with such devices. Such methods and interfaces may complement or replace conventional methods for selecting user interface objects.

There is a need for electronic devices with faster, more efficient methods and interfaces for typing characters on a virtual keyboard while detecting a continuous contact on a touch-sensitive surface. Such methods and interfaces may complement or replace conventional methods for typing characters on a virtual keyboard. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a virtual keyboard on the display and detecting a contact on the touch-sensitive surface. The method further includes, while continuously detecting the contact on the touch-sensitive surface, detecting one or more movements of the contact on the touch-sensitive surface that correspond to movement of a focus selector over the virtual keyboard. The method further includes, for each respective key of a plurality of keys of the virtual keyboard, while detecting the focus selector over a respective key of the plurality of keys, in accordance with a determination that character-output criteria for outputting a character that corresponds to the respective key have been met, where the character-output criteria include that a respective intensity of the contact is above a first intensity threshold while detecting the focus selector over the respective key, outputting the character. The method further includes, in accordance with a determination that the character-output criteria have not been met, forgoing outputting the character that corresponds to the respective key.

In accordance with some embodiments, an electronic device includes a display unit configured a display a virtual keyboard, a touch-sensitive surface unit configured to a contact, one or more sensor units to detect intensity of contacts on the touch sensitive surface unit and a processing unit coupled to the display unit and the touch-sensitive surface unit. The processing unit is configured to, while continuously detecting the contact on the touch-sensitive surface unit: detect one or more movements of the contact on the touch-sensitive surface unit that correspond to movement of a focus selector over the virtual keyboard; and for each respective key of a plurality of keys of the virtual keyboard, while detecting the focus selector over a respective key of the plurality of keys: in accordance with a determination that character-output criteria for outputting a character that corresponds to the respective key have been met, wherein the character-output criteria include that a respective intensity of the contact is above a first intensity threshold while detecting the focus selector over the respective key, output the character; and in accordance with a determination that the character-output criteria have not been met, forgo outputting the character that corresponds to the respective key.

Thus, electronic devices with displays, touch-sensitive surfaces and one or more sensors to detect intensity of contacts with the touch-sensitive surface are provided with faster, more efficient methods and interfaces for typing characters on a virtual keyboard, thereby increasing the effectiveness, efficiency, and user satisfaction with such devices. Such methods and interfaces may complement or replace conventional methods for typing characters on a virtual keyboard.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 12A-12D are flow diagrams illustrating a method of typing characters on a virtual keyboard in accordance with some embodiments.

DESCRIPTION OF EMBODIMENTS

Figure 1A:
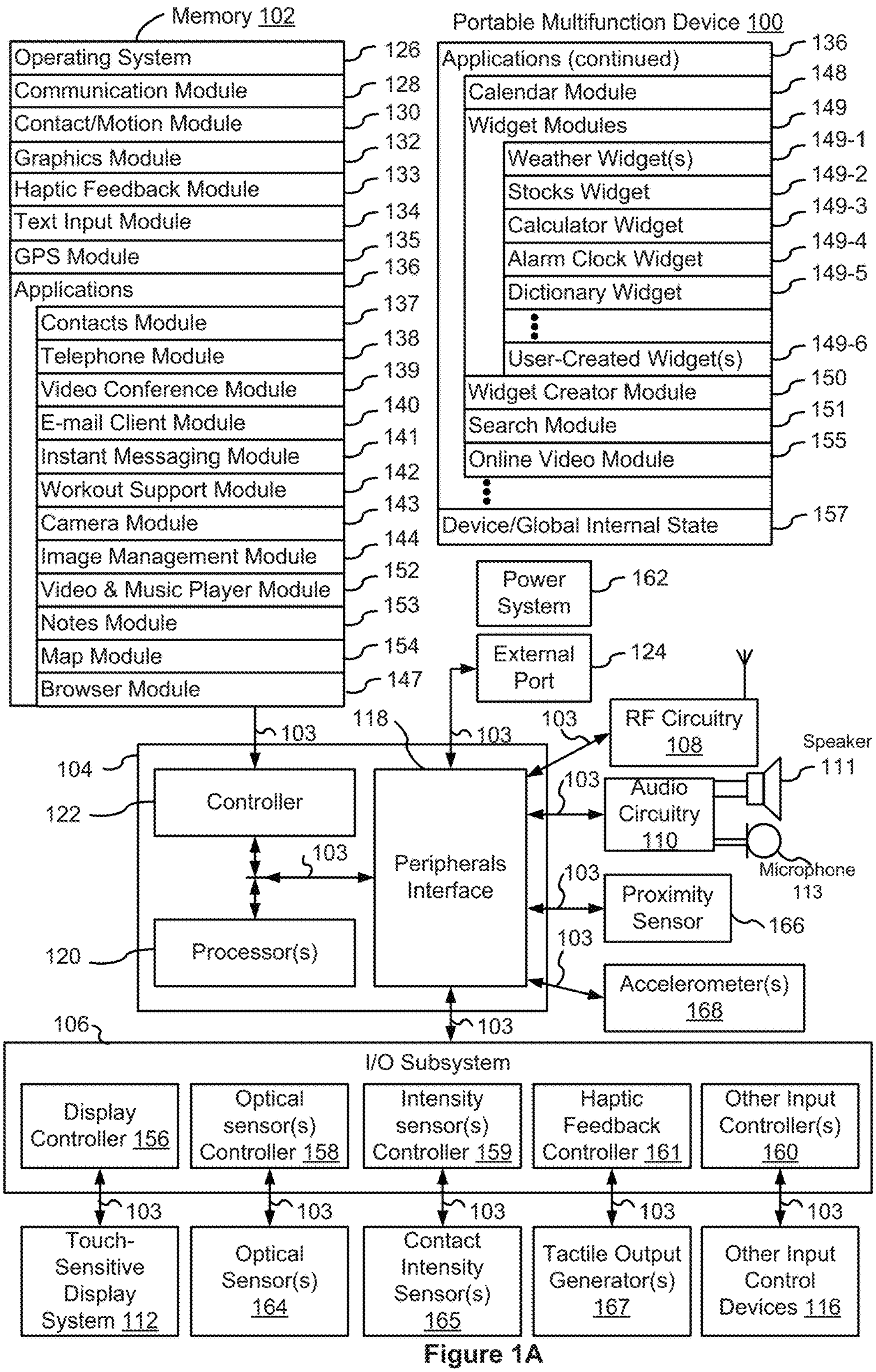
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

Figure 5A:
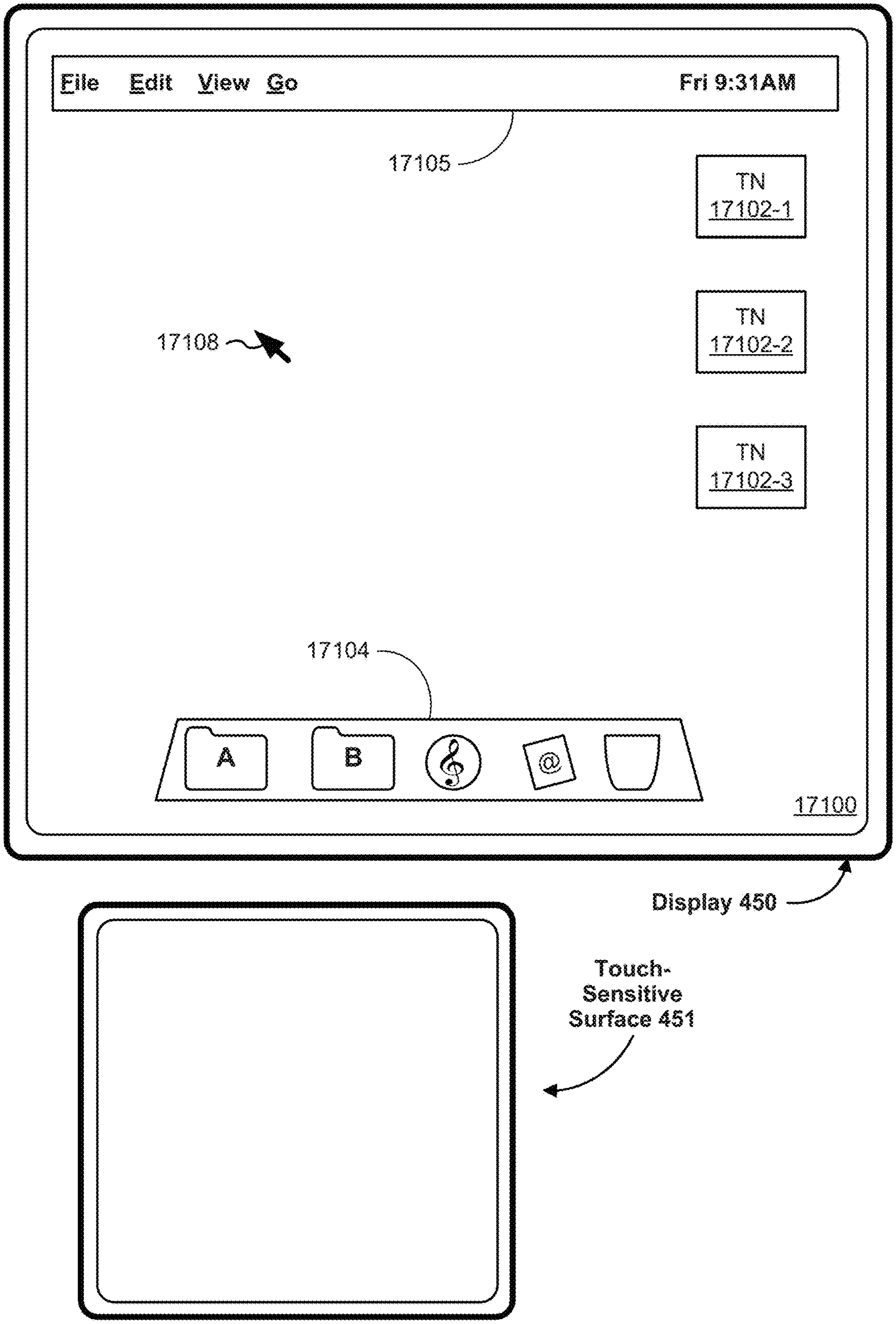
FIGS. 5A-5AA illustrate exemplary user interfaces for determining whether to select a user interface object or forgo selecting a user interface object in accordance with some embodiments.
Figure 11A:
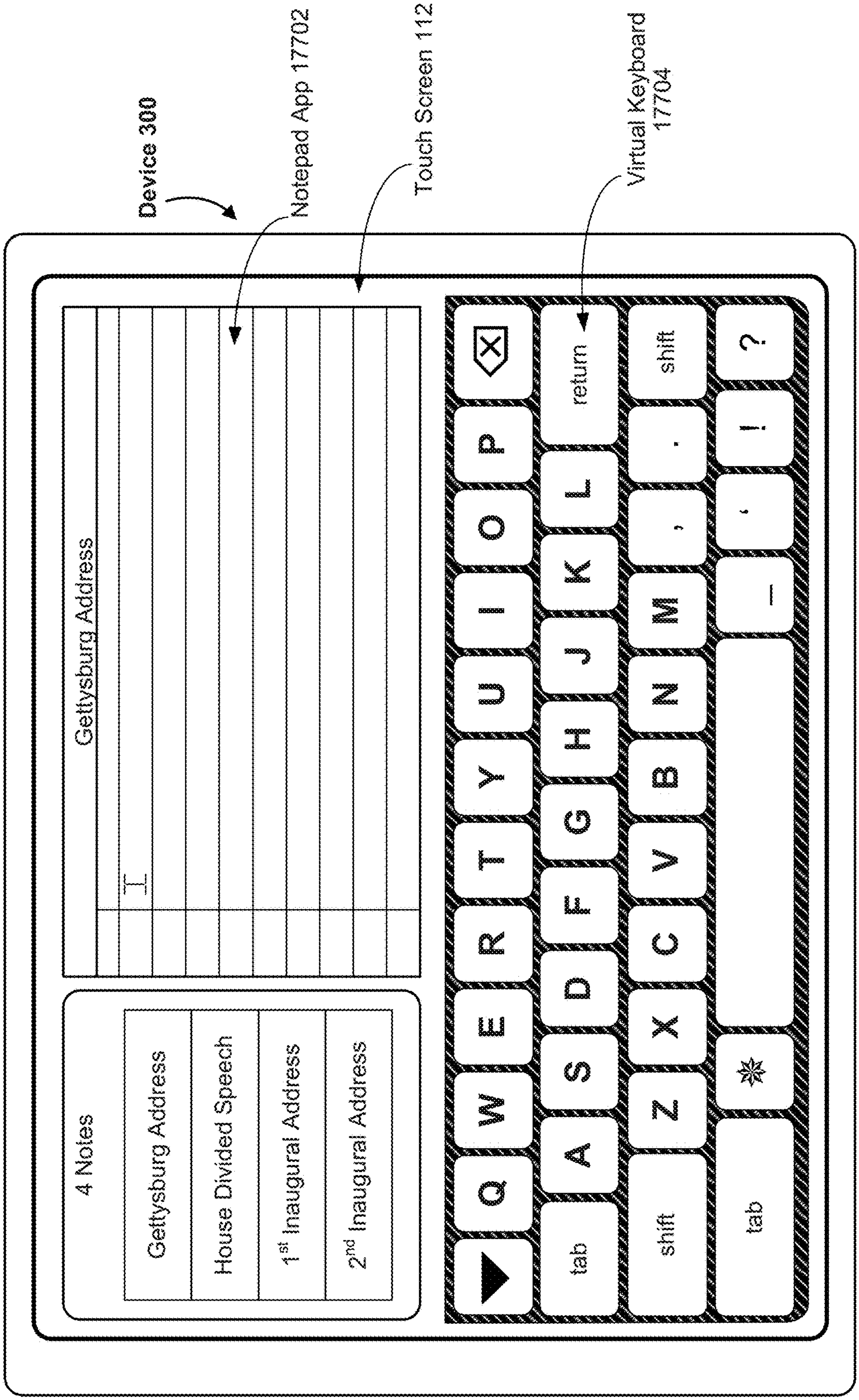
FIGS. 11A-11T illustrate exemplary user interfaces for typing characters on a virtual keyboard in accordance with some embodiments.
Figure 11B:
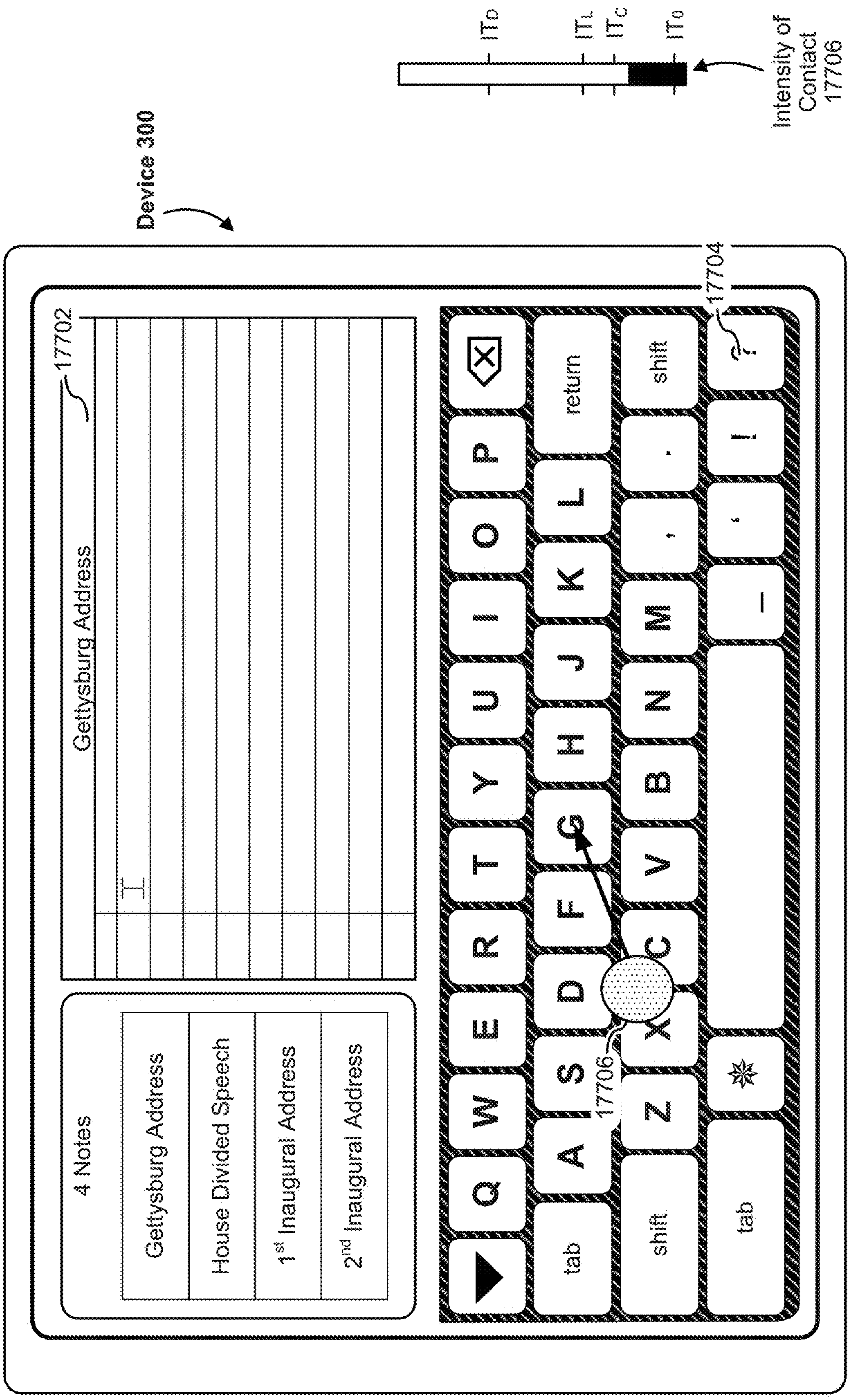

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

- Many electronic devices have graphical user interfaces that display user interface objects such as thumbnails, icons, folders, and thumb/handles in scrubbers and slider bar. Often, a user of an electronic device will want to select and move user interface objects on a display. However, selecting user interface objects sometimes includes multiple steps performed by a user that can be confusing and time consuming for a user. The embodiments described below provide an effective, efficient method of determining whether or not to select a user interface object, based on an intensity of a contact with a touch-sensitive surface. FIGS. 5A-5AA illustrate exemplary user interfaces for determining whether to select a user interface object or forgo selecting a user interface object in accordance with some embodiments. The user interfaces in FIGS. 5A-5AA are used to illustrate the processes in FIGS. 6A-6E.
- Many electronic devices have graphical user interfaces that display user interface objects such as thumbnails, icons, folders, and thumb/handles in scrubbers and slider bar on a display. Often, a user of an electronic device will want to select and move user interface objects on the display. However, selecting user interface objects sometimes includes multiple steps performed by a user that can be confusing and time consuming for a user. The embodiments described below provide an efficient, intuitive method, implemented on an electronic device with a touch-sensitive surface, for determining whether to select a user interface object, or forgo selecting a user interface object, based on an intensity of a contact with the touch-sensitive surface. Below, FIGS. 8A-8DD illustrate exemplary user interfaces for selecting user interface objects. FIGS. 9A-9E are flow diagrams illustrating a method of selecting user interface objects. The user interfaces in FIGS. 8A-8DD are used to illustrate the processes in FIGS. 9A-9E.
- Many electronic devices with touch-sensitive surfaces, such as portable multifunction devices with touch screen displays, have graphical user interfaces with displayed virtual keyboards for typing characters for output in, for example, e-mail messages, notepad applications, search fields. Some methods for entering a character or a sequence of characters (e.g., entering an input into the device that corresponds to a request to output a character or multiple characters) require separate contacts on a touch-sensitive surface for each character entered. However, entering characters with a separate contact for each character entered can be inefficient and time consuming for a user. In the embodiments described below, a faster and more efficient method for accurately typing characters on a virtual keyboard is provided where a sequence of characters can be selected with a continuous contact in response to detecting an increase in intensity of the contact while the contact is over keys corresponding to the characters. In particular, FIGS. 11A-11T illustrate exemplary user interfaces for typing characters on a virtual keyboard. FIGS. 12A-12D are flow diagrams illustrating a method of typing characters on a virtual keyboard. The user interfaces in FIGS. 11A-11T are used to illustrate the processes in FIGS. 12A-12D.

EXEMPLARY DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user.

Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
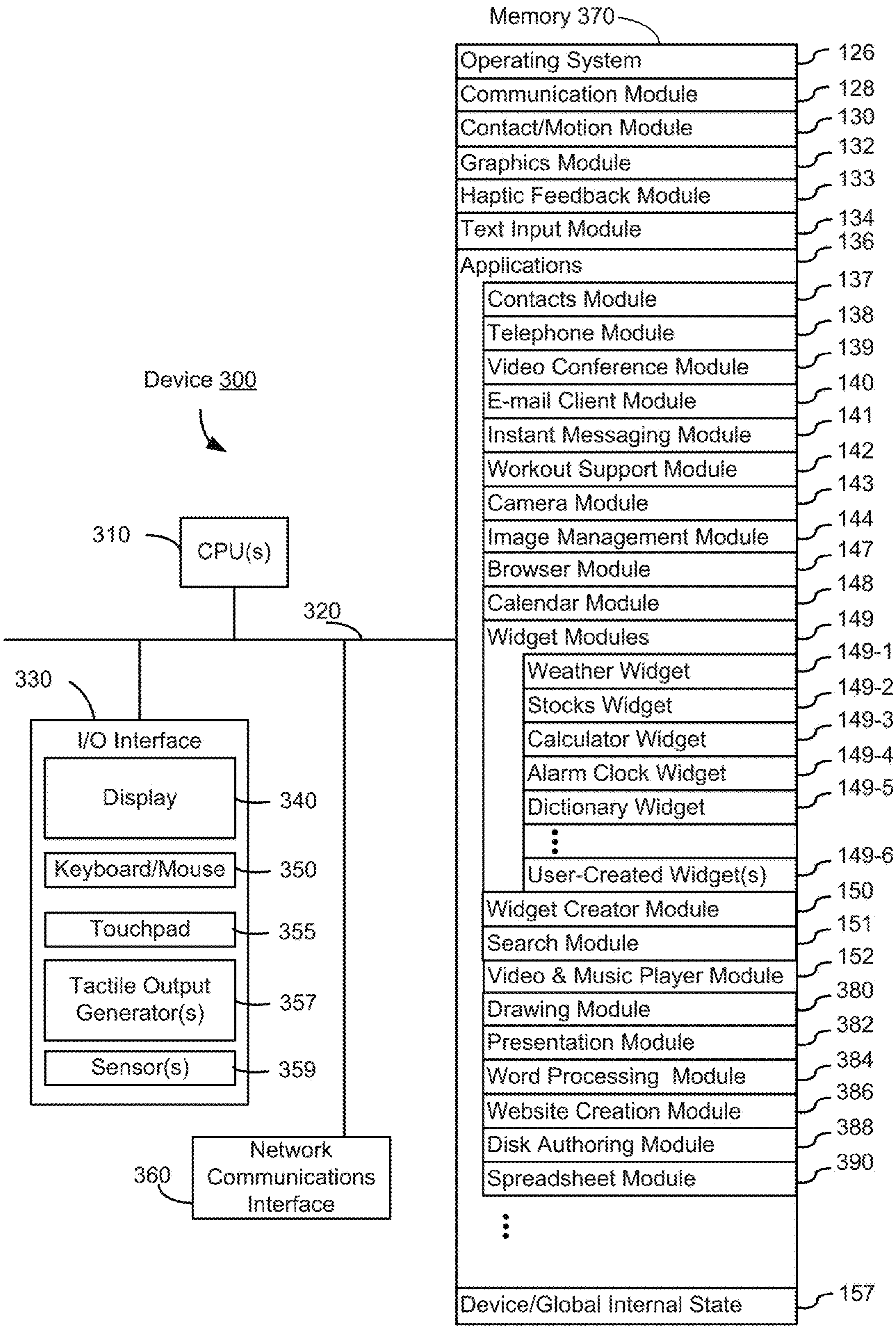
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
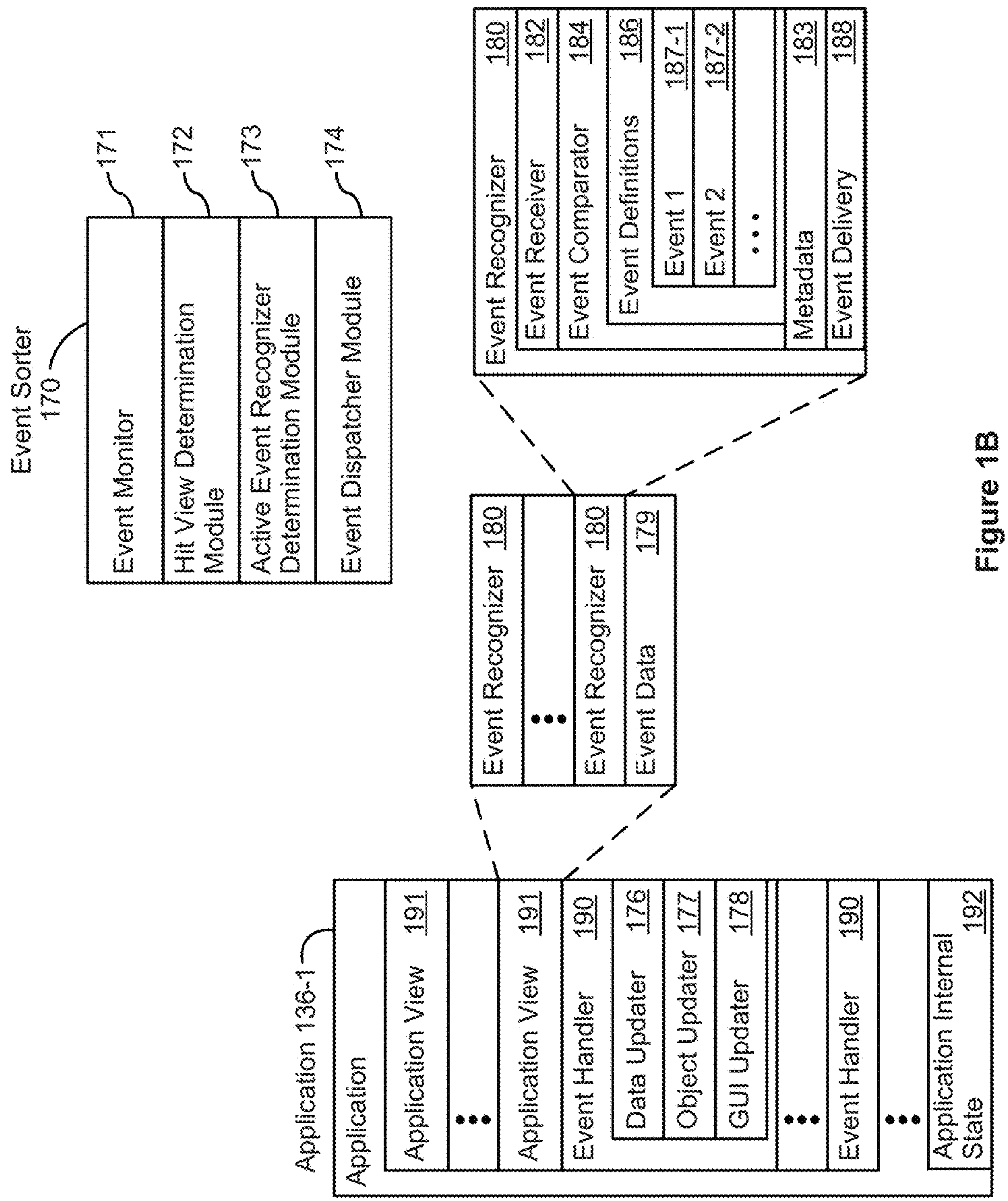
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
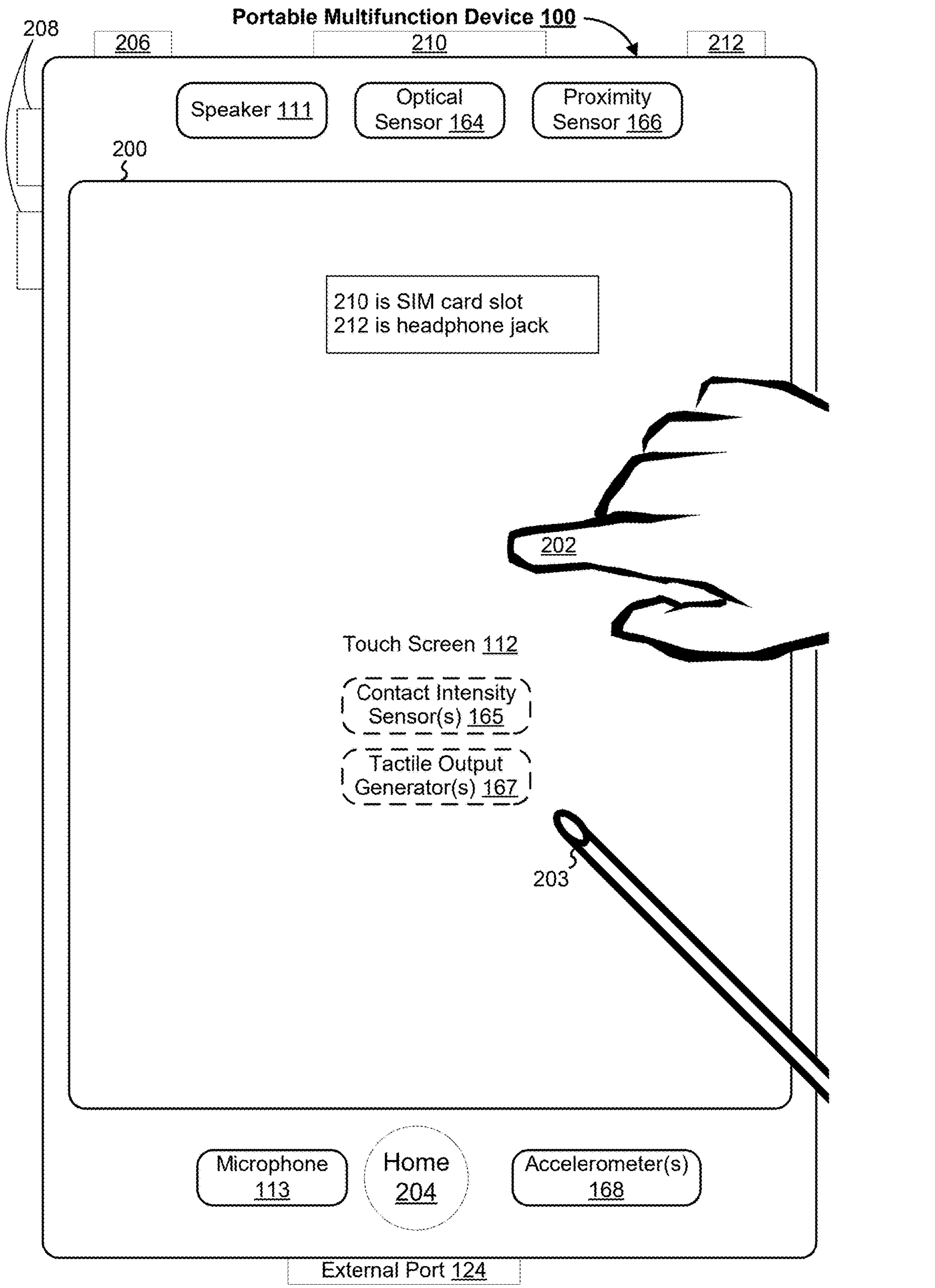
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot

210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
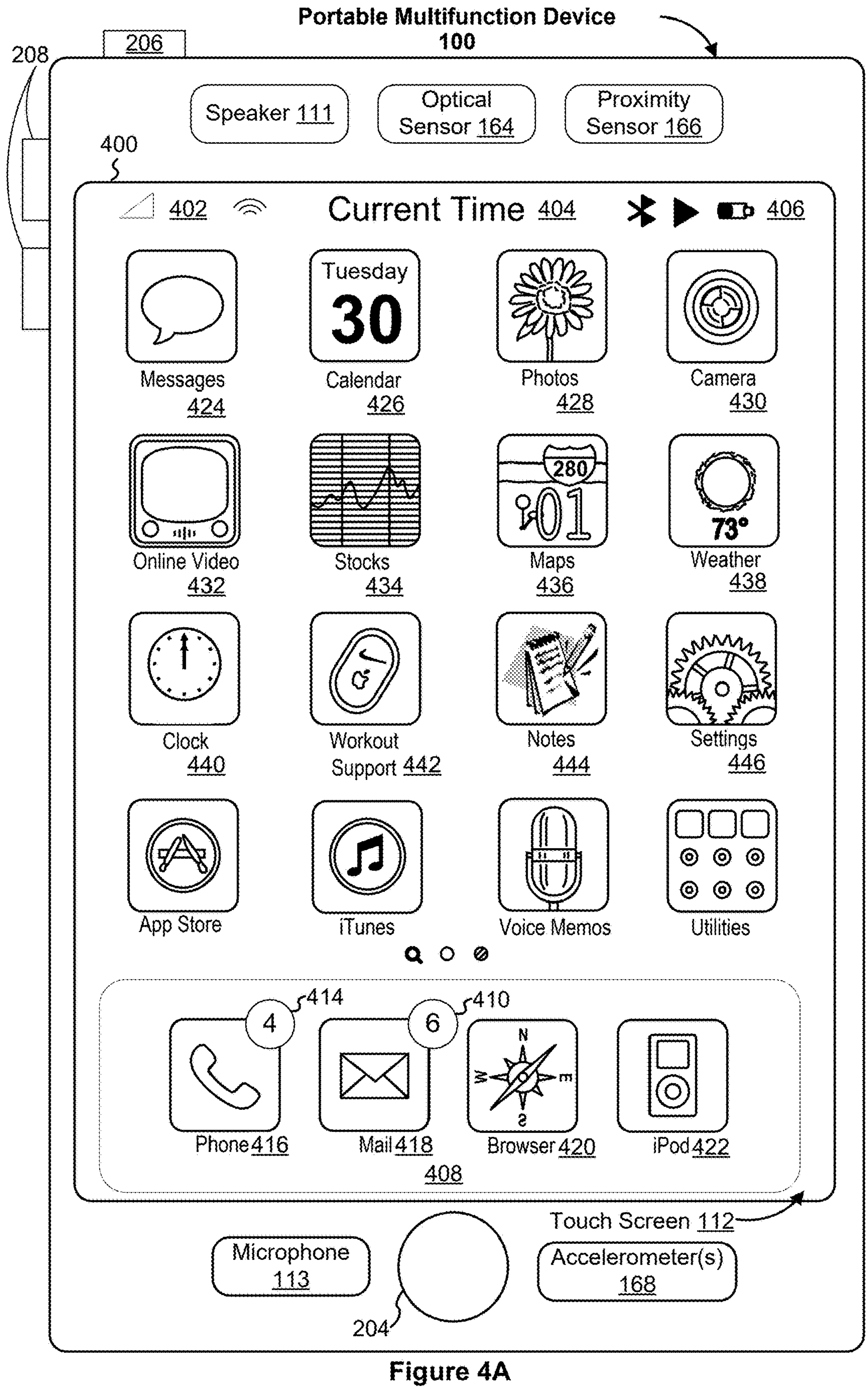
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Text;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video"
  - Icon 434 for stocks widget 149-2, labeled "Stocks;"
  - Icon 436 for map module 154, labeled "Map;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
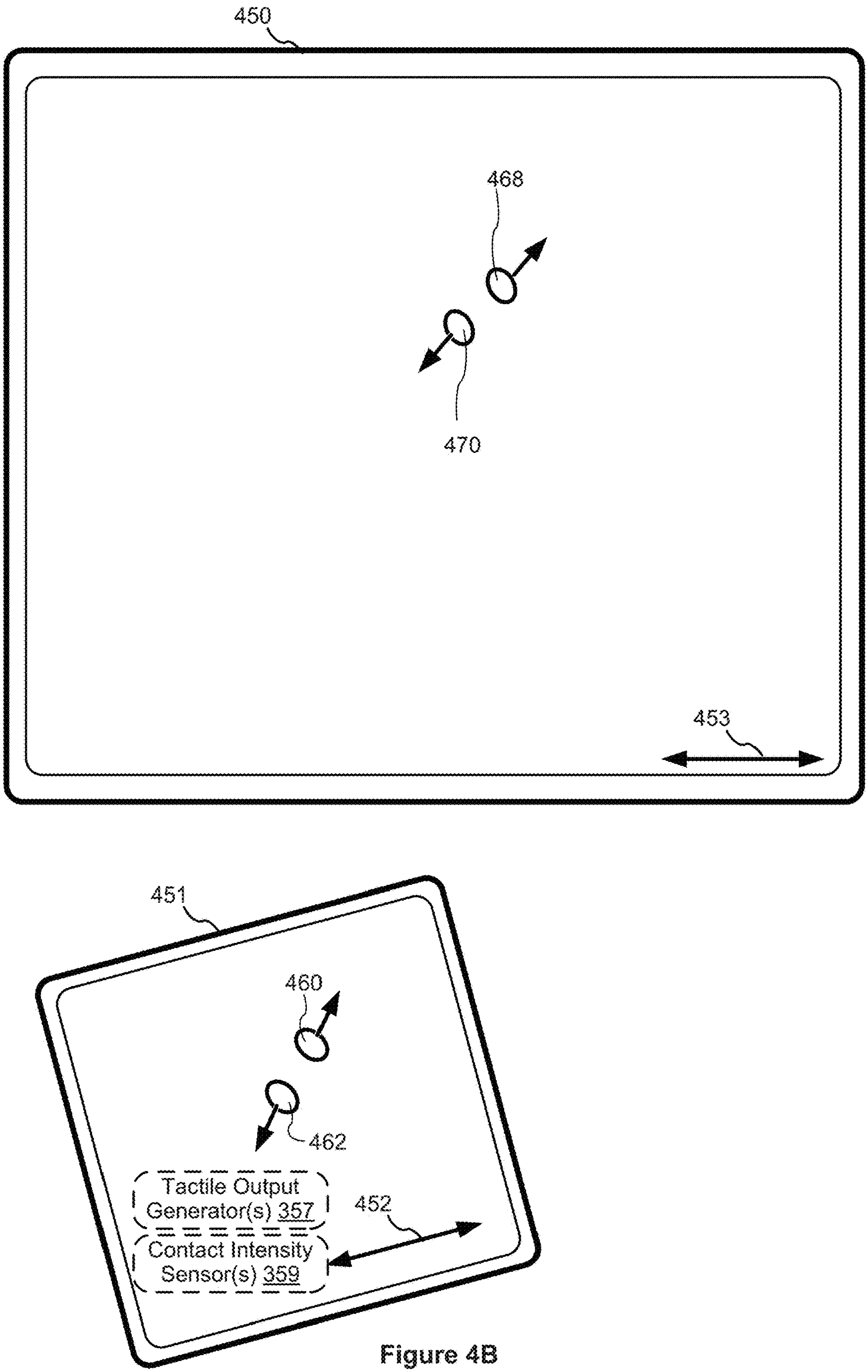
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357)

for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold ITS, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

USER INTERFACES AND ASSOCIATED PROCESSES

Selecting User Interface Objects

Many electronic devices have graphical user interfaces that display user interface objects such as thumbnails, icons, folders, and thumb/handles in scrubbers and slider bar. Often, a user of an electronic device will want to select and move user interface objects on a display. For example, a user will want to rearrange desktop items on a desktop of a user interface. As another example, a user may want to rearrange the order of applications, or "apps" displayed on the display of a portable multifunction device (such as a smart-phone or the like). As yet another example, a user may want to move the handle of the volume bar (a handle being a type of user interface object) to change the volume produced by the media player. Some methods of selecting user interface objects on electronic devices with touch-sensitive surfaces typically require a new input to individually select a user interface object (e.g., a mouse click or a tap and drag input). Moreover, once one user interface object is selected, selection of a second user interface object (e.g., another desktop item) requires a separate input (e.g., a different tap and drag gesture with a different contact). The problem with such methods is that they fail to provide a convenient way for users to select a user interface object during the course of a continuous contact with a touch-sensitive surface. The embodiments described below provide an effective, efficient method for an electronic device with a touch-sensitive surface to select multiple objects by determining whether or not to select a user interface object, based on an intensity of a contact with the touch-sensitive surface.

FIGS. 5A-5AA illustrate exemplary user interfaces for selecting user interface objects in accordance with some embodiments. The user interfaces in these figures are used to illustrate the processes described below, including the processes in FIGS. 6A-6E. FIGS. 5A-5AA include intensity diagrams that show the current intensity of the contact on the touch-sensitive surface relative to a plurality of intensity thresholds including a predefined intensity threshold (e.g., light press intensity threshold "$IT_L$"). In some embodiments, operations similar to those described below with reference to the light press intensity threshold $IT_L$ are performed with reference to a deep press intensity threshold ITS.

In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5AA and FIG. 6A-6E will be discussed with reference to display 450 and a separate touch-sensitive surface 451, however analogous operations are, optionally, performed on a device with a touch-sensitive display system 112 in response to detecting the contacts described in FIGS. 5A-5AA on the touch-sensitive display system 112 while displaying the user interfaces shown in FIGS. 5A-5AA on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 17108, cursor 17132 or cursor 17140.

FIGS. 5A-5AA illustrate exemplary user interfaces for selecting user interface objects in accordance with some embodiments. The user interfaces in these figures are used to illustrate the processes described below, including the processes in FIGS. 6A-6E.

FIGS. 5A-5E illustrate an example of selecting a user interface object in accordance with some embodiments. User interface 17100 is displayed on display 450 and includes user interface objects (e.g., thumbnails 17102, dock 17104, taskbar 17105) as well as a focus selector (e.g., cursor 17108).

Figure 5B:
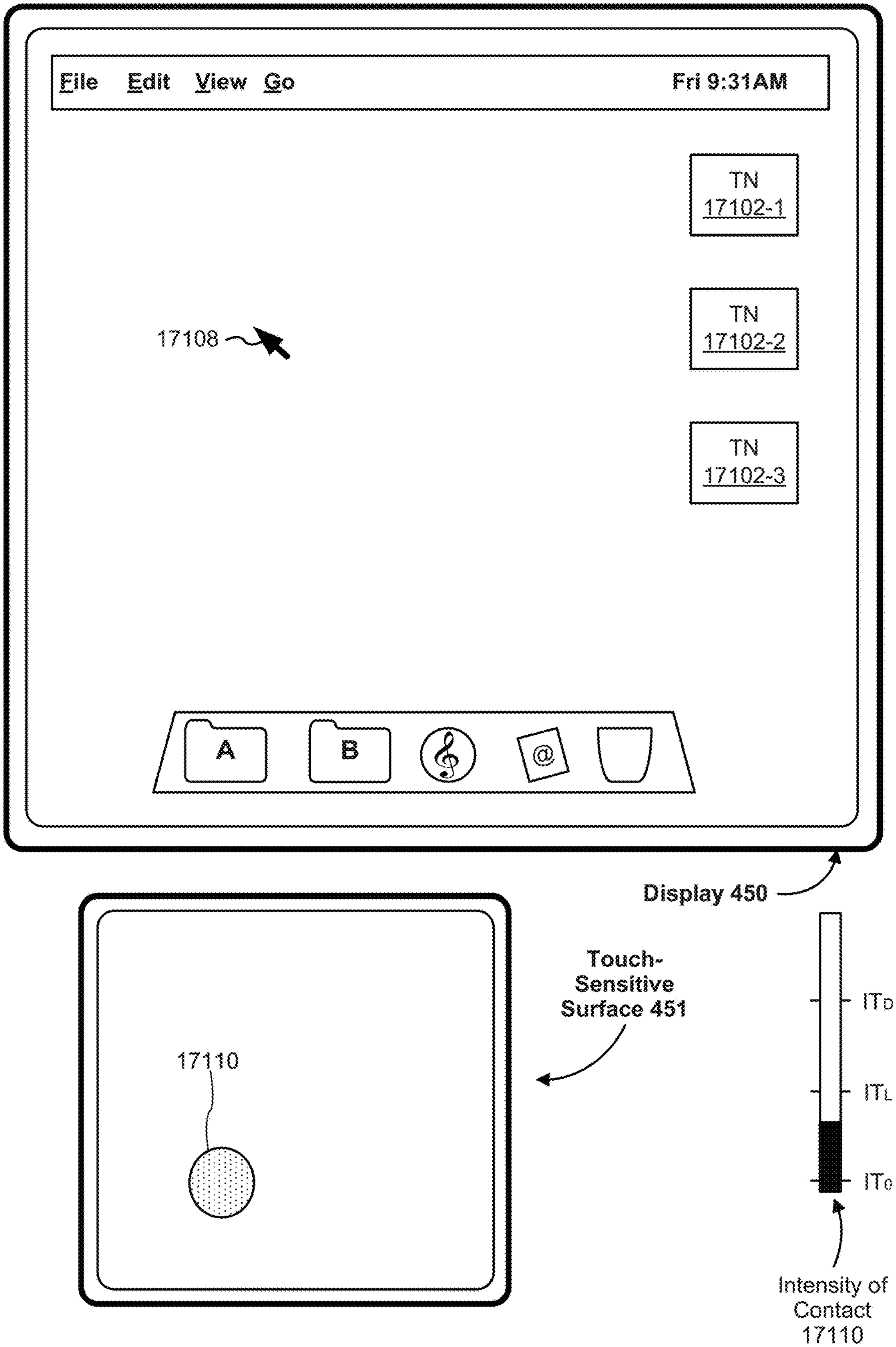

FIG. 5B illustrates an example of a user interface in which a contact 17110 (e.g., a press input) is detected on touch-sensitive surface 451. Contact 17110 is detected on the touch-sensitive surface (contact 17110 has an intensity on the touch-sensitive surface 451, sometimes referred to simply as "an intensity of contact" or "contact intensity"). Contact 17110 in FIG. 5B controls the position of cursor 17108. For example, movement of contact 17110 across touch-sensitive surface 451 (illustrated by the arrow attached to contact 17110) causes cursor 17108 to move toward, or in some cases to, a location of thumbnail 17102-1 on display 450.

Figure 5C:
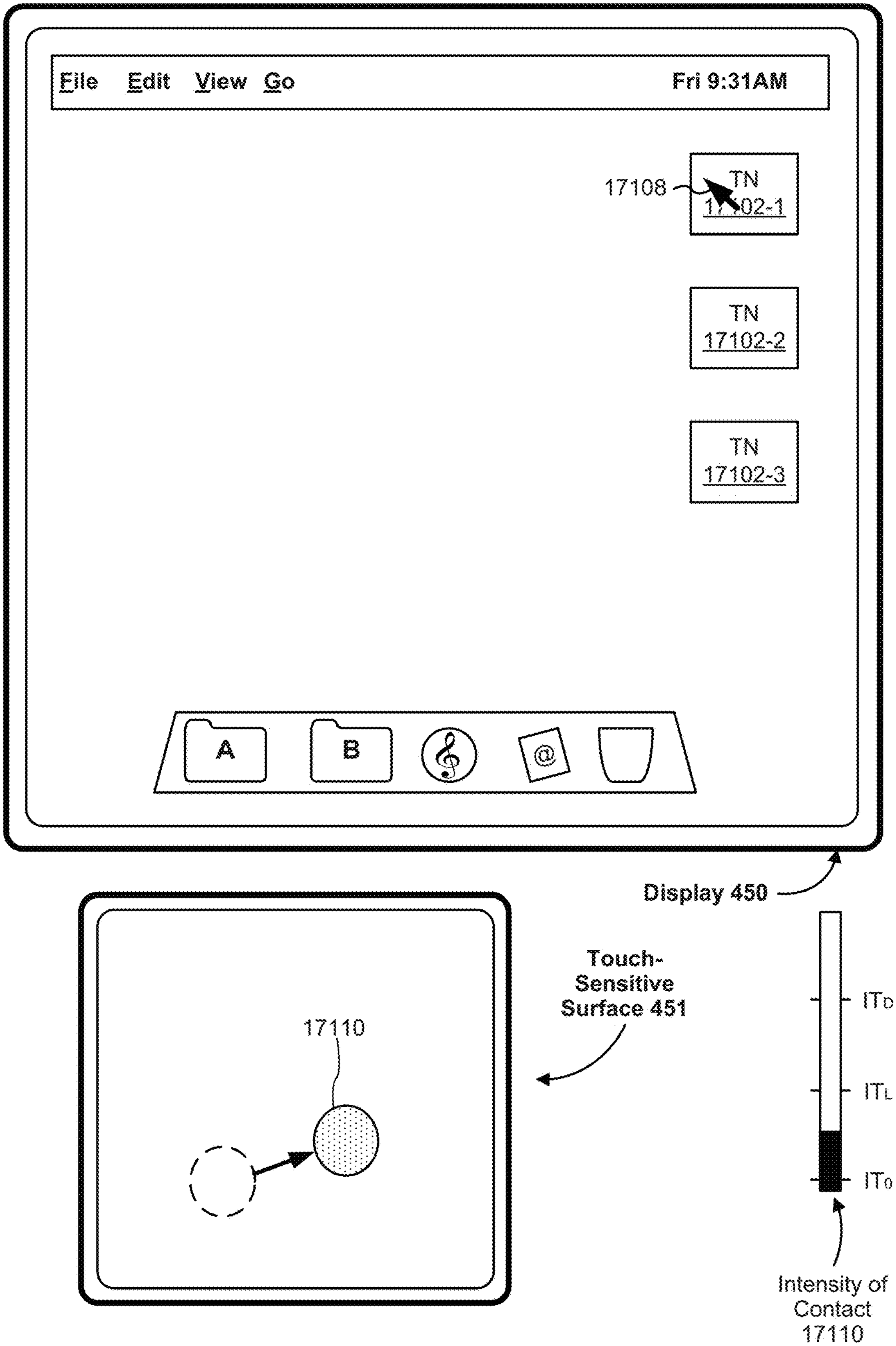

FIGS. 5B-5C further illustrate an example of moving a focus selector (e.g., cursor 17108) over a user interface object. FIG. 5C follows from FIG. 5B in the sense that detection of movement of contact 17110 on touch-sensitive surface 451 from the location of contact 17110 in FIG. 5B to the location of contact 17110 in FIG. 5C causes the device to move cursor 17108 over thumbnail 17102-1. It should be appreciated that the location of thumbnail 17102-1 is, optionally, defined as a point (e.g., a corner of the thumbnail, a centroid or geometric center), or by a non-zero area, such as any location within the boundary of thumbnail 17102 or a hidden hit region for thumbnail 17102-1. In some embodiments, the hidden hit region is larger than thumbnail 17102-1. In some embodiments, the hidden hit region is "shifted" relative to the boundary of thumbnail 17102-1. Accordingly, in some embodiments, cursor 17108 is considered "over" thumbnail 17102-1 whenever cursor 17108 is displayed within the boundary defining the location of thumbnail 17102-1. The location of other user interface objects is, optionally, defined in a similar manner.

Figure 5D:
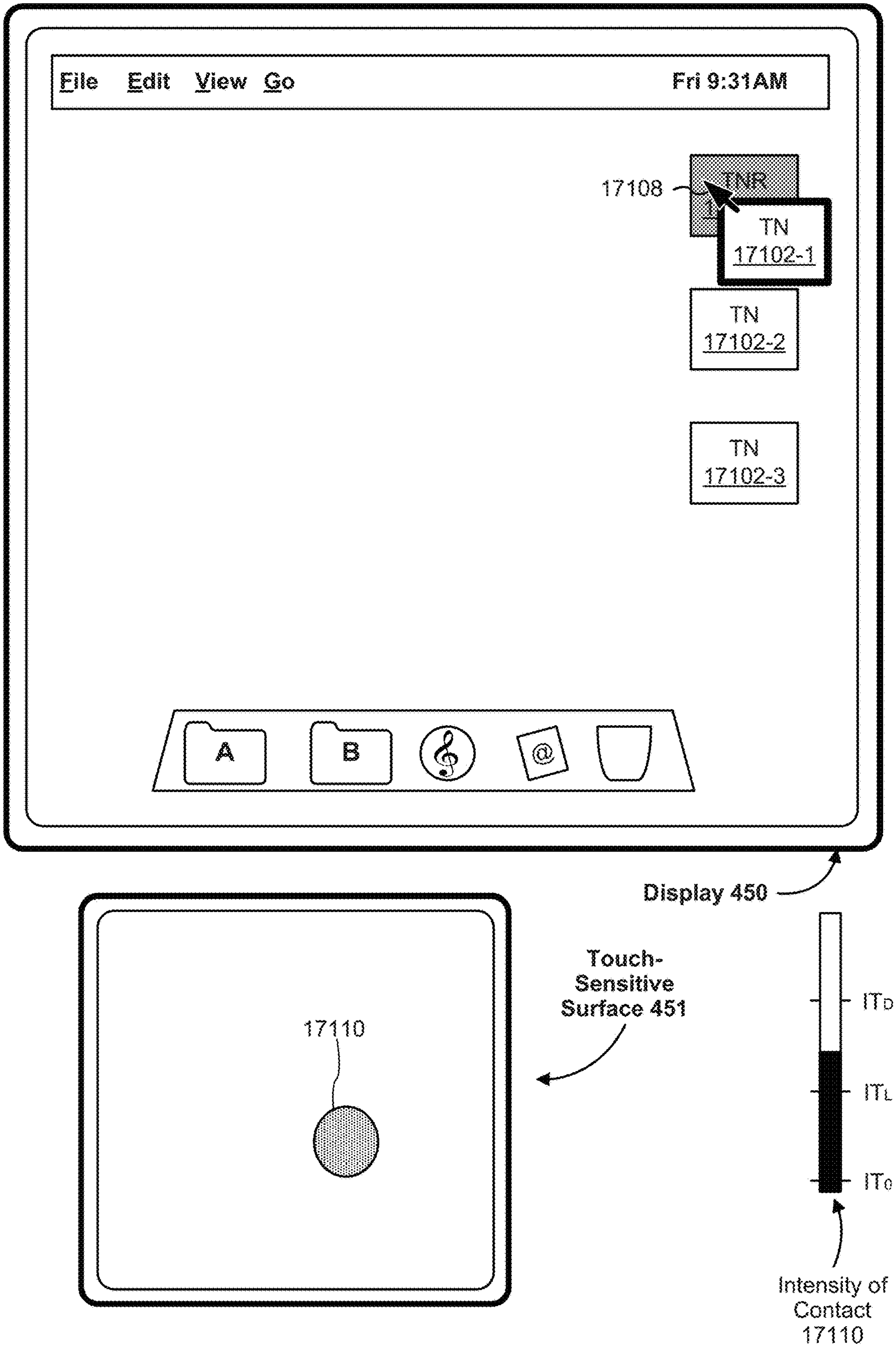

FIGS. 5C-5D illustrate an example of selecting a user interface object based on intensity of contact 17110 while the focus selector (in this example, cursor 17108) is at the location of thumbnail 17102-1. In this example, a light press input (e.g., an increase in intensity of contact 17108 from an intensity below $IT_L$ in FIG. 5C to an intensity above $IT_L$ in FIG. 5D) is detected while cursor 17108 is over thumbnail 17102-1. FIG. 5D illustrates an example of a response of the device to detecting a light press while cursor 17108 is over thumbnail 17102-1. In response to detecting the light press input, the device selects thumbnail 17102-1, as shown in FIG. 5D. In some embodiments, the selection of thumbnail 17102-1 is indicated by displaying a thumbnail representation (e.g., TNR 17116-1, FIG. 5E) at the original location thumbnail 17102-1. In some embodiments, a thumbnail representation is not displayed. In some embodiments, the device alters the appearance of thumbnail 17102-1 to indicate that it has been selected (e.g., the displayed thumbnail is highlighted). In the example shown in FIG. 5E, thumbnail 17102-1 is now "attached" to cursor 17108 and will move on the display, along with cursor 17108, in response to subsequent detection of movement of contact 17110 until the thumbnail is dropped.

Figure 5E:
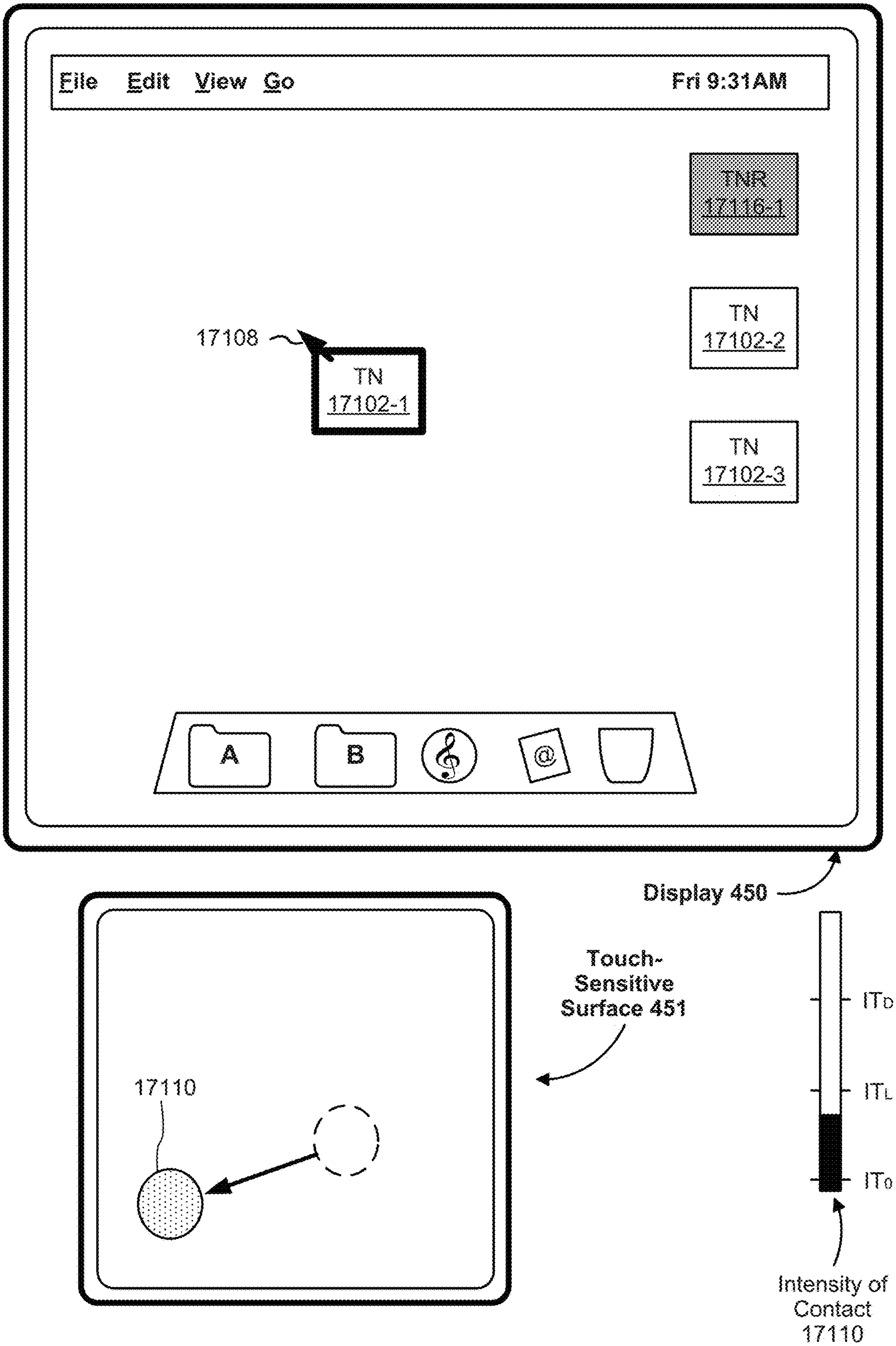

FIG. 5E illustrates an example of a response to movement of contact 17110 after thumbnail 17102-1 is selected. In response to movement of contact 17110 across touch-sensitive surface 451 (e.g., from the location of contact 17110 in FIG. 5D to the location of contact 17110 in FIG. 5E), cursor 17108 is moved and thumbnail 17102-1 is moved in a corresponding manner (e.g., thumbnail 17102-1 is moved so that it remains proximate to cursor 17108). In some embodiments, after selection of user interface object 17102-1, the intensity of contact 17110 does not need to be maintained above the predefined intensity threshold. For example, the intensity of contact 17110, as shown in FIG. 5E, is below light press intensity threshold $IT_L$, however, user interface object 17102-1 remains selected. In some embodiments, the intensity of contact 17110 remains above the light press intensity threshold with the same effect.

Figure 5F:
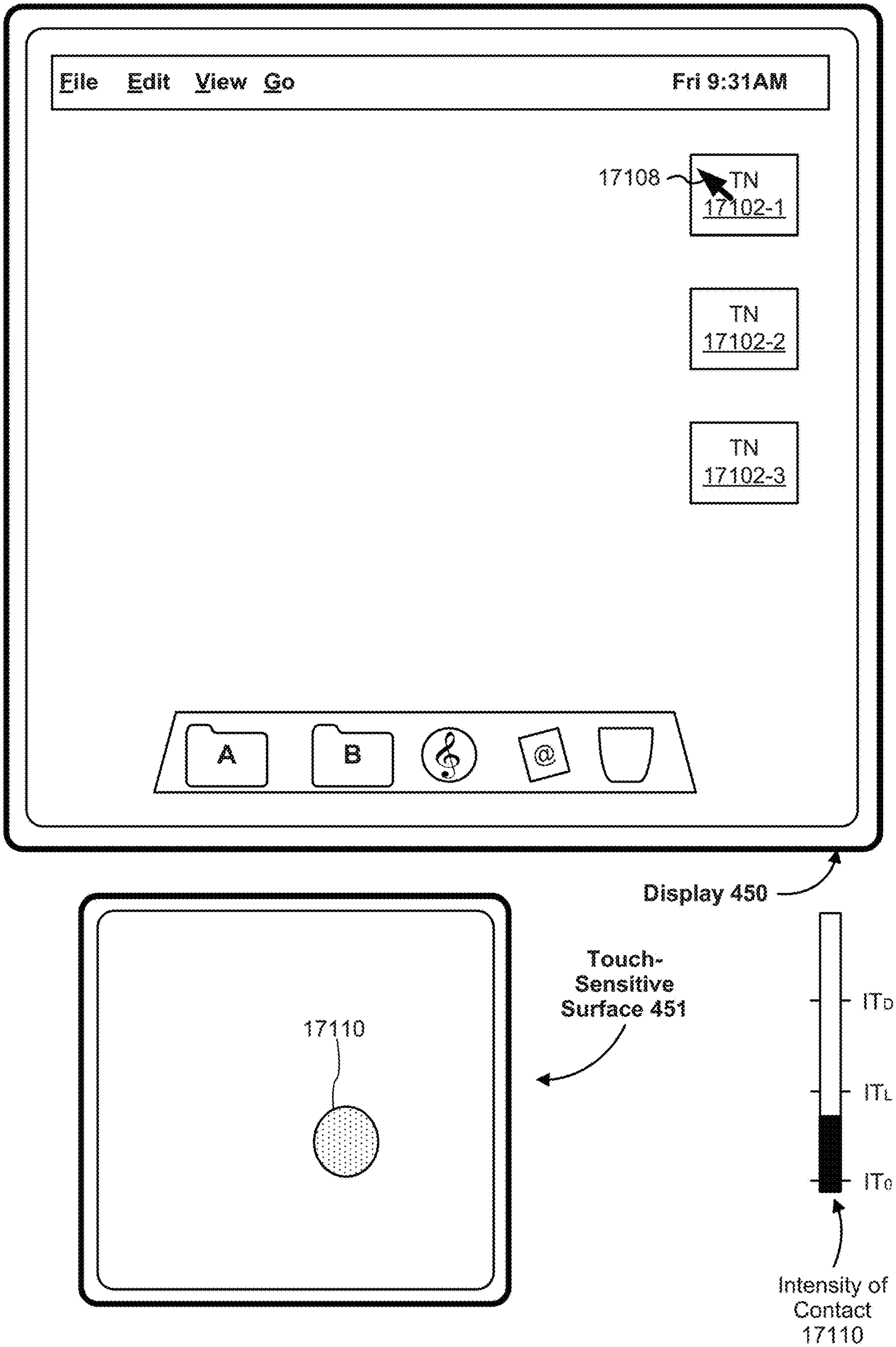

FIGS. 5A-5B and 5F-5G illustrate an example of forgoing selection of a user interface object in accordance with some embodiments. FIGS. 5A and 5B again demonstrate aspects of the method previous described with references to those figures, e.g., detection of a contact, movement of the contact and corresponding movement of the focus selector, and the like. In this example, however, contact 17110 as shown in FIG. 5F, remains below the light press intensity threshold $IT_L$ while cursor 17108 is over user interface object 17102-1. As a result, the device forgoes selection of thumbnail 17102-1. This response by the device provides an intuitive way for the user to drag cursor 17108 over thumbnail 17102-1 (e.g., "mouse-over") without selecting the thumbnail because the user has not increased the intensity of contact 17110 above $IT_L$. The user can subsequently move the cursor to a different location (e.g., the location of cursor 17108 in FIG. 5G) without dragging thumbnail 17102-1 along with it.

Figure 5G:
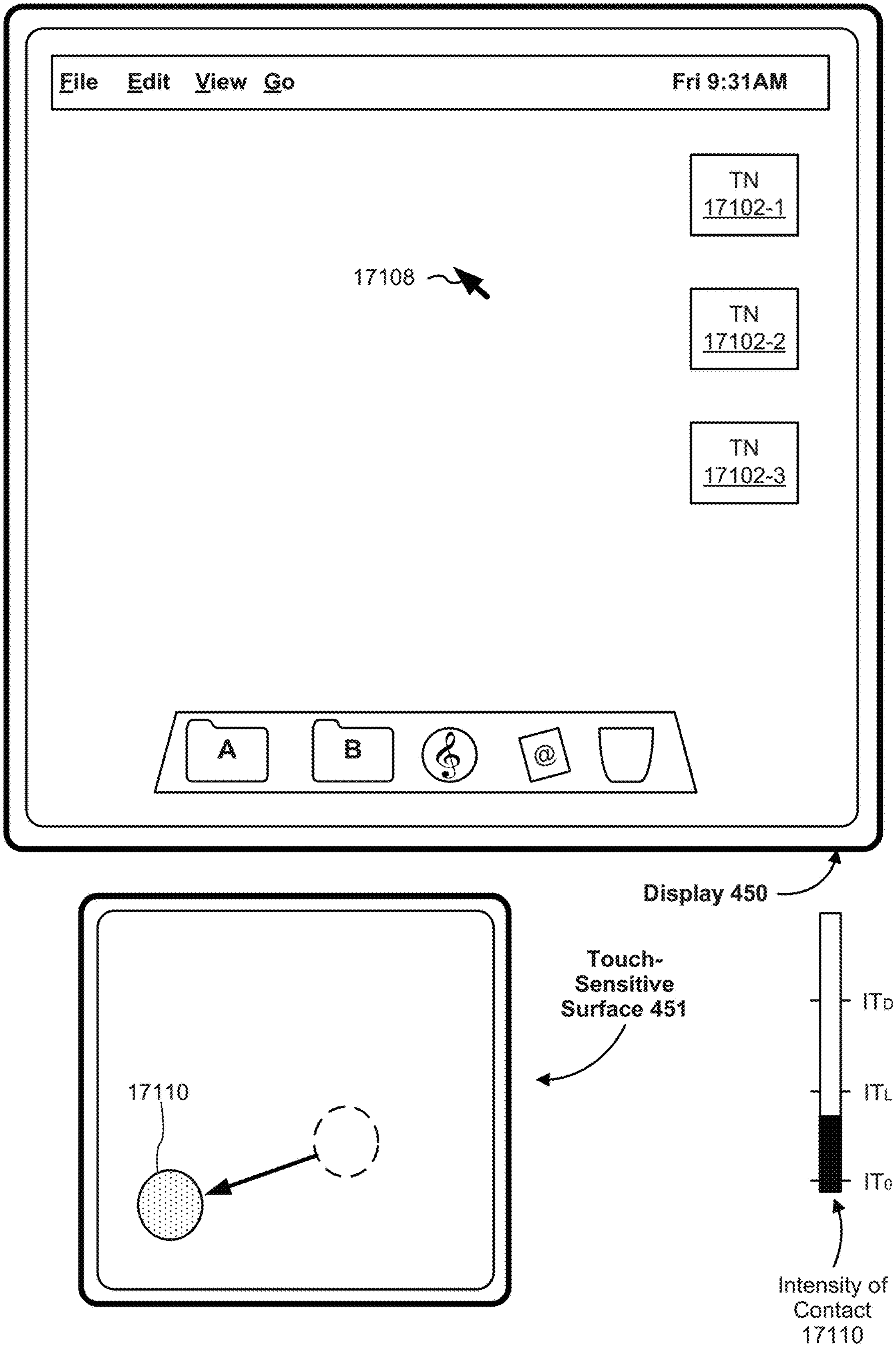
Figure 5H:
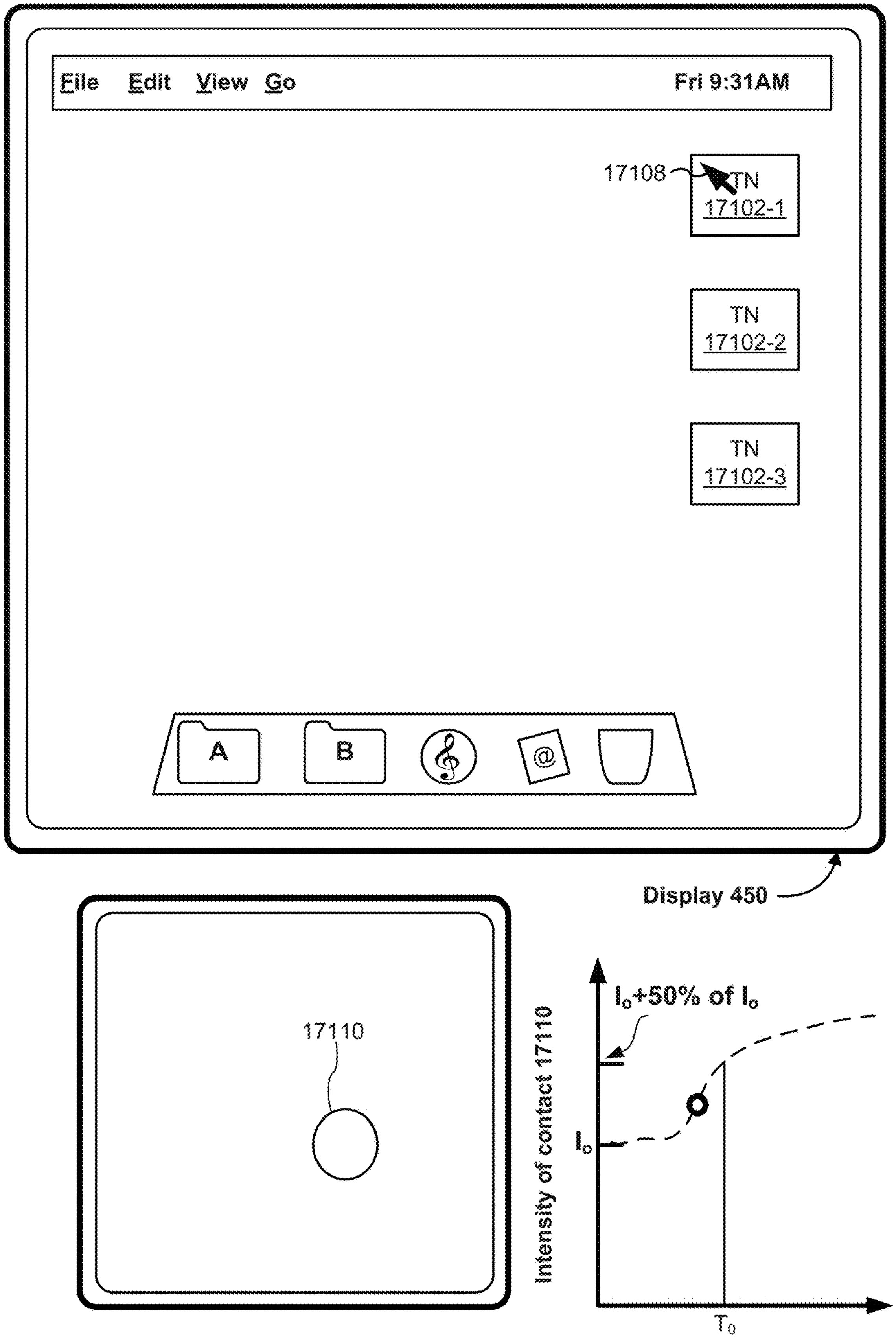
Figure 5I:
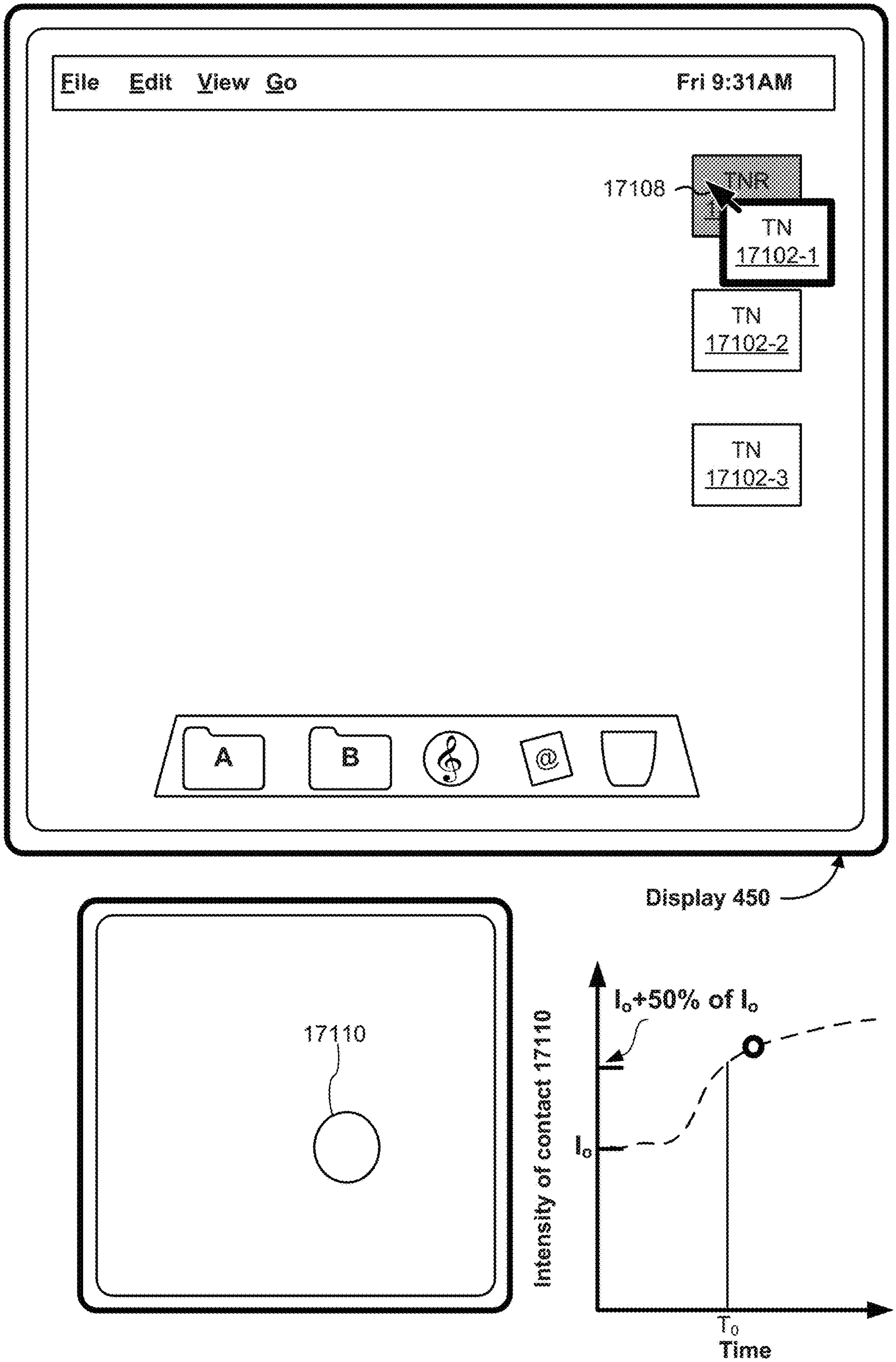
Figure 5J:
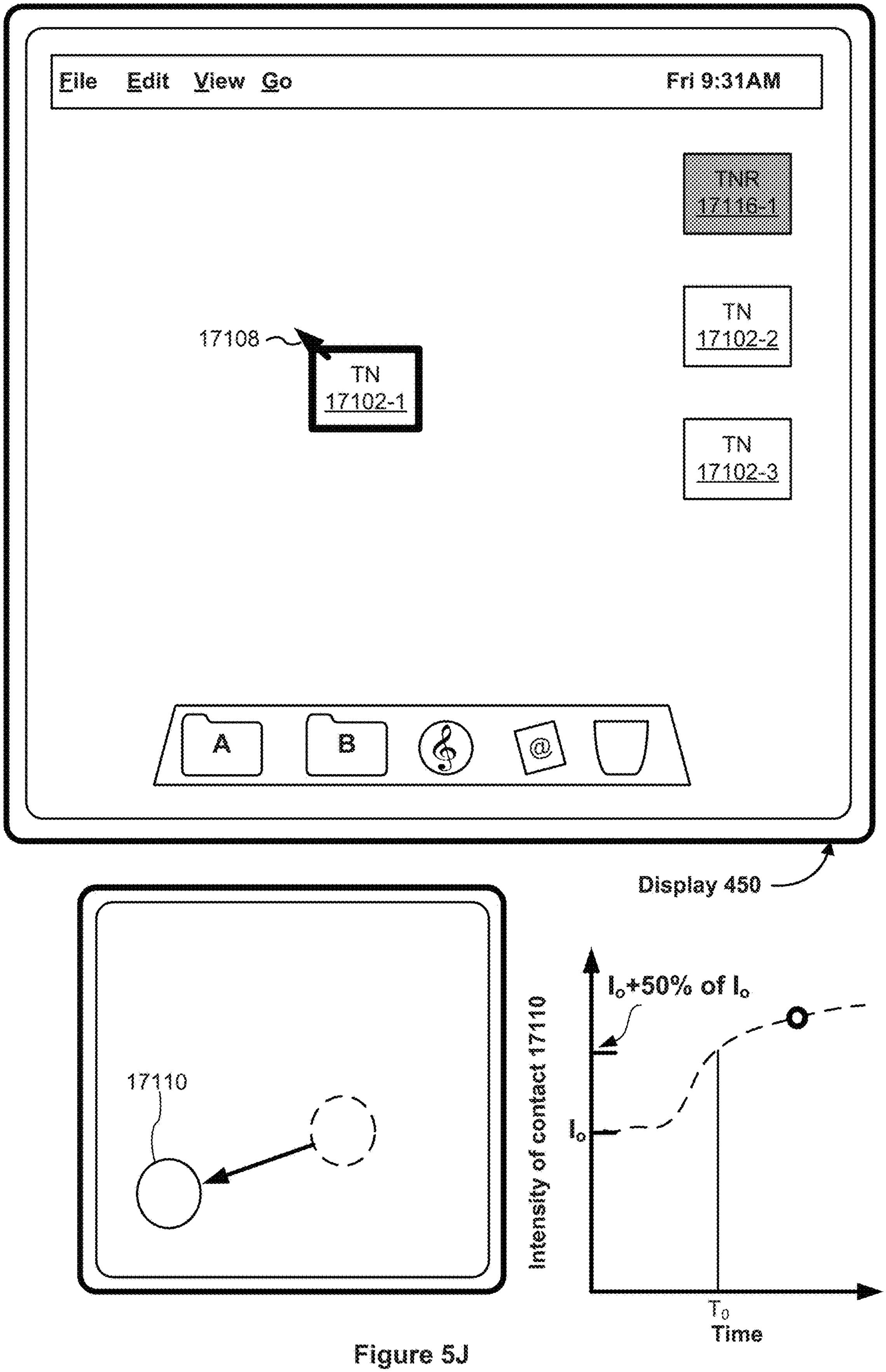

FIGS. 5A-5B and 5H-5J illustrate an example of embodiments in which selection of a user interface object is based on a change in the intensity of a contact relative to an initial intensity of the contact. The examples illustrated in these are different from the embodiments described above with reference to FIGS. 5A-5G, in which a particular intensity value (e.g., $IT_L$) is used as an intensity threshold that is used in determining whether to select, or forgo selecting, a user interface object. FIGS. 5A and 5B illustrate positioning cursor 17108 over thumbnail 17102-1 as described previously. FIG. 5G includes a graph showing the intensity of contact 17110 versus time during the period that cursor 17108 is over thumbnail 17102-1. The device selects a baseline intensity for comparison, labeled I0. It should be appreciated that I0 is, optionally, determined in any number of ways. For example, in some embodiments, I0 is the intensity of contact at the moment when cursor 17108 is first detected "over" thumbnail 17102-1, where the term "over" should be interpreted as previously described. In some embodiments, I0 is an average contact intensity of contact 17110, starting from the beginning of the contact. In still alternative embodiments, I0 is a "smart" value, meaning that the value is adapted to a particular user (e.g., I0 is higher for users who tend to press harder during normal use). FIG. 5H shows an example of contact 17110 having an intensity that exceeds, at a particular time T0, a predefined threshold for a change in contact intensity relative to I0. In this example, the predefined threshold for a change in contact intensity relative to I0 is 50%. Thus, in this example, when the contact intensity reaches I0+50% of I0, (or, equivalently, $I[T0]=1.5\times I0$) predefined selection criteria are met and thumbnail 17102-1 is selected. FIG. 5I illustrates selection of thumbnail 17102-1, subsequent to (e.g., at a time $T0+\Delta$) and in response to predefined selection criteria being met as described with reference to FIG. 5H. FIGS. 5I-5J illustrate movement of cursor 17108 and thumbnail representation 17116-1 following selection of thumbnail 17102-1 in response to detecting movement of contact 17110 (e.g., from the location of contact 17110 in FIG. 5I to the location of contact 17110 in FIG. 5J). These operations are analogous to those discussed with reference to FIG. 5E.

Figure 5K:
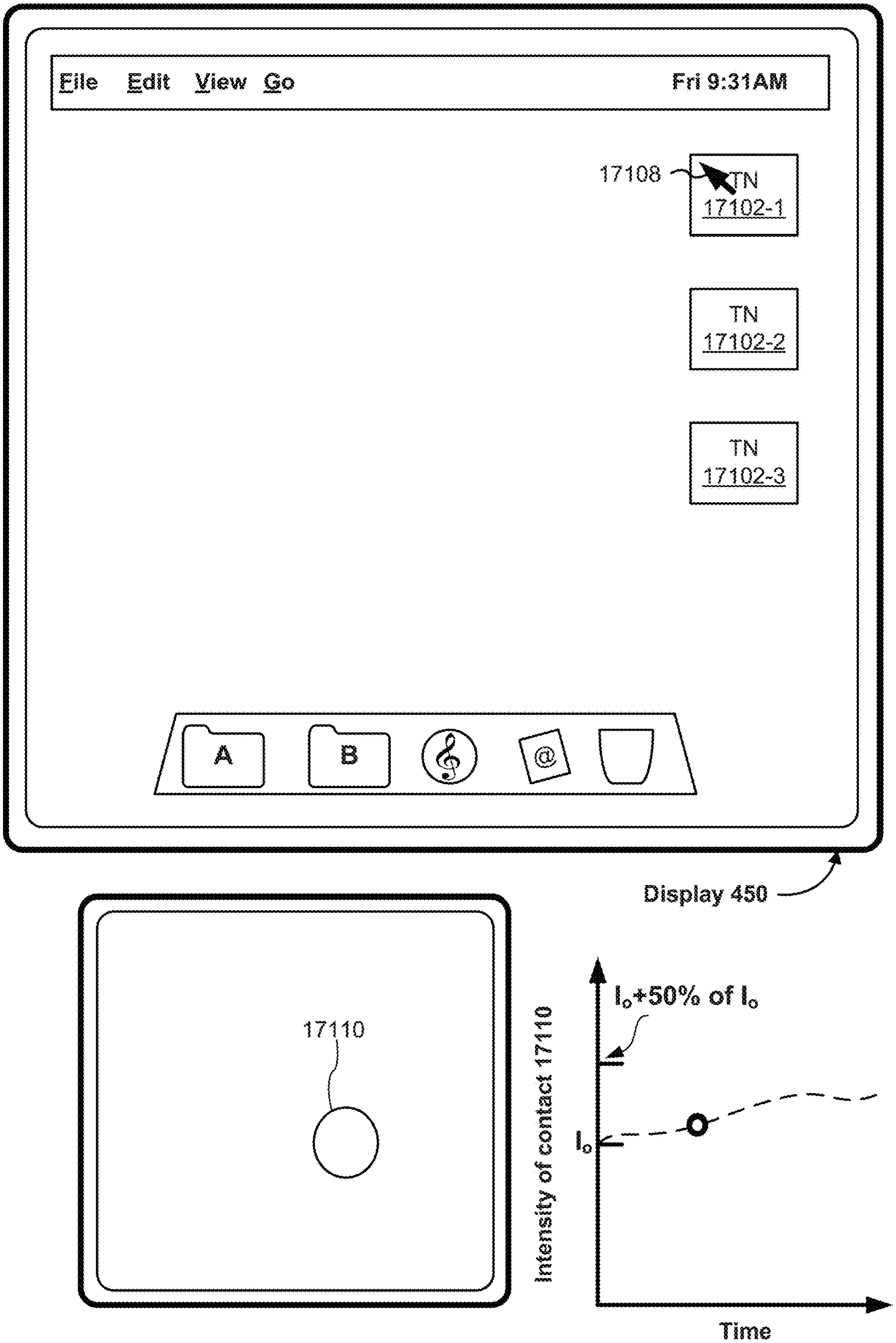
Figure 5L:
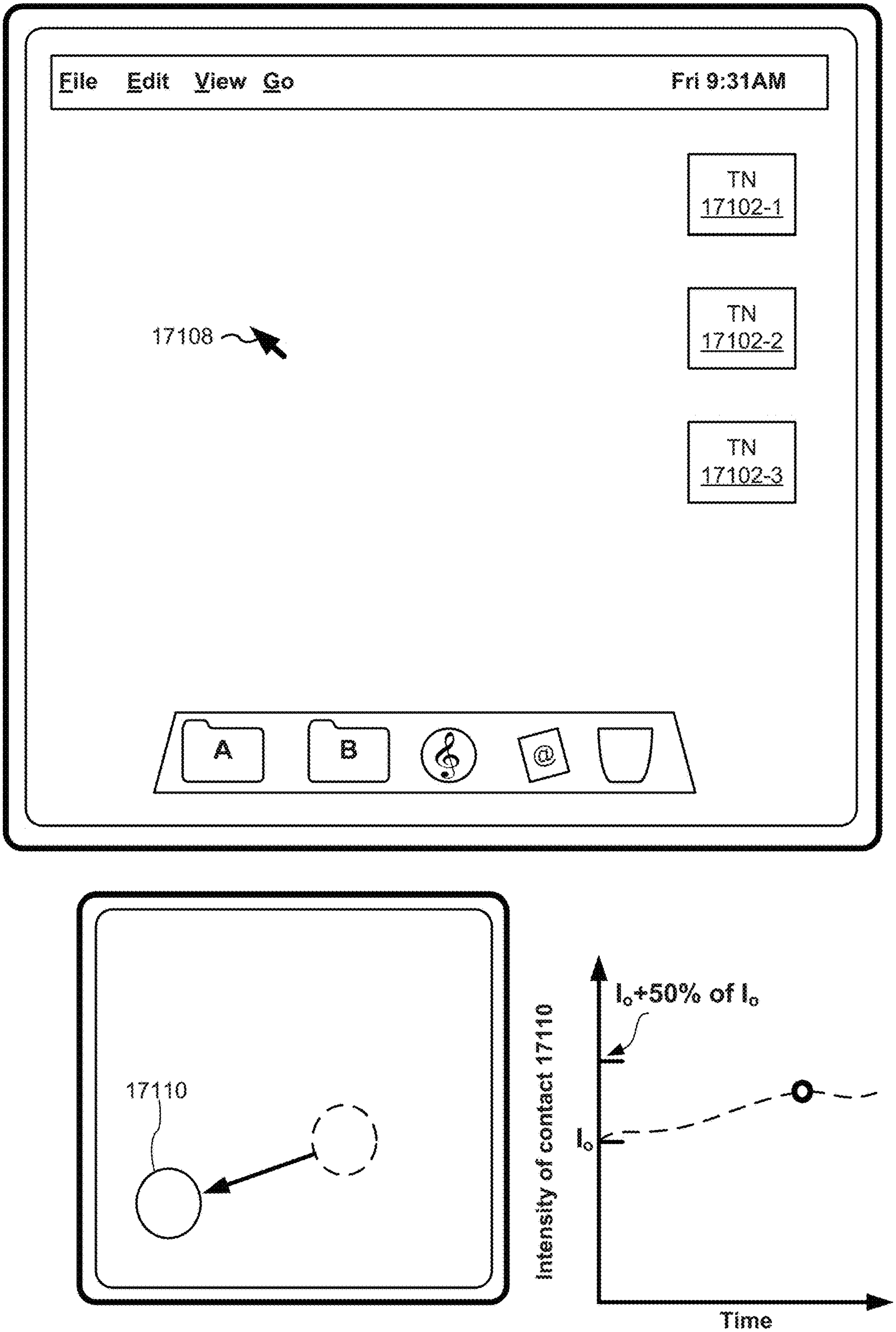
Figure 5M:
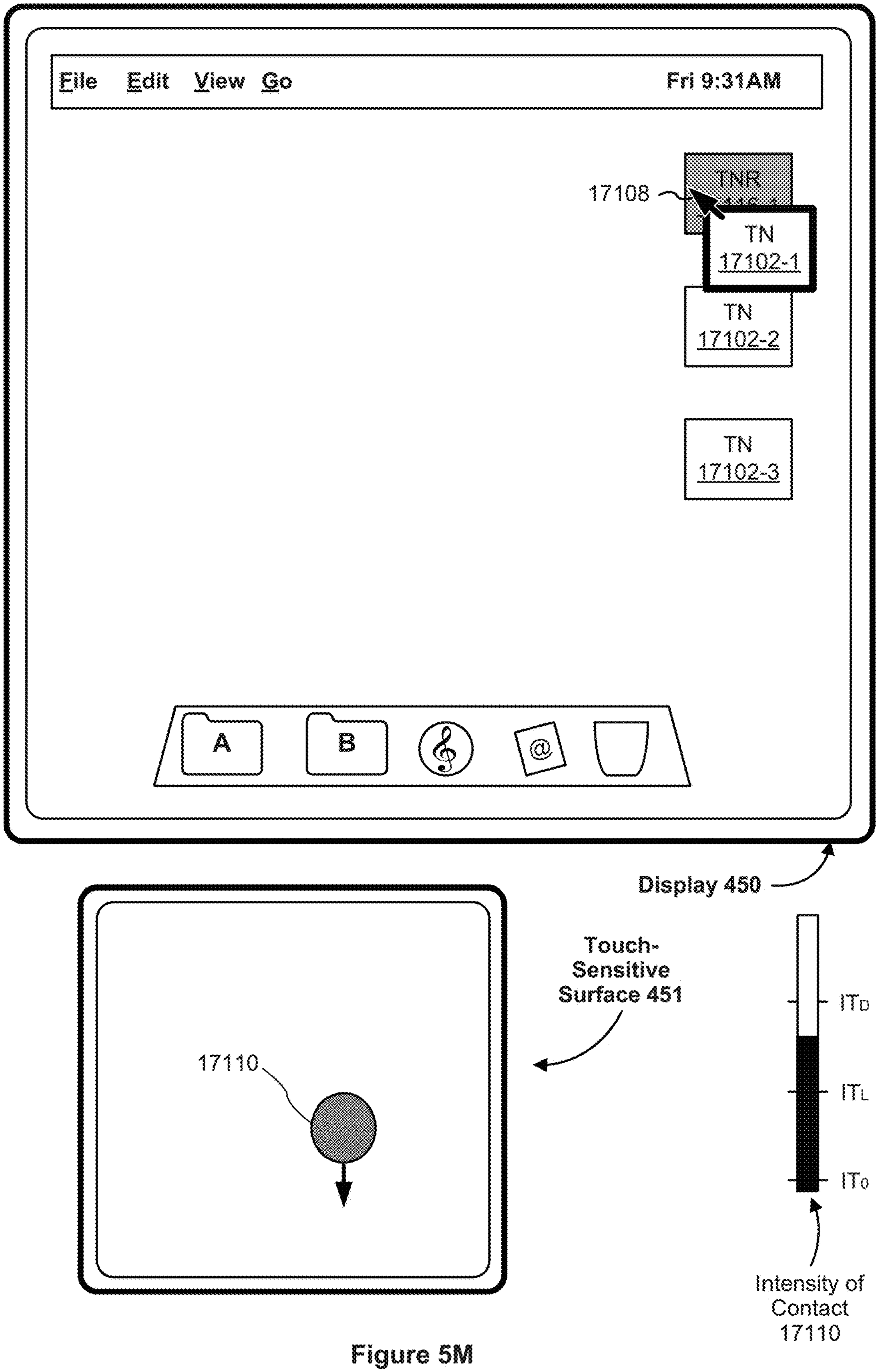

FIGS. 5A-5B and FIGS. 5K-5L illustrate an example of embodiments in which forgoing selection of a user interface object is based on a change in the intensity of a contact relative to an initial intensity of the contact, in accordance with some embodiments. In FIG. 5K, cursor 17108 is positioned over thumbnail 17102-1 as described previously with reference to FIGS. 5A-5B. An initial contact intensity I0 is determined as described with references to FIG. 5H. In this example, however, the contact intensity does not exceed the predefined threshold for change in contact intensity while cursor 17108 is at position over thumbnail 17102-1. As a result, the device forgoes selection of thumbnail 17102-1. Detection of subsequent movement of contact 17110, shown in FIG. 5L, results in movement of cursor (e.g., from the position of cursor 17108 in FIG. 5K to the position of cursor 17108 in FIG. 5L) without corresponding movement of thumbnail 17102-1.

Figure 5N:
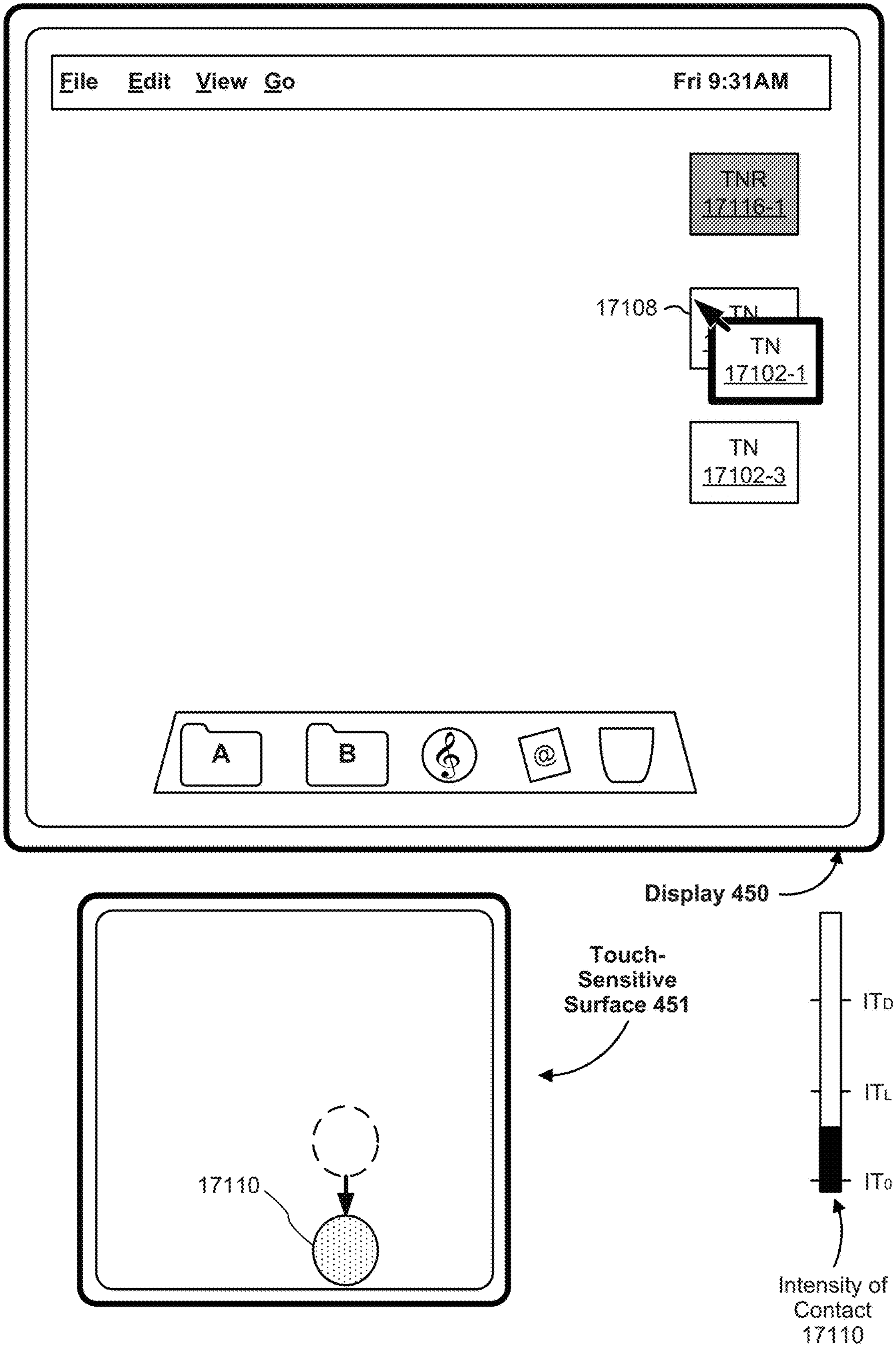
Figure 5O:
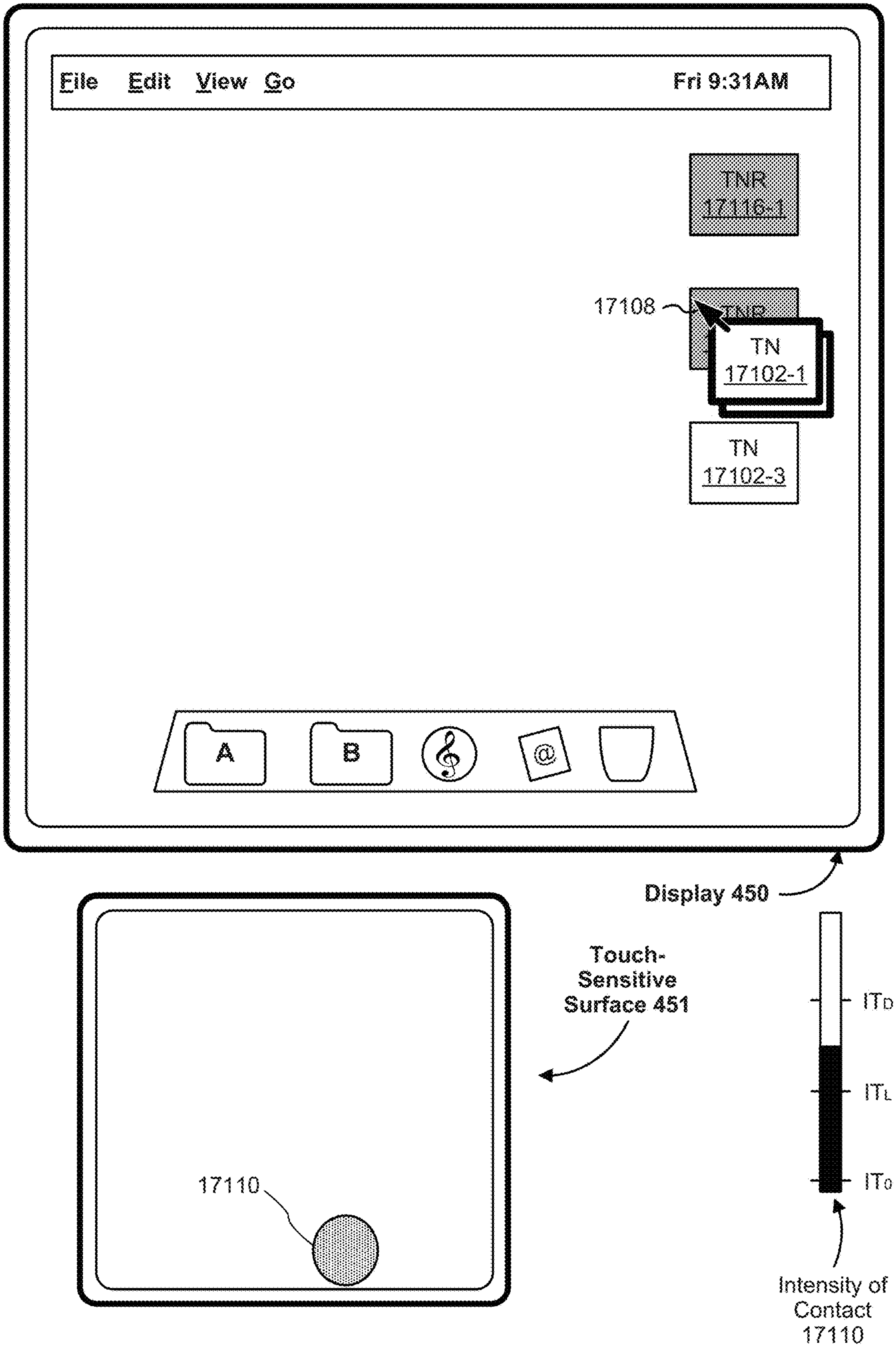
Figure 5P:
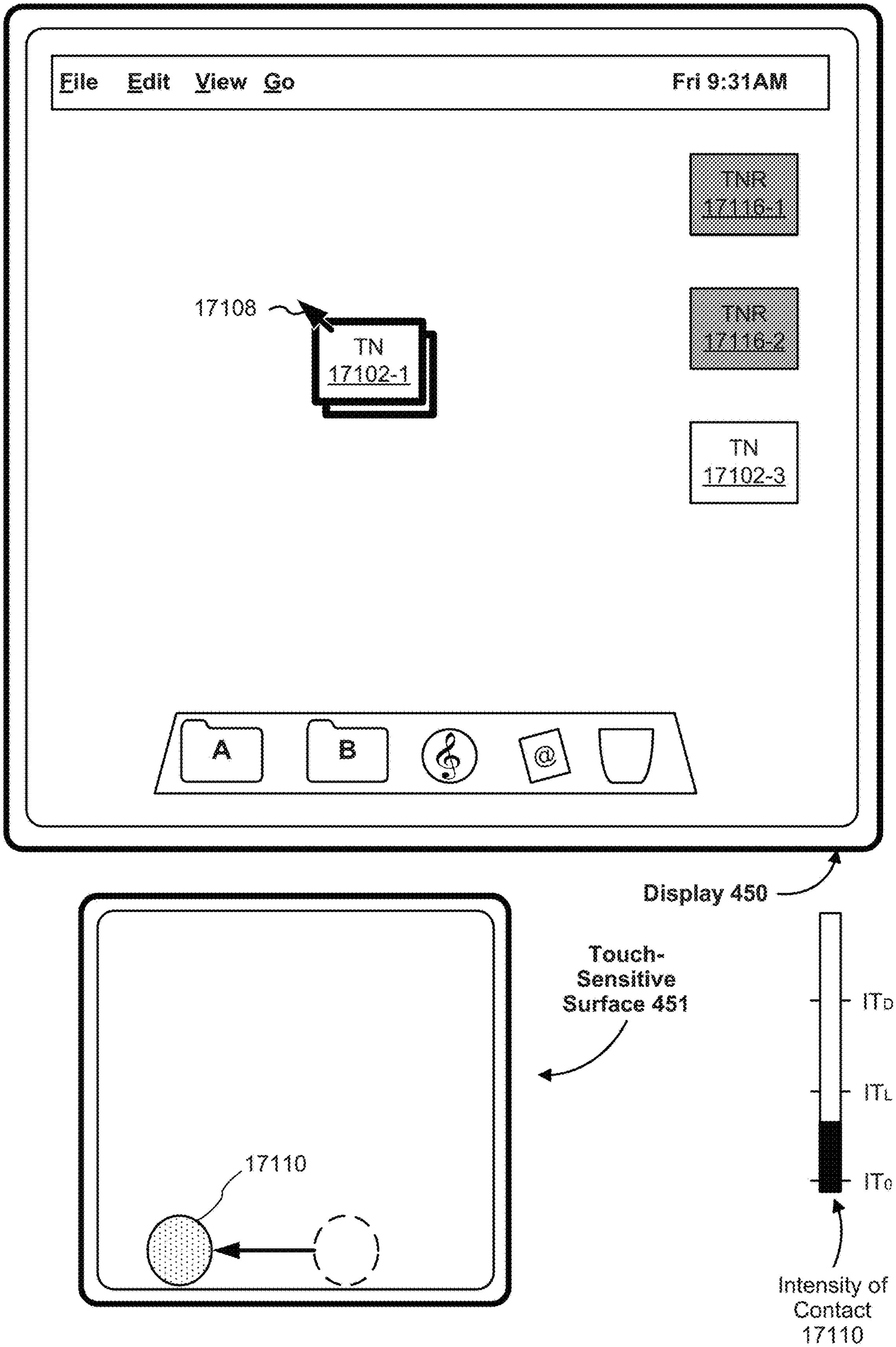

FIGS. 5M-5P illustrate selection of a second user interface object (e.g., thumbnail 17102-2) in accordance with some embodiments. After selection of thumbnail 17102-1 (for example, as shown in FIG. 5D) the device detects movement of contact 17110 in FIG. 5M and, in response, moves cursor 17108 from its previous position in FIG. 5M to a new position that is over thumbnail 17102-2 in FIG. 5N. In response to detecting a light press input while cursor 17108 is over thumbnail 17102-2, as shown in FIGS. 5N-5O where the intensity of contact 17110 increases from an intensity below $IT_L$ to an intensity above $IT_L$, the device selects thumbnail 17102-2 without deselecting or dropping thumbnail 17102-1. In FIG. 5P, the device detects movement of contact 17110 (e.g., from the position of contact 17110 in FIG. 5O to the position of contact 17110 in FIG. 5P) and, in response to detecting the movement of contact 17110 in FIG. 5P, the device moves cursor 17108 and both of the selected thumbnails 17102-1 and 17102-2, as shown in FIG. 5P.

As shown in FIG. 5P, after thumbnails 17102-1 and 17102-2 have been selected and moved in accordance with movement of cursor 17108, the device displays respective residual images 17116-1 and 17116-2 that correspond to the respective thumbnails. In some embodiments, detecting a light press input (e.g., an increase in intensity of contact 17110 from an intensity below $IT_L$ to an intensity above $IT_L$) while cursor 17108 is over one of the residual images would cause the device to deselect the corresponding thumbnail. For example, in FIG. 5P, if the device detected a light press input after moving cursor 17108 over residual image 17116-2, the device would deselect thumbnail 17102-2. Similarly, in FIG. 5P, if the device detected a light press input after moving cursor 17108 over residual image 17116-1, the device would deselect thumbnail 17102-1.

Figure 5Q:
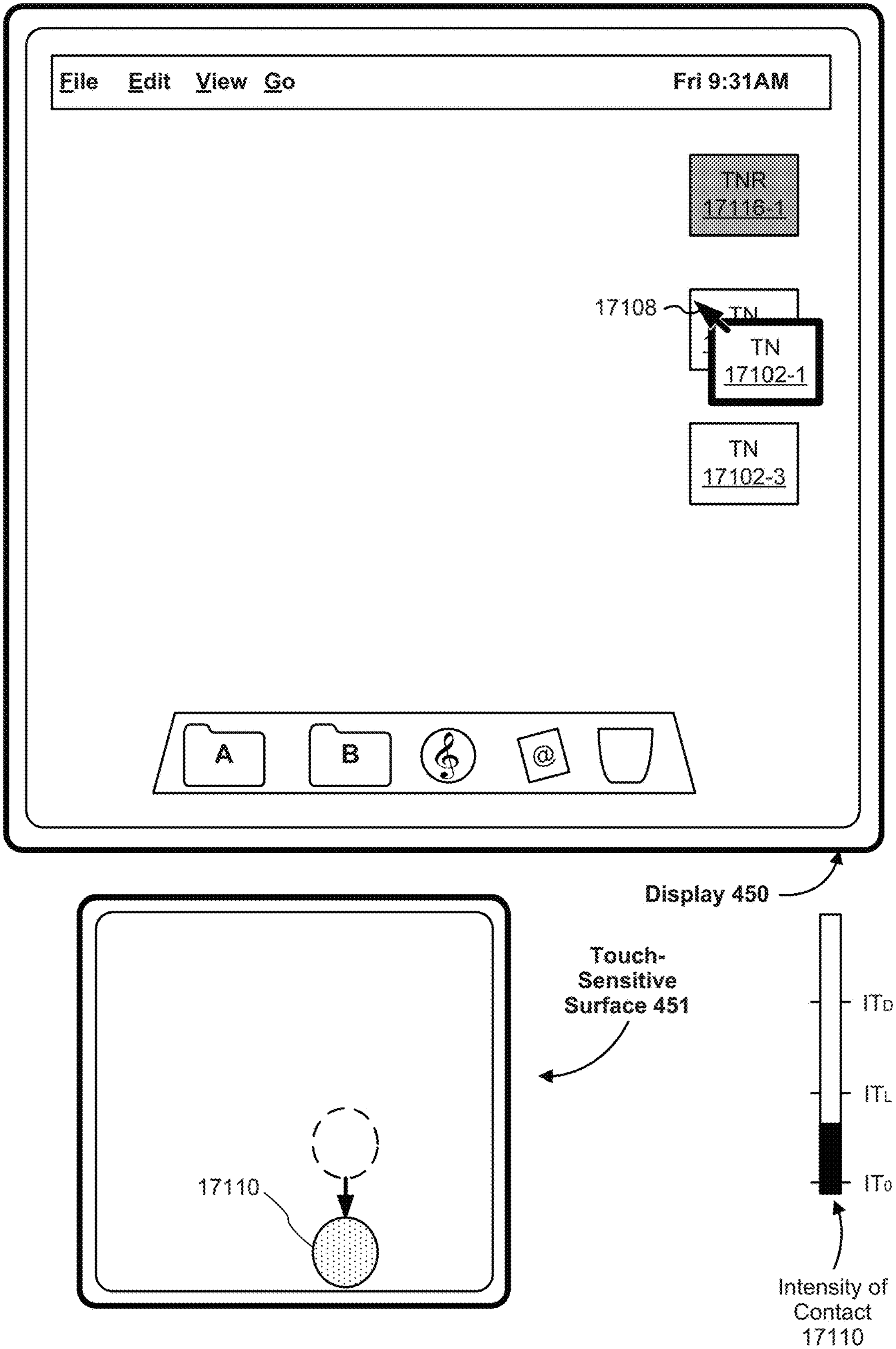
Figure 5R:
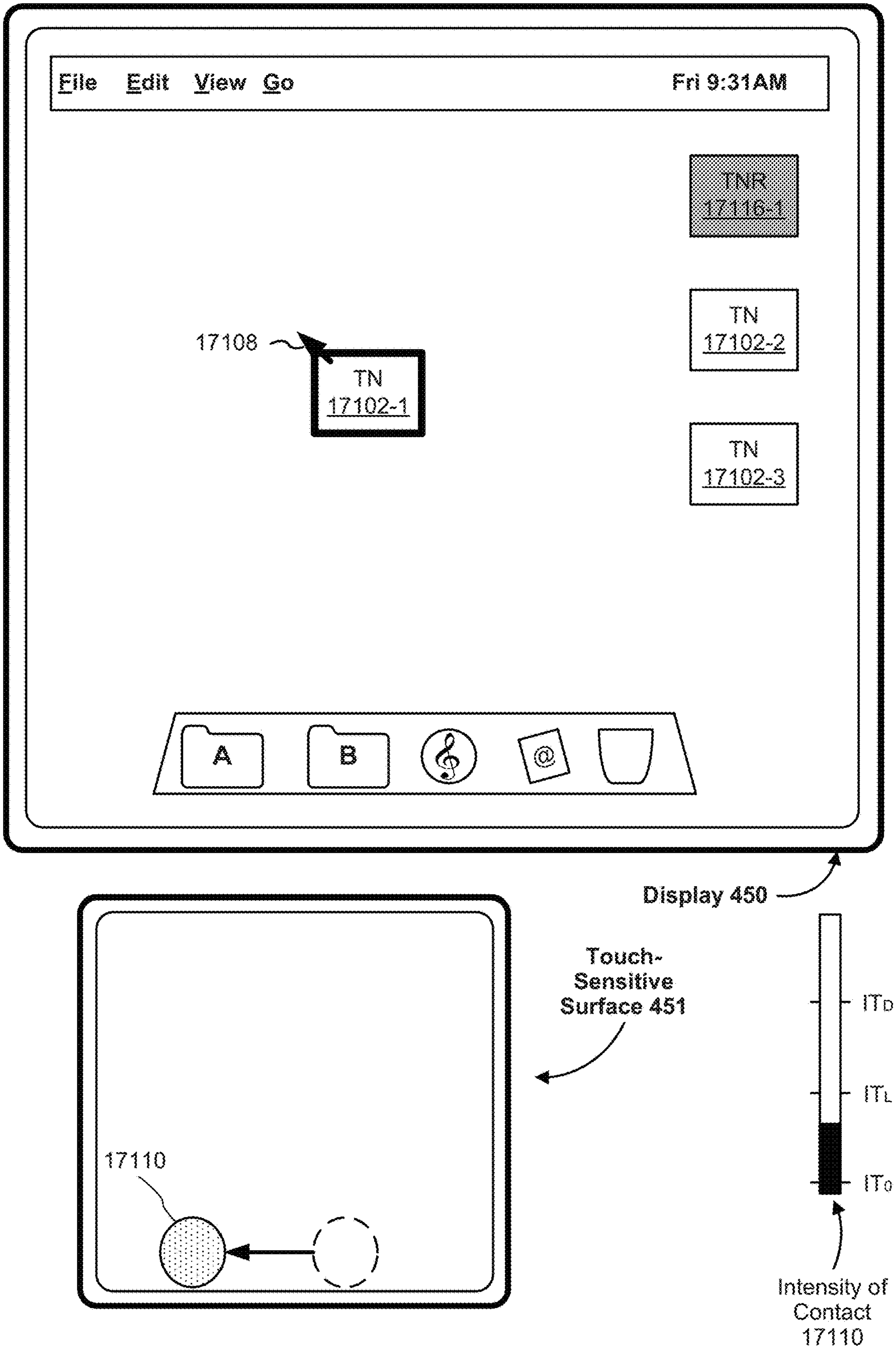

FIGS. 5M-5N and 5Q-5R illustrate examples of forgoing selection of a second user interface object (e.g., thumbnail 17102-2), while maintaining selection of a first user interface object (e.g., thumbnail 17102-1). After selection of thumbnail 17102-1 (for example, as shown in FIG. 5D) the device detects movement of contact 17110 in FIG. 5M and, in response moves cursor 17108 from its previous position shown in FIG. 5M to a new position that is over thumbnail as shown in FIG. 5N. In FIG. 5Q, the intensity of contact 17110 remains below the light press threshold during the period of time in which the cursor 17108 is over thumbnail 17102-2. As a result, the device forgoes selection of thumbnail 17102-2 and detection of movement of contact 17110 results in movement of the cursor 17108 accompanied by Thumbnail 17102-1, and not by thumbnail 17102-2 or a representation of thumbnail 17102-2, as shown in FIG. 5R. In some embodiments, selecting, or forgoing selection of, a second user interface object is based on a change in the intensity of contact relative to an initial intensity of contact, as previously described, rather than a "fixed" or "absolute" intensity threshold.

Figure 5S:
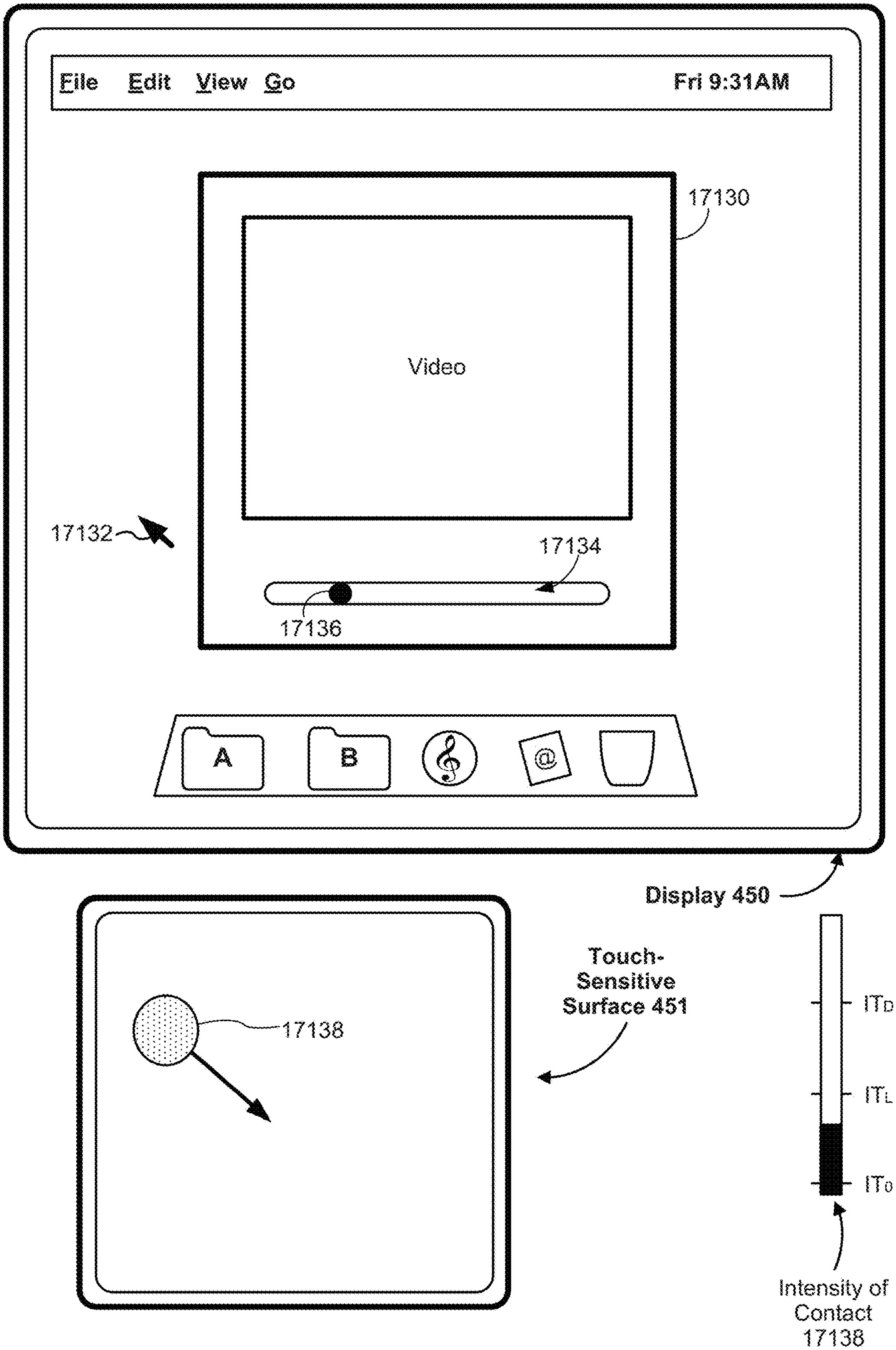

In some circumstances, movement of a particular user interface object is naturally constrained to one dimension. For example, volume sliders (which allow a user to graphically adjust the volume of, for example, speakers integrated into electronic device 300) and video scrubbers (which allow users to graphically "fast-forward" or "rewind" a digital video clip, also sometimes called a video scrub bar) are constrained to up and down or, alternatively, forward and back directions. FIGS. 5S-5AA illustrate several examples of selecting a user interface object, or forgoing selection of a user interface object, that is constrained to one dimensions.

FIG. 5S illustrates a user interface with a media player 17130. Media player 17130 includes a video scrubber 17134. Video scrubber 17134 includes a handle 17136 that indicates progress of a video clip. For example, as the video clip progresses, handle 17136 moves to the right. In some embodiments, a user can "click-and-drag" handle 17136 to the left (thereby "rewinding") or to the right (thereby "fast-forwarding"). However, in some user interfaces, subsequent motion of cursor 17132 away from the scrubber results in handle 17136 being deselected or dropped. In some embodiments described herein, a determination is made as to whether or not to select handle 17136 based on the intensity of contact while cursor 17132 is over handle 17136. When handle 17136 is selected, handle 17136 remains selected despite movement of cursor 17132 away from the scrubber, as described below. Additionally, in some user interfaces, a respective user interface object is only selected when a contact is initially detected in conjunction with detecting a focus selector over the respective user interface object (e.g., if a contact is detected on a touch-screen display at a position remote from a thumb on a slider, the thumb is not selected even if the contact moves over the thumb). Thus, it would be advantageous to be able to select and maintain selection of a user interface object that is constrained to a predefined path based on intensity of a contact rather than initial position of a focus selector on a touch-sensitive surface.

Figure 5T:
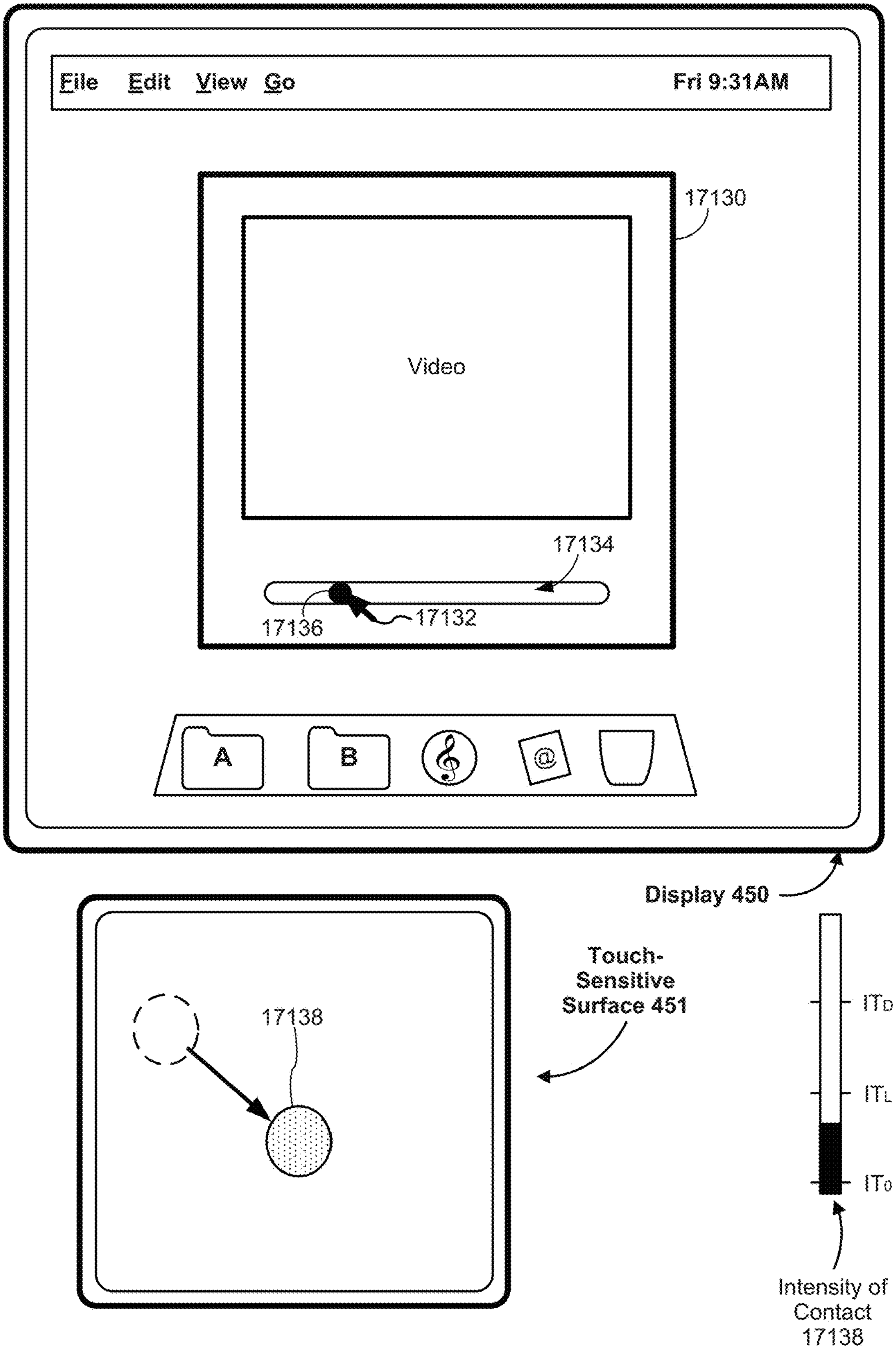
Figure 5U:
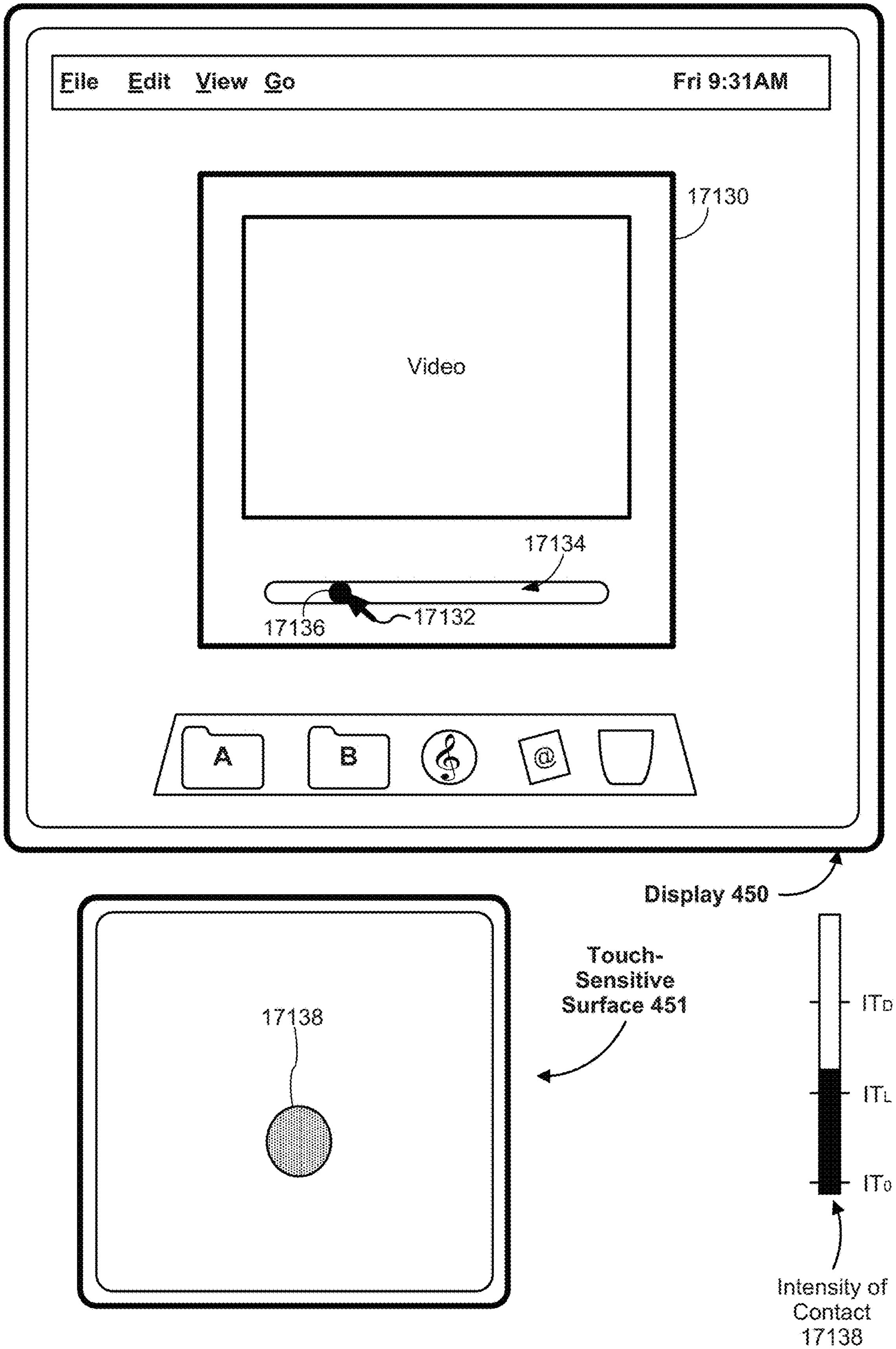
Figure 5V:
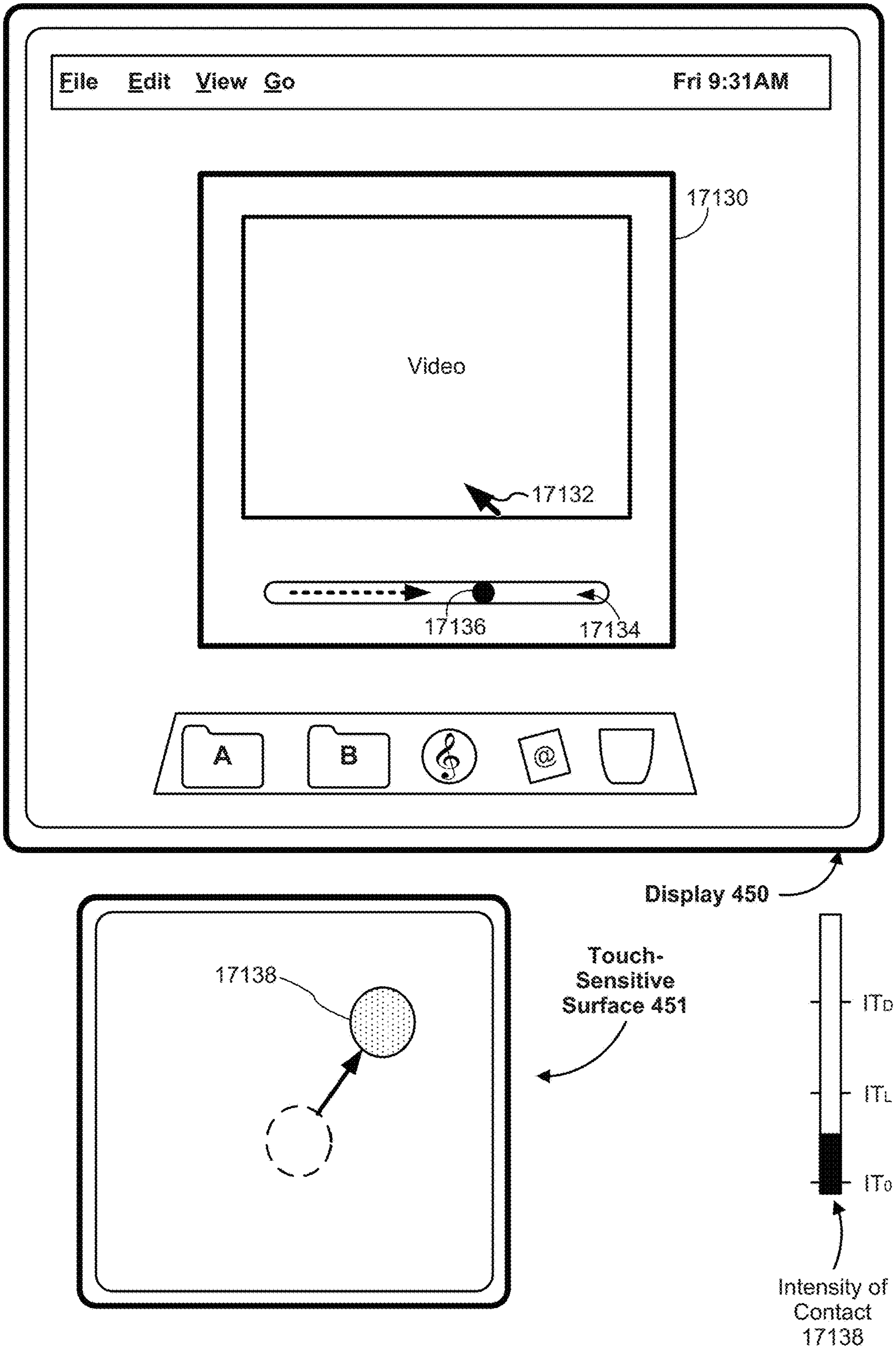

FIGS. 5S-5T illustrate moving a focus selector (e.g., cursor 17132) across display 450 in response to detecting movement of contact 17138 across the touch-sensitive surface 451. As shown in FIG. 5S before detecting the movement of contact 17138, cursor 17132 is at a position remote from handle 17136, and the device moves cursor 17132 over handle 17136, as shown in FIG. 5T. FIGS. 5T-5U illustrate detecting a light press input including detecting an increase in the intensity of contact 17138 from an intensity below $IT_L$ to an intensity above $IT_L$. FIGS. 5U-5V illustrate movement of contact 17138 that corresponds to movement of cursor 17132 to a new position shown in FIG. 5V. Although cursor 17132 is allowed to move freely within the two dimensions of the display in FIGS. 5S-5V, handle 17136 is constrained to an allowed direction defined by the scrubber 17134. As a result, handle 17136 follows the projection (or the component of) of the movement of cursor 17132 on the display in the allowed direction along the scrubber 17134.

Figure 5W:
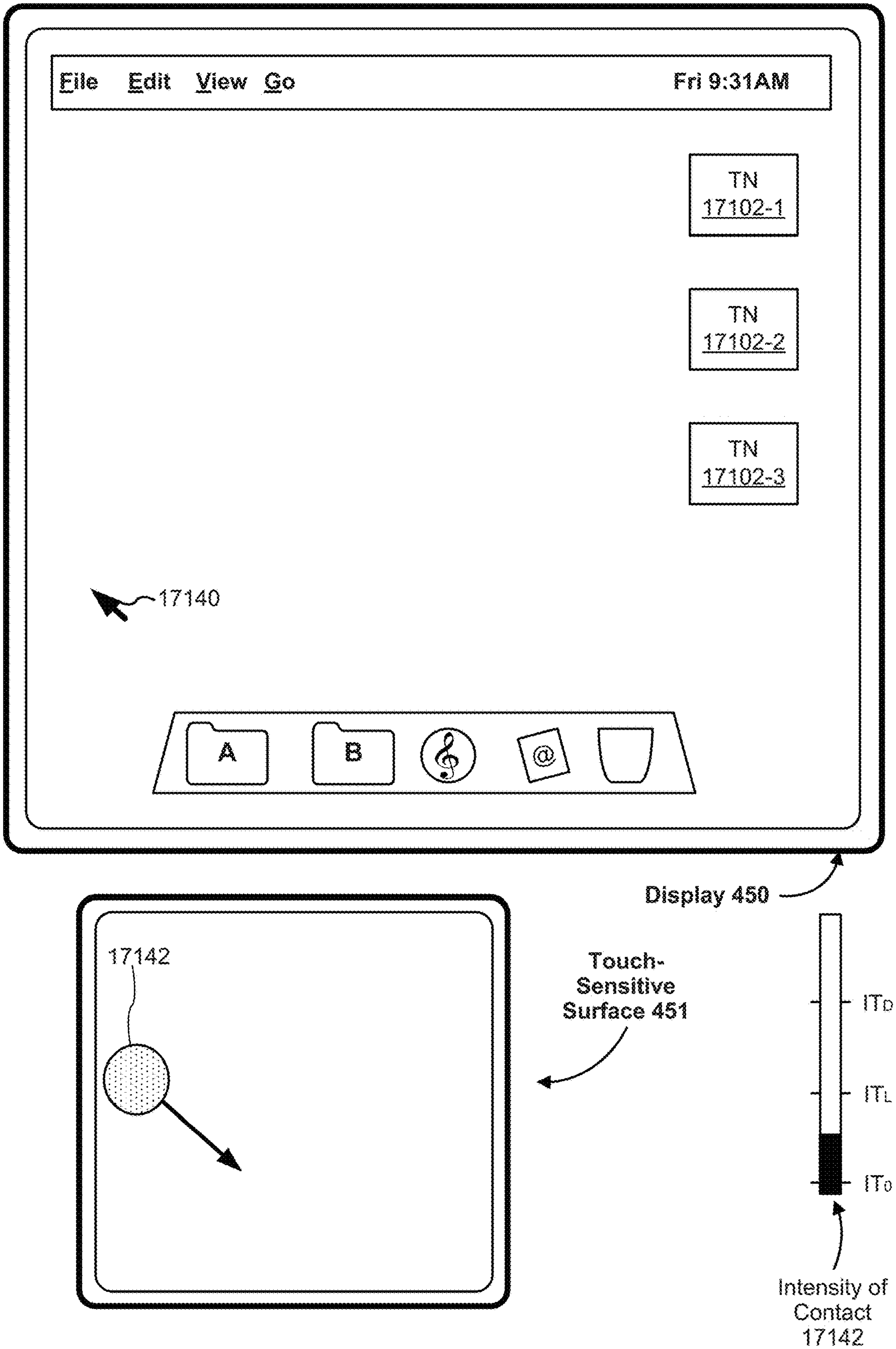
Figure 5X:
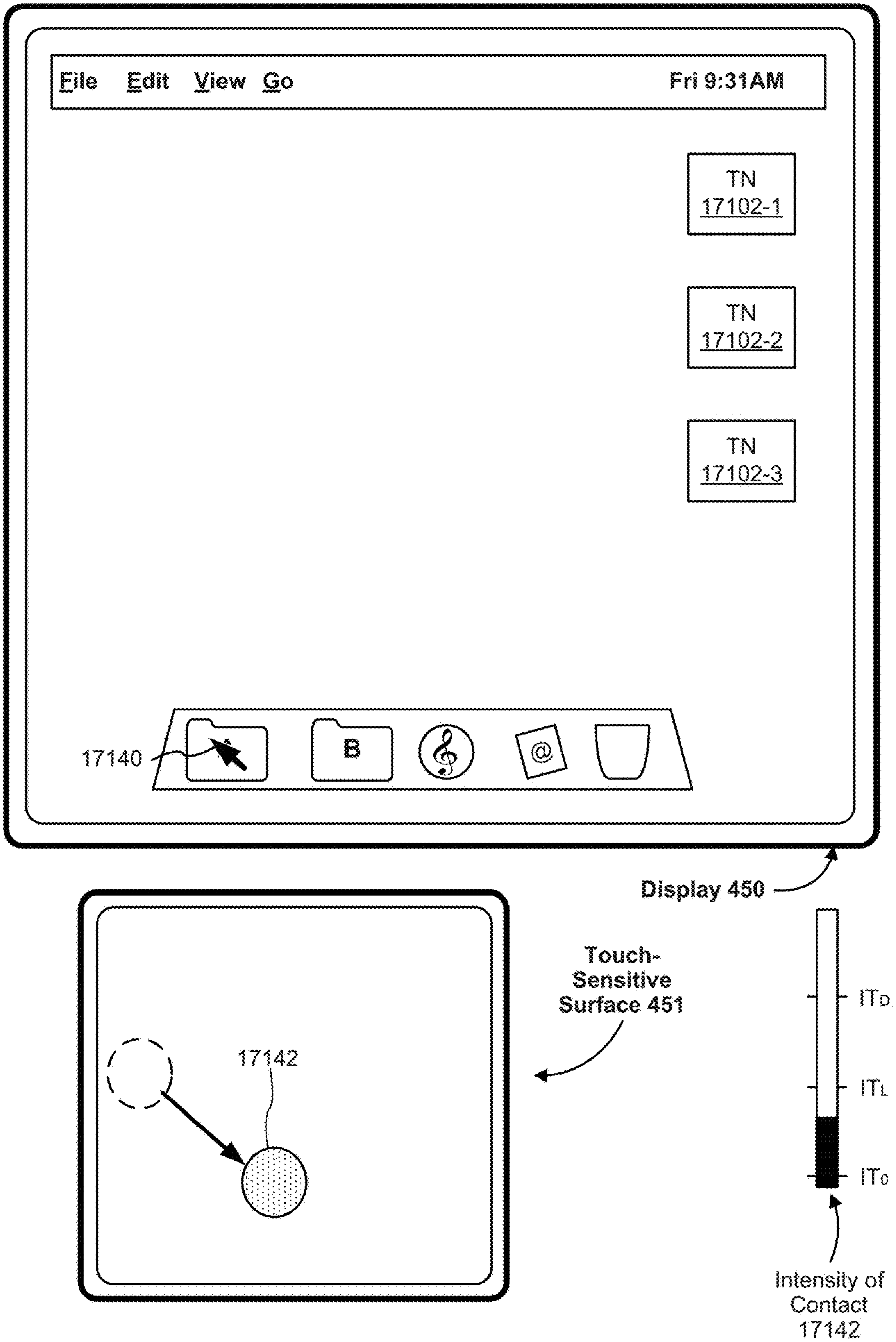
Figure 5Y:
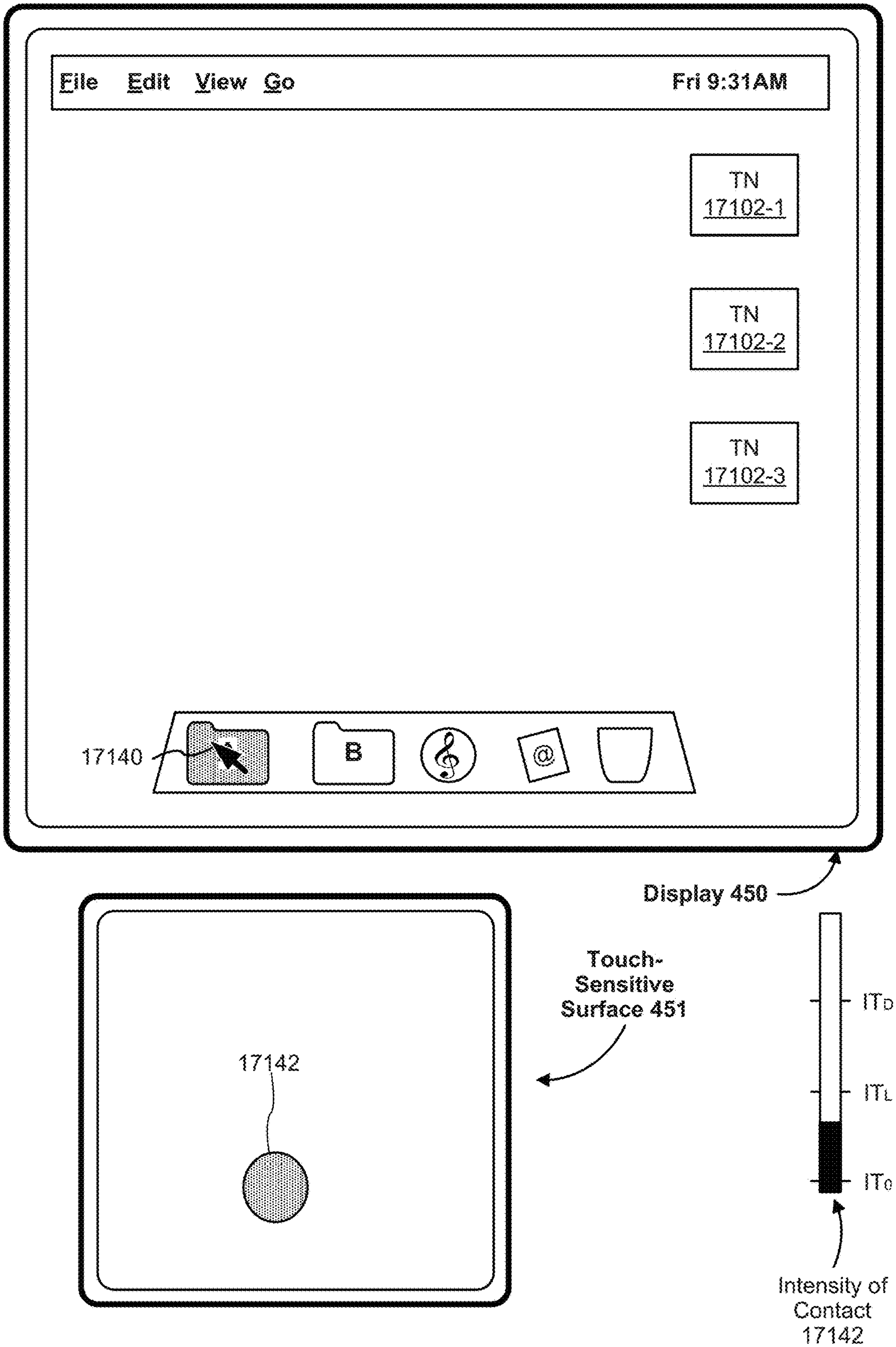
Figure 5Z:
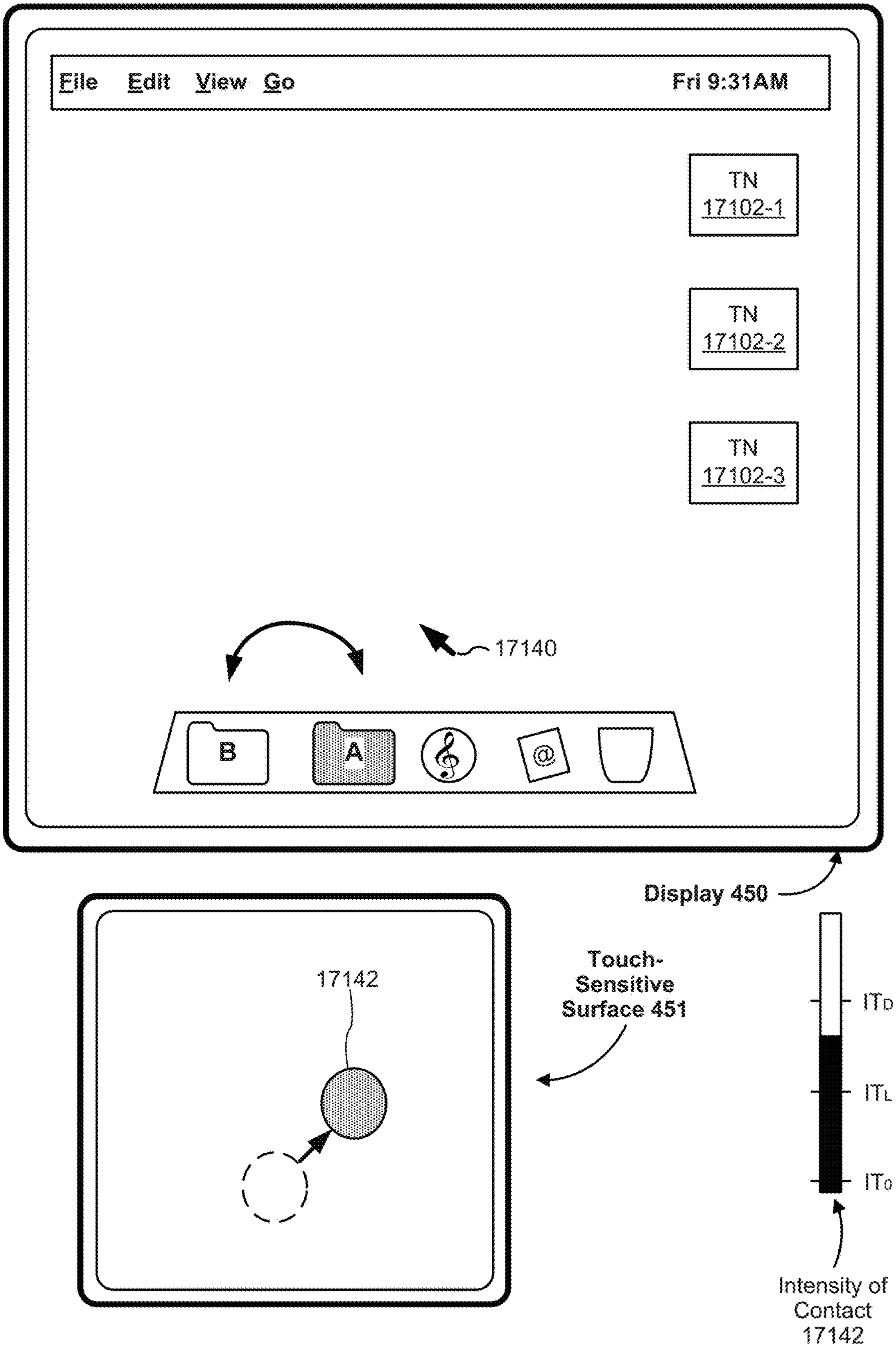
Figure 5A:
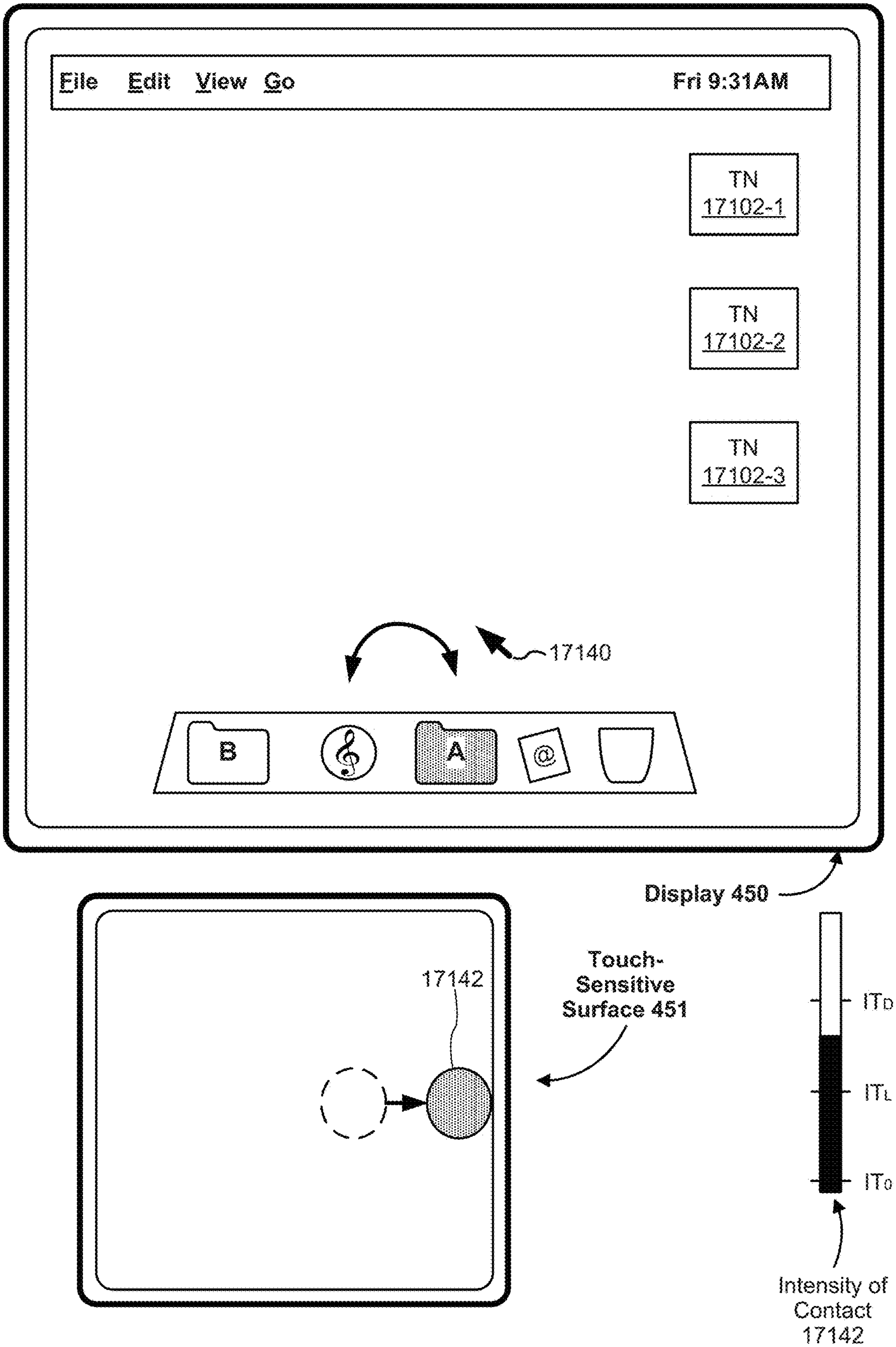
Figure 6A:
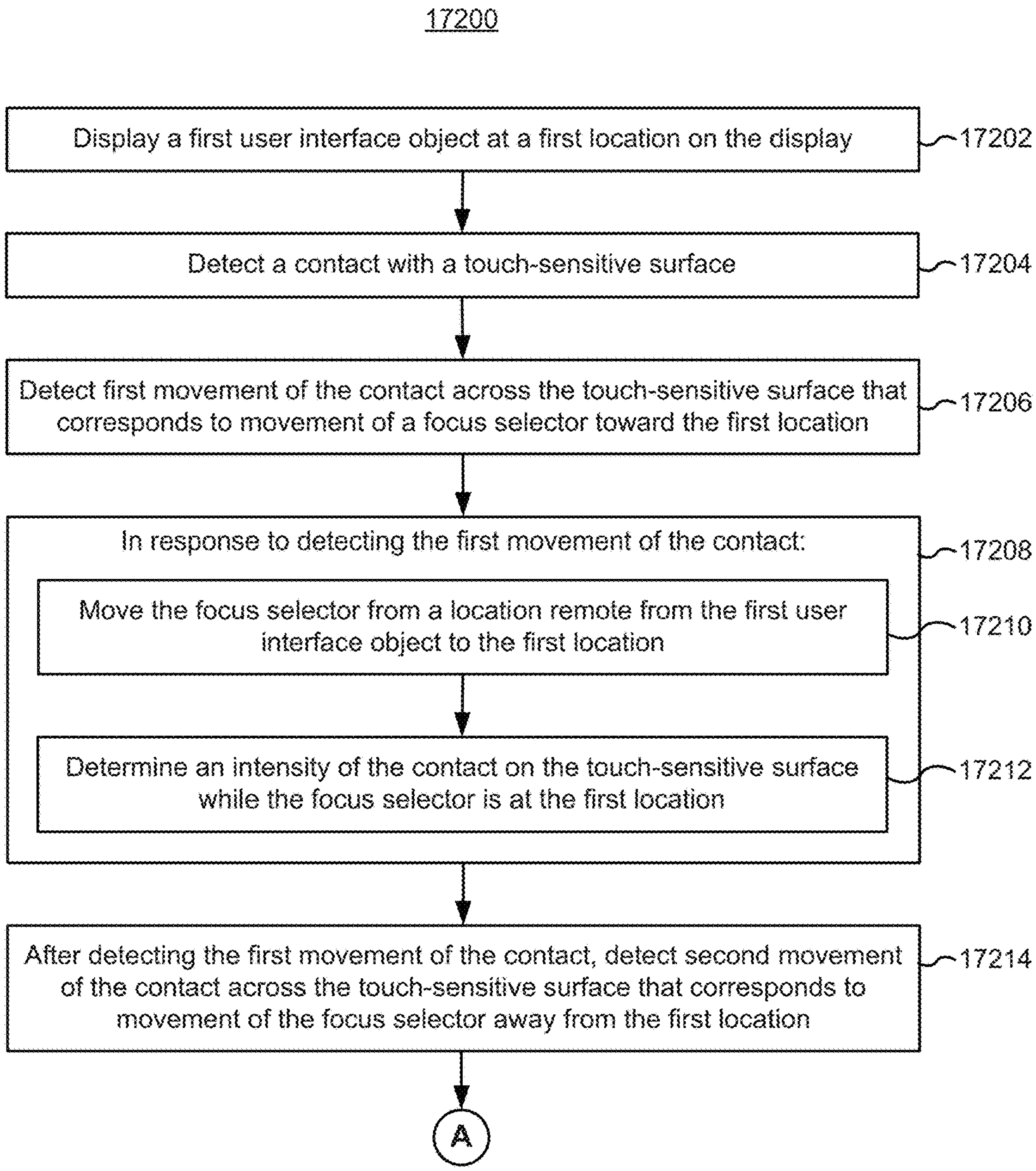
FIGS. 6A-6E are flow diagrams illustrating a method of determining whether to select a user interface object or forgo selecting a user interface object in accordance with some embodiments.
Figure 6B:
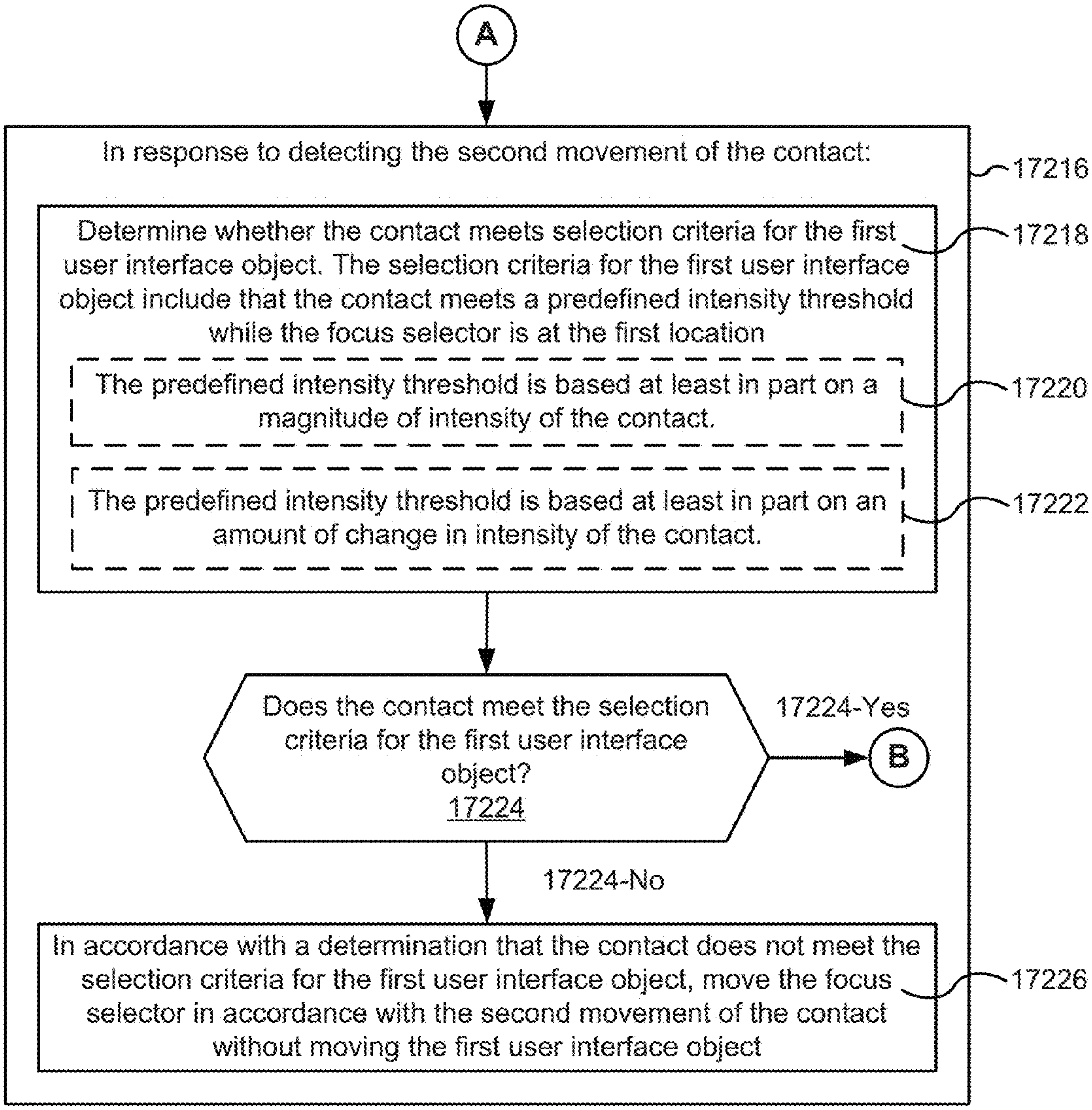
Figure 6C:
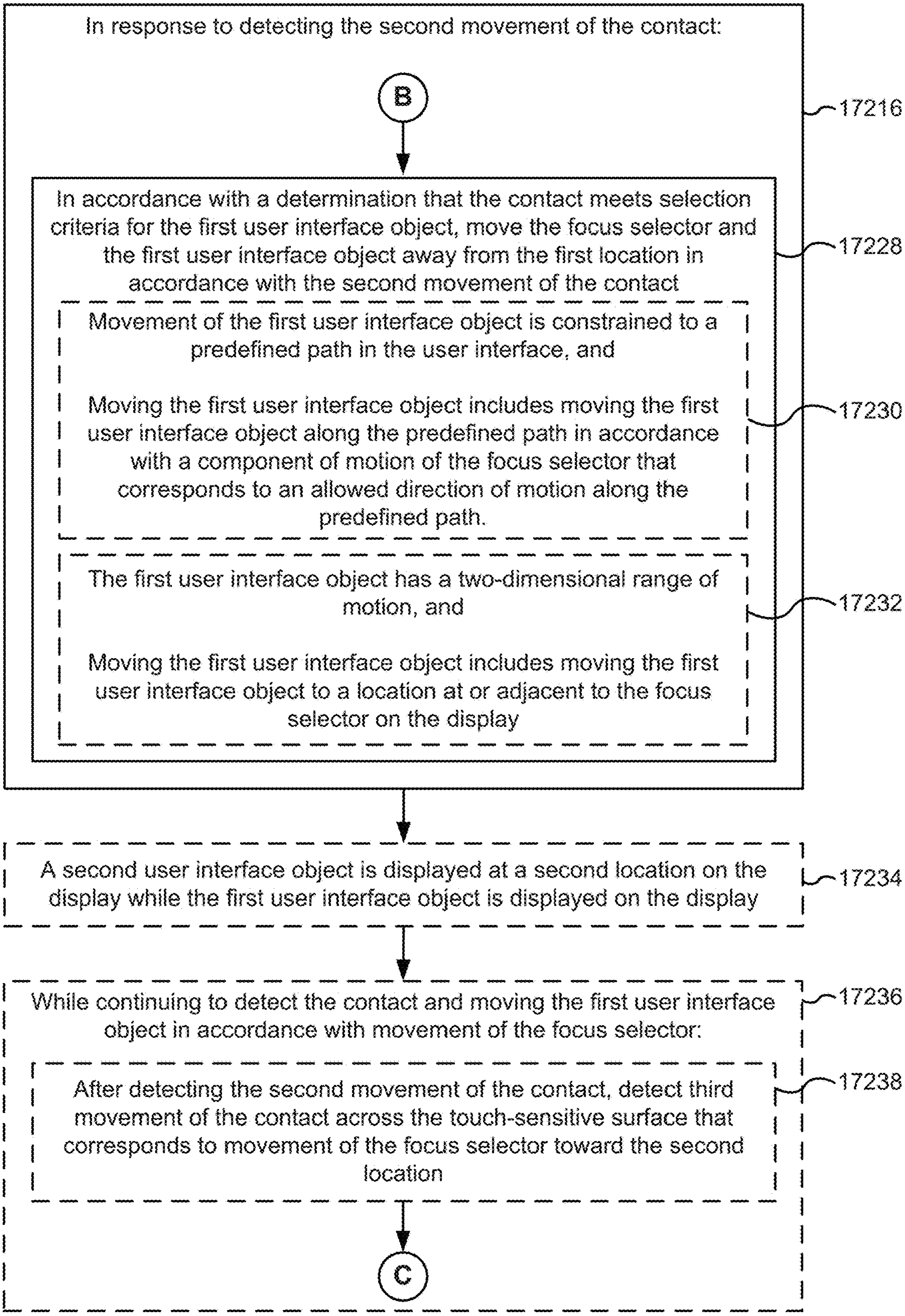
Figure 6D:
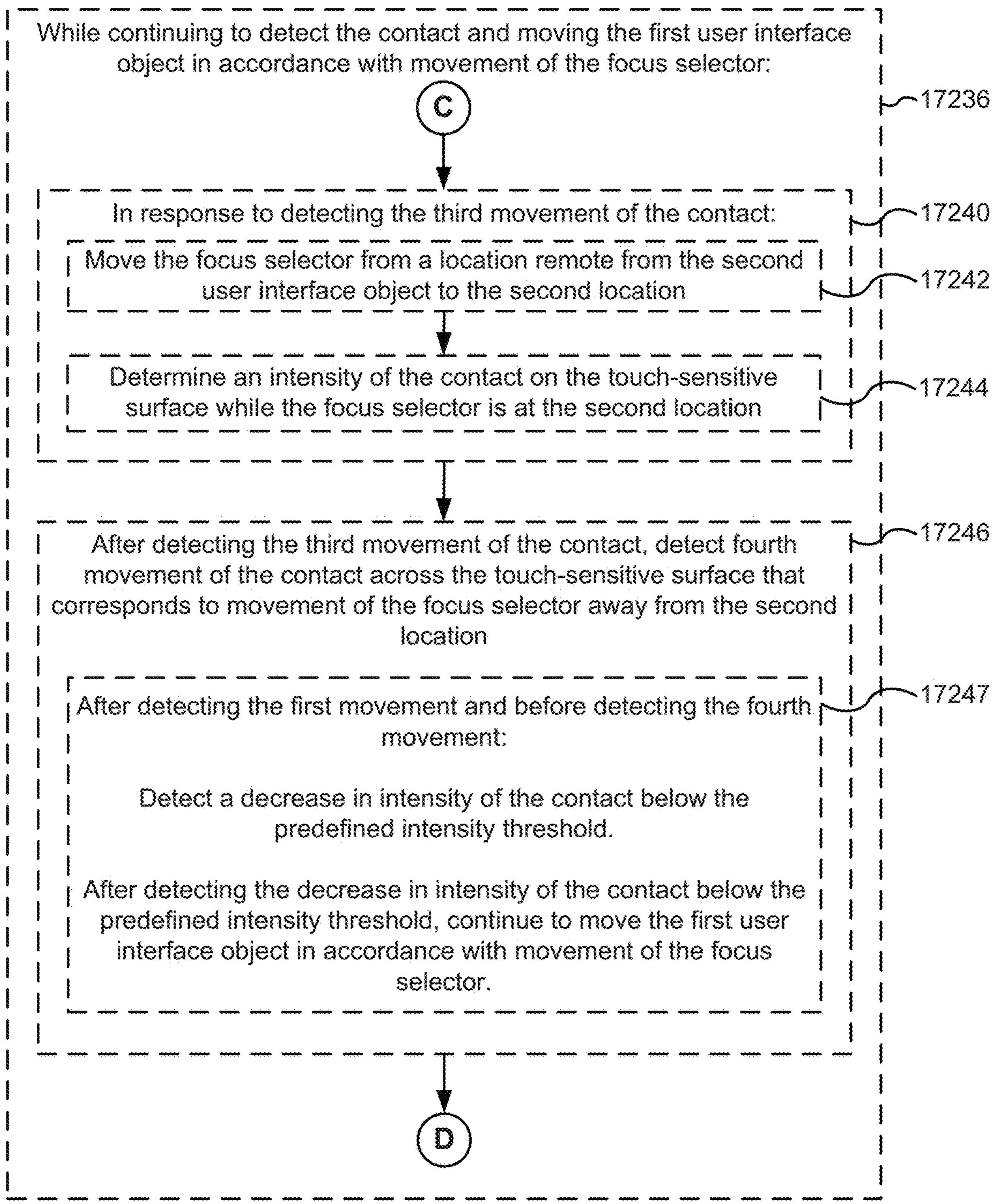
Figure 6E:
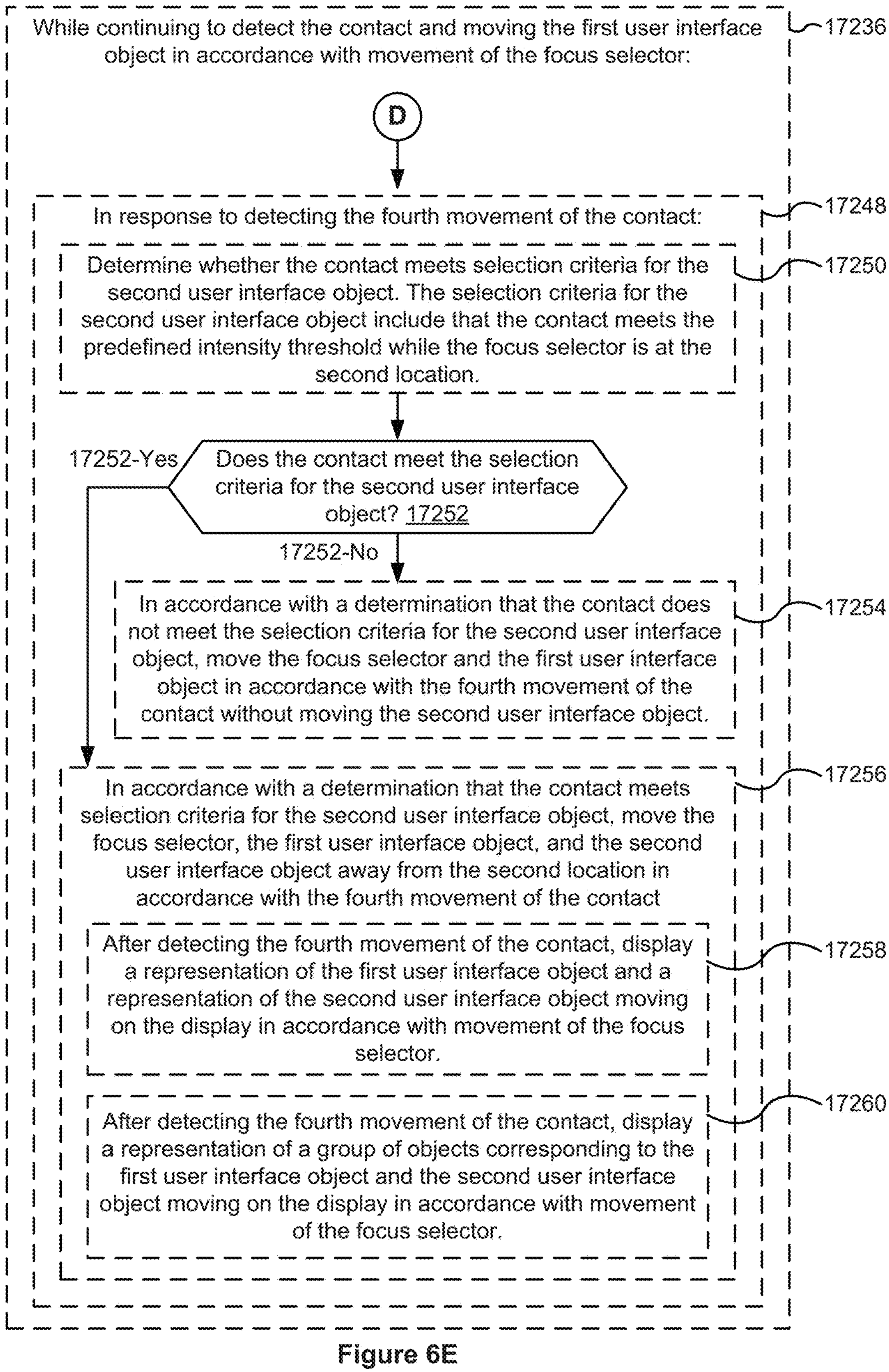

FIGS. 5W-5AA illustrate an example of selection and movement of a user interface objects constrained to one dimension. However, in this example, the user interface objects (in this case icons in an icon bar) are constrained to visual discrete locations within their one dimensional range of motion. For instance, the icons in the icon bar are ordered from left-to-right and are consistently spaced. A user, therefore, is not permitted to randomly position icons within the icon bar, but can swap the location of two icons. In FIG. 5W, the device detects contact 17142 on touch-sensitive surface 451 and detects movement of the contact (e.g., from the position of contact 17142 in FIG. 5W to the position of contact 17142 in FIG. 5X) and in response to detecting the movement of contact 17142, the device moves cursor 17140. In FIGS. 5W-5X, the device moves the cursor 17140 from a position remote from folder A in FIG. 5W to a position over folder A in FIG. 5X. In FIGS. 5X-5Y, the device detects a light press input including detecting an increase in intensity of contact 17142 from an intensity below $IT_L$ to an intensity above $IT_L$ and in response, the device selects Folder A. In response to detecting subsequent movement of contact 17142 shown in FIG. 5Z-5AA, the device moves cursor 17140 and re-orders the icons in the task bar, as shown in FIGS. 5Z-5AA. For example, in some embodiments, the final position of Folder A is determined using the projection of cursor movement along the allowed direction and then rounded to determine the new location among the discrete locations available to Folder A. When a determination is made that Folder A should move, for example, one place to the right of its current location, the device swaps the location of Folder A and the icon to its right. For example, FIG. 5Z illustrates swapping the location of Folder A and Folder B. Similarly, FIG. 5AA illustrates an example of further swapping Folder A with the music icon in response to additional movement of cursor 17140 that includes a component corresponding to movement of cursor 17140 to the right on display 450.

FIGS. 6A-6E are flow diagrams illustrating a method 17200 of determining whether to select a user interface object or forgo selecting a user interface object when a focus selector that corresponds to a contact that is already detected on the touch-sensitive surface passes over the user interface object, based on an intensity of the contact, on the touch-sensitive surface, while the focus selector is over the user interface object, in accordance with some embodiments. Method 17200 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 17200 are, optionally, combined and/or the order of some operations is, optionally, changed.

As described below, method 17200 provides an intuitive way to select a user interface object. The method reduces the cognitive burden on a user when selecting a user interface object, thereby creating a more efficient human-machine interface. For battery-operated electronic devices, method 17200 enables a user to select user interface object faster and more efficiently conserves power and increases the time between battery charges.

The device displays (17202) a first user interface object at a first location on the display, for example, thumbnail 17102-1 as described with reference to FIG. 5A. The device detects (17204) a contact (e.g., a finger contact) with a touch-sensitive surface, such as contact 17110 described with reference to 171B. The device detects (17206) first movement of the contact across the touch-sensitive surface that corresponds to movement of a focus selector toward the first location (e.g., to the first location). The first location is, optionally, a point or a region with a non-zero area, such as a hidden hit region for the first user interface object. In response to detecting the first movement of the contact (17208), the device moves the focus selector (17210) from a location remote from the first user interface object to the first location. For example, in FIG. 5B, cursor 17108 starts at an initial location, and in response to detecting movement of contact 17110 in FIG. 5C of the device moves cursor 17108 to a new location over thumbnail 17102-1.

The device also determines (17212) an intensity of the contact on the touch-sensitive surface while the focus selector is at the first location. After detecting the first movement of the contact, the device detects (17214) second movement of the contact across the touch-sensitive surface that corresponds to movement of the focus selector away from the first location. For example in FIGS. 5E, 5G, 5J and 5L the device detects movement of contact 17110 and, in response to detecting the movement of 17110 the device moves cursor 17108 away from the location corresponding to thumbnail 17102-1. In response to detecting the second movement of the contact (17216), the device determines (17218) whether the contact meets selection criteria for the first user interface object. The selection criteria for the first user interface object include that the contact meets a predefined intensity threshold while the focus selector is at the first location. FIGS. 5C-5E and FIGS. 5H-5J illustrate examples where the contact meets the selection criteria while the focus selector (e.g., cursor 17108) is over the first user interface object (e.g., thumbnail 17102-1). FIGS. 5F-5G and FIGS. 5K-5L illustrate examples where the contact does not meet the selection criteria while the focus selector (e.g., cursor 17108) is over the first user interface object (e.g., thumbnail 17102-1).

In some embodiments, the predefined intensity threshold is based (17220) at least in part on a magnitude of intensity of the contact (e.g., if the intensity of the contact is above a predefined amount of pressure that is greater than zero, then the device picks up the first user interface object). For example, FIGS. 5C-5E show an example in which the predefined intensity threshold is the light press intensity threshold (e.g., $IT_L$) and the predefined selection criteria are met because an intensity of contact 17110 is above the light press intensity threshold while cursor 17108 is over thumbnail 17102-1. On the other hand, the predefined selection criteria are not met in FIGS. 5F-5G, because contact 17110 does not have an intensity above the light press intensity threshold (e.g., $IT_L$) while cursor 17108 is over thumbnail 17102-1. In some embodiments, the predefined intensity threshold is based (17222) at least in part on an amount of change in intensity of the contact (e.g., if the intensity of the contact increases by 50%, then pick up the first user interface object). For example, FIGS. 5H-5J show an example in which the predefined selection criteria are met because an intensity of contact 17110 increases from a baseline intensity 10 by more than 50% while cursor 17108 is over thumbnail 17102-1. On the other hand, the predefined selection criteria are not met in FIGS. 5K-5L, because contact 17110 does not increase from a baseline intensity I0 by more than 50% while cursor 17108 is over thumbnail 17102-1.

In accordance with the determination that the contact meets (17224—Yes) selection criteria for the first user interface object, the device moves the focus selector and the first user interface object as described in greater detail below. In contrast, in accordance with a determination that the contact does not (17224—No) meet the selection criteria for the first user interface object, the device moves (17226) the focus selector in accordance with the second movement of the contact without moving the first user interface object (e.g., the device forgoes selecting/picking-up the first user interface object). For example, FIG. 5F shows cursor 17108 at respective location over thumbnail 17102-1, while FIG. 5G shows movement of contact 17110 along with corresponding movement of the focus selector to a new location away from thumbnail 17102-1. However, because the selection criteria for thumbnail 17102-1 were not met prior to detecting movement of contact 17110, thumbnail 17102-1 remains at the first location in FIG. 5G.

In accordance with the determination that the contact meets (17224—Yes) selection criteria for the first user interface object, the device moves (17228) the focus selector and the first user interface object away from the first location in accordance with the second movement of the contact (e.g., the device selects/picks-up the first user interface object, as illustrated in FIGS. 5E and 5J, where thumbnail 17102-1 is moved in accordance with movement of cursor 17108).

In some embodiments, movement of the first user interface object (such as a thumb or handle in a scrubber or a slider) is constrained (17230) to a predefined path in the user interface, and moving the first user interface object includes moving the first user interface object along the predefined path in accordance with a component of motion of the focus selector that corresponds to an allowed direction of motion along the predefined path. Examples of these embodiments are illustrated in the user interfaces shown in FIGS. 5S-5AA. Alternatively, in some embodiments, the first user interface object has a two-dimensional range of motion (17232), and moving the first user interface object includes moving the first user interface object to a location at or adjacent to the focus selector on the display. For example, the first user interface object is a document icon that can be moved laterally on the display in a two dimensional plane and is not constrained to a predefined path. Similar examples are illustrated in the user interfaces shown in FIGS. 5A-5R. In some embodiments, the device displays (17234) a second user interface object at a second location on the display while the first user interface object is displayed on the display (e.g., thumbnail 17102-2 in FIG. 5A). While continuing to detect (17236) the contact and moving the first user interface object in accordance with movement of the focus selector, after detecting the second movement of the contact, the device detects (17238) third movement of the contact across the touch-sensitive surface that corresponds to movement of the focus selector toward the second location (e.g., to the second location). In response to detecting the third movement of the contact (17240), the device moves (17242) the focus selector from a location remote from the second user interface object (e.g., from the first location or a location proximate to the first location) to the second location. In some embodiments, the second location is a point or a region with a non-zero area, such as a hidden hit region for the second user interface object. For example, in FIGS. 5N and 5Q, the device detects movement of contact 17110 and in response to detecting movement of contact 17110 downward on touch-sensitive surface 451, the device moves cursor 17108 over a second user interface object (e.g., thumbnail 17102-2).

In response to detecting third movement of the contact, the device also determines (17244) an intensity of contact on the touch-sensitive surface while the focus selector is at the second location. After detecting the third movement of the contact, the device detects (17246) fourth movement of the contact across the touch-sensitive surface that corresponds to movement of the focus selector away from the second location. For example, in FIGS. 5P and 5R, the device detects movement of contact 17110 and in response to detecting movement of contact 17110 to the left on touch-sensitive surface 451, the device moves cursor 17108 away from the location occupied by a second user interface object (e.g., thumbnail 17102-2) before detecting the third movement or the fourth movement.

In some embodiments, after detecting the first movement and before detecting the fourth movement, the device detects (17247) a decrease in intensity of the contact below the predefined intensity threshold, and after detecting the decrease in intensity of the contact below the predefined intensity threshold, the device continues to move the first user interface object in accordance with movement of the focus selector (e.g., in FIG. 5Q, contact 17110 has an intensity below $IT_L$). For example, after "picking up" the first user interface object, the user can lower the intensity of the contact without "dropping" the first user interface object, so that the user will be able to "pick up" additional user interface objects (e.g., the second user interface object) by increasing the intensity of the contact above the predefined intensity threshold again over each additional user interface object. If the user has picked up several user interface objects (e.g., the first user interface object and the second user interface object), the user can lower the intensity of the contact without "dropping" the any of the user interface objects, so that the user will be able to "pick up" additional user interface objects (e.g., the second user interface object) by increasing the intensity of the contact above the predefined intensity threshold again over each additional user interface object.

In response to detecting (17248) the fourth movement of the contact, the device determines whether the contact meets selection criteria for the second user interface object. The selection criteria for the second user interface object include that the contact meets the predefined intensity threshold while the focus selector is at the second location.

In accordance with a determination that the contact does not (17252—No) meet the selection criteria for the second user interface object, the device moves (17254) the focus selector and the first user interface object in accordance with the fourth movement of the contact without moving the second user interface object (e.g., the device forgoes selection/fails to pick-up the second user interface object, as illustrated in FIG. 5R, where thumbnail 17102-2 is not moved in accordance with movement of cursor 17108). In some embodiments, when a first user interface object is already selected and the device detects an increase in intensity of the contact while the focus selector is over the second object, the second object is picked up in addition to the first object. As such, the user can select and move multiple objects with a single contact by moving the focus selector over a plurality of different user interface objects and performing a press gesture that includes increasing the intensity of the contact above the predefined intensity threshold while the focus selector is over each of the user interface objects.

In accordance with a determination that the contact meets (17252—Yes) selection criteria for the second user interface object, the device moves (17256) the focus selector, the first user interface object, and the second user interface object away from the second location in accordance with the fourth movement of the contact (e.g., the device selects/picks-up the second user interface object and moves the second user interface object along with the first user interface object, as illustrated in FIG. 5P, where thumbnail 17102-2 is moved in accordance with movement of cursor 17108). In some embodiments, after detecting the fourth movement of the contact, a representation of the first user interface object and a representation of the second user interface object are displayed (17258) moving on the display in accordance with movement of the focus selector (e.g., as illustrated in FIG. 5P). In some embodiments, after detecting the fourth movement of the contact, a representation of a group of objects corresponding to the first user interface object and the second user interface object are displayed (17260) moving on the display in accordance with movement of the focus selector.

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 17200 described above with respect to FIGS. 6A-6E. For example, the contacts, user interface objects, intensity thresholds, and focus selectors described above with reference to method 17200 optionally have one or more of the characteristics of the contacts, user interface objects, intensity thresholds, and focus selectors described herein with reference to other methods described herein (e.g., those listed in the fifth paragraph of the Description of Embodiments). For brevity, these details are not repeated here.

Figure 7:
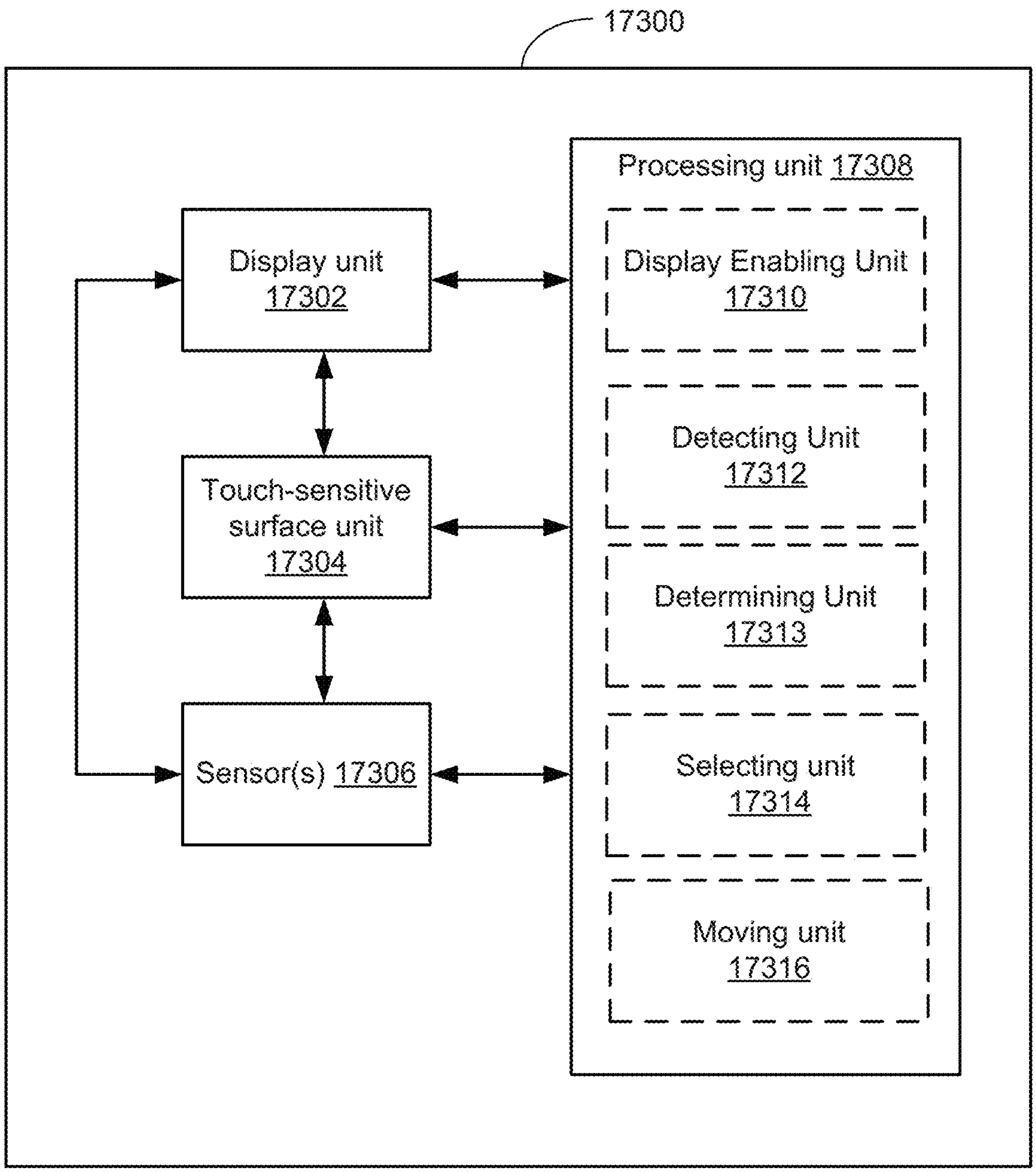
FIG. 7 is a functional block diagram of an electronic device in accordance with some embodiments.

In accordance with some embodiments, FIG. 7 shows a functional block diagram of an electronic device 17300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 17300 includes a display unit 17302 configured to display a user interface that includes a first user interface object at a first location on the display unit, a touch-sensitive surface unit 17304 configured to detect contacts, one or more sensor units 17306 configured to detect intensity of contacts with the touch-sensitive surface unit 17304; and a processing unit 17308 coupled to the display unit 17302, the touch-sensitive surface unit 17304 and the one or more sensor units 17306. In some embodiments, the processing unit 17308 includes a display enabling unit 17310, a detecting unit 17312, a determining unit 17313, a selecting unit 17314, and a moving unit 17316.

Processing unit 17308 is configured to detect first movement of the contact (e.g., with the detecting unit 17312) across touch-sensitive surface unit 17304 that corresponds to movement of a focus selector toward the first location. In response to detecting the first movement of the contact, processing unit 17308 is configured to move (e.g., with the moving unit 17316) the focus selector from a location remote from the first user interface object to the first location, and determine (e.g., with the determining unit 17313) an intensity of the contact on touch-sensitive surface unit 17304 while the focus selector is at the first location. After detecting the first movement of the contact, processing unit 17308 is configured to detect second movement of the contact (e.g., with the detecting unit 17312) across the touch-sensitive surface unit 17304 that corresponds to movement of the focus selector away from the first location. In response to detecting the second movement of the contact, in accordance with a determination that the contact meets selection criteria for the first user interface object, where the selection criteria for the first user interface object include that the contact meets a predefined intensity threshold while the focus selector is at the first location, processing unit 17308 is configured to move (e.g., with the moving unit 17316) the focus selector and the first user interface object away from the first location in accordance with the second movement of the contact. In response to detecting the second movement of the contact, in accordance with a determination that the contact does not meet the selection criteria for the first user interface object, processing unit 17308 is configured to move (e.g., with the moving unit 17316) the focus selector in accordance with the second movement of the contact without moving the first user interface object.

In some embodiments, movement of the first user interface object is constrained to a predefined path in the user interface, and moving the first user interface object includes moving the first user interface object (e.g., with the moving unit 17316) along the predefined path in accordance with a component of motion of the focus selector that corresponds to an allowed direction of motion along the predefined path.

In some embodiments, the first user interface object has a two-dimensional range of motion, and moving the first user interface object includes moving the first user interface object (e.g., with the moving unit 17316) to a location at or adjacent to the focus selector on the di splay unit.

In some embodiments, the predefined intensity threshold is based at least in part on an amount of change in intensity of the contact.

In some embodiments, the predefined intensity threshold is based at least in part on a magnitude of intensity of the contact.

In some embodiments, a second user interface object is displayed on display unit 17302 at a second location on display unit 17302 while the first user interface object is displayed on display unit 17302, and processing unit 17308 is configured to, while continuing to detect the contact and moving the first user interface object in accordance with movement of the focus selector and after detecting the second movement of the contact, detect third movement of the contact (e.g., with the detecting unit 17312) across the touch-sensitive surface unit 17304 that corresponds to movement of the focus selector toward the second location (e.g., to the second location). In response to detecting the third movement of the contact, processing unit 17308 is configured to move (e.g., with the moving unit 17316) the focus selector from a location remote from the second user interface object to the second location, and determine (e.g., with the determining unit 17313) an intensity of the contact on the touch-sensitive surface unit 17304 while the focus selector is at the second location. After detecting the third movement of the contact, processing unit 17308 is configured to detect fourth movement of the contact (e.g., with the detecting unit 17312) across the touch-sensitive surface unit 17304 that corresponds to movement of the focus selector away from the second location. In response to detecting the fourth movement of the contact, in accordance with a determination that the contact meets selection criteria for the second user interface object, where the selection criteria for the second user interface object include that the contact meets the predefined intensity threshold while the focus selector is at the second location, processing unit 17308 is configured to move (e.g., with the moving unit 17316) the focus selector, the first user interface object, and the second user interface object away from the second location in accordance with the fourth movement of the contact. In response to detecting the fourth movement of the contact, in accordance with a determination that the contact does not meet the selection criteria for the second user interface object, processing unit 17308 is configured to move (e.g., with the moving unit 17316) the focus selector and the first user interface object in accordance with the fourth movement of the contact without moving the second user interface object.

In some embodiments, processing unit 17308 is further configured to, after detecting the fourth movement of the contact, display (e.g., with the display enabling unit 17310) a representation of the first user interface object and a representation of the second user interface object moving on the display unit in accordance with movement of the focus selector.

In some embodiments, processing unit 17308 is further configured to, after detecting the fourth movement of the contact, display (e.g., with the display enabling unit 17310) a representation of a group of objects corresponding to the first user interface object and the second user interface object moving on the display unit in accordance with movement of the focus selector.

In some embodiments, processing unit is further configured to, after detecting the first movement and before detecting the fourth movement detect a decrease in intensity of the contact (e.g., with the detecting unit 17312) below the predefined intensity threshold, and after detecting the decrease in intensity of the contact below the predefined intensity threshold, continuing to move (e.g., with the moving unit 17316) the first user interface object in accordance with movement of the focus selector.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6E are, optionally, implemented by components depicted in FIGS. 1A-1B or FIG. 7. For example, detection operations 17204 and 17212, moving operations 17210, 17226 and 17228, and determining operation 17212 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selecting User Interface Objects

Many electronic devices have graphical user interfaces that display user interface objects such as thumbnails, icons, folders, and thumb/handles in scrubbers and slider bar on a display. Such user interface items generally represent either a file or a directory (or sub-directory) corresponding to a collection of files. Often, a user of an electronic device will want to select and move user interface objects on the display. For example, a user will want to rearrange desktop items in a desktop environment/window system. As another example, a user may want to select several user interface objects and add the selected user interface object to a collection of user interface objects. Such operations occur, for example, while using a desktop environment (e.g., adding files to a folder), or between a desktop environment and an application (e.g., adding files from a desktop window to a play list in a media player), or within an application (e.g., selecting and dragging user interface items within a media player). As yet another example, a user may want to rearrange the order of thumbnails corresponding to applications, or "apps" displayed on the display of a portable multifunction device.

Some methods of selecting user interface objects on electronic devices with touch-sensitive surfaces typically require performing a distinct selection operation on each of a plurality of a user interface objects (e.g., activating a mouse button or placing a contact on a touch-sensitive surface) to individually select the user interface objects. Typically, in such embodiments, in order to perform a subsequent selection operation a user first ceases to select a previously selected object (e.g., a previously selected user interface object is deselected when the mouse button is deactivated or the contact is lifted off of the touch-sensitive surface). Thus, in these examples, selection of a second user interface object (e.g., another desktop item) requires a separate selection operation and consequently only one user interface object is selected at a time. Alternatively, some methods enable a user to select multiple user interface an area to select multiple user interface objects, however this method of selecting objects does not enable a user to a specific set of user interface objects from a group of user interface objects that are located in close proximity to each other. The embodiments described below provide a more efficient, intuitive method, implemented on an electronic device with a touch-sensitive surface, for determining whether to select a user interface object, or forgo selecting a user interface object, based on an intensity of a contact with the touch-sensitive surface. In some circumstances, multiple user interface objects are selected using a single, continuous contact or, alternative, multiple distinct contacts on the touch-sensitive surface.

FIGS. 8A-8DD illustrate exemplary user interfaces for selecting user interface objects in accordance with some embodiments. The user interfaces in these figures are used to illustrate the processes described below, including the processes in FIGS. 9A-9E. For figures that illustrate a contact with a touch-sensitive surface, an intensity diagram is included that shows the current intensity of the contact on the touch-sensitive surface relative to a plurality of intensity thresholds including an alternative-mode intensity threshold (e.g., "$IT_D$") and a selection intensity threshold (e.g., "$IT_L$").

In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 8A-8DD and FIGS. 9A-9E will be discussed with reference to display 450 and a separate touch-sensitive surface 451, however analogous operations are, optionally, performed on a device with a touch-sensitive display system 112 in response to detecting the contacts described in FIGS. 8A-8DD on the touch-sensitive display system 112 while displaying the user interfaces shown in FIGS. 8A-8DD on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 17408.

Figure 8A:
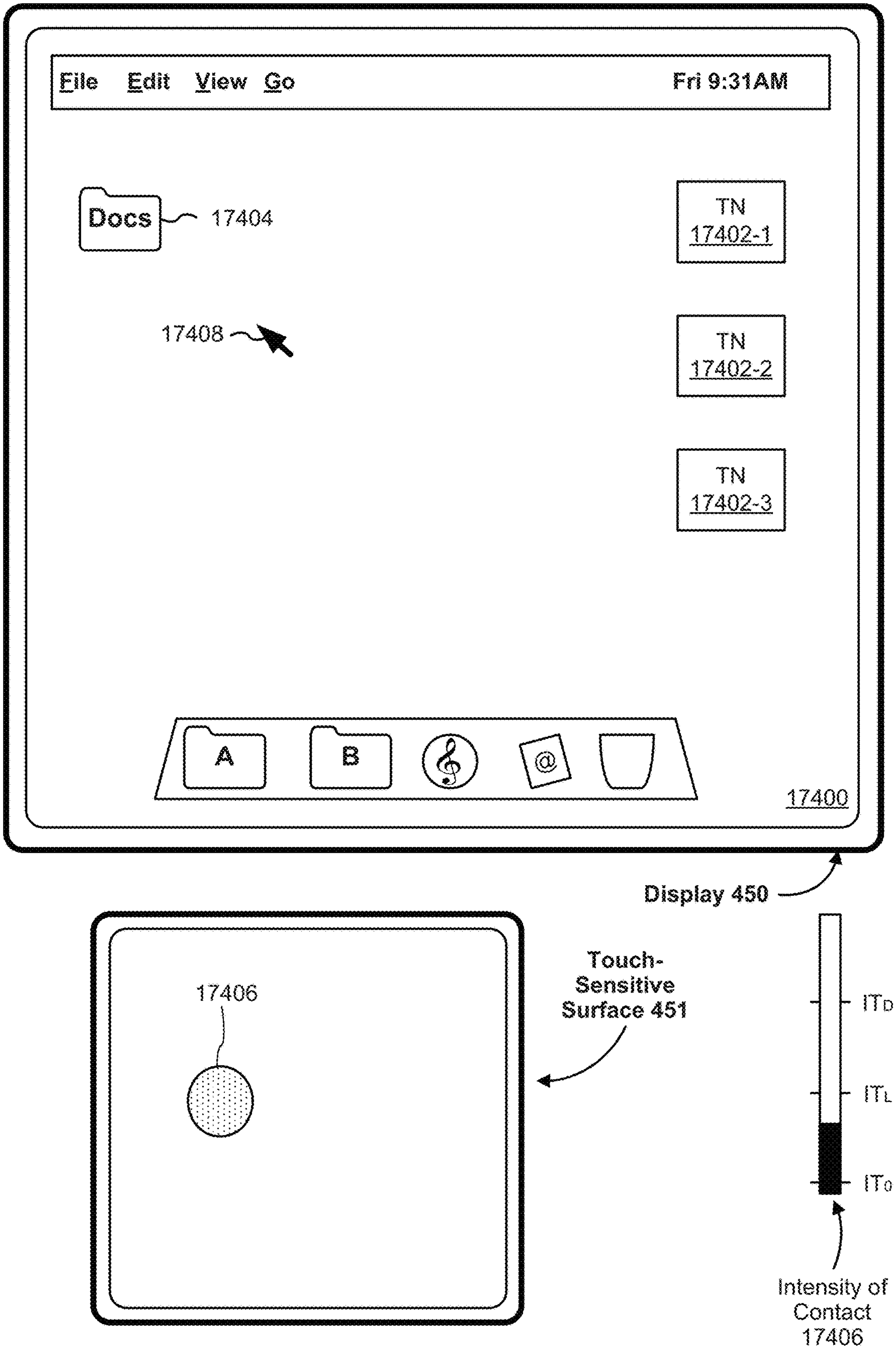
FIGS. 8A-8DD illustrate exemplary user interfaces for selecting user interface objects in accordance with some embodiments.
Figure 8B:
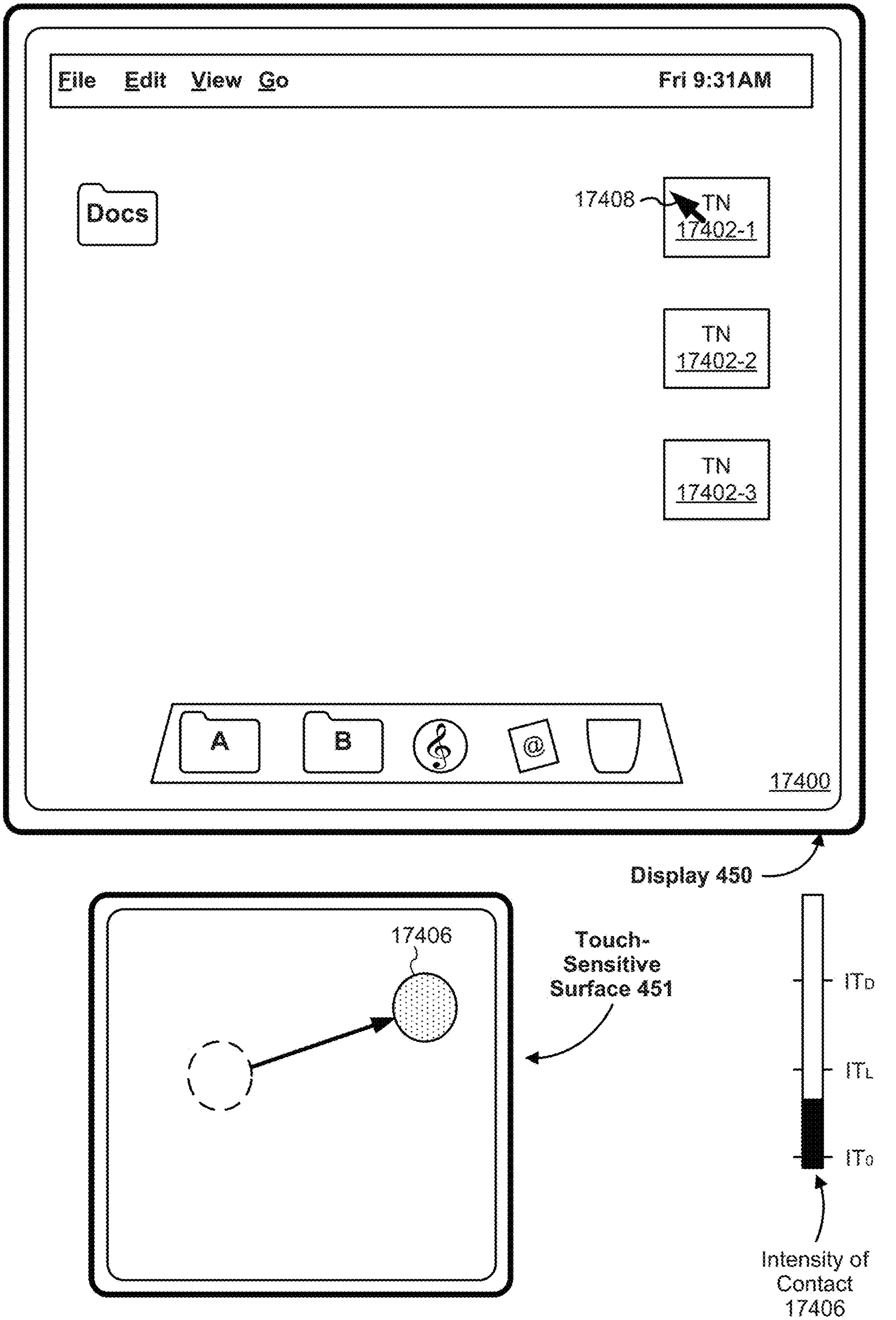

FIG. 8A illustrates an exemplary user interface for selecting user interface objects in accordance with some embodiments. FIG. 8A illustrates an exemplary user interface 17400. User interface 17400 is displayed on display 450 and includes user interface objects (e.g., thumbnails 17402, folder 17404) as well as a focus selector (e.g., cursor 17408). FIG. 8B illustrates the device detecting movement of contact 17406 across touch-sensitive surface 451 and in response moving cursor 17408 across the display from a location remote from thumbnail 17402-1 in FIG. 8A to a location over thumbnail 17402-1 in FIG. 8B.

FIGS. 8B-8F illustrate an example user interface for selecting user interface objects in a first selection mode in accordance with some embodiments. At the outset of FIG. 8B, user interface 17400 is in a first selection mode (sometimes referred to as a "single object selection mode") with properties described below. Furthermore, in FIGS. 8B-8F, contact 17406 represents a continuously detected (e.g., unbroken) contact with touch-sensitive surface 451, (e.g., the contact is continuously detected between the beginning of the first press input and the end of the second press input).

In some embodiments, contact 17406 controls the position of cursor 17408. For example, movement of contact 17406 across touch-sensitive surface 451 (illustrated by the arrow attached to contact 17406, FIG. 8B) causes cursor 17408 to move correspondingly toward, or in some cases to, a location of thumbnail 17402-1. It should be appreciated that the location of thumbnail 17402-1 is, optionally, defined as a point (e.g., a corner of the thumbnail, or the geometric center of mass), or by a non-zero area, such as any location within the boundary of thumbnail 17402 or a hidden hit region for thumbnail 17402-1. In some embodiments, the hidden hit region is larger than thumbnail 17402-1. In some implantations, the hidden hit region is "shifted" relative to the boundary of thumbnail 17402-1. Accordingly, in some embodiments, cursor 17408 is considered to be "over" thumbnail 17402-1 whenever cursor 17408 is displayed within the boundary defining the location of thumbnail 17402-1. Likewise, the location of other user interface objects is similarly defined. Regardless of the definition of the location of a user interface object, a press input detected while a focus selector is over a user interface object is sometimes referred to as a "press input on a respective user interface object," or the like.

Figure 8C:
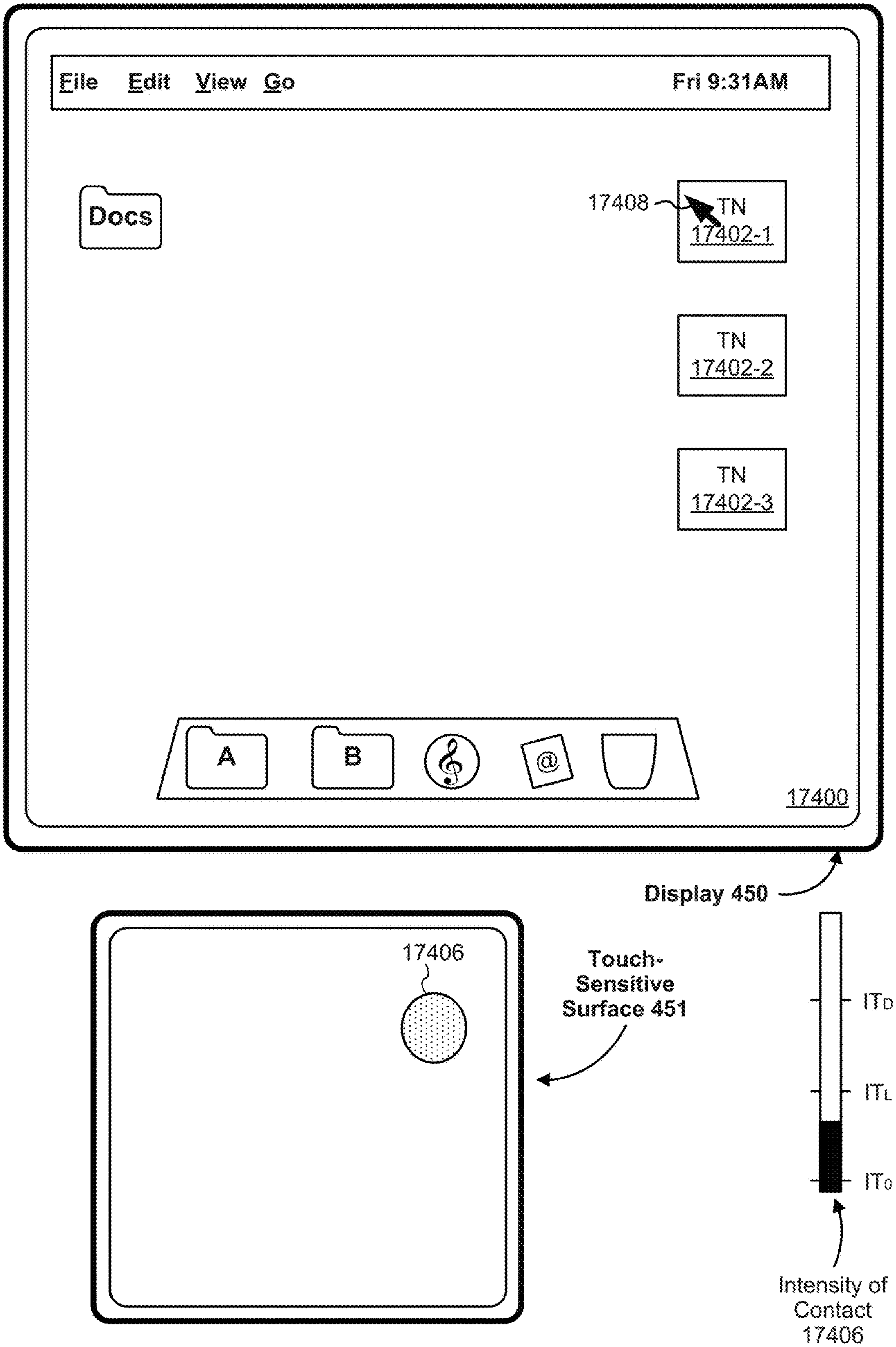
Figure 8D:
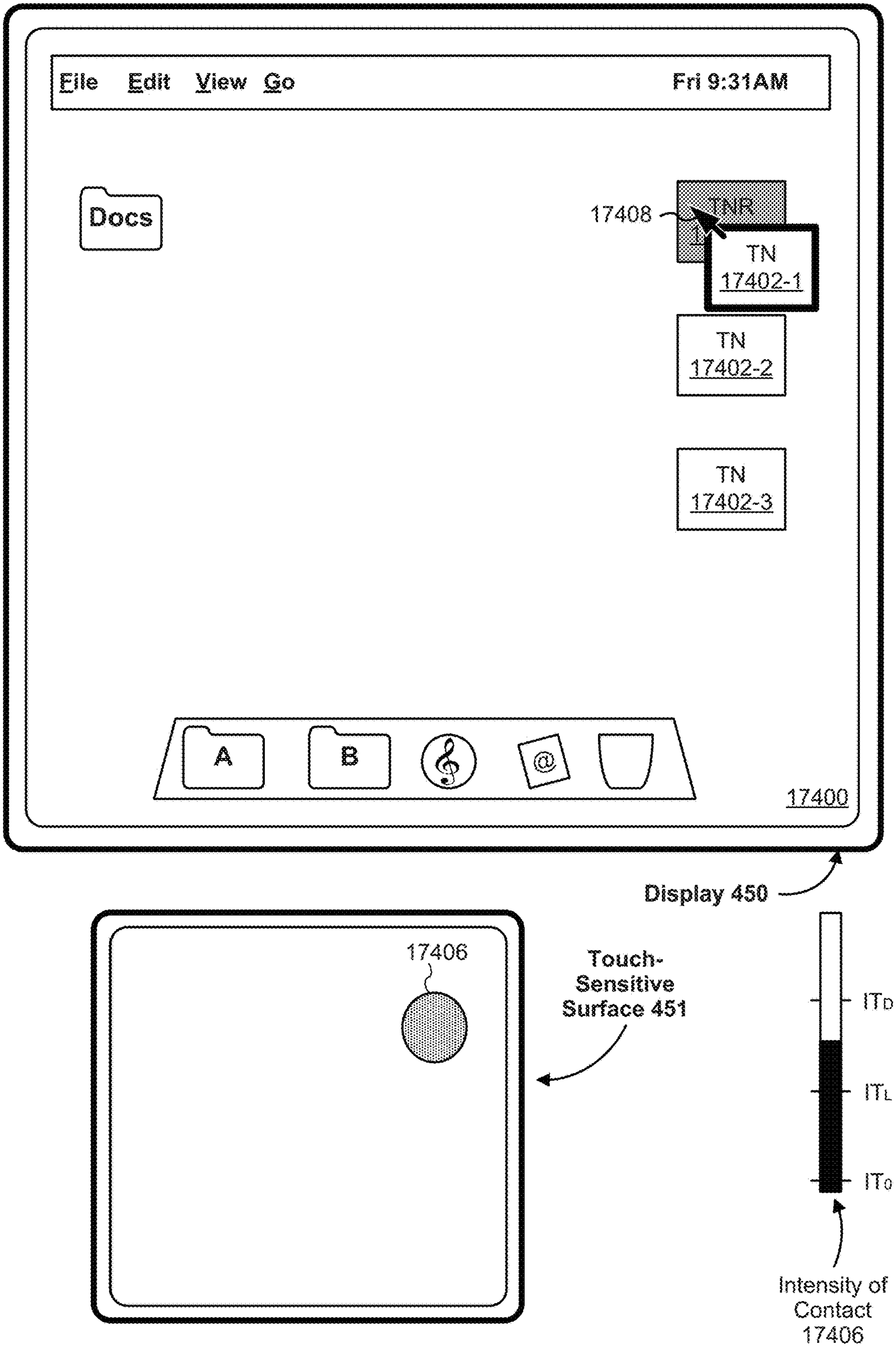
Figure 8E:
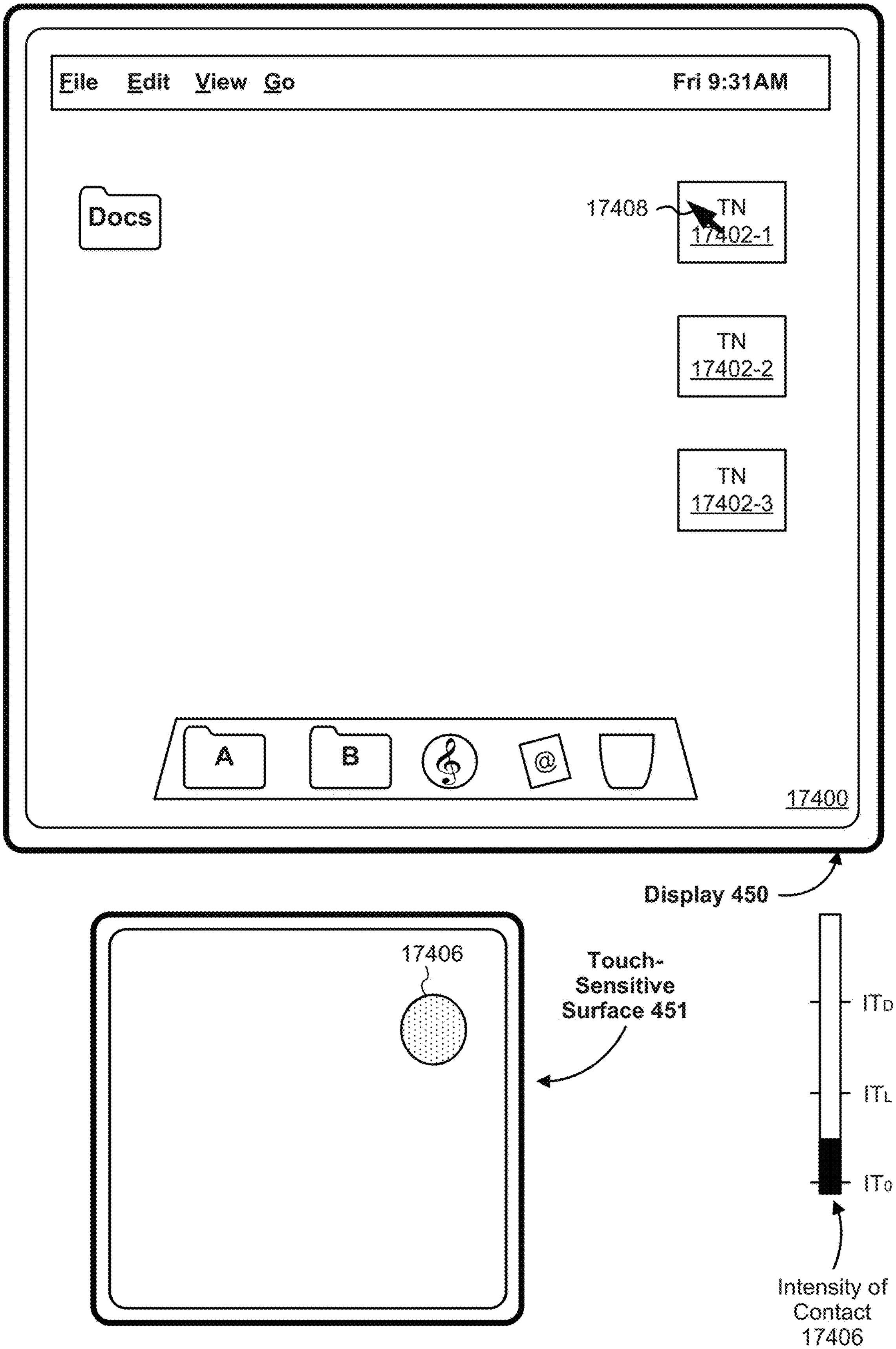
Figure 8F:
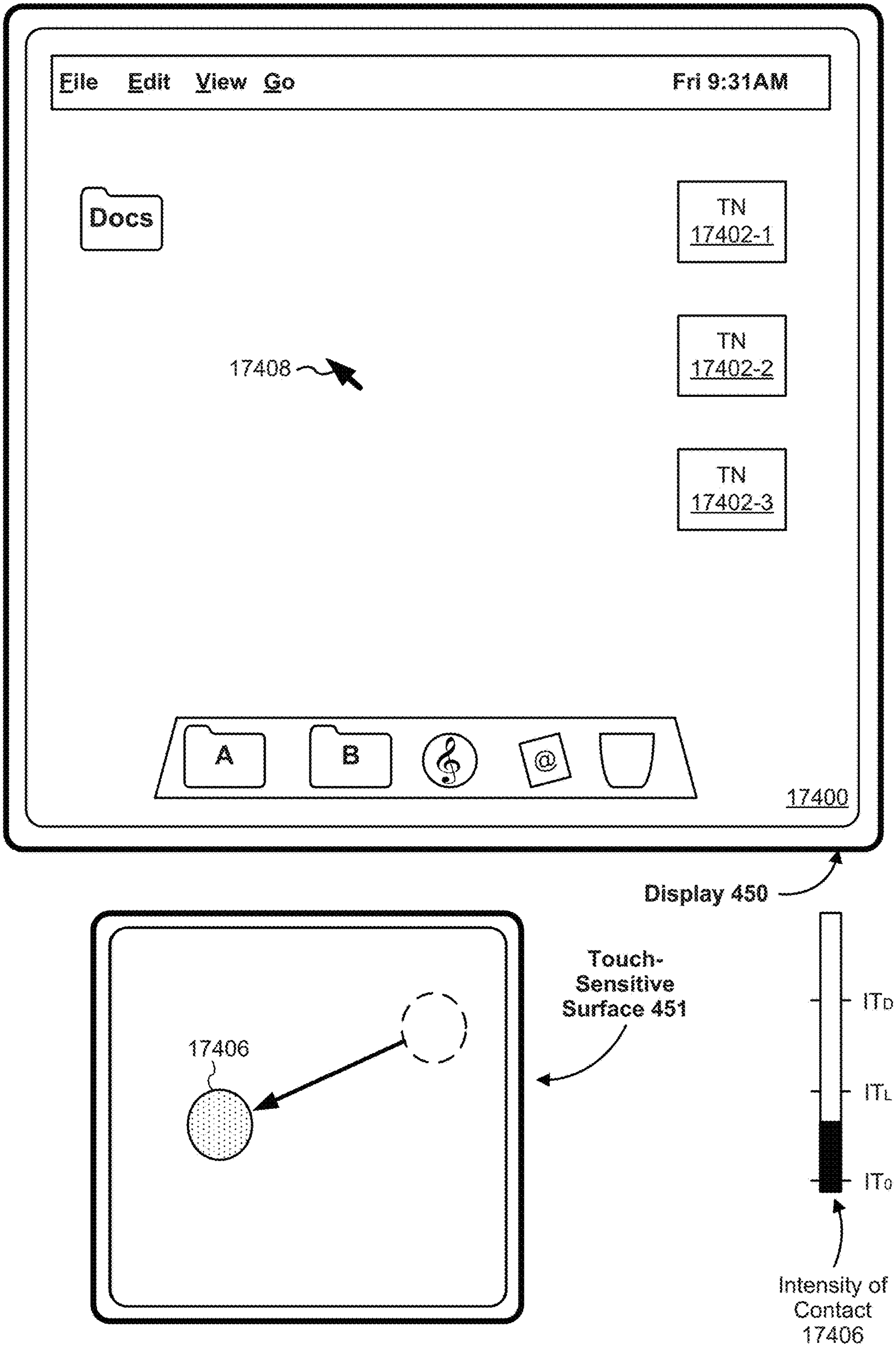

FIG. 8C shows detection of a "light press input," e.g., a press input that corresponds to an increase in intensity of contact 17410 above a selection intensity threshold (e.g., "$IT_L$") but below an alternative-mode intensity threshold (e.g., $IT_D$). Thumbnail 17402-1 is selected in response to the light press being detected while cursor 17408 is over thumbnail 17402-1, as shown in FIG. 8D. As shown in FIGS. 8D-8E, when the device is in a single object selection mode and intensity of contact 17406 drops below the $IT_L$, thumbnail 17402-1 is deselected or "dropped." Because thumbnail 17402-1 is no longer selected in FIG. 8E, subsequent movement of contact 17406 across touch-sensitive surface 451 moves cursor 17408 to the position without moving thumbnail 17402-1, as shown in FIG. 8F.

Figure 8G:
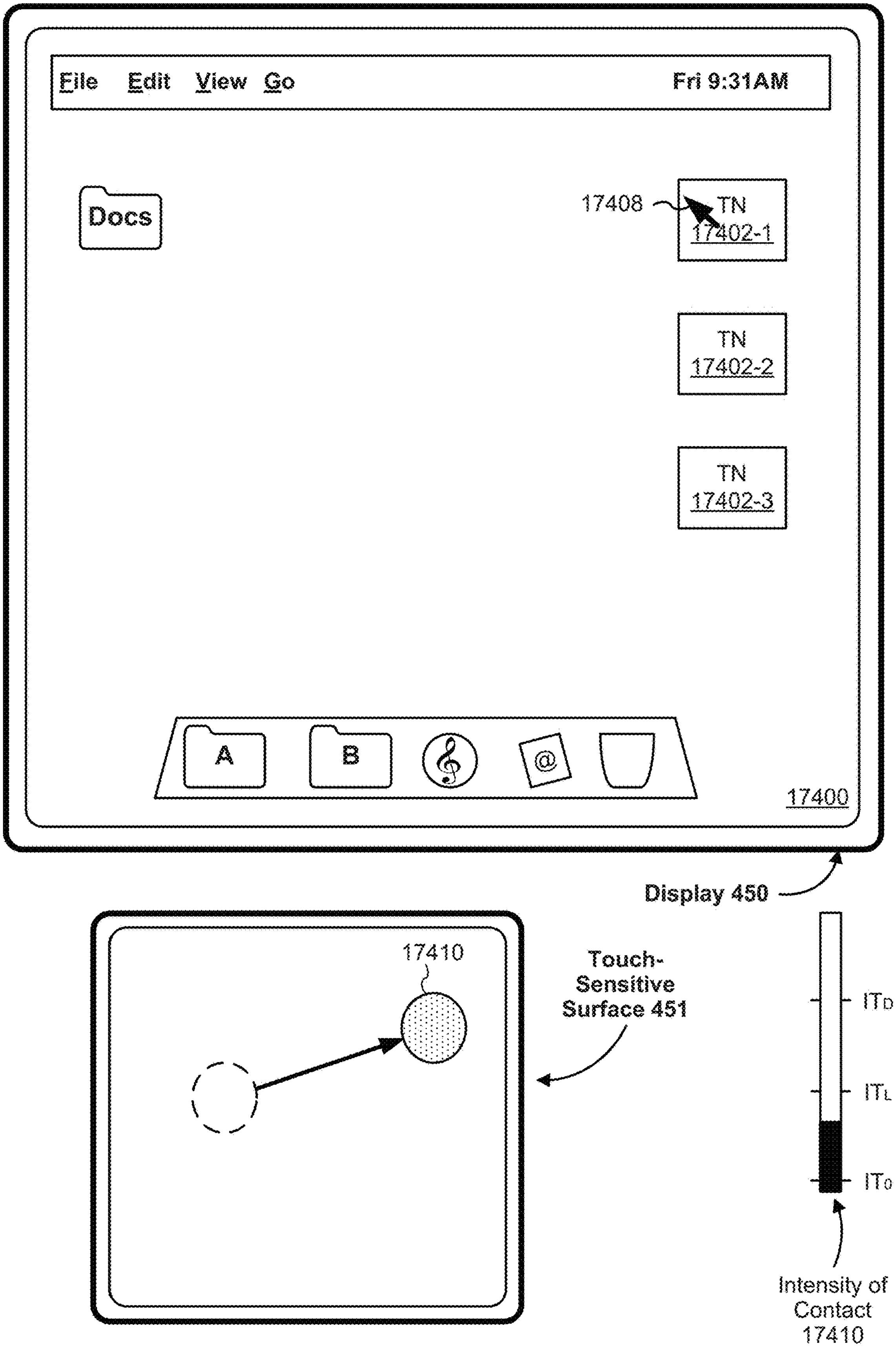
Figure 8H:
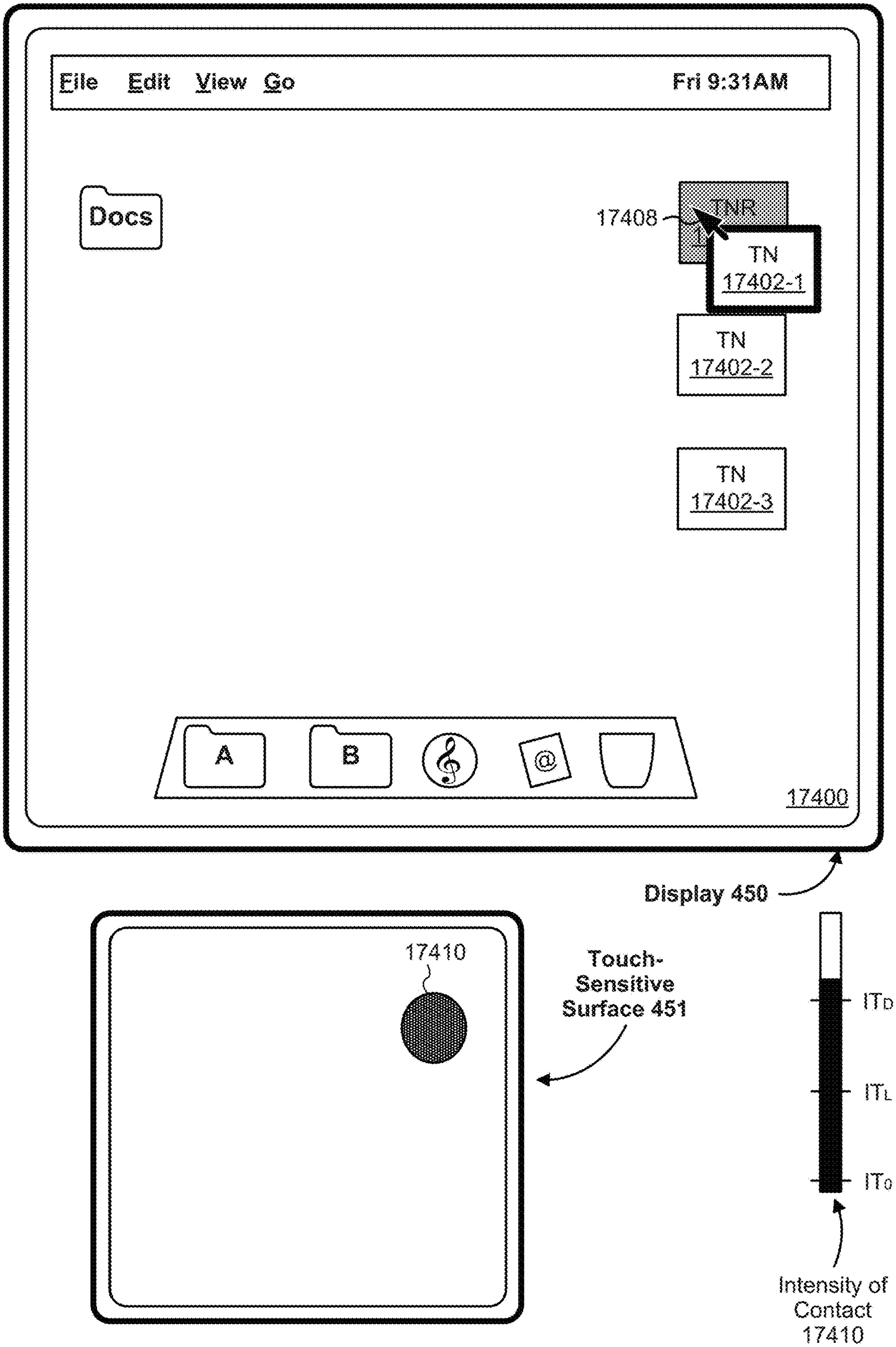
Figure 8I:
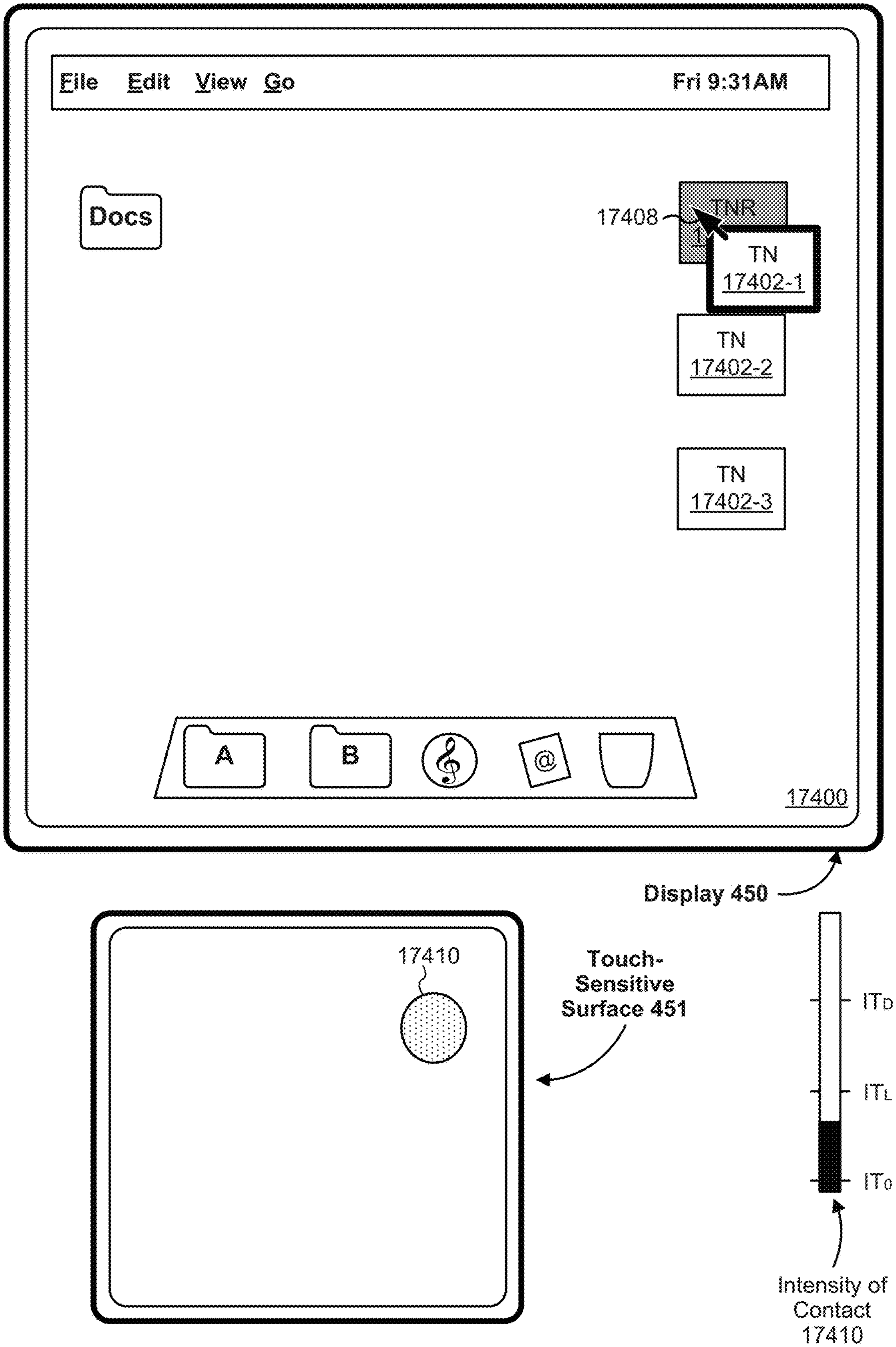
Figure 8J:
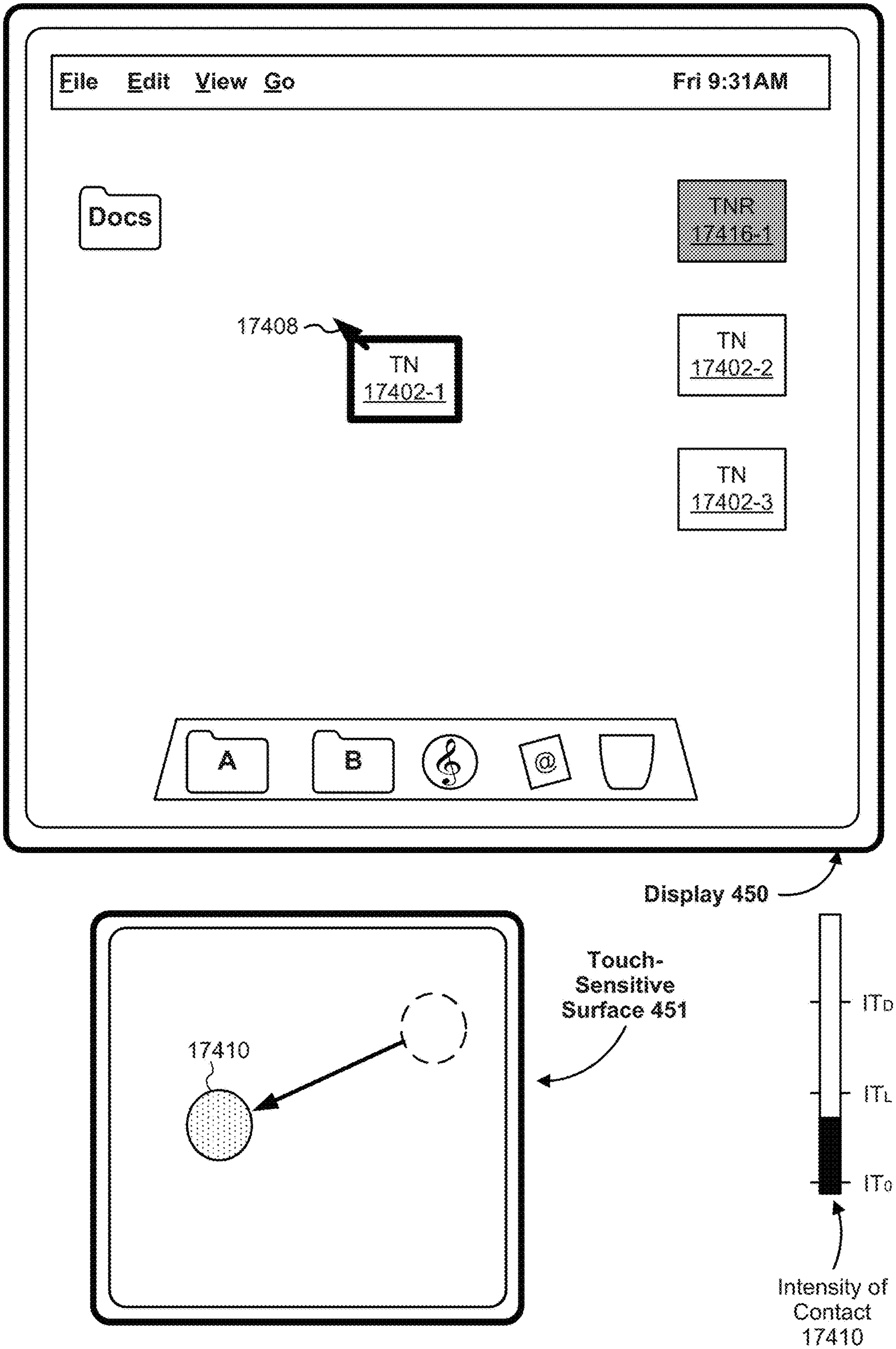

FIGS. 8G-80 illustrate an example user interface for selecting user interface objects in an alternative mode (sometimes referred to as a "select multiple objects" mode) in accordance with some embodiments. For ease of explanation, embodiments in FIGS. 8G-80 are described with reference to a continuous contact 17410. At the outset of FIG. 8G, user interface 17400 is in the selection mode, as described above. FIGS. 8G and 8H are analogous to FIGS. 8B and 8C, respectively, where the device moves cursor 17408 across the display from a location remote from thumbnail 17402-1 in FIG. 8A to a location over thumbnail 17402-1 in FIG. 8G in response to detecting movement of contact 17410 across touch-sensitive surface 451, with the difference that the press input in FIGS. 8G-8H corresponds to an increase in intensity of contact 17410 above an alternative-mode intensity threshold (e.g., "$IT_D$"). As a result, user interface 17400 enters an alternative mode (e.g., the select multiple objects mode). In some embodiments, when user interface 17400 is in the alternative mode, a subsequent decrease of intensity contact 17410 below $IT_L$ does not result in thumbnail 17402-1 being dropped. For example, in FIG. 8I, thumbnail 17402-1 continues to be selected, even though the intensity of contact 17410 has decreased below $IT_L$. Subsequent movement of contact 17410 across touch-sensitive surface 451 results in movement of cursor 17408 shown in FIG. 8J, accompanied by movement of thumbnail 17402-1. FIG. 8J also shows an example of the device displaying a residual image 17416 (e.g., 17416-1) of thumbnail 17402-1 on display 450.

Figure 8K:
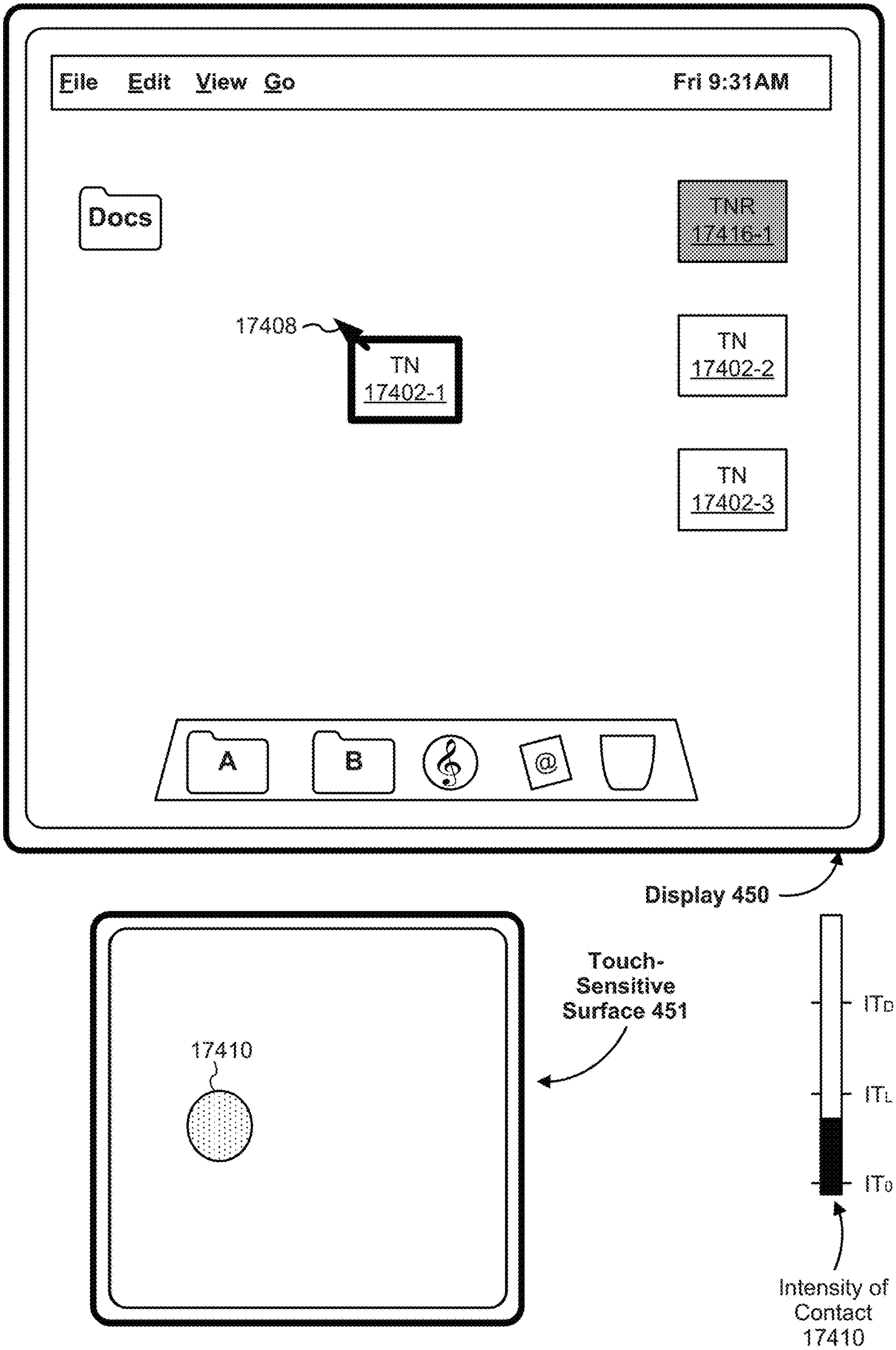
Figure 8L:
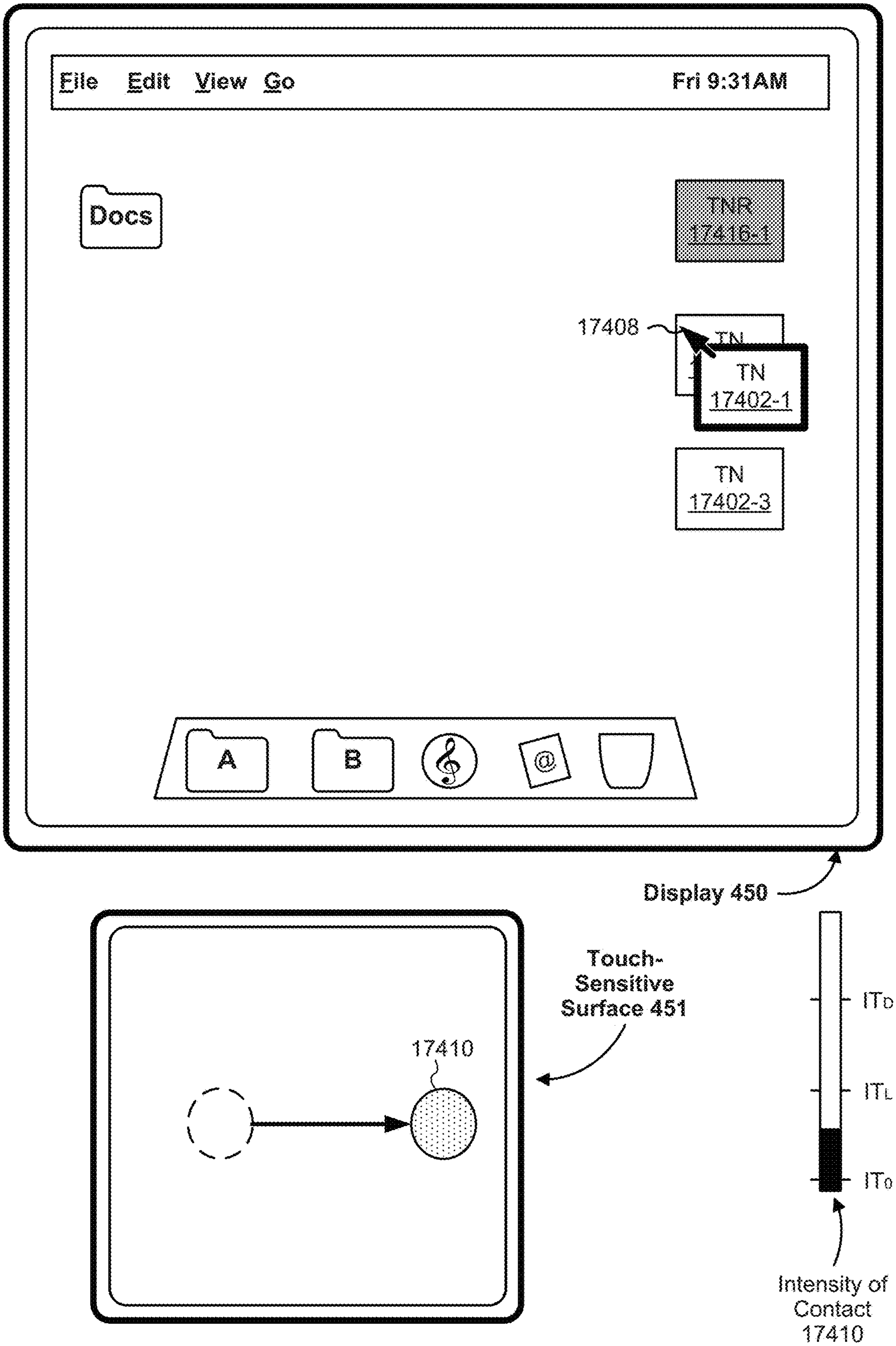
Figure 8M:
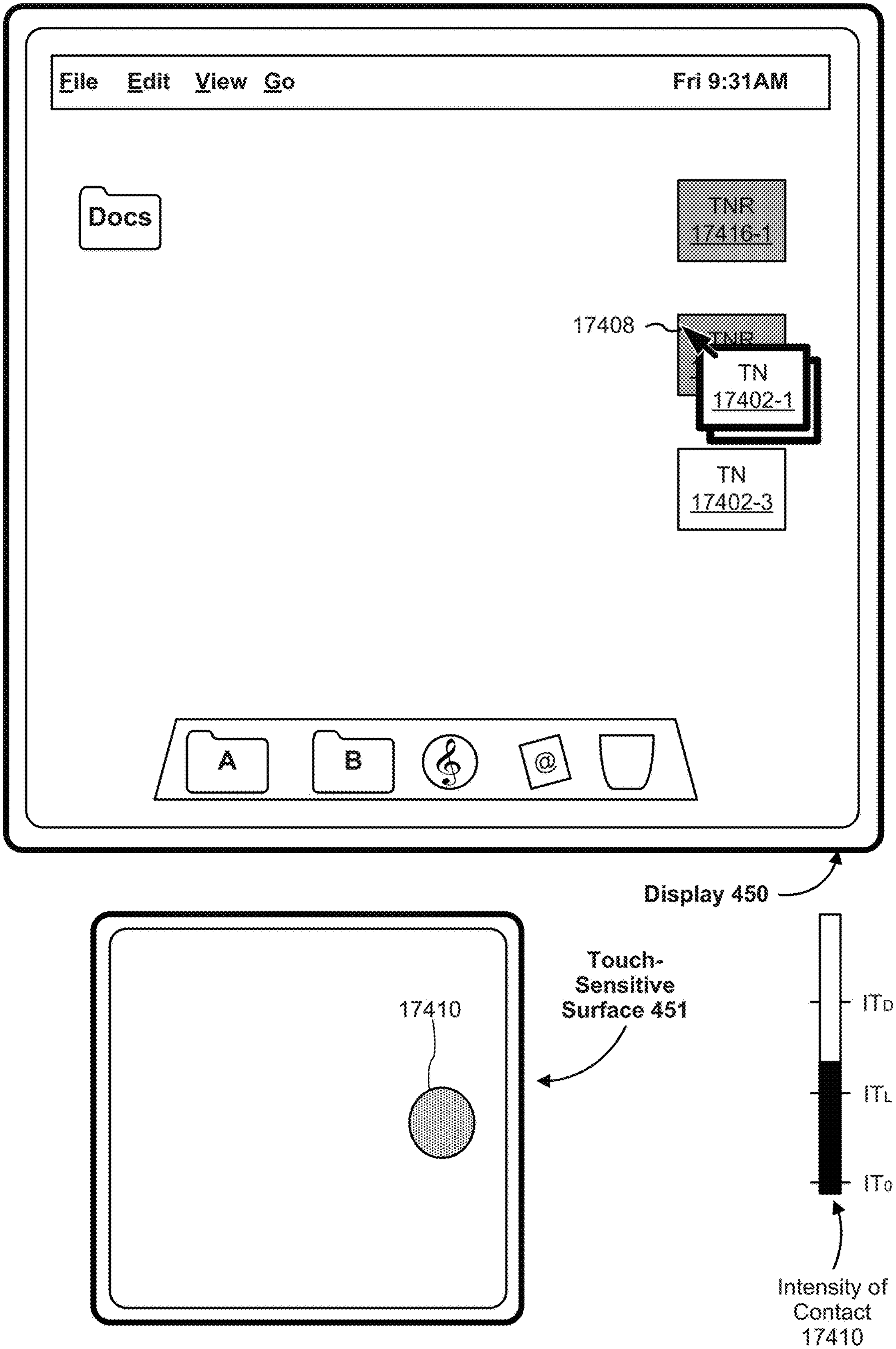

FIGS. 8K-8L illustrate the device detecting subsequent movement contact 17410 on touch-sensitive surface 451, and, in response, moving cursor 17408 from a location remote from thumbnail 17402-2 as shown in FIG. 8K to a location over thumbnail 17402-2 as shown in FIG. 8L. In FIG. 8M, the device detects a subsequent (e.g., second) press input corresponding to an increase in intensity above the selection threshold (e.g., $IT_L$) while cursor 17408 is over a thumbnail 17402-2 and, in response, the device selects thumbnail 17402-2 without dropping thumbnail 17402-1. In some embodiments, the first press input and the second press input are made by a continuously detected (unbroken) contact on the touch-sensitive surface.

Figure 8N:
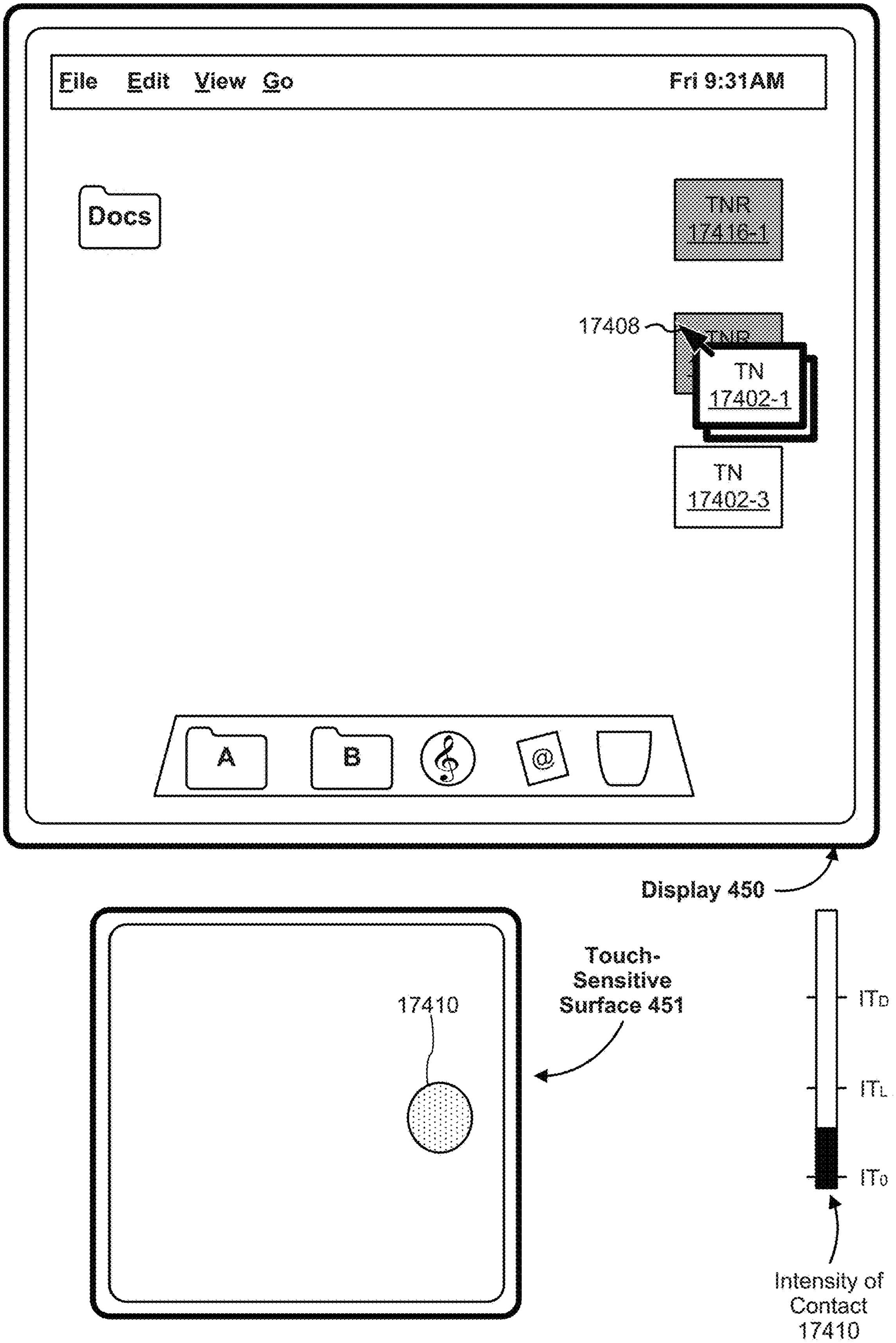
Figure 8O:
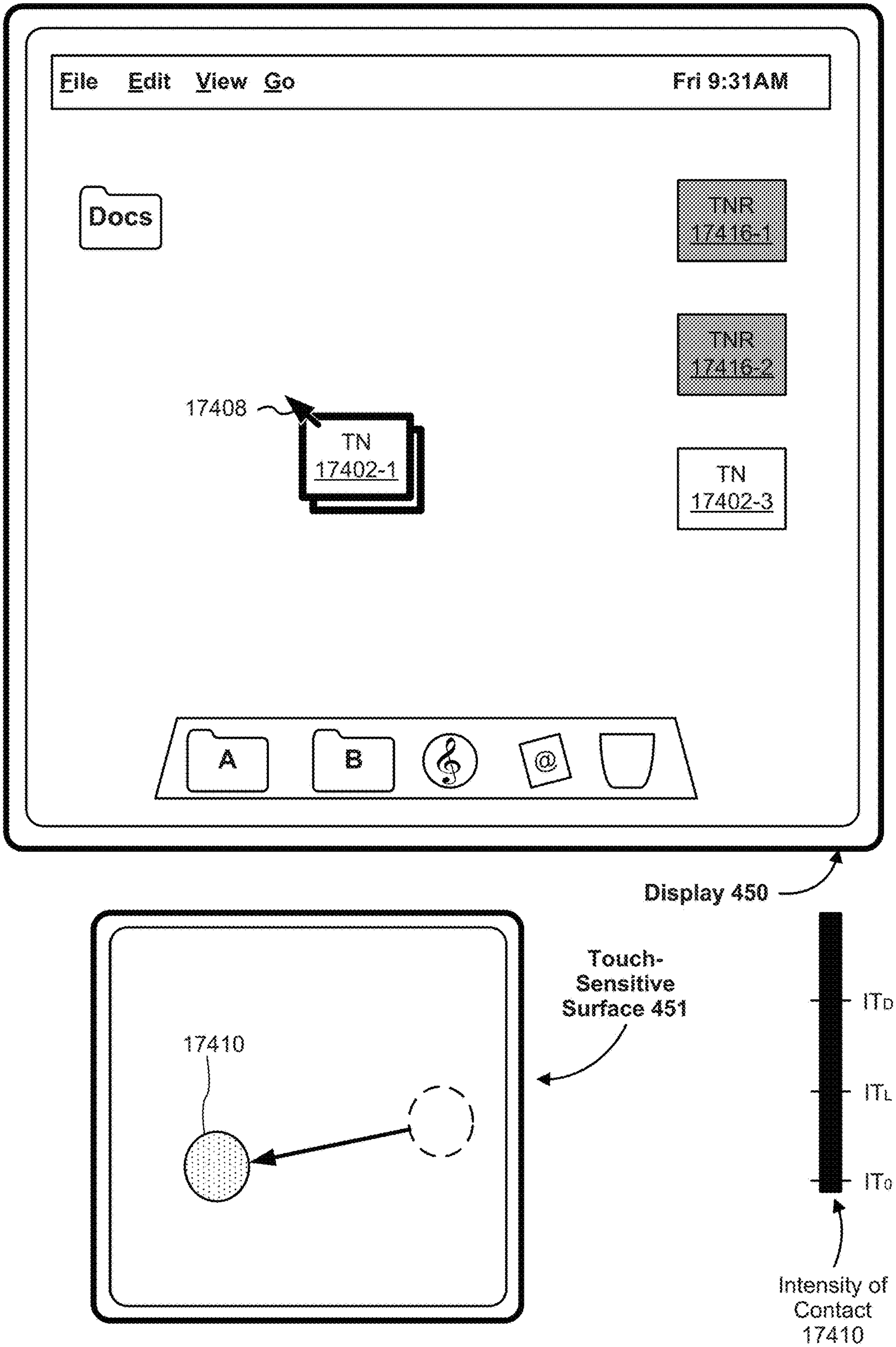

After selecting thumbnail 17402-2, while the device is in the multiple object selection mode, the device maintains selection of the selected thumbnails 17402-2 and 17402-1, even when the intensity of contact 17410 decreases below the selection intensity threshold (e.g., "$IT_L$"). In response to detecting movement of contact 17410 in FIG. 80, the device moves the selected thumbnails away from the location previously occupied by thumbnail 17402-2, as shown in FIG. 80. FIGS. 8N-80 are analogous to FIGS. 8I-8J with the difference that, because both thumbnail 17402-1 and thumbnail 17402-2 are selected, movement of cursor 17408 is accompanied by both thumbnails. A thumbnail residual 17416-2 is also displayed in FIG. 80, corresponding to a residual of thumbnail 17402-2. Residual images 17416 have additional properties. In some embodiments, after a user interface object is selected and a residual image of the user interface object is displayed, a press input is detected on the residual image (e.g., contact 17410 increases from an intensity below $IT_L$ to an intensity above $IT_L$ while cursor 17408 is over a respective residual image). In some embodiments, in response to detecting the press input on a respective residual image, the user interface object corresponding to the respective residual image is deselected. For example, when thumbnails 17402-1 and 17402-2 are selected, a press input on residual image 17416-1 (e.g., an increase in intensity of contact 17410 from an intensity below $IT_L$ to an intensity above $IT_L$ while cursor 17408 is over residual image 17416-1) will cause the device to deselect thumbnail 17402-1 and maintain selection of thumbnail 17402-2. In some embodiments, an animation of thumbnail 17402-1 "flying back" and replacing residual image 17416-1 is performed.

Figure 8P:
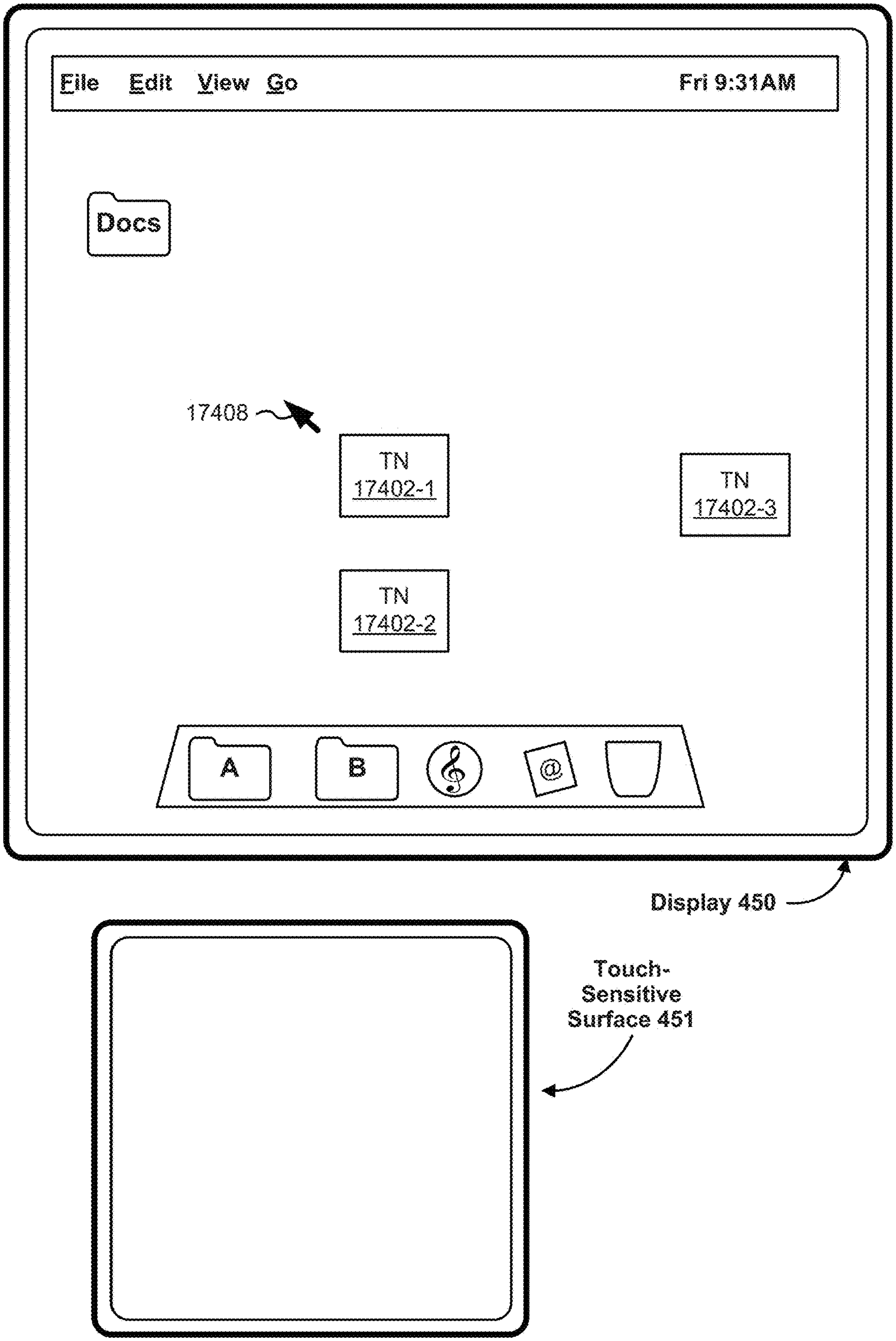

In some embodiments, in response to detecting liftoff of a continuous contact (e.g., contact 17410, FIGS. 8G-80) previously selected user interface objects (e.g., thumbnail 17402-1 and thumbnail 17402-2, FIG. 80) are dropped in the user interface, as shown in FIG. 8P. In some embodiments, when previously selected user interface objects are dropped, the corresponding residual images (e.g., thumbnail residuals 17416) are no longer displayed and the user interface objects are displayed at a location proximate to a location of the cursor 17408 when the liftoff of contact 17410 was detected, as shown in FIG. 8P.

Figure 8Q:
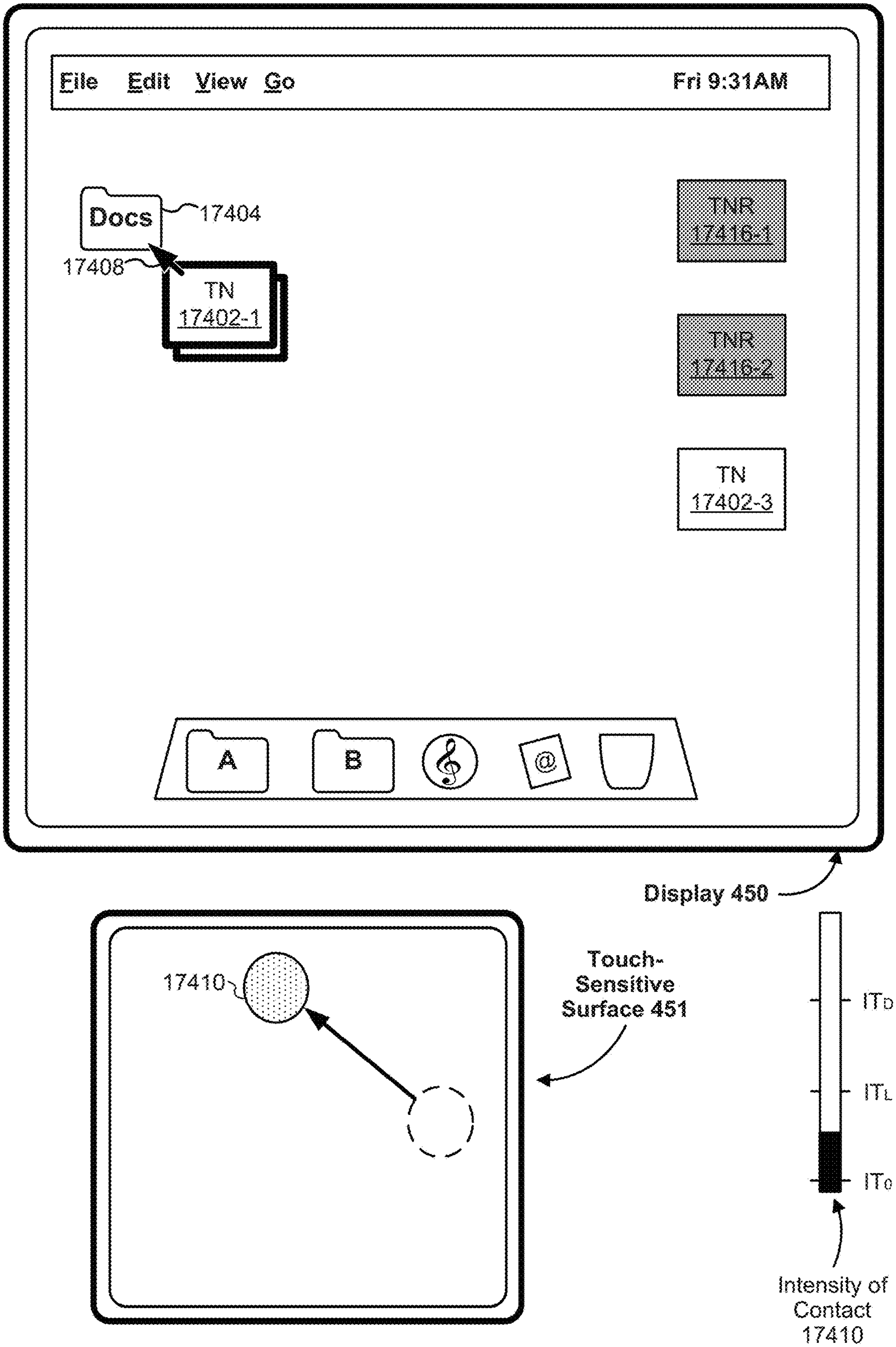
Figure 8R:
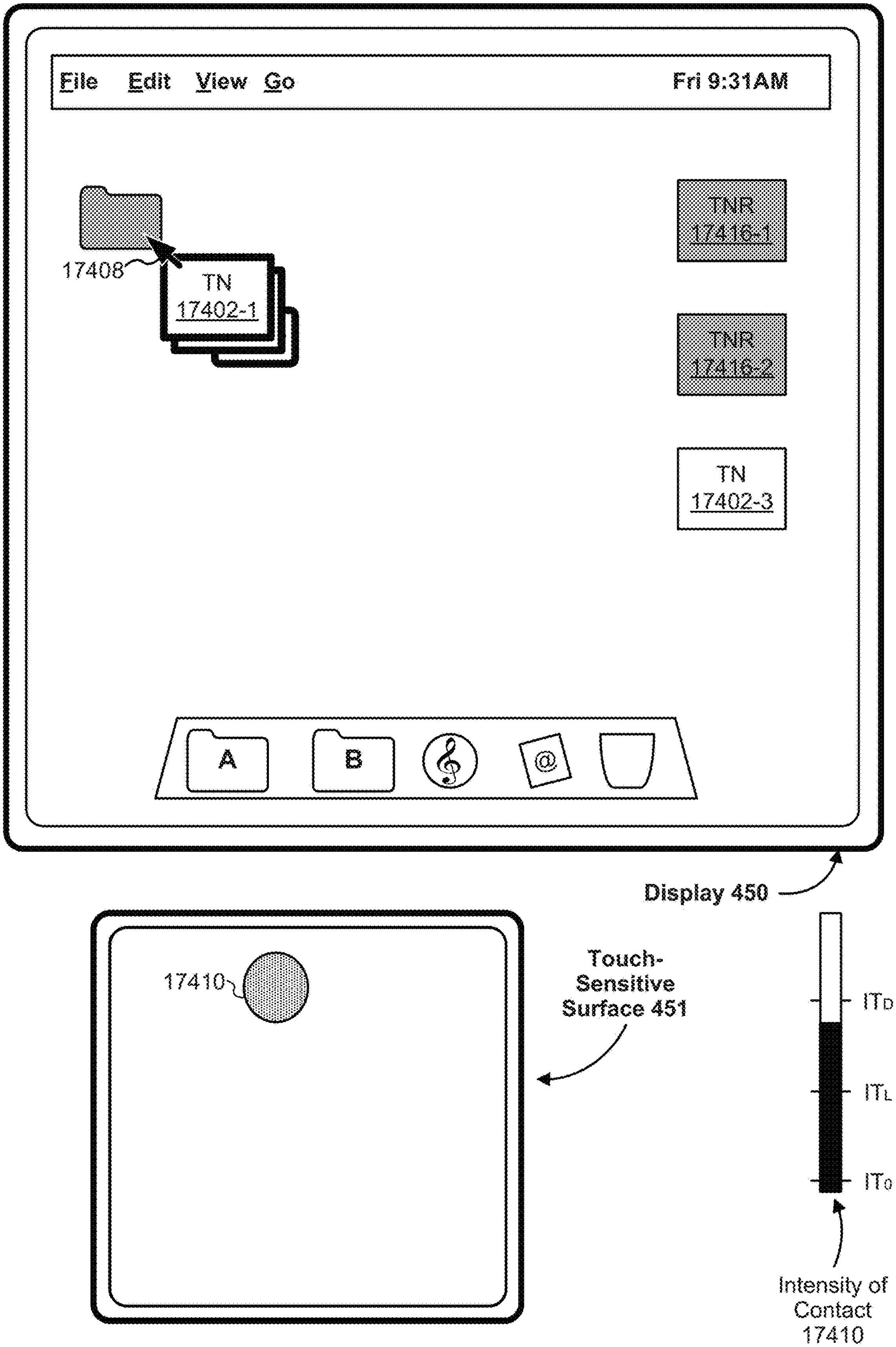
Figure 8S:
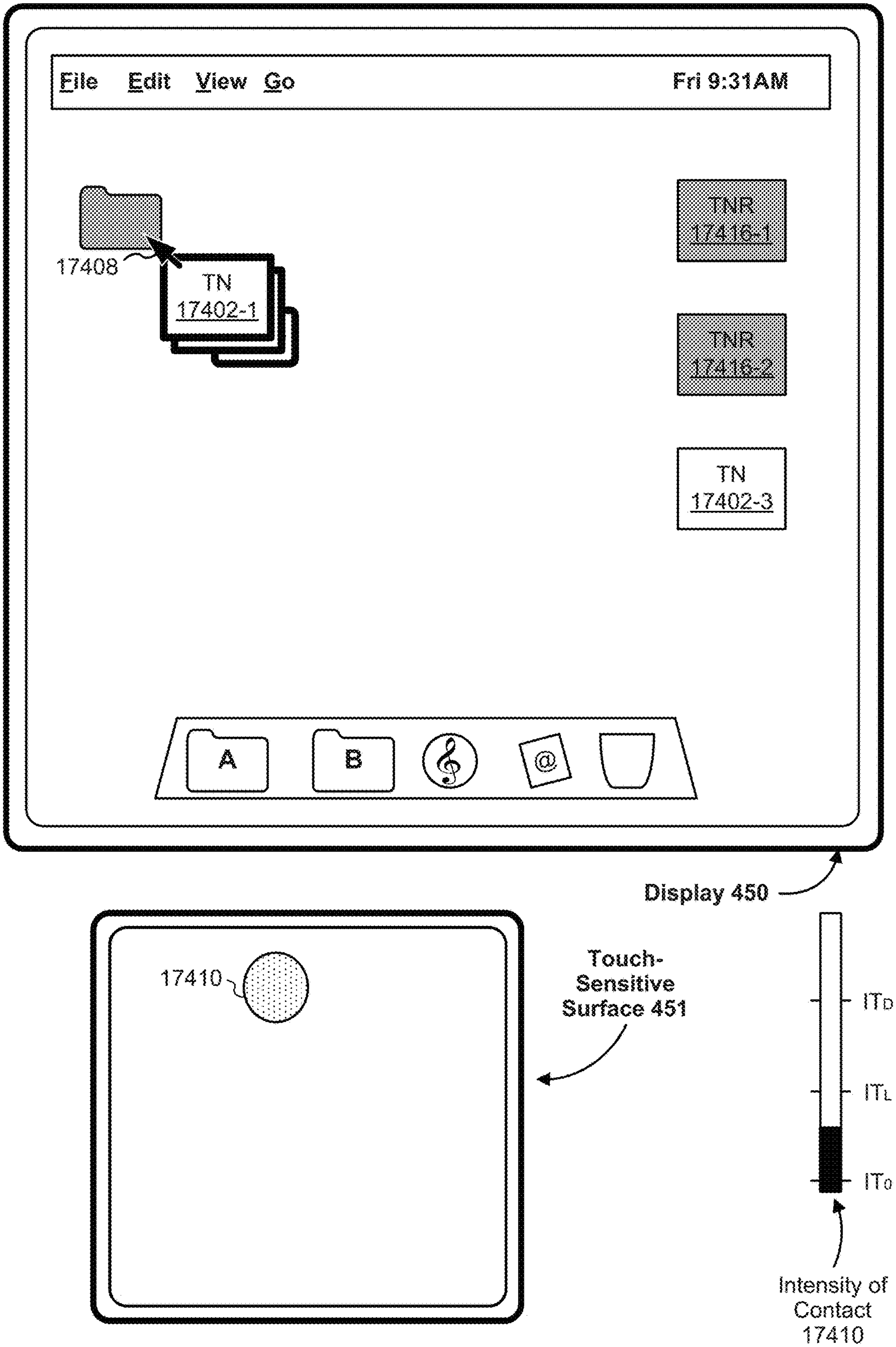
Figure 8T:
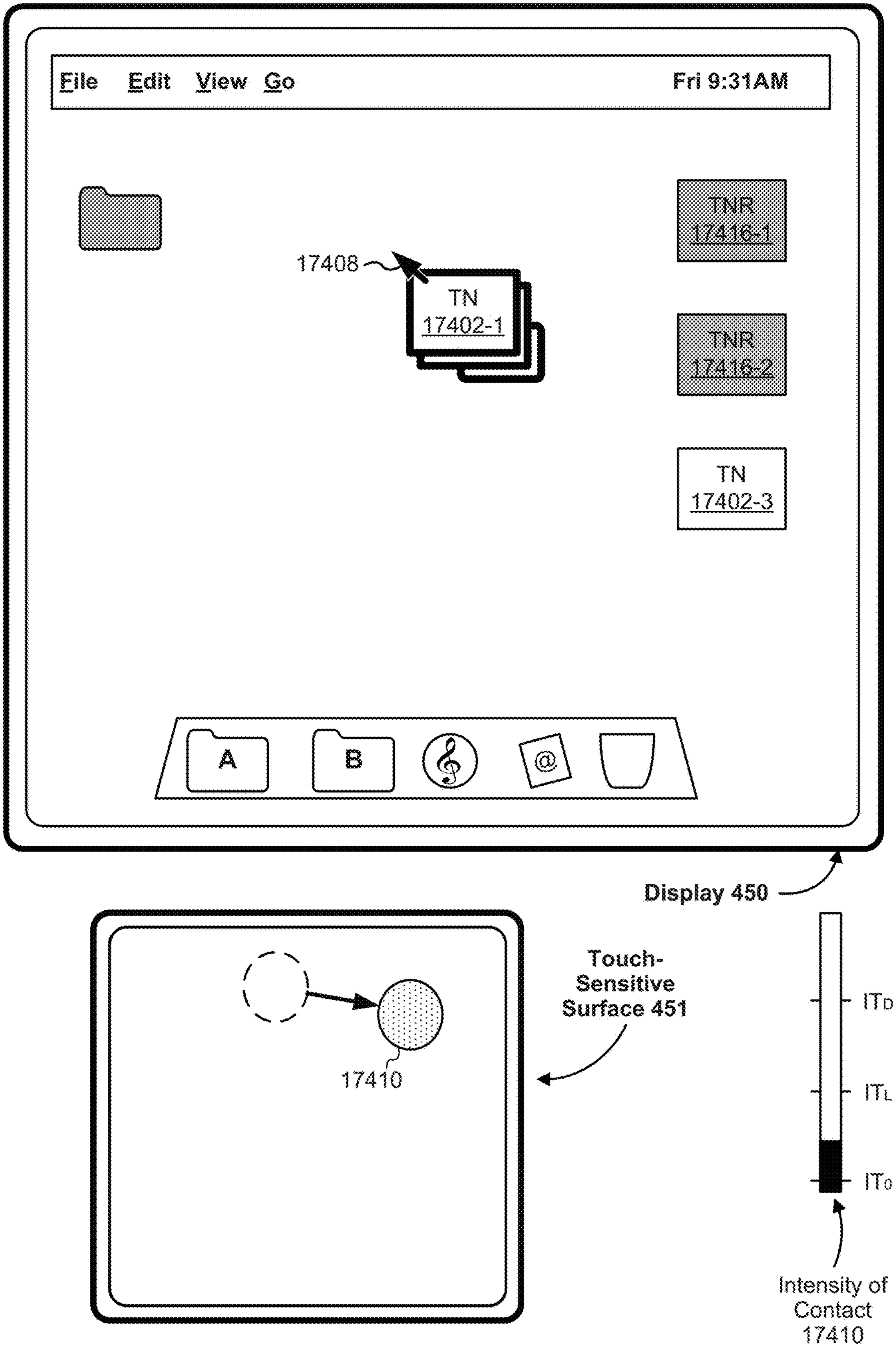

FIGS. 8G-8N and 8Q-8T illustrate selection of a third user interface object that is representative of a collection of user interface objects (e.g., a folder, sub-directory, photo album, playlist, etc.). Following FIGS. 8G-8N, which have already been described, FIG. 8Q illustrates movement of contact 17410 on touch-sensitive surface 451 that corresponds to movement of cursor 17408 to location over docs folder 17404, after thumbnails 17402-1 and 17402-2 have been selected. In response to detection of a light press input (e.g., an increase in intensity of contact 17410 from an intensity below $IT_L$ to an intensity between $IT_L$ and $IT_D$, as shown in FIGS. 8Q-8R), the device selects folder 17404 without deselecting either of the thumbnails, as illustrated in FIG. 8R. FIGS. 8S-8T illustrate subsequent motion of the cursor accompanied by the selected thumbnails and of folder in response to detecting movement of contact 17410 on the touch-sensitive surface 451.

Figure 8U:
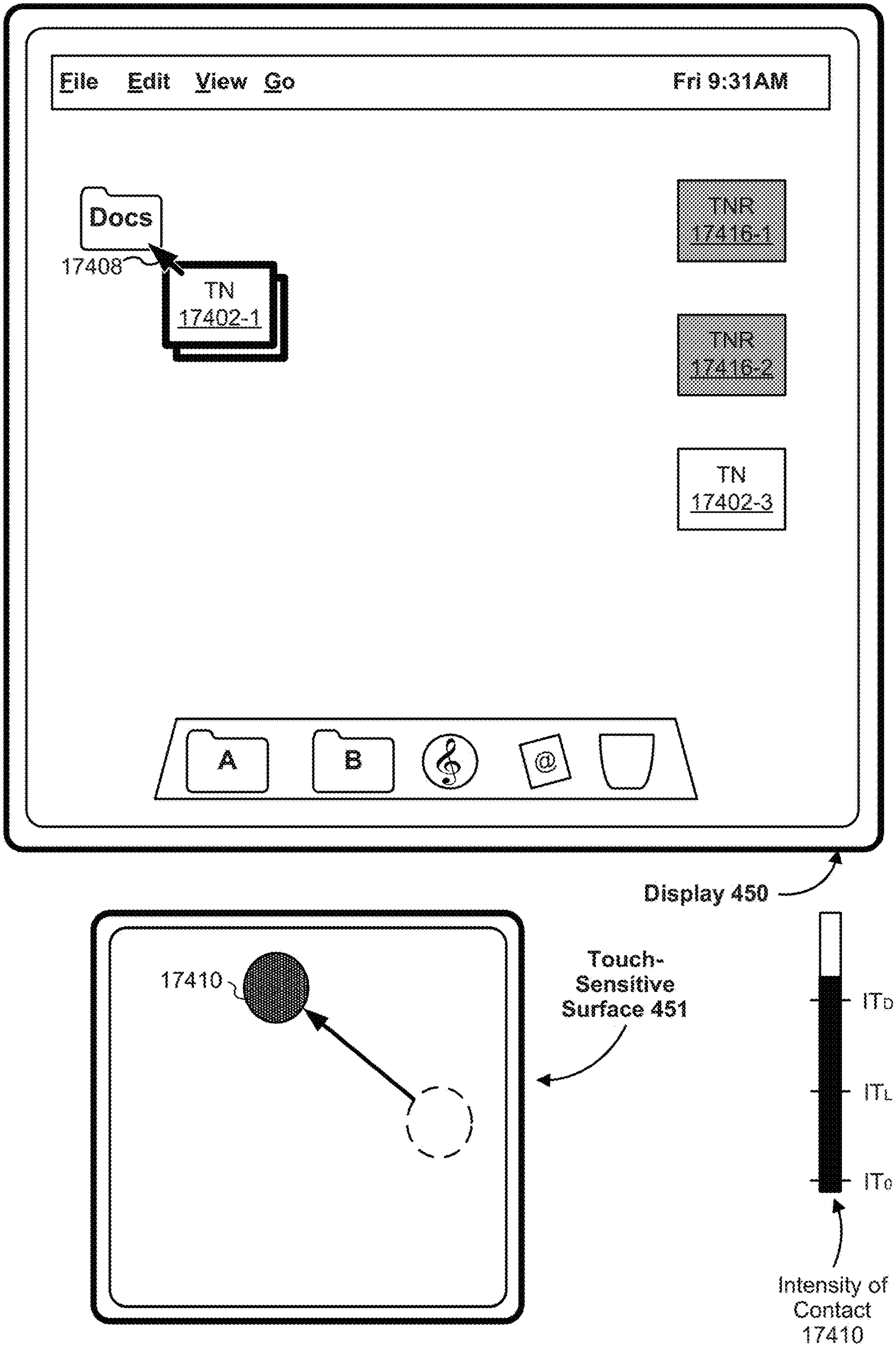
Figure 8V:
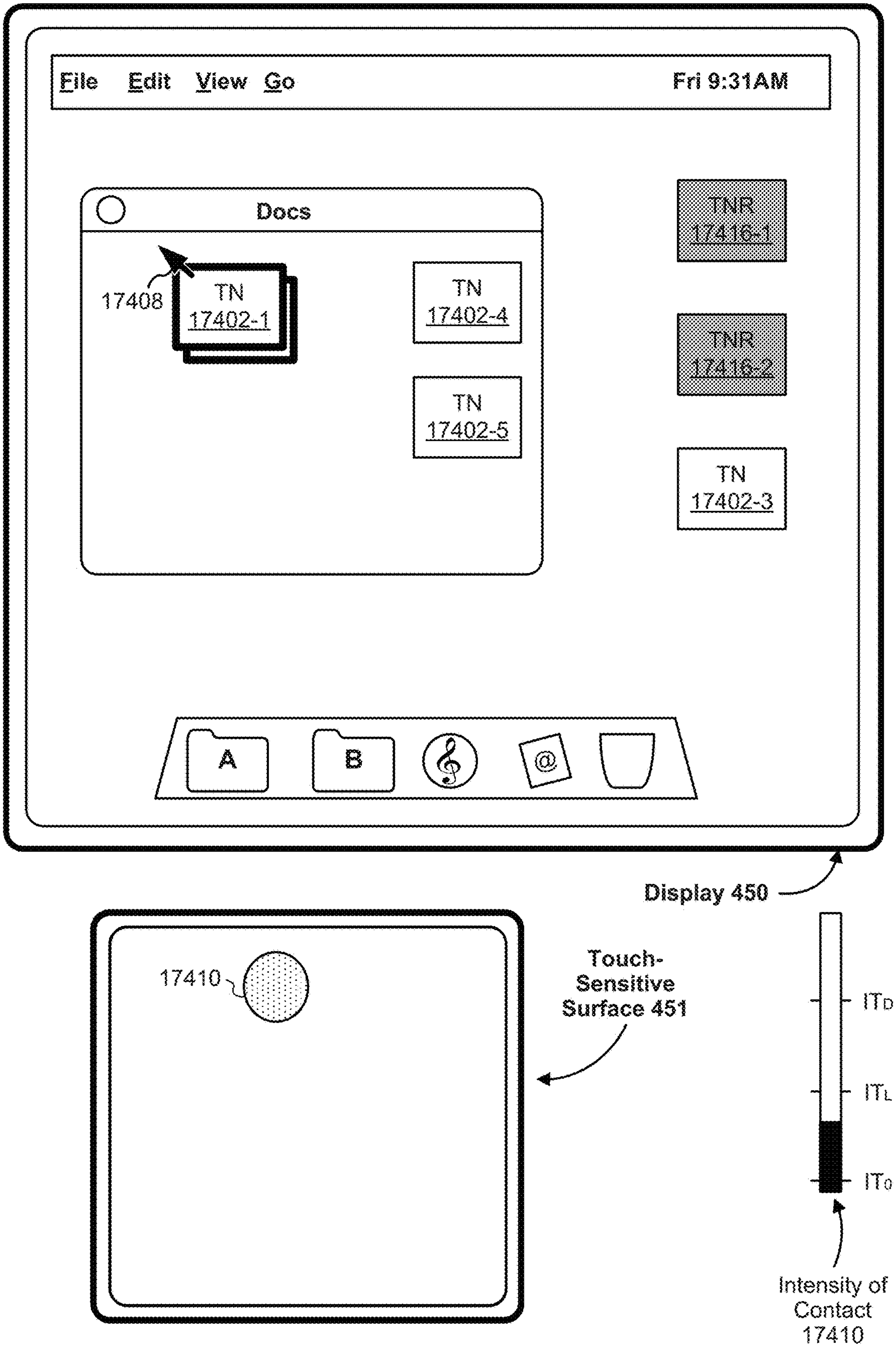
Figure 8W:
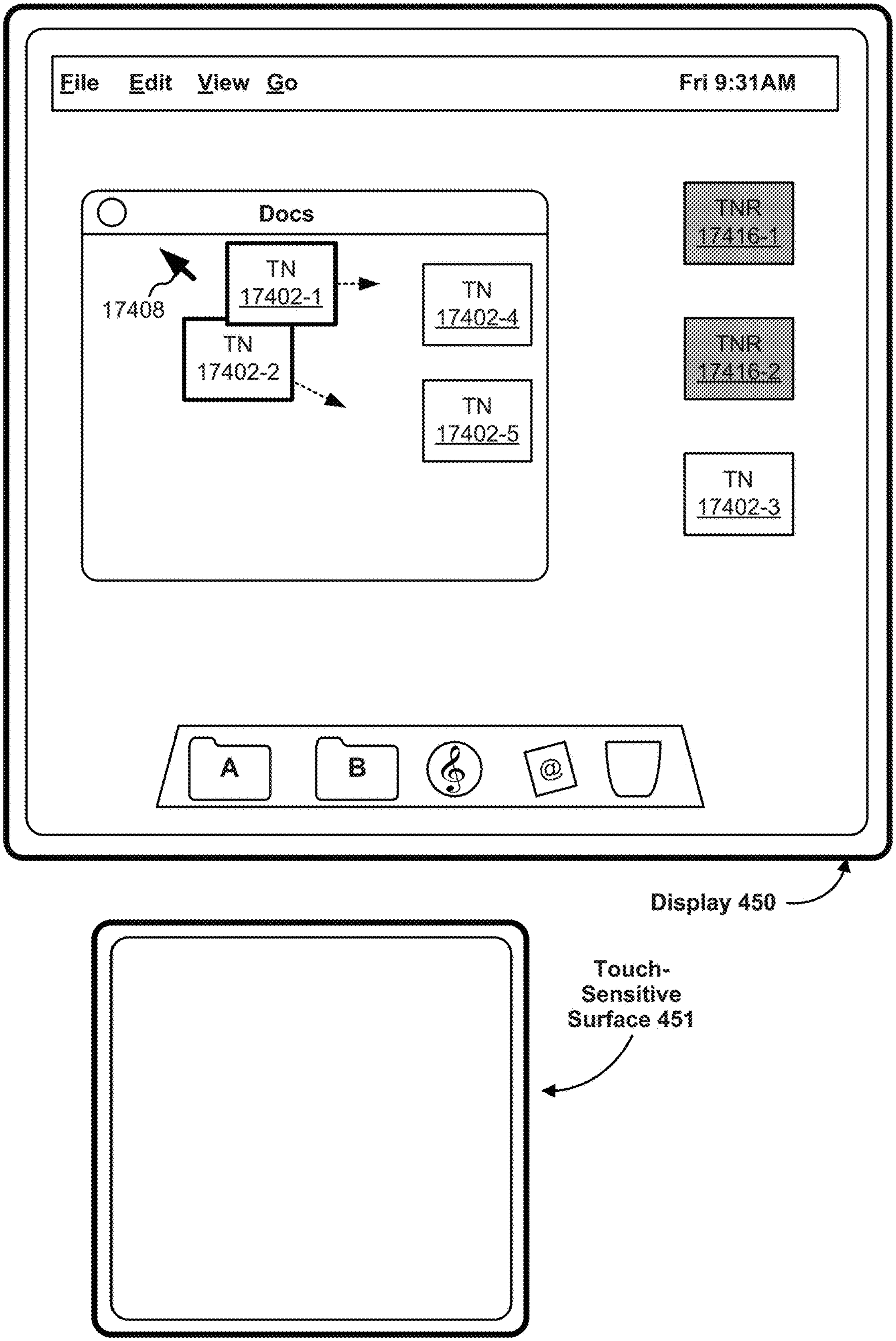
Figure 8X:
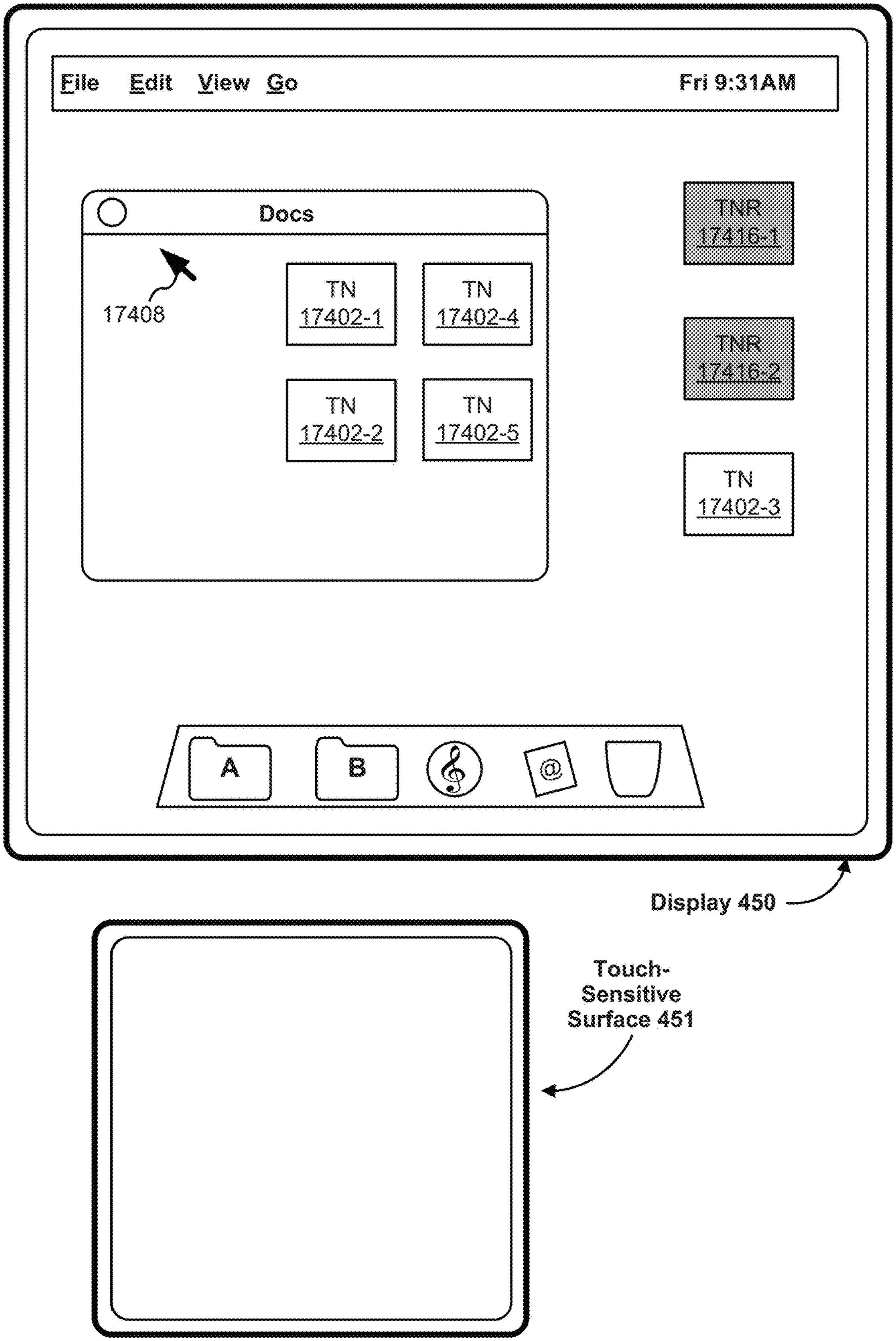

In contrast, FIGS. 8U-8X also follow FIGS. 8G-8N, but in this case, the detected press input is a deep press input (e.g., an increase in intensity of contact 17410 from an intensity below ITS to an intensity above $IT_D$, as shown in FIGS. 8U-8V). As a result, of detecting a deep press input instead of a light press input, the device displays a user interface (e.g., an open folder) with a region for adding thumbnails 17402-1 and 17402-2 to a collection of thumbnails. In FIG. 8W, thumbnails 17402-1 and 17402-1 are deselected in response to detecting liftoff of contact 17410, and, in FIG. 8W, the two thumbnails are added to the contents of the opened "docs" folder because cursor 17408 is over the representation of the docs folder 17404 when liftoff of contact 17410 is detected. The "docs" folder, for example, already contains other thumbnails, such as thumbnail 17402-4 and 17402-5. FIGS. 8W-8X illustrate an animation of thumbnails 17402-1 and 17402-2 moving from a location proximate to cursor 17408 to a location in an arrangement of thumbnail 17402 in the representation of docs folder. The exemplary user interfaces in FIGS. 8Q-8X therefore illustrate an example of an advantage of distinguishing between press inputs that reach different intensity thresholds (e.g., $IT_L$ and $IT_D$), where the different press inputs can be used to provide an intuitive user interface that enables a user to either add a folder to a selection or open a folder to add selected items to the folder.

Figure 8Y:
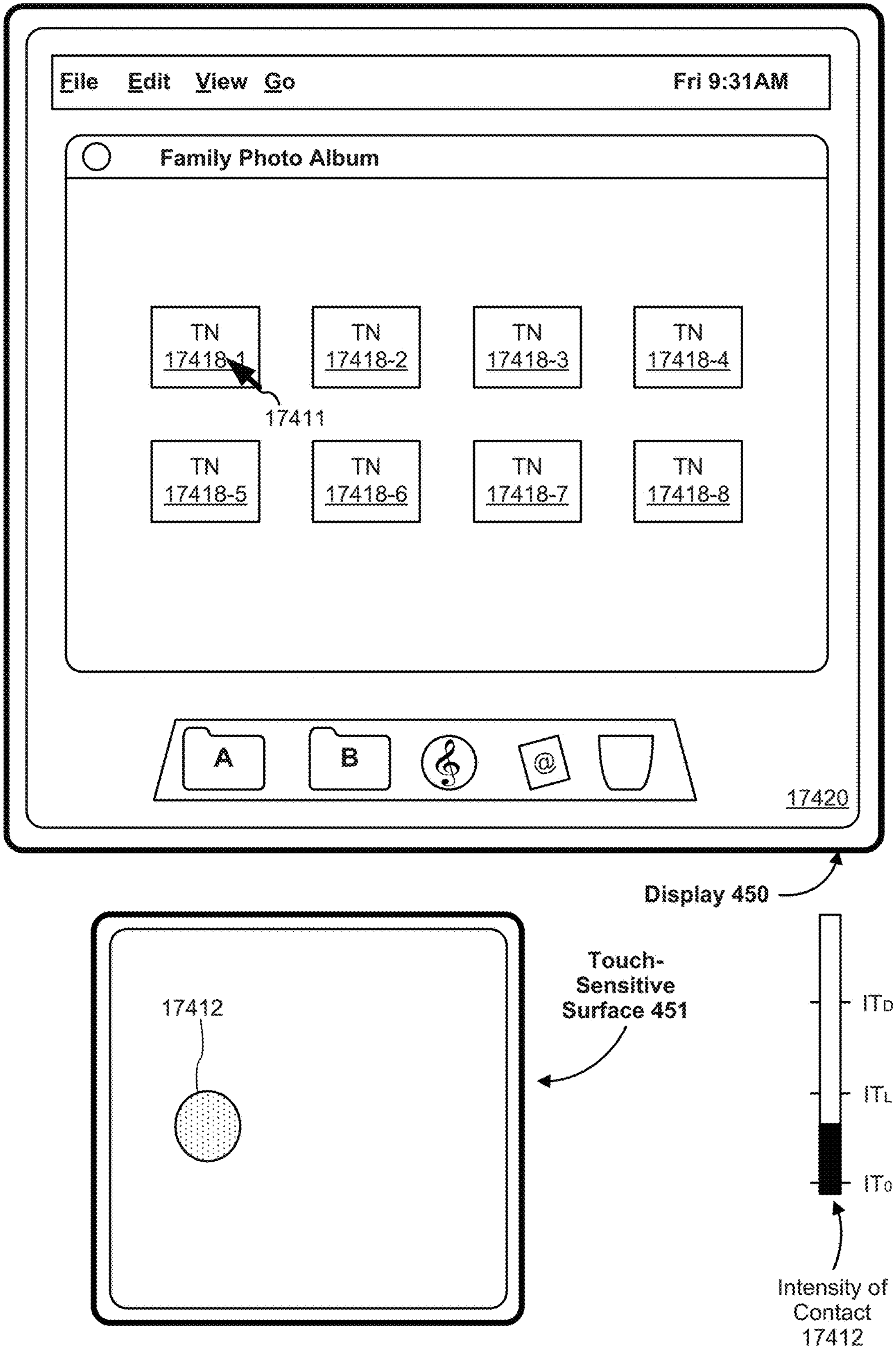

FIGS. 8Y-8DD illustrate embodiments of a user interface 17420 in which multiple, distinct contacts are used to selected user interface objects. For example, a first contact ceases to be detected prior to detecting a second contact. In some embodiments, the first contact and the second contact are made by the same finger at different times. In some embodiments (e.g., illustrated in FIGS. 8Y-8DD), the first press input is a "deep press" input that corresponds to an increase in intensity of a contact to an alternative-mode intensity threshold (e.g., "$IT_D$") that is higher than a selection intensity threshold (e.g., "$IT_L$"), and in response to detecting the first press input, the device enters a "select multiple objects" mode where sequential press inputs that have an intensity at or above the selection intensity threshold (e.g., "$IT_L$") cause the device to select multiple user interface objects simultaneously that correspond to the sequential press inputs.

Figure 8Z:
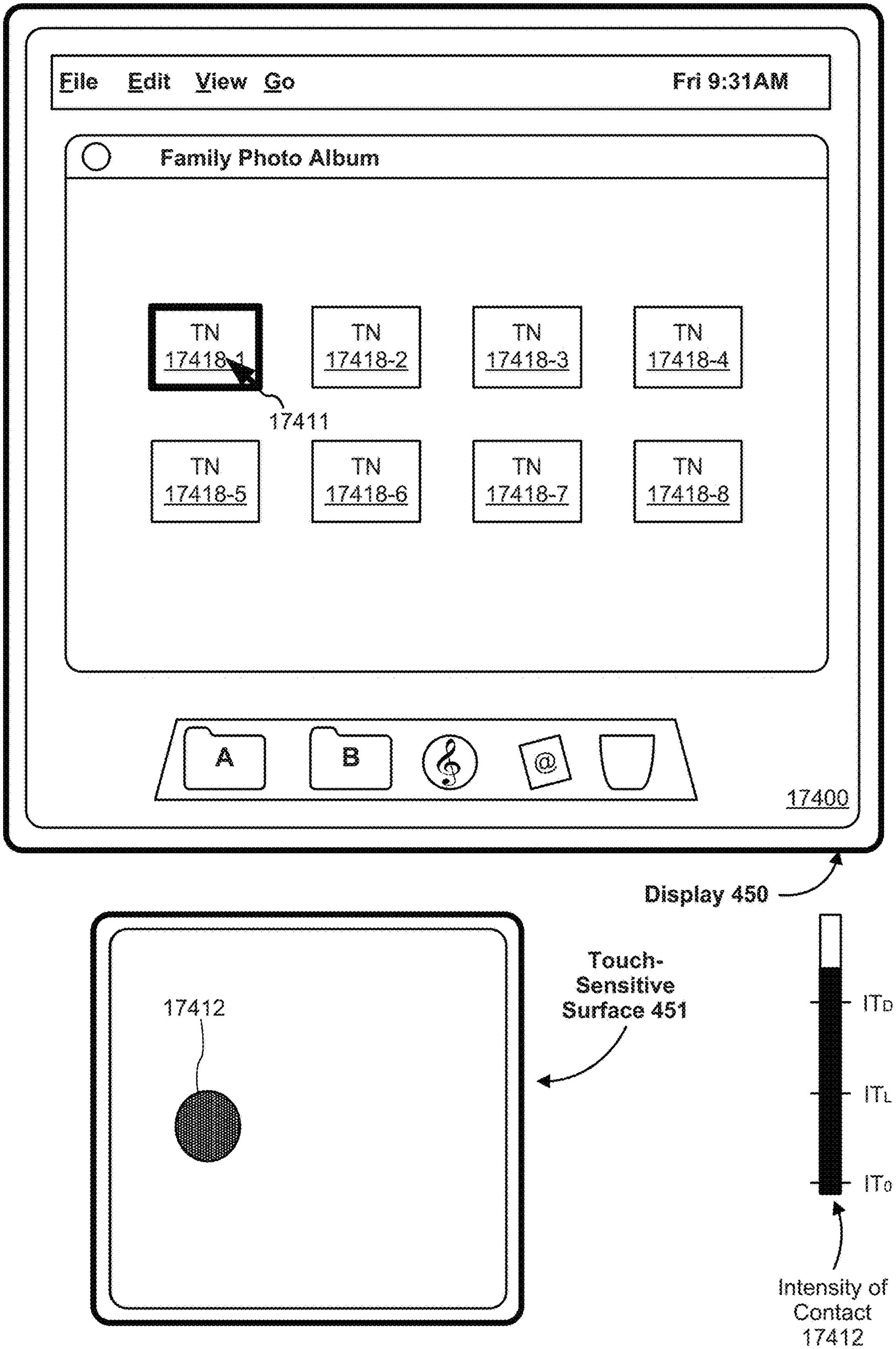
Figure 8A:
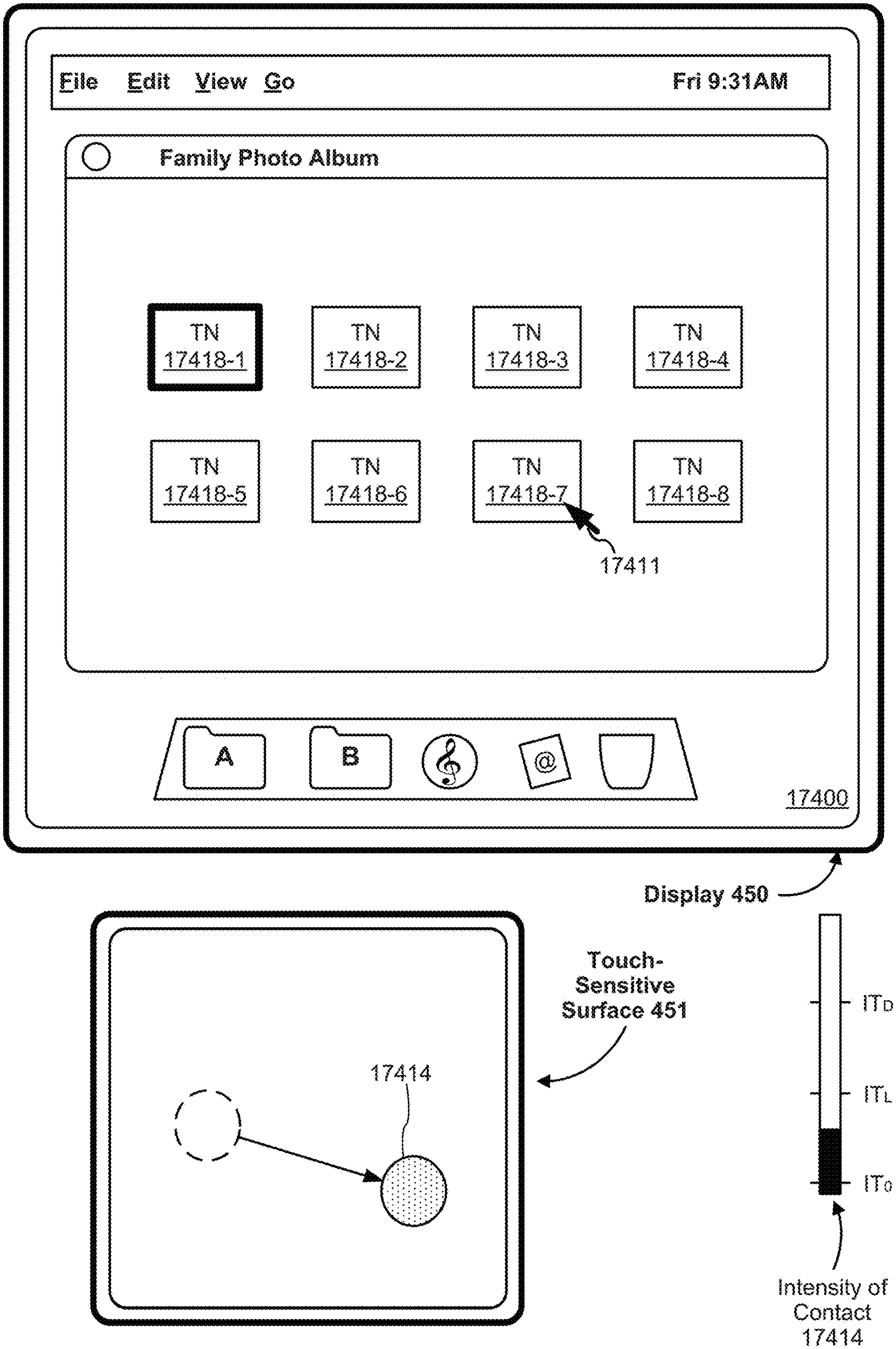
Figure 8B:
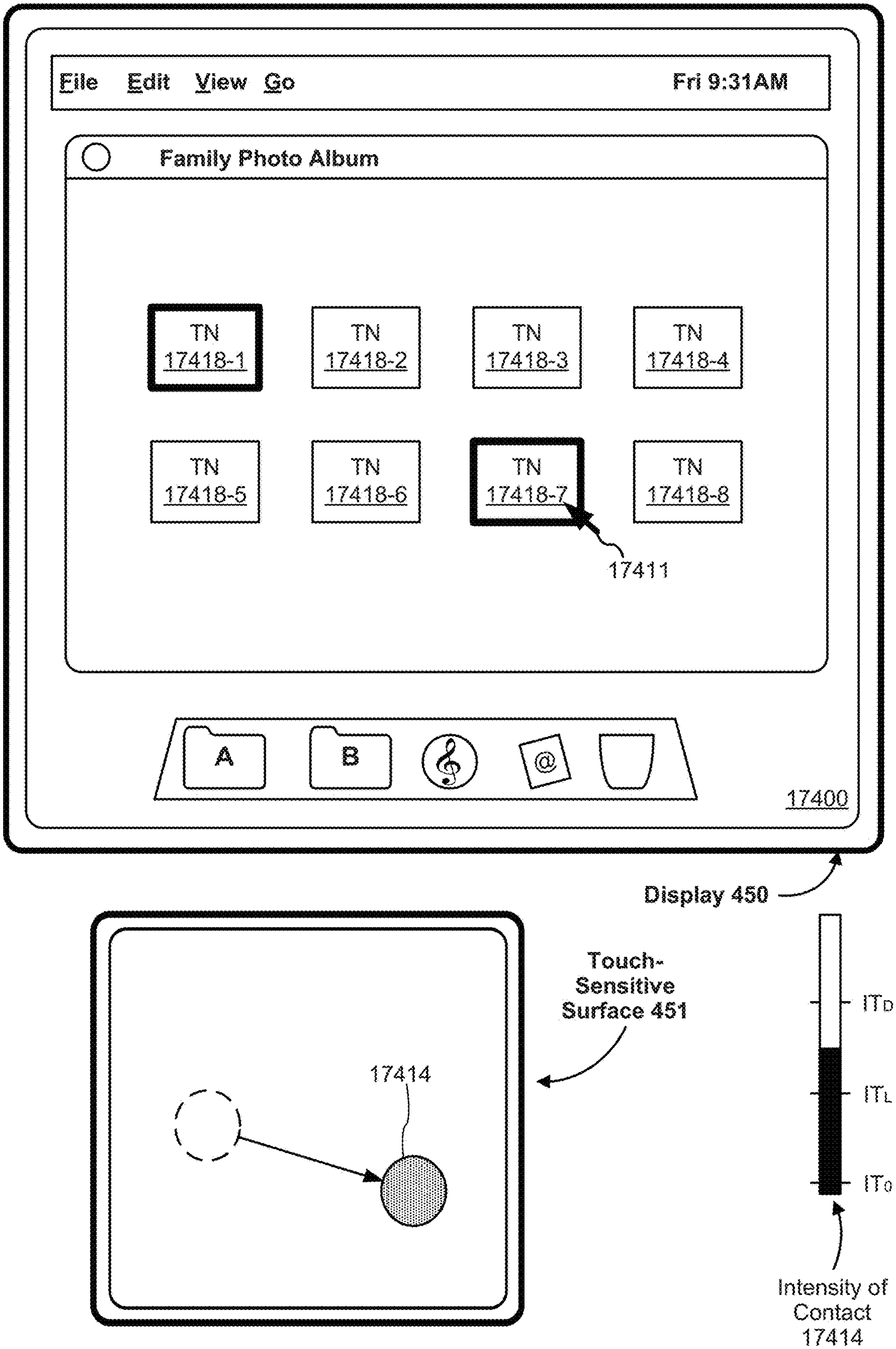
Figure 8C:
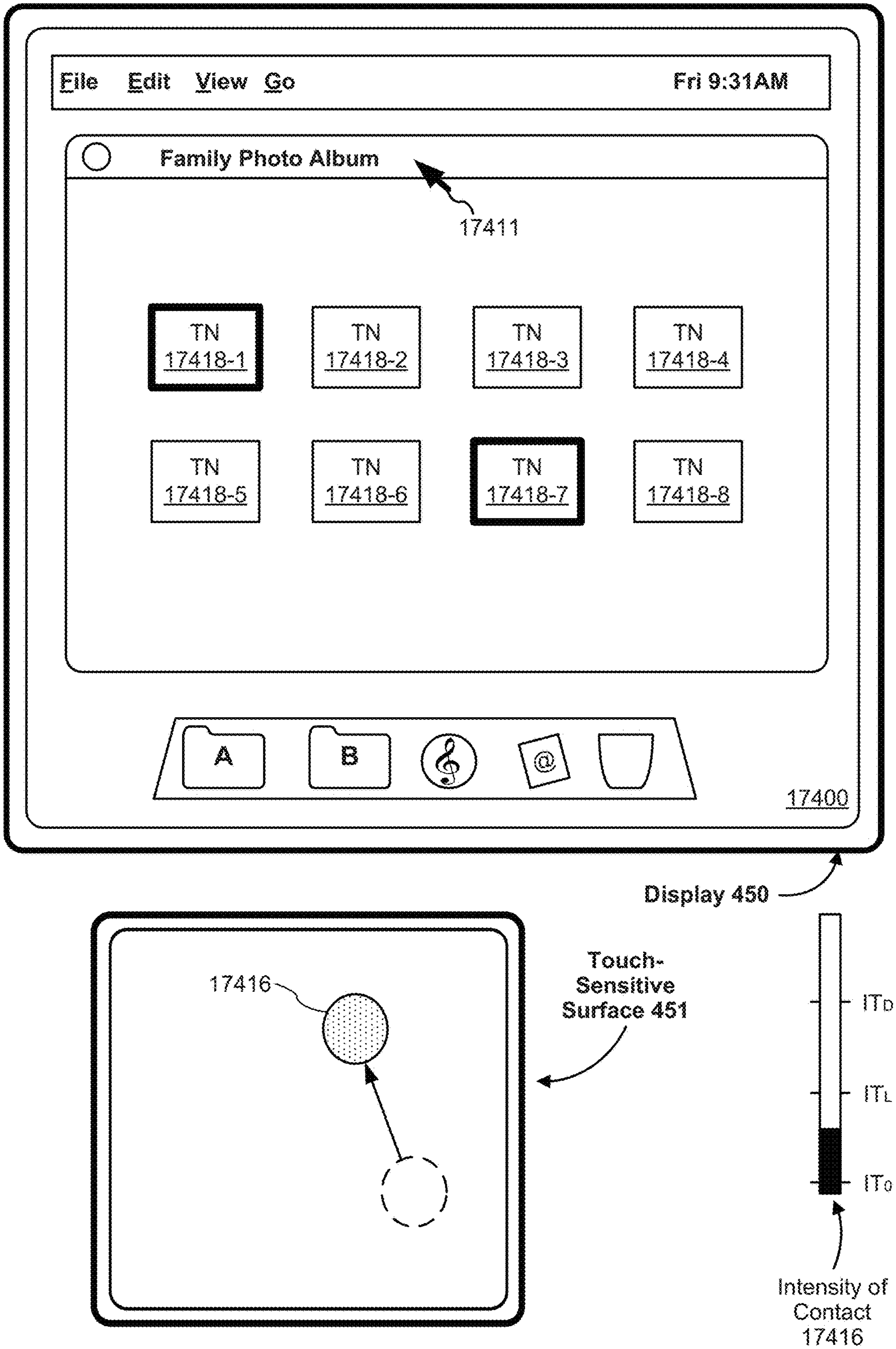
Figure 8D:
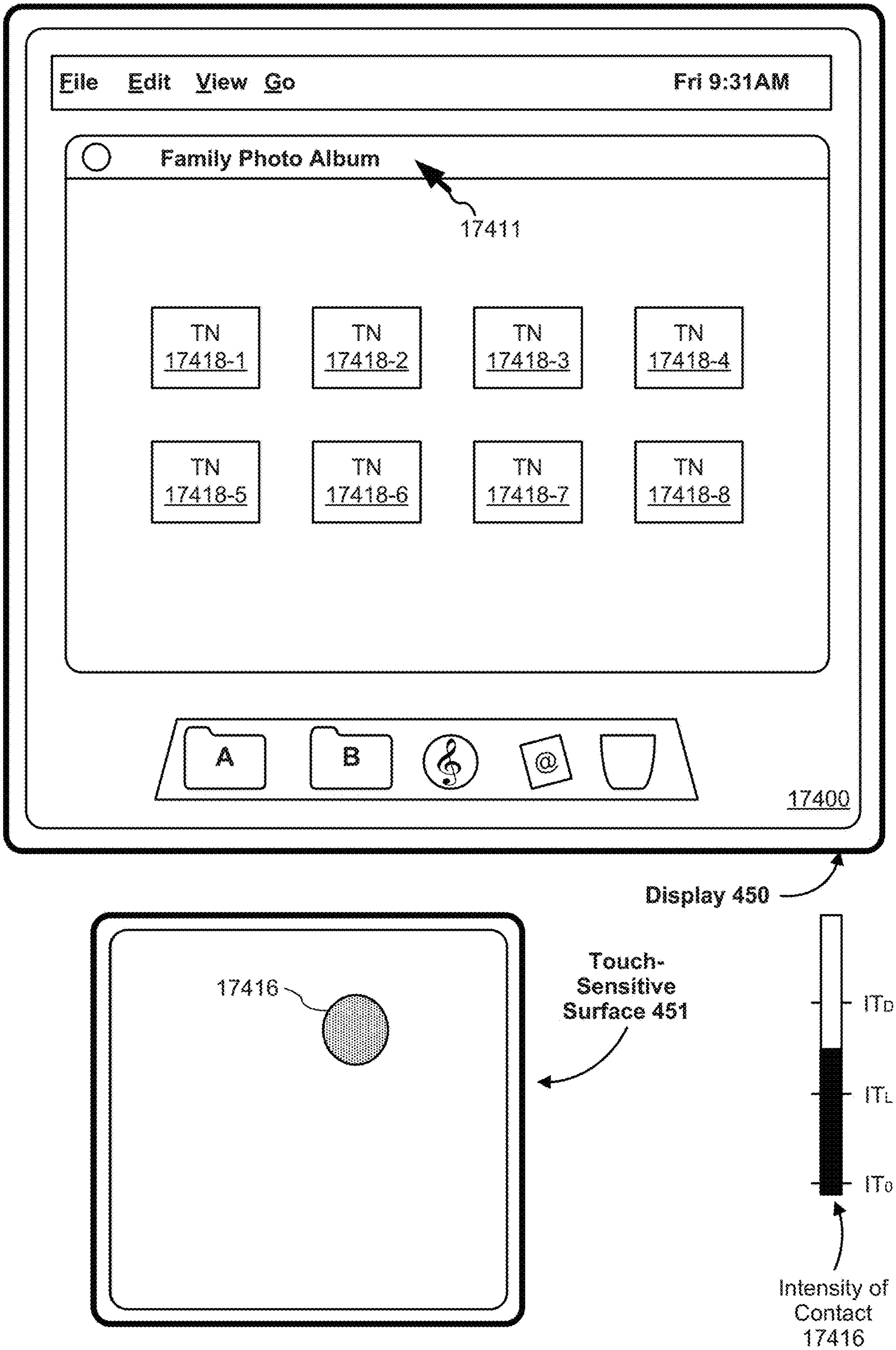
Figure 9A:
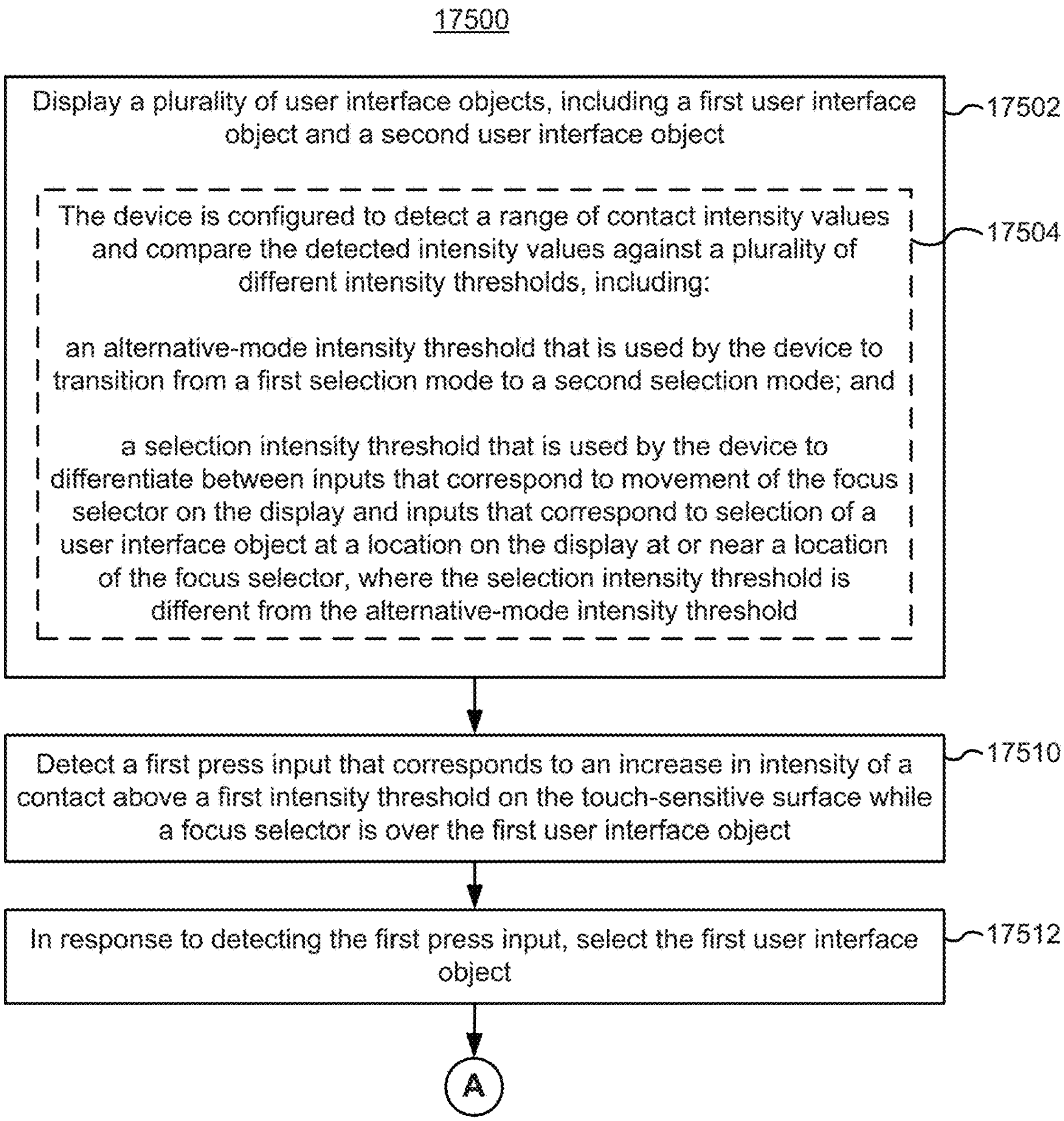
FIGS. 9A-9E are flow diagrams illustrating a method of selecting user interface objects in accordance with some embodiments.
Figure 9B:
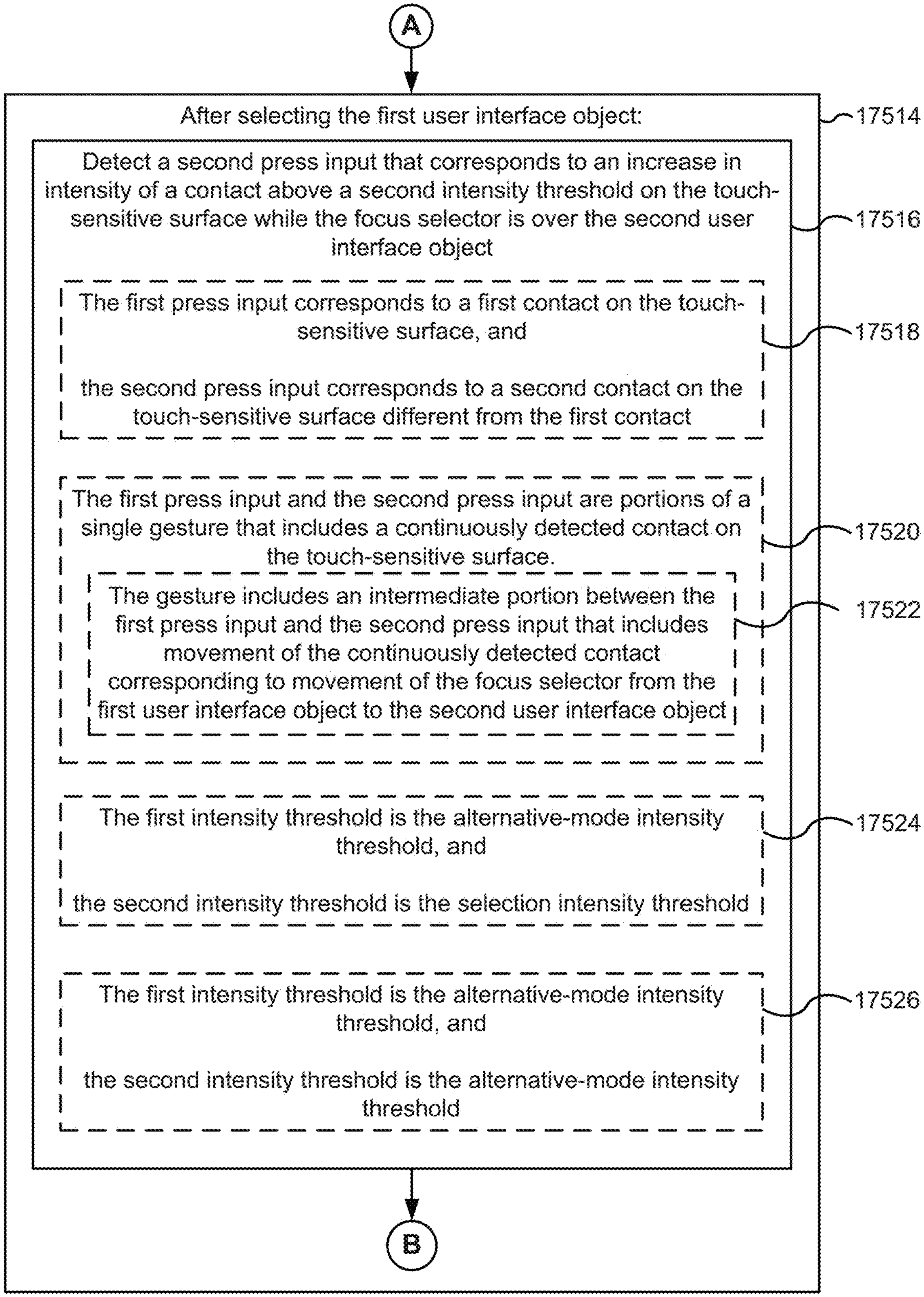
Figure 9C:
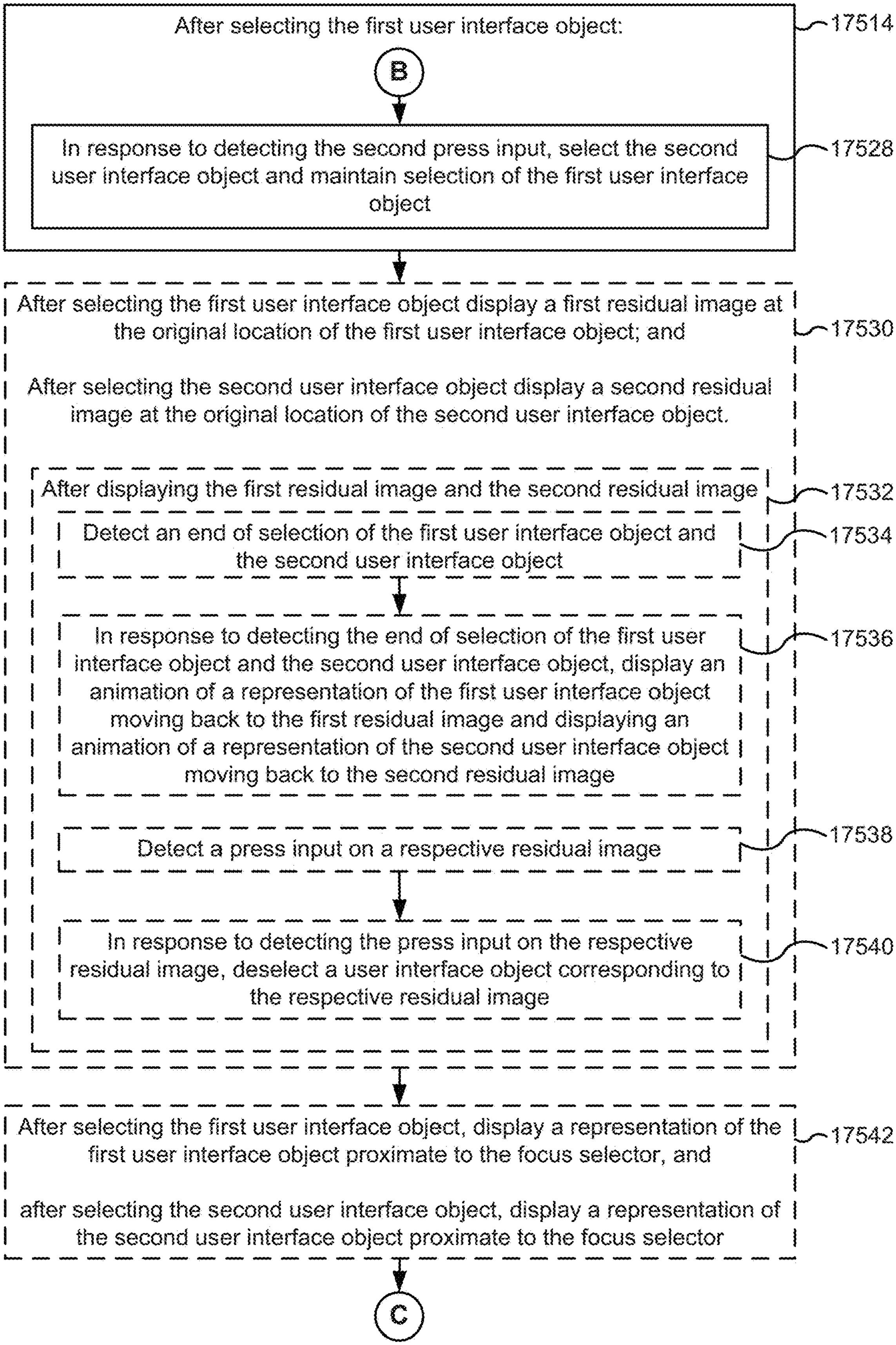
Figure 9D:
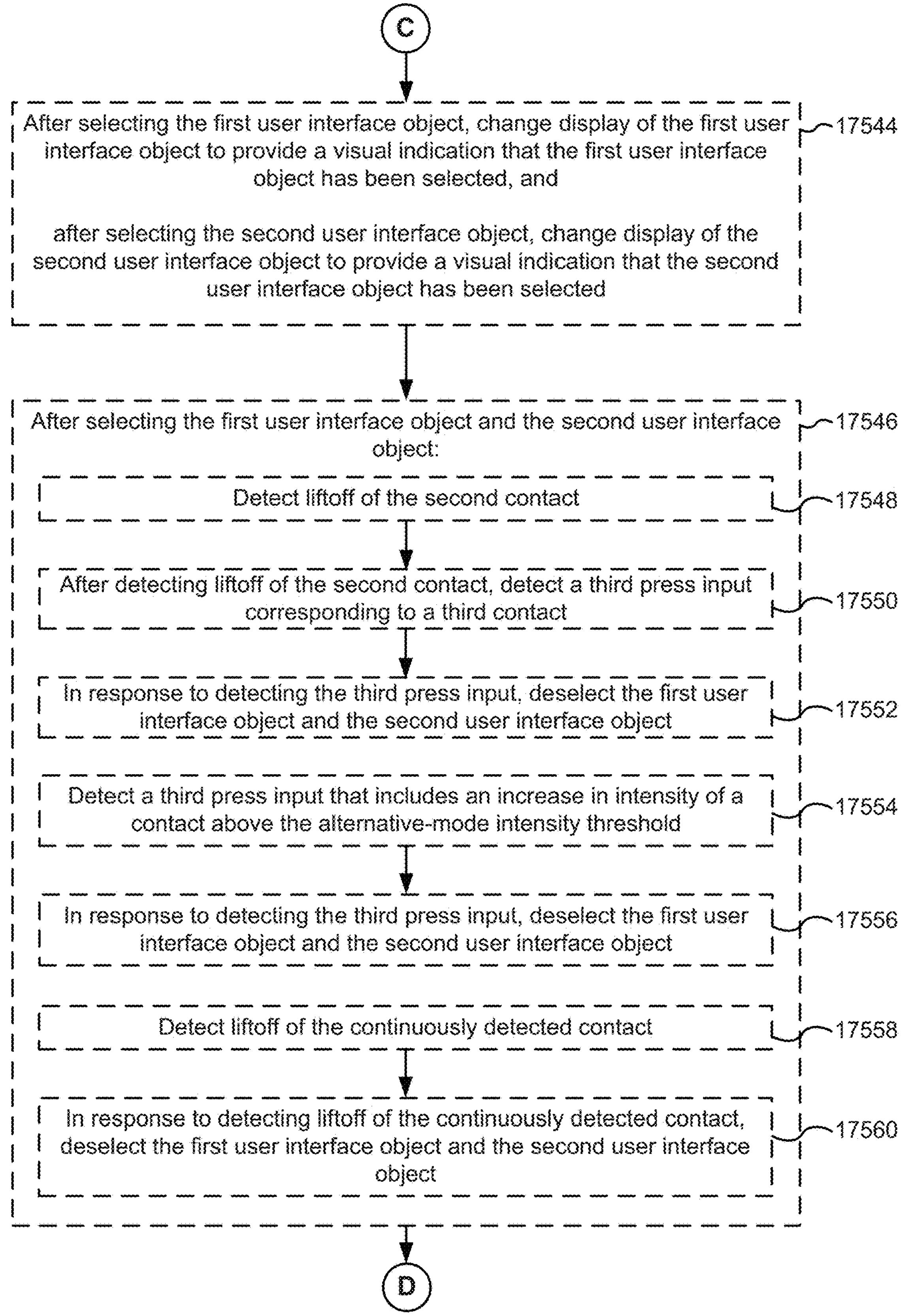
Figure 9E:
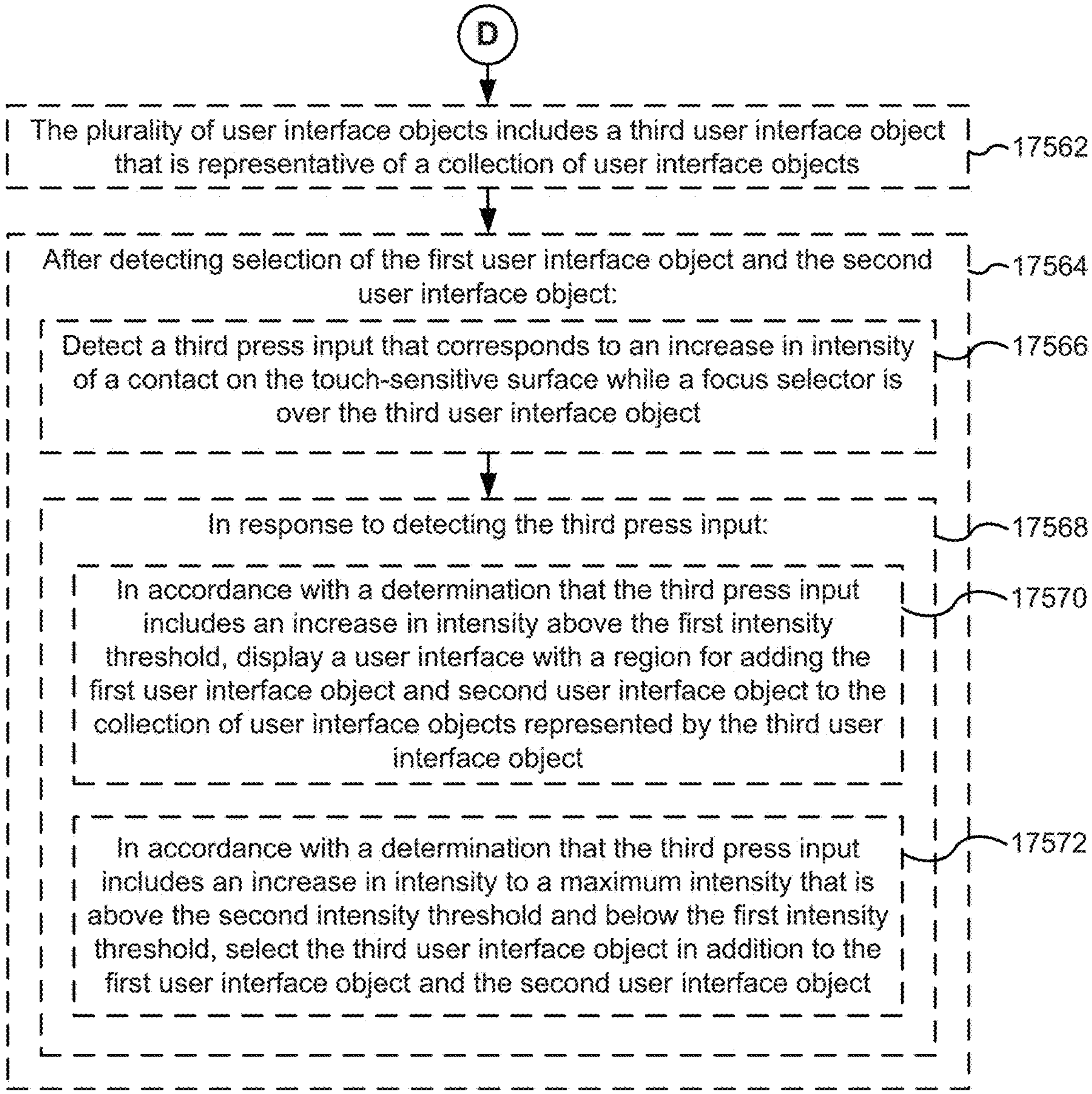

FIG. 8Y illustrates a plurality of user interface objects (e.g., thumbnails 17418) representing media objects (e.g., pictures) in a media player displaying, for example, a photo album (e.g., "Family Photo Album"). Users of such a media player may wish to select several thumbnails at a time, for example, to add the selected pictures to a different album and/or delete unwanted pictures. FIG. 8Z shows a contact 17412 corresponding to a press input while cursor 17411 is over thumbnail 17418-1. The press input correspond to an increase in intensity of contact 17412 above an alternative-mode intensity threshold (e.g., "$IT_D$"). In response to detecting the press input, the device enters an alternate mode for selecting user interface objects and selects user interface object 17418-1.

FIG. 8AA shows liftoff of contact 17412 (e.g., contact 17412 is no longer detected on touch-sensitive surface 451). In FIG. 8AA, thumbnail 17418-1 remains selected after detecting liftoff, allowing additional user interface items to be selected. FIG. 8AA shows the device detecting movement of contact 17414 and, in response to detecting the movement of contact 17414, moving cursor 17411 from the location over thumbnail 17418-1 in FIG. 8Z to a position over thumbnail 17418-7 in FIG. 8AA. While cursor 17411 is over thumbnail 17418-7 in FIGS. 8AA-8BB, the device detects a press input corresponding to an increase in intensity of contact 17414, from an intensity below a selection intensity threshold (e.g., "$IT_L$") to an intensity above the selection intensity threshold (e.g., "$IT_L$"), as shown in FIG. 8BB. In response to detecting the press input in FIG. 8BB, the device selects thumbnail 17418-7 in addition to thumbnail 17418-1.

FIG. 8CC shows detection of liftoff of contact 17414. In FIG. 8CC, both thumbnail 17418-1 and thumbnail 17418-7 remain selected in the illustrated embodiment, even though liftoff of contact 17414 has been detected. FIG. 8DD-8EE illustrate detection of a press input that does not correspond to a selectable user interface object (e.g., while the focus selector is at a location on the display that is outside of the plurality of user interface objects). In FIG. 8CC, the device detects movement of contact 17416 across touch-sensitive surface 451 and, in response moves cursor 17411 across the touch-sensitive surface to a location on the display that does not correspond to any of the plurality of thumbnails 17418. While cursor 17411 is at a location that does not correspond to any of the plurality of thumbnails 17418, the device detects a press input corresponding ton contact 17416 (e.g., an increase in intensity of contact 17416 from an intensity below $IT_L$ to an intensity between $IT_L$ and $IT_D$) and in response to detecting the press input in FIG. 8DD, the device cancels the selection and exits the "select multiple objects" or "alternative" mode.

FIGS. 9A-9E are flow diagrams illustrating a method 17500 of selecting user interface objects in accordance with some embodiments. The method 17500 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 17500 are, optionally, combined and/or the order of some operations is, optionally, changed.

As described below, the method 17500 provides an intuitive way to selecting user interface objects. The method reduces the cognitive burden on a user when selecting user interface objects, thereby creating a more efficient human-machine interface. For battery-operated electronic devices, enabling a user to select user interface objects faster and more efficiently conserves power and increases the time between battery charges.

The device displays (17502) on a display, a plurality of user interface objects, including a first user interface object and a second user interface object (e.g., thumbnails 17402-1 and 17402-2, FIG. 8A and thumbnails 17418-1 and 17418-7 in FIG. 8Y). In some embodiments, the device is configured to detect (17504) a range of contact intensity values and compare the detected intensity values against a plurality of different intensity thresholds, and the plurality of different intensity thresholds includes an alternative-mode intensity threshold (e.g., "deep press" threshold $IT_D$) that is used by the device to transition from a first selection mode (e.g., a "single object selection" mode) to a second selection mode (e.g., a "multiple object selection" mode) and a selection intensity threshold (e.g., "light press" threshold $IT_L$) that is used by the device to differentiate between inputs that correspond to movement of the focus selector on the display (e.g., inputs with an intensity between $IT_0$ and $IT_L$) and inputs that correspond to selection of a user interface object at a location on the display at or near a location of the focus selector (e.g., inputs with an intensity between $IT_L$ and $IT_D$), where the selection intensity threshold is different from (e.g., lower than) the alternative-mode intensity threshold. In some embodiments, during a normal mode of operation, when the device detects an increase in intensity of a contact above the selection intensity threshold while the focus selector is over a user interface object, the device selects the user interface object and when the device detects a decrease in intensity of the contact below the selection intensity threshold (or a predefined amount less than the selection intensity threshold) the device drops the object or performs an operation associated with activating the object (e.g., the device stops dragging an object that was being moved in accordance with movement of the focus selector or launches an application associated with the object if the object was not moved after detecting the increase in intensity of the contact).

While displaying the plurality of user interface objects, the device detects (17510) a first press input that corresponds to an increase in intensity of a contact above a first intensity threshold on the touch-sensitive surface while a focus selector is over the first user interface object. In response to detecting the first press input, the device selects (17512) the first user interface object, (e.g., selection of thumbnail 17402-1 in FIG. 8D and selection of thumbnail 17418-1 in FIG. 8Z).

After selecting the first user interface object (17514), the device detects (17516) a second press input that corresponds to an increase in intensity of a contact above a second intensity threshold on the touch-sensitive surface while the focus selector is over the second user interface object. In some embodiments, the first press input corresponds (17518) to a first contact on the touch-sensitive surface, and the second press input corresponds to a second contact on the touch-sensitive surface different from the first contact (e.g., the first contact ceases to be detected prior to detecting the second press input). In some embodiments, the first contact and the second contact are made by the same finger at different times, as shown in FIGS. 8Y-8DD. In some embodiments, the first press input is a "deep press" input that corresponds to an increase in intensity of a contact to an intensity threshold (e.g., "$IT_D$") that is higher than a selection intensity threshold (e.g., "$IT_L$"), and in response to detecting the first press input, the device enters a "select multiple objects" mode where sequential press inputs that have an intensity at or above the selection intensity threshold cause the device to select multiple user interface objects simultaneously that correspond to the sequential press inputs. Alternatively, the first press input and the second press input are portions of a single gesture that includes (17520) a continuously detected contact on the touch-sensitive surface, as shown in FIGS. 8A-8X. For example, the contact is continuously detected between the beginning of the first press input and the end of the second press input. For example in FIGS. 8B-8F, the device detects various movements of contact 17406 across touch-sensitive surface 451 as well as various press inputs performed without detecting liftoff of contact 17406 from touch-sensitive surface 451. Similarly in FIGS. 8G-8X, the device detects various movements of contact 17410 across touch-sensitive surface 451 as well as various press inputs performed without detecting liftoff of contact 17410 from touch-sensitive surface 451. In contrast, in FIGS. 8Y-8DD, the device detects multiple, distinct contacts (e.g., 17412, 17414 and 17416) instead of a continuous contact when selecting multiple user interface objects.

In some embodiments, the first press input and the second press input are made by a continuously detected (unbroken) contact on the touch-sensitive surface. In some embodiments, the gesture includes (17522) an intermediate portion (e.g., movement of contact 17410 in FIGS. 8J-8L) between the first press input and the second press input that includes movement of the continuously detected contact corresponding to movement of the focus selector from the first user interface object to the second user interface object (e.g., while the focus selector is at the first user interface object, the user selects the first user interface object, then drags the focus selector across the display from the first user interface object to the second user interface object and selects the second user interface object as part of one continuous gesture).

Regardless of whether a single contact or multiple contacts are used, in some embodiments, as shown in FIGS. 8A-8X, and, separately, in FIGS. 8Y-8DD, the first intensity threshold is (17524) the alternative-mode intensity threshold (e.g., "$IT_D$"), and the second intensity threshold is the selection intensity threshold (e.g., "$IT_L$"). In some embodiments, the first press input is a "deep press" input that corresponds to an increase in intensity of a contact to an intensity threshold (e.g., "$IT_D$") that is higher than a selection intensity threshold (e.g., "$IT_L$"), and in response to detecting the first press input, the device enters a "select multiple objects" mode where sequential press inputs that have an intensity at or above the light press intensity threshold cause the device to select multiple user interface objects simultaneously that correspond to the sequential press inputs, as shown in FIGS. 8G-8X. In the "select multiple objects" mode, the focus selector is moved sequentially over the user interface objects and, while the focus selector is over a respective user interface object, the intensity of the contact is increased above the selection intensity threshold in order to select the respective user interface object and then decreased below the selection intensity threshold while maintaining selection of the respective user interface object so that a next user interface object can be selected (e.g., a first deep press puts the device into a multiple-select mode and subsequent presses can be to a lower threshold, such as a light press input threshold).

Alternatively, in some embodiments, the first intensity threshold is (17526) the alternative-mode intensity threshold (e.g., "$IT_D$"), and the second intensity threshold is the alternative-mode intensity threshold (e.g., "$IT_D$"). Thus, in some embodiments, the second intensity threshold is the same as the first intensity threshold. For example, in some embodiments, the device enters the alternative mode in response to detecting a deep press input (e.g., an input including an increase in intensity of a contact from an intensity below ITS to an intensity above $IT_D$) during selection of a first user interface object, and the device selects a second (or third, fourth, etc.) user interface object in response to detecting other deep press inputs. In some embodiments, the device enters the alternative mode in response to detecting a light press input (e.g., an input including an increase in intensity of a contact from an intensity below $IT_L$ to an intensity above $IT_L$) during selection of a first user interface object and the device selects a second (or third, fourth, etc.) user interface object in response to detecting other light press inputs.

In response to detecting the second press input, the device selects (17528) the second user interface object and maintains selection of the first user interface object, as shown, for example, in FIGS. 8L-80, where the device selects thumbnail 17402-2 in response to detecting an increase in intensity of contact 17410 from an intensity below $IT_L$ to an intensity above $IT_L$. In some embodiments, also shown in FIGS. 8L-80, after selecting (17530) the first user interface object the device displays a first residual image (e.g., residual image 17416-1 in FIGS. 8J-80) at the original location of the first user interface object, and after selecting the second user interface object the device displays a second residual image (e.g., residual image 17416-2 in FIG. 80) at the original location of the second user interface object. In some embodiments, the residual images remain in place even while the focus selector (and, optionally, representations of the user interface objects) are moved on the display until the user interface objects are moved to a different location in the user interface (e.g., as shown in FIG. 8P).

In some embodiments, after (17532) displaying the first residual image and the second residual image the device detects (17534) an end of selection of the first user interface object and the second user interface object. For example, the device detects an invalid drop of the selected user interface objects such as liftoff (or deep press/double tap) of the contact while the focus selector is over a region of the display that the selected objects cannot be placed in. In response to detecting the end of selection of the first user interface object and the second user interface object, the device displays (17536) an animation of a representation of the first user interface object moving back to the first residual image and displaying an animation of a representation of the second user interface object moving back to the second residual image. For example, in FIG. 80, when the device detects a valid drop operation, thumbnails 17402-1 and 17402-2 are dropped at a location proximate to cursor 17408, as shown in FIG. 8P. In contrast, in some embodiments, if the device detected an invalid drop operation in FIG. 80, the device would display an animation of thumbnail 17402-1 and 17402-2 moving back to residual images 17416-1 and 17416-2, to return to the state of the user interface shown in FIG. 8F.

In some embodiments, the device detects (17538) a press input on a respective residual image (e.g., the device detects an increase in intensity of a contact corresponding to cursor 17408 above $IT_L$ while the cursor is over the respective residual image). In response to detecting the press input on the respective residual image, the device deselects (17540) a user interface object corresponding to the respective residual image (e.g., deselect the first user interface object if the respective residual image is the first residual image and deselect the second user interface object if the respective residual image is the second residual image). In some embodiments, after the user interface object is deselected, the user interface object is displayed at its original location and the representation of the user interface object that was previously moving in accordance with movement of the focus selector and the respective residual image cease to be displayed.

In some embodiments, after selecting the first user interface object, the device displays (17542) a representation of the first user interface object proximate to the focus selector, and, after selecting the second user interface object, the device displays a representation of the second user interface object proximate to the focus selector (e.g., representations of a pile of photos follow cursor/contact around display). Examples of representations of user interface objects proximate to the focus selector include the "stack" or "pile" of user interface objects shown in, for example, FIG. 80 representing thumbnails 17402-1 and 17402-2.

In some embodiments, after selecting the first user interface object, the devices changes (17544) display of the first user interface object to provide a visual indication that the first user interface object has been selected (e.g., the border of thumbnail 17418-1 changes between FIG. 8Y and FIG. 8Z to show that thumbnail 17418-1 has been selected), and after selecting the second user interface object, the device changes display of the second user interface object to provide a visual indication that the second user interface object has been selected (e.g., the border of thumbnail 17418-7 changes between FIG. 8AA and FIG. 8BB to show that thumbnail 17418-7 has been selected). As one example, multiple thumbnails are simultaneously popped up off of the page (e.g., using a drop shadow or pseudo three dimensional effect) to provide a visual indication that user interface objects corresponding to the popped up images have been selected. As another example, residual images of thumbnails are displayed to provide a visual indication that user interface objects corresponding to the residual images have been selected.

In some embodiments, after (17546) selecting the first user interface object and the second user interface object, the device detects (17548) liftoff of the second contact. After detecting liftoff of the second contact, the device detects (17550) a third press input corresponding to a third contact. In response to detecting the third press input, the device deselects (17552) the first user interface object and the second user interface object (e.g., in FIG. 8DD, in response to detecting a contact 17416 that does not correspond to a selectable user interface object 17418, the device cancels the selection and exits the "select multiple objects" mode).

In some embodiments, the device detects (17554) a third press input that includes an increase in intensity of a contact above the alternative-mode intensity threshold (e.g., while the focus selector is at a location on the display that is outside of the plurality of user interface objects). In response to detecting the third press input, the device deselects (17556) the first user interface object and the second user interface object. In some embodiments, the first and second user interface objects are deselected if the increase in intensity is detected while the focus selector is over a portion of the user interface that does not include any selectable user interface objects, whereas if the increase in intensity is detected while the focus selector is over a third user interface object that is selectable, the third user interface object is selected in addition to the previously selected first and second user interface objects. For example, if the device were to detect an deep press input in FIG. 8DD while cursor 17411 is over thumbnail 17418-2 instead of over a portion of the user interface that does not include any of the thumbnails, then thumbnail 17418-2 would be selected in addition to thumbnails 17418-1 and 17418-7 instead of deselecting thumbnails 17418-1 and 17418-7, as shown in FIG. 8DD.

In some embodiments, the device detects (17558) liftoff of the continuously detected contact. In response to detecting liftoff of the continuously detected contact, the device deselects (17560) the first user interface object and the second user interface object (e.g., simultaneous selection of the multiple user interface object is maintained until the contact used to select the user interface objects is lifted off of the touch-sensitive surface), as shown in FIG. 8P, where the device deselects thumbnails 17402-1 and 17402-2 in response to detecting liftoff of contact 17410 from the touch-sensitive surface 451.

In some embodiments, the plurality of user interface objects includes (17562) a third user interface object that is representative of a collection of user interface objects (e.g., a folder icon that is representative of a directory of files, such as "docs" folder 17404 in FIG. 8A). After detecting selection of the first user interface object and the second user interface object (17564), the device detects (17566) a third press input that corresponds to an increase in intensity of a contact on the touch-sensitive surface while a focus selector is over the third user interface object. In some of these embodiments, in response (17568) to detecting the third press input, in accordance with a determination that the third press input includes an increase in intensity above the first intensity threshold (for example, contact 17410 has an intensity above ITS as shown in 174U), the device displays (17570) a user interface with a region for adding the first user interface object and second user interface object to the collection of user interface objects represented by the third user interface object (e.g., opening the file in a file manager program, for example, as shown in FIGS. 8V-8X), and in accordance with a determination that the third press input includes an increase in intensity to a maximum intensity that is above the second intensity threshold (e.g., "$IT_L$") and below the first intensity threshold (e.g., "ITS"), the device selects (17572) the third user interface object in addition to the first user interface object and the second user interface object (e.g., in response to detecting the press input in FIG. 8S, the device picks up the folder icon, as shown in FIGS. 8S-8T). In some embodiments, if the increase in intensity of the contact is below the second intensity threshold (e.g., "$IT_L$"), the device forgoes performing an operation associated with the third user interface object.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 17500 described above with respect to FIGS. 9A-9E. For example, the contacts, press inputs, user interface objects, intensity thresholds, focus selectors described above with reference to method 17500 optionally have one or more of the characteristics of the contacts, press inputs, user interface objects, intensity thresholds, focus selectors described herein with reference to other methods described herein (e.g., those listed in the fifth paragraph of the Description of Embodiments). For brevity, these details are not repeated here.

Figure 10:
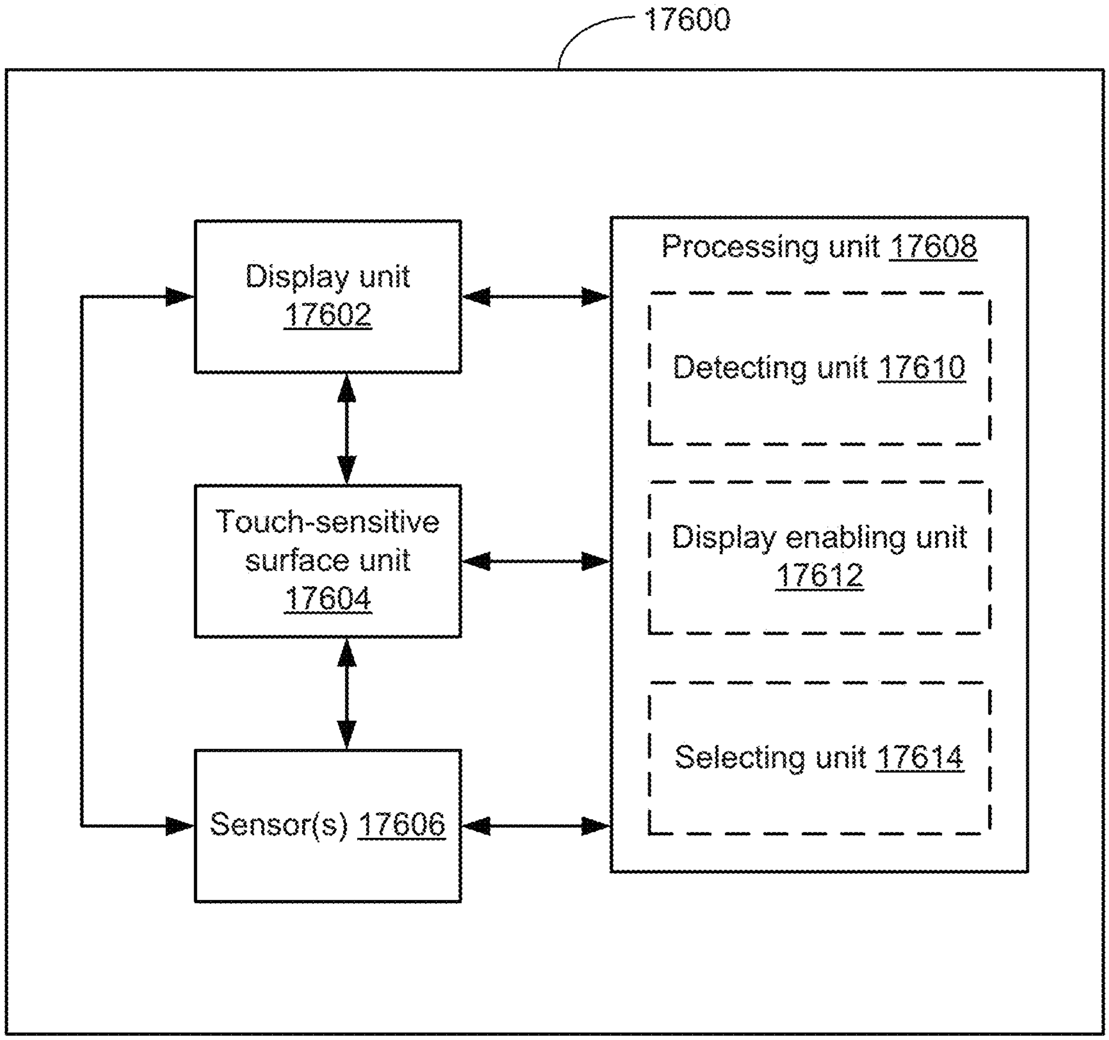
FIG. 10 is a functional block diagram of an electronic device in accordance with some embodiments.

In accordance with some embodiments, FIG. 10 shows a functional block diagram of an electronic device 17600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 17600 includes a display unit 17602 configured to display a graphic user interface, a touch-sensitive surface unit 17604 configured to receive contacts, one or more sensor units 17606 configured to detect intensity of contacts with the touch-sensitive surface unit 17604; and a processing unit 17608 coupled to the display unit 17602, the touch-sensitive surface unit 17604 and the one or more sensor units 17606. In some embodiments, the processing unit 17608 includes a detecting unit 17610, a display enabling unit 17612, and a selecting unit 17614.

Display unit 17602 is configured to display a plurality of user interface objects, including a first user interface object and a second user interface object. Processing unit 17608 is configured to detect a first press input (e.g., with the detecting unit 17610) that corresponds to an increase in intensity of a contact above a first intensity threshold on the touch-sensitive surface unit 17604 while a focus selector is over the first user interface object. In response to detection of the first press input, processing unit 17608 is configured to select the first user interface object (e.g., with the selecting unit 17614), and after selecting the first user interface object, detect a second press input (e.g., with the detecting unit 17610) that corresponds to an increase in intensity of a contact above a second intensity threshold on the touch-sensitive surface unit 17604 while the focus selector is over the second user interface object. In response to detection of the second press input, processing unit 17608 is configured to select the second user interface object (e.g., with the selecting unit 17614) and maintaining selection of the first user interface object.

In some embodiments, the first press input corresponds to a first contact on the touch-sensitive surface unit, and the second press input corresponds to a second contact on the touch-sensitive surface unit different from the first contact.

In some embodiments, the processing unit 17608 is further configured to, after selecting the first user interface object and the second user interface object, detect liftoff of the second contact. After detecting liftoff of the second contact, processing unit 17608 is further configured to detect a third press input (e.g., with the detecting unit 17610) corresponding to a third contact; and, in response to detecting the third press input, deselect the first user interface object and the second user interface object (e.g., with the selecting unit 17614).

In some embodiments, the first press input and the second press input are portions of a single gesture that includes a continuously detected contact on the touch-sensitive surface unit 17604.

In some embodiments, the processing unit 17608 is further configured to, after selecting the first user interface object and the second user interface object, detect liftoff (e.g., with the detecting unit 17610) of the continuously detected contact; and in response to detecting liftoff of the continuously detected contact, deselect the first user interface object and the second user interface object (e.g., with the selecting unit 17614).

In some embodiments, the first press input and the second press input are portions of a single gesture that includes a continuously detected contact on the touch-sensitive surface unit; and the gesture includes an intermediate portion between the first press input and the second press input that includes movement of the continuously detected contact corresponding to movement of the focus selector from the first user interface object to the second user interface object.

In some embodiments, the processing unit 17608 is configured to detect a range of contact intensity values and compare the detected intensity values against a plurality of different intensity thresholds. The plurality of different intensity thresholds include an alternative-mode intensity threshold that is used by the processing unit 17608 to transition from a first selection mode to a second selection mode; and a selection intensity threshold that is used by the processing unit 17608 to differentiate between inputs that correspond to movement of the focus selector on the display unit 17602 (and inputs that correspond to selection of a user interface object at a location on the display unit 17602 at or near a location of the focus selector, where the selection intensity threshold is different from the alternative-mode intensity threshold.

In some embodiments, processing unit 17608 is further configured to, after selecting the first user interface object and the second user interface object, detect a third press input (e.g., with the detecting unit 17610) that includes an increase in intensity of a contact above the alternative-mode intensity threshold; and in response to detecting the third press input, deselect the first user interface object and the second user interface object (e.g., with the selecting unit 17614).

In some embodiments, the first intensity threshold is the alternative-mode intensity threshold, and the second intensity threshold is the alternative-mode intensity threshold.

In some embodiments, the first intensity threshold is the alternative-mode intensity threshold, and the second intensity threshold is the selection intensity threshold.

In some embodiments, the plurality of user interface objects includes a third user interface object that is representative of a collection of user interface objects, and the processing unit 17608 is further configured to, after selecting the second user interface object, detect (e.g., with the detecting unit 17610) a third press input that corresponds to an increase in intensity of a contact on the touch-sensitive surface unit 17604 while a focus selector is over the third user interface object. The processing unit 17608 is further configured to, in response to detecting the third press input, in accordance with a determination that the third press input includes an increase in intensity above the first intensity threshold, display a user interface (e.g., with the display enabling unit 17612) with a region for adding the first user interface object and second user interface object to the collection of user interface objects represented by the third user interface object and, in accordance with a determination that the third press input includes an increase in intensity to a maximum intensity that is above the second intensity threshold and below the first intensity threshold, select the third user interface object (e.g., with the selecting unit 17614) in addition to the first user interface object and the second user interface object.

In some embodiments, the processing unit 17608 is further configured to, after selecting the first user interface object, display a first residual image (e.g., with the display enabling unit 17612) at the original location of the first user interface object; and after selecting the second user interface object, display a second residual image (e.g., with the display enabling unit 17612) at the original location of the second user interface object.

In some embodiments, the processing unit 17608 is further configured to, after displaying the first residual image and the second residual image, detect (e.g., with the detecting unit 17610) an end of selection of the first user interface object and the second user interface object and in response to detecting the end of selection of the first user interface object and the second user interface object, display an animation (e.g., with the display enabling unit 17612) of a representation of the first user interface object moving back to the first residual image and display an animation (e.g., with the display enabling unit 17612) of a representation of the second user interface object moving back to the second residual image.

In some embodiments, the processing unit 17608 is further configured to, after displaying the first residual image and the second residual image, detect a press input (e.g., with the detecting unit 17610) on a respective residual image, and, in response to detecting the press input on the respective residual image, deselect a user interface object (e.g., with the selecting unit 17614) corresponding to the respective residual image.

In some embodiments, the processing unit 17608 is further configured to, after selecting the first user interface object, display a representation of the first user interface object (e.g., with the display enabling unit 17612) proximate to the focus selector; and, after selecting the second user interface object, display a representation of the second user interface object (e.g., with the display enabling unit 17612) proximate to the focus selector.

In some embodiments, processing unit 17608 is further configured to, after selecting the first user interface object, change display of the first user interface object (e.g., with the display enabling unit 17612) to provide a visual indication that the first user interface object has been selected; and, after selecting the second user interface object, change display of the second user interface object (e.g., with the display enabling unit 17612) to provide a visual indication that the second user interface object has been selected.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9E are, optionally, implemented by components depicted in FIGS. 1A-1B or FIG. 10. For example, detection operations 17510 and 17512, and selection operations 17512 and 17528, and deselecting operation 17540 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Typing Characters on a Virtual Keyboard

Many electronic devices with touch-sensitive surfaces, such as portable multifunction devices with touch screen displays, have graphical user interfaces with displayed virtual keyboards for typing characters for output in, for example, e-mail messages, notepad applications, and search fields. Some methods for entering a character or a sequence of characters (e.g., entering an input into the device that corresponds to a request to output a character or multiple characters) require separate contacts on a touch-sensitive surface for each character entered. However, entering characters with a separate contact for each character entered can be inefficient and time consuming for a user.

In the embodiments described below, a faster and more efficient method for accurately typing characters on a virtual keyboard is provided where a sequence of characters can be selected with a continuous contact in response to detecting an increase in intensity of the contact while the contact is over keys corresponding to the characters. In some embodiments, detecting a press input that includes a contact with a respective intensity above a respective threshold (e.g., on a device with a touch-sensitive surface configured to detect intensity of contacts) while a contact is over a respective character causes the device to output the respective character. In contrast, detecting a press input with a maximum intensity below the respective threshold causes the device to forgo outputting the respective character. This method streamlines the character typing process by allowing a user to type characters quickly and accurately using a single continuous movement of a contact.

FIGS. 11A-11T illustrate exemplary user interfaces for typing characters on a virtual keyboard in accordance with some embodiments. The user interfaces in these figures are used to illustrate the processes described below, including the processes in FIGS. 12A-12D. FIGS. 11B-11T include intensity diagrams that show the current intensity of the contact on the touch-sensitive surface relative to a plurality of intensity thresholds including a first intensity threshold (e.g., "$IT_L$"), a deep press intensity threshold (e.g., "$IT_D$") and a character output intensity threshold (e.g., "$IT_C$").

FIG. 11A illustrates an exemplary user interface displayed on device 300 with touch screen 112 for typing characters on a virtual keyboard 17704 in accordance with some embodiments. As an example, the device displays a notepad application (app) 17702. Letters and/or other characters produced using inputs (gestures, contacts, etc.) are outputted (e.g., displayed) in the notepad within notepad app 17702.

FIG. 11B illustrates detection of a contact 17706 on touch screen 112. Contact 17706 is detected by virtue of an intensity of contact above a minimum contact intensity threshold $IT_0$. However, in FIG. 11B, contact 17706 has an intensity below the light press intensity threshold $IT_L$, and therefore no characters are outputted in notepad app 17702 (as described with reference to method 17800, FIGS. 12A-12D). FIG. 11B also illustrates movement of contact 17706 from the location shown in the figure to a location over the key corresponding to character "G."

Figure 11C:
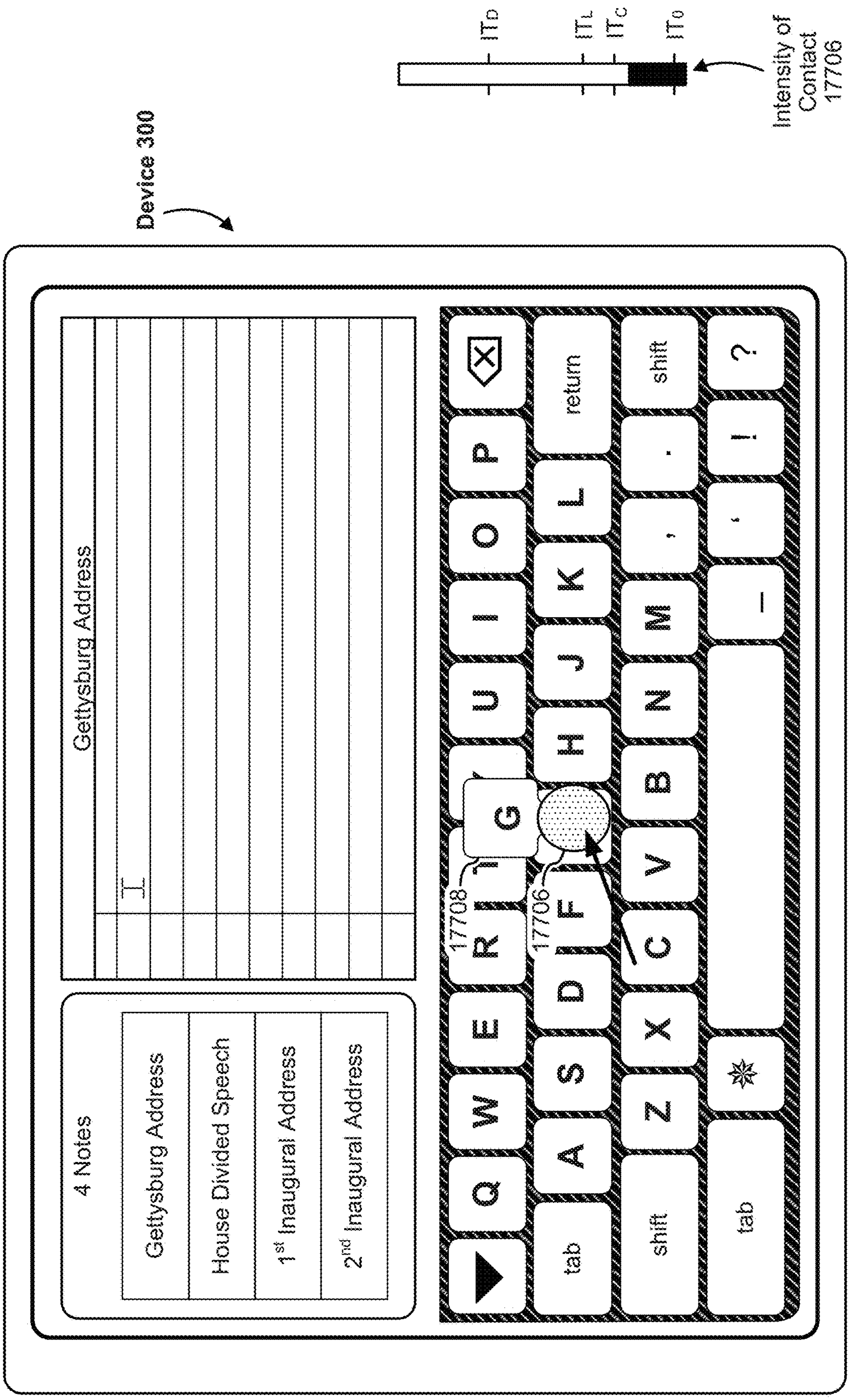

FIG. 11C illustrates an intensity of contact 17706 below $IT_L$ while contact 17706 is over the key corresponding to character "G." Optionally, the device displays a pop-up tab 17708 displaying a character that corresponds to the location of contact 17706. For example, because contact 17706 is currently over a hit-region that corresponds to the character "G", the character "G" is displayed in the pop-up tab. The pop-up tab therefore allows a user to see a character to which a contact corresponds despite that character being covered by the user's finger. In this example, pop-up tab 17708 is displayed regardless of the intensity (e.g., without necessarily outputting the character "G," as explained below).

Figure 11D:
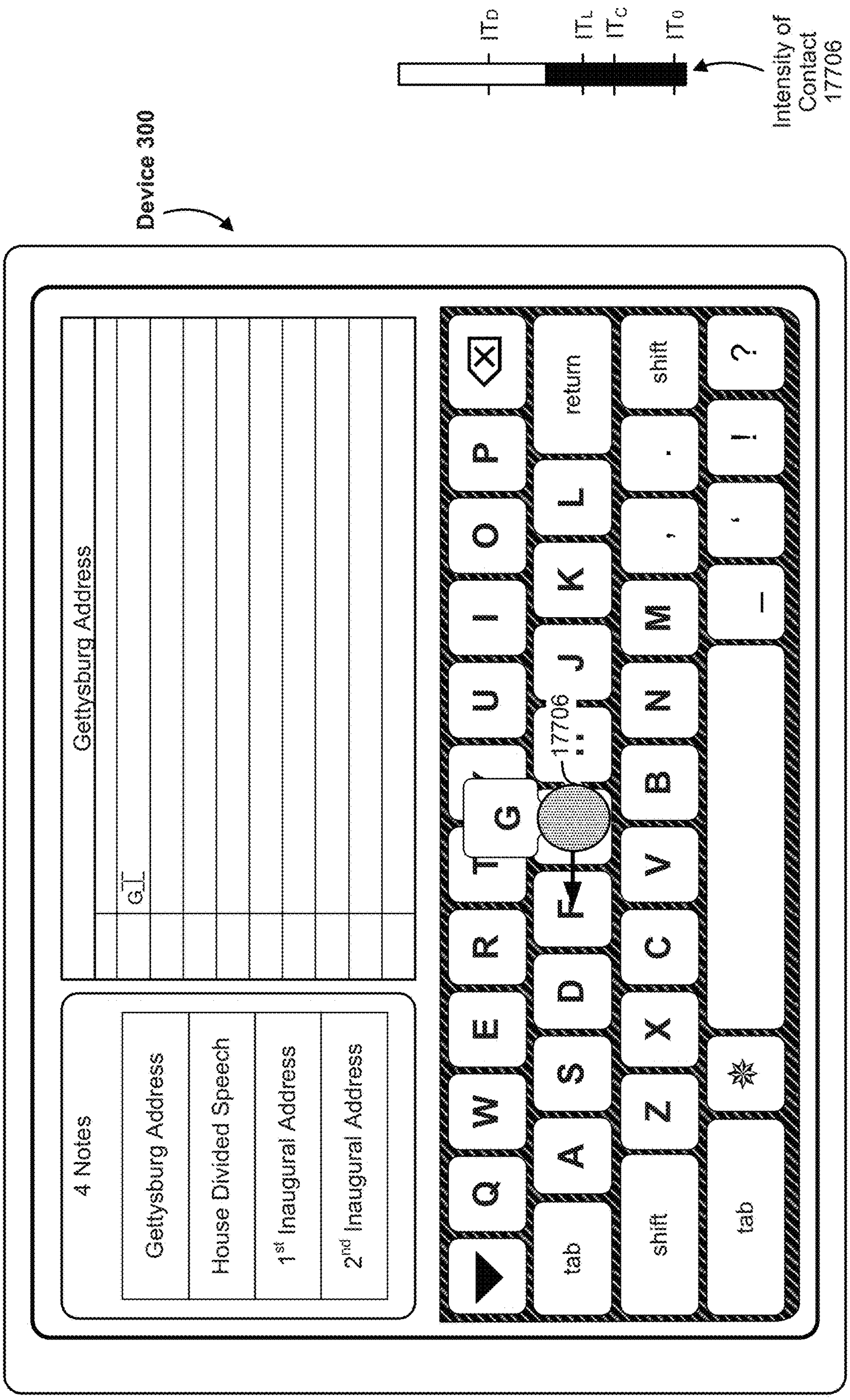

FIG. 11D illustrates an intensity of contact 17706 above $IT_L$ while contact 17706 is over the key corresponding to character "G" (e.g., a light press input is detected over the key corresponding to character "G"). Because character-output criteria are met, character "G" is outputted in notepad app 17702 (as described with reference to method 17800, FIGS. 12A-12D). In some embodiments, character "G" is outputted when an increase in intensity of contact 17706 is detected above $IT_L$ (e.g., on the rising edge of intensity, or "down-stroke" of a contact, that subsequently has an intensity above $IT_L$). For example, in FIG. 11D, character "G" is output when an intensity of contact 17706 is above $IT_L$ while contact 17706 is over the key corresponding to character "G" on the virtual keyboard.

In some embodiments, character "G" is outputted when a decrease in intensity of contact 17706 is detected from above $IT_L$ to below $IT_L$ (e.g., on the falling edge, or "up-stroke" of a contact that previously had an intensity above $IT_L$). In some embodiments, the character-output criteria include detection of both an intensity of contact 17706 above $IT_L$, and a subsequent decrease in intensity from above to below a different character-output intensity threshold (e.g., $IT_C$), while contact 17706 is continuously detected over the key corresponding to character "G" on the virtual keyboard. In such embodiments, there are different thresholds to activate potential output of a character (e.g., $IT_L$) and to actually trigger output of the character (e.g., $IT_C$), thereby providing hysteresis and prevented repeated, accidental outputs of the same character. Alternatively, in some embodiments, $IT_L$ and $IT_C$ are equal. For ease of explanation, output of a respective character is shown contemporaneously with a corresponding input above $IT_L$, unless otherwise noted (e.g., output is triggered on the down-stroke).

In some embodiments, after output of a capitalized character (e.g., character "G") virtual keyboard 17704 automatically transitions to displaying lower-case characters. In some embodiments, subsequent fulfillment of character-output criteria while a contact is over a lower-case character (e.g., "g") results in output of the lower-case character. For convenience of explanation, embodiments are described with reference to capitalized (i.e., upper-case) characters.

FIG. 11D also illustrates subsequent movement of contact 17706 to a location over the key corresponding to character "F."

Figure 11E:
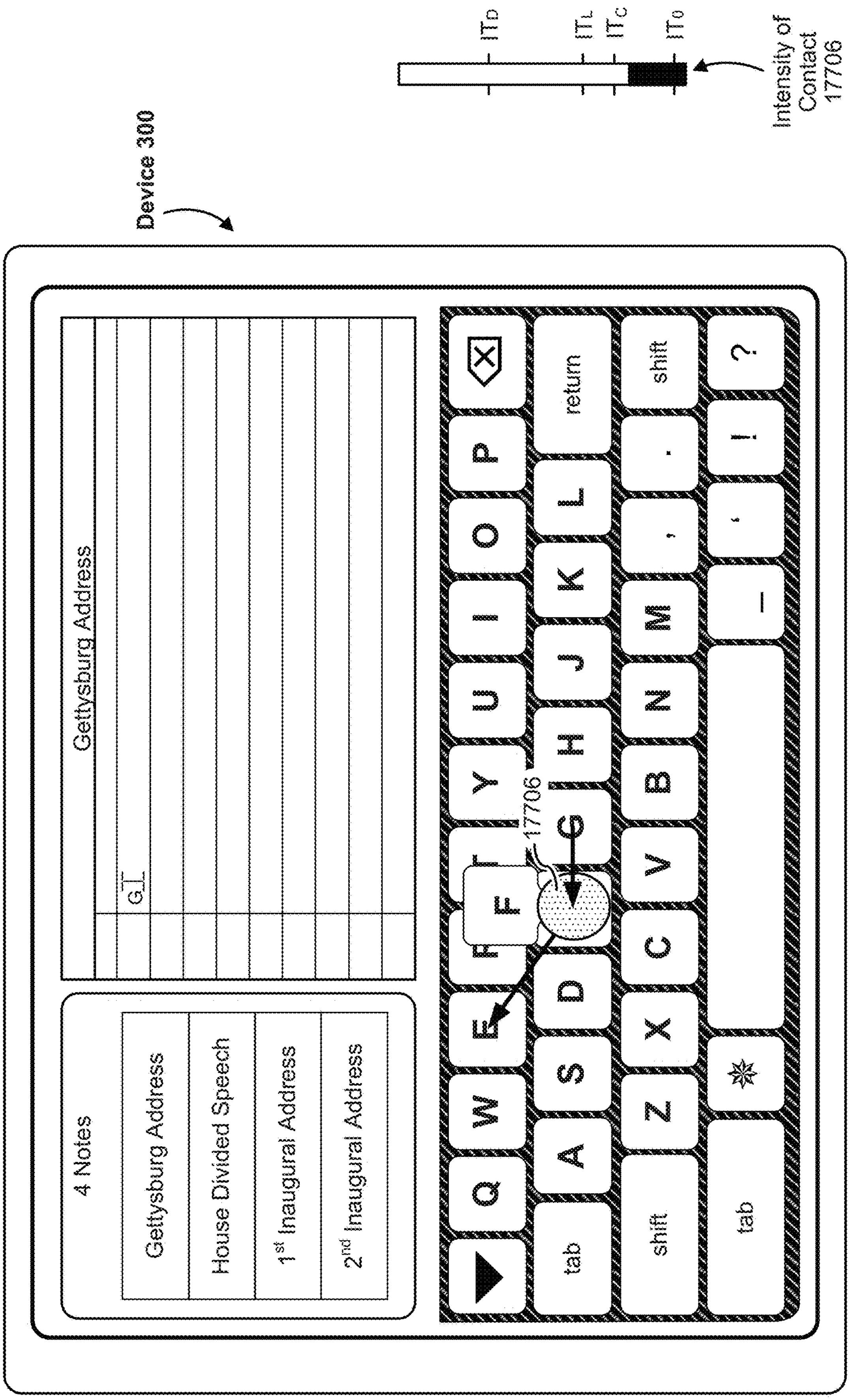

FIG. 11E illustrates a maximum intensity of contact 17706 below $IT_L$ while contact 17706 is over the key corresponding to character "F." In this example, intensity of contact 17706 remains below $IT_L$ during the period of time in which contact 17706 is over the key corresponding to character "F." As a result, the device forgoes outputting character "F" in notepad app 17702 (as described with reference to method 17800, FIGS. 12A-12D). FIG. 11E also illustrates subsequent movement of contact 17706 to a location over the key corresponding to character "E."

Figure 11F:
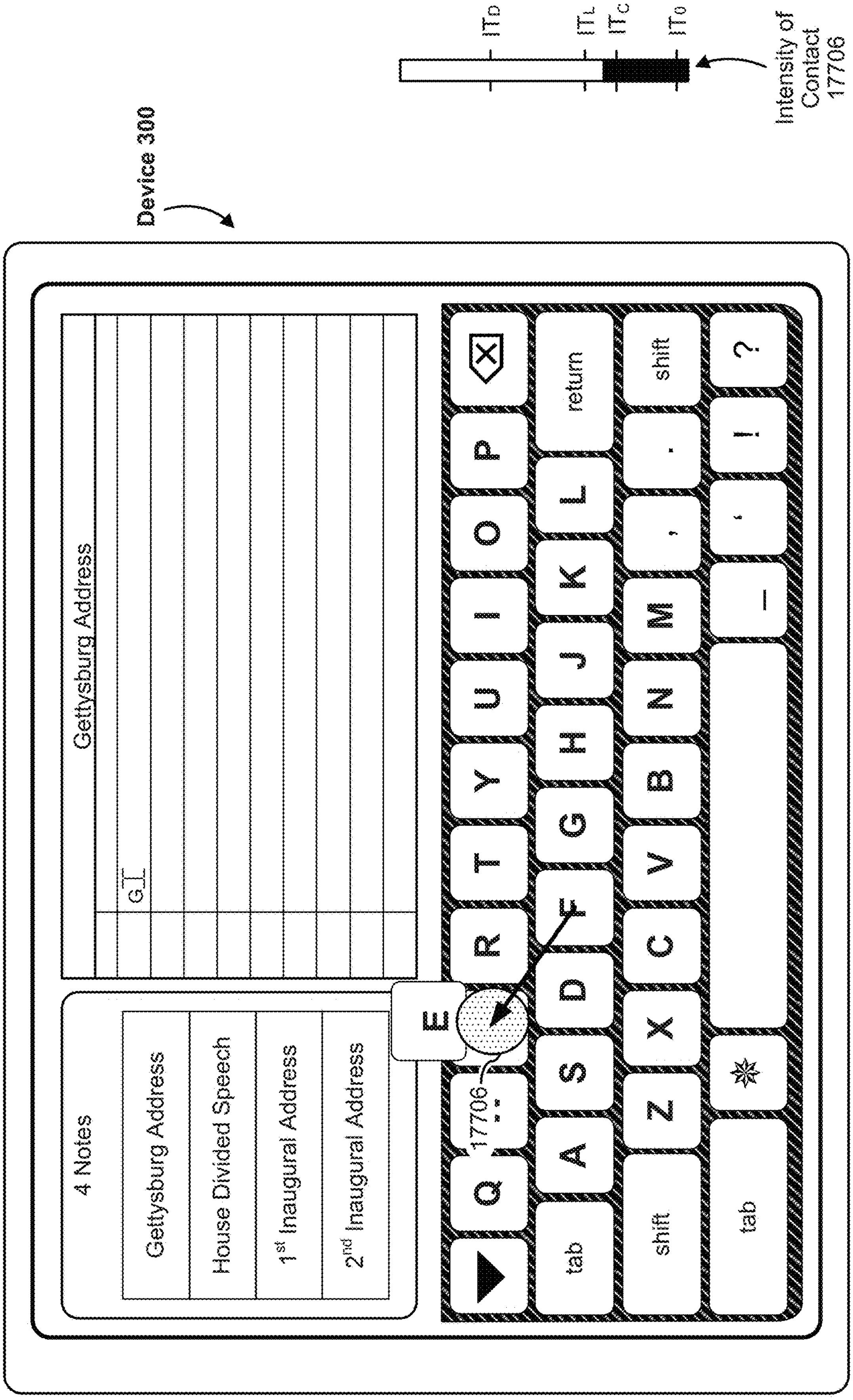

FIG. 11F illustrate an intensity of contact 17706 below $IT_L$ while contact 17706 is over the key corresponding to character "E."

Figure 11G:
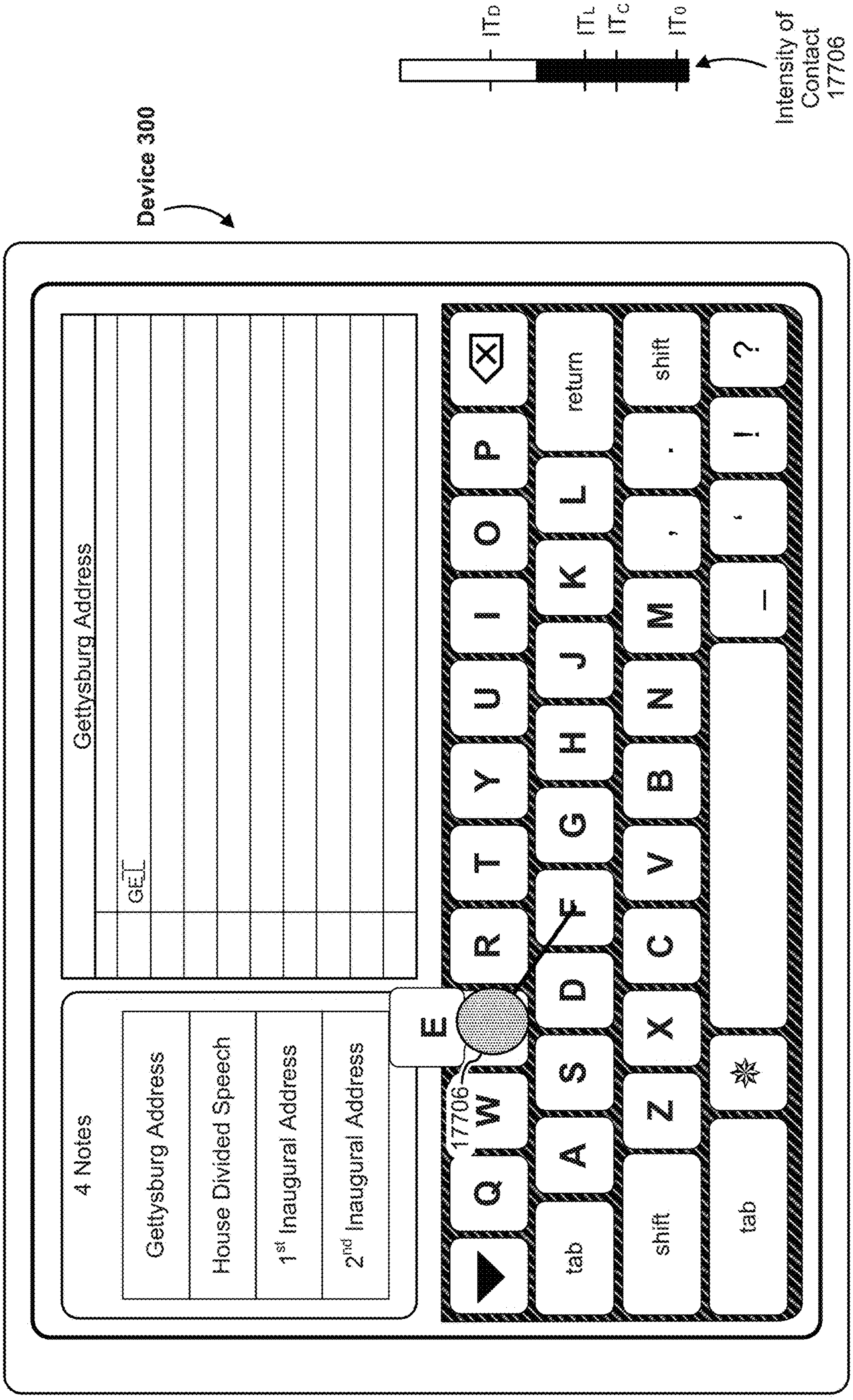

FIG. 11G illustrates an increase in intensity of contact 17706 from below $IT_L$ to above $IT_L$ and the resulting output of a character "E."

Figure 11H:
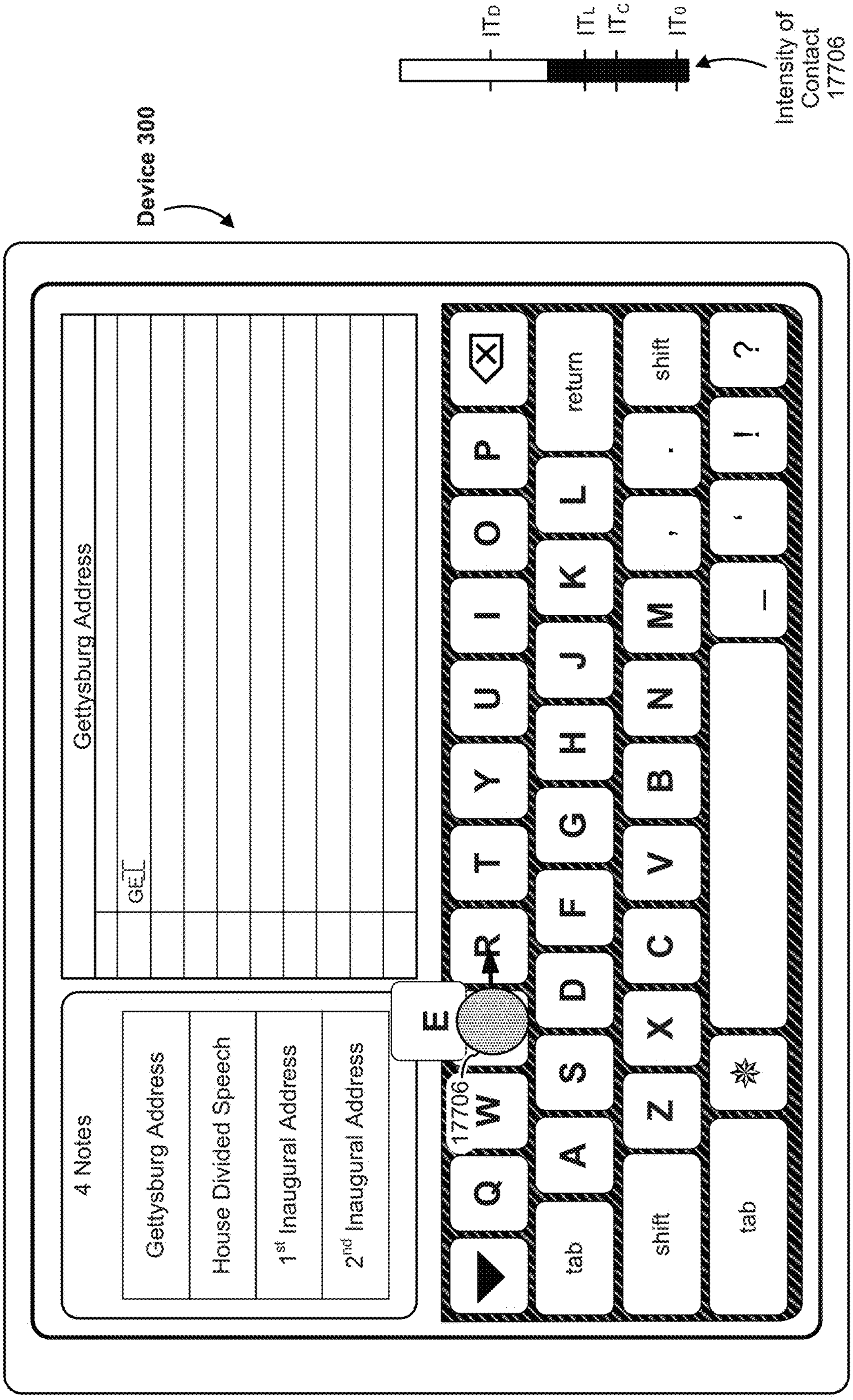
Figure 11I:
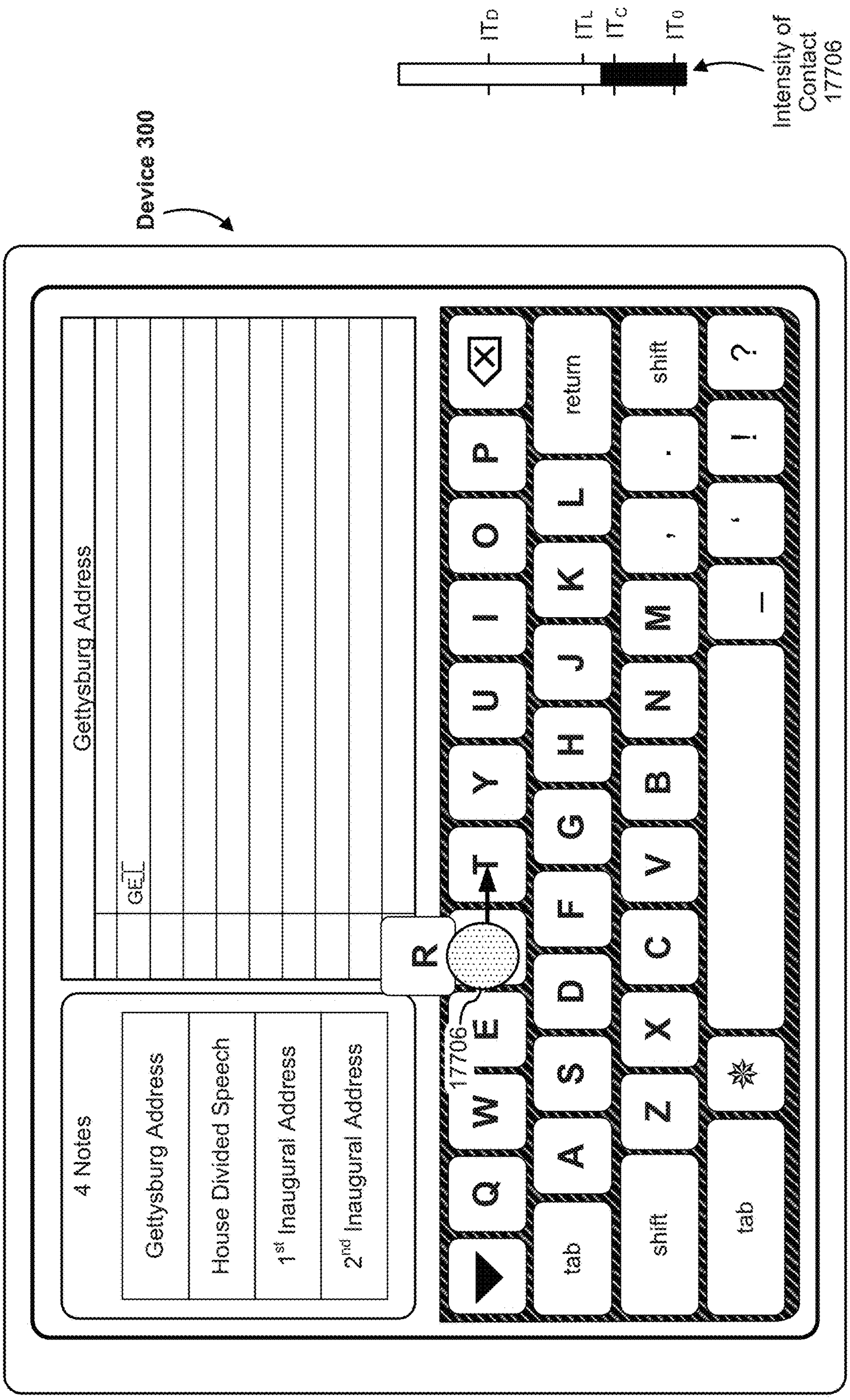

FIG. 11H illustrates subsequent movement of contact 17706 to a location over the key corresponding to character "R." The device forgoes output of the character "R", as shown in FIG. 11I, because the intensity of contact 17706 remains below $IT_L$ while contact 17706 is over the key corresponding to character "R."

Figure 11J:
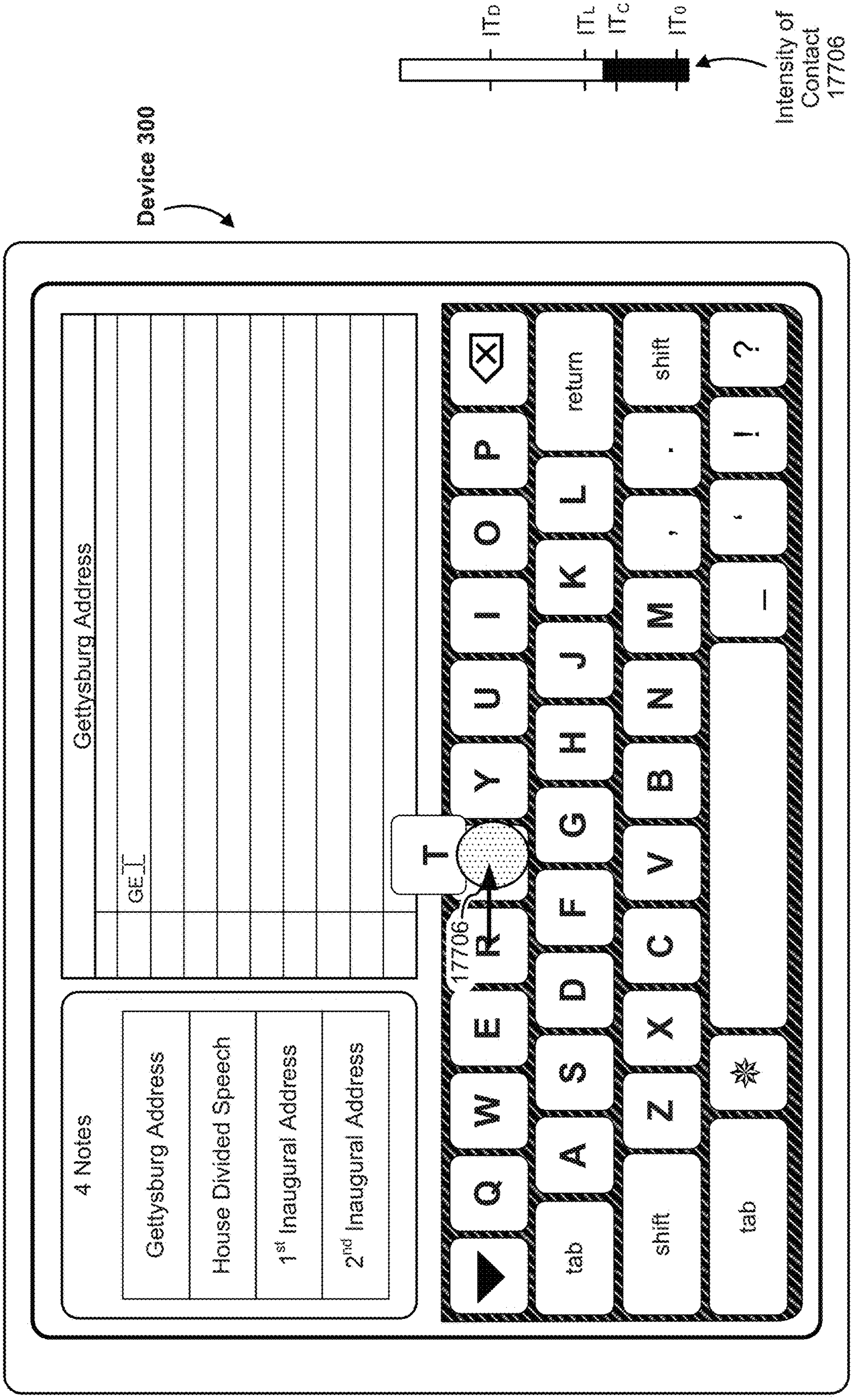
Figure 11K:
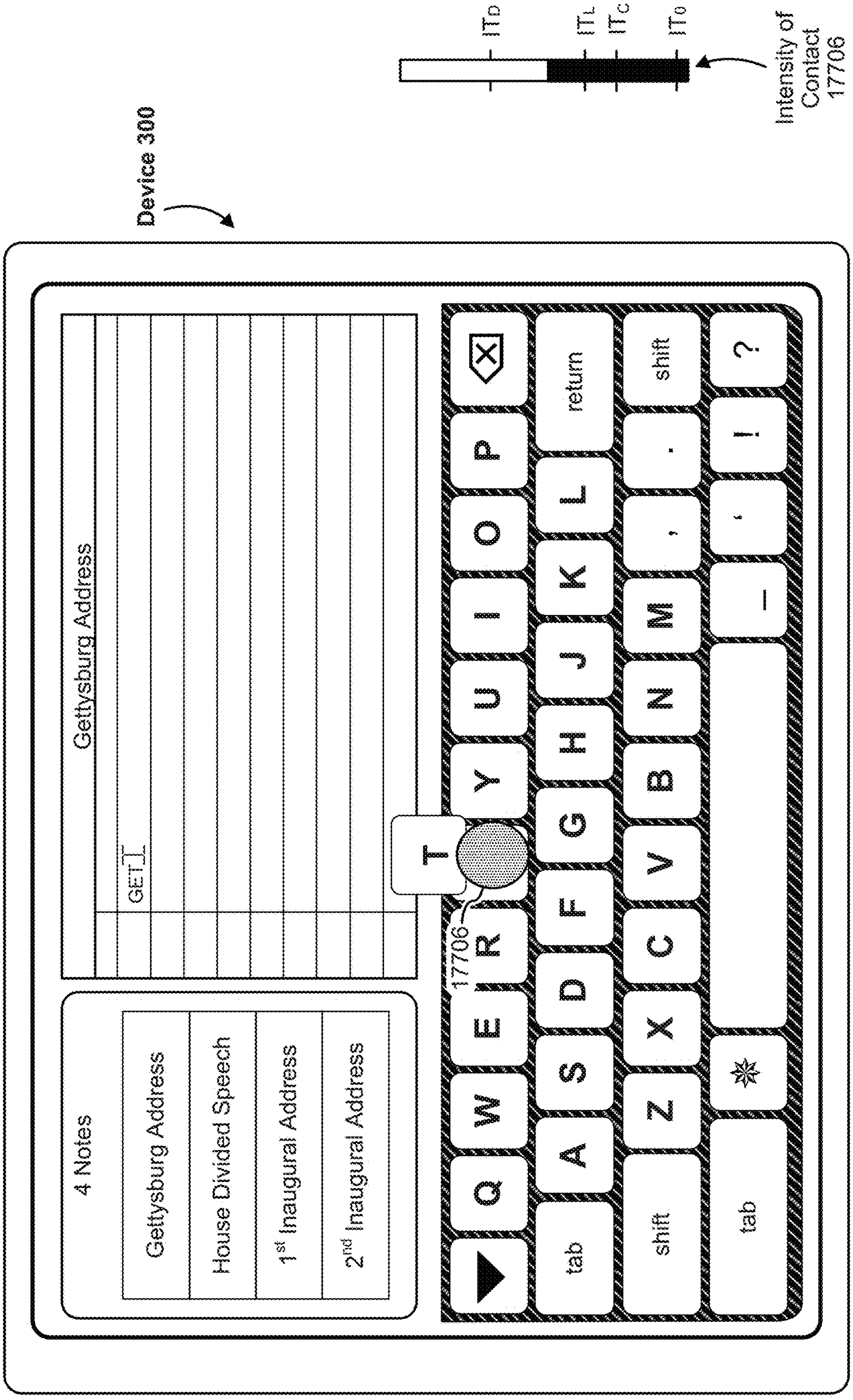
Figure 11L:
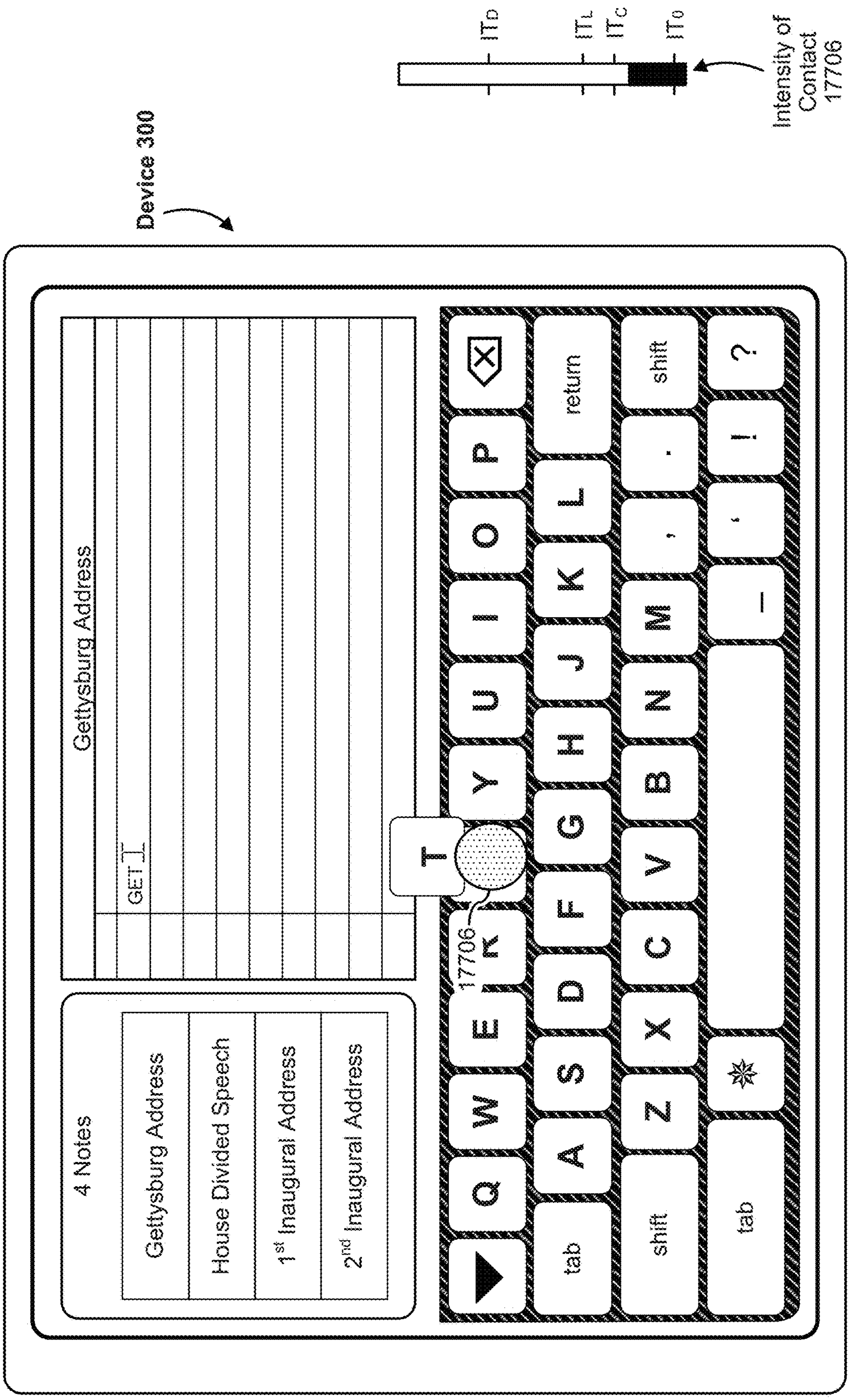
Figure 11M:
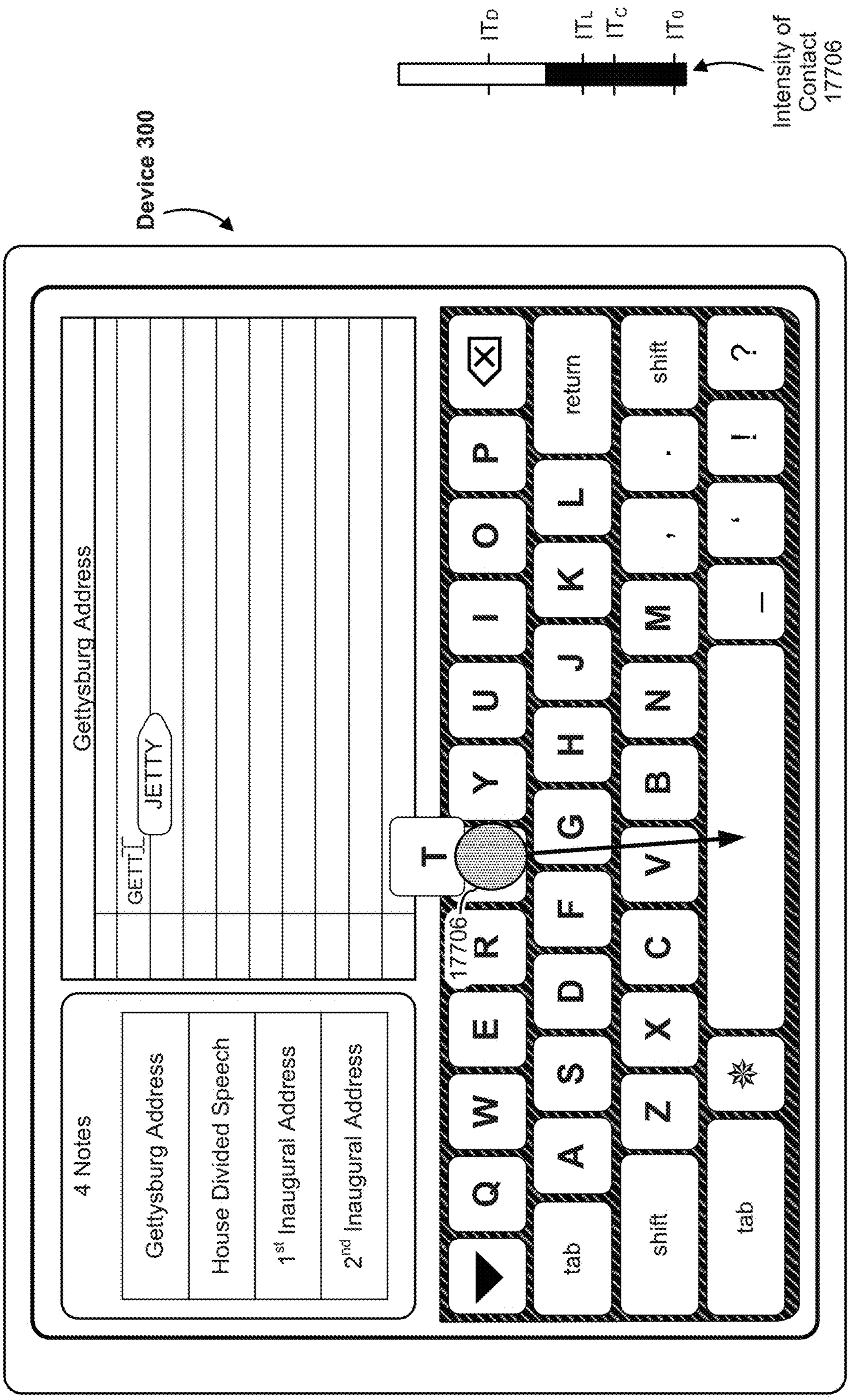
Figure 11N:
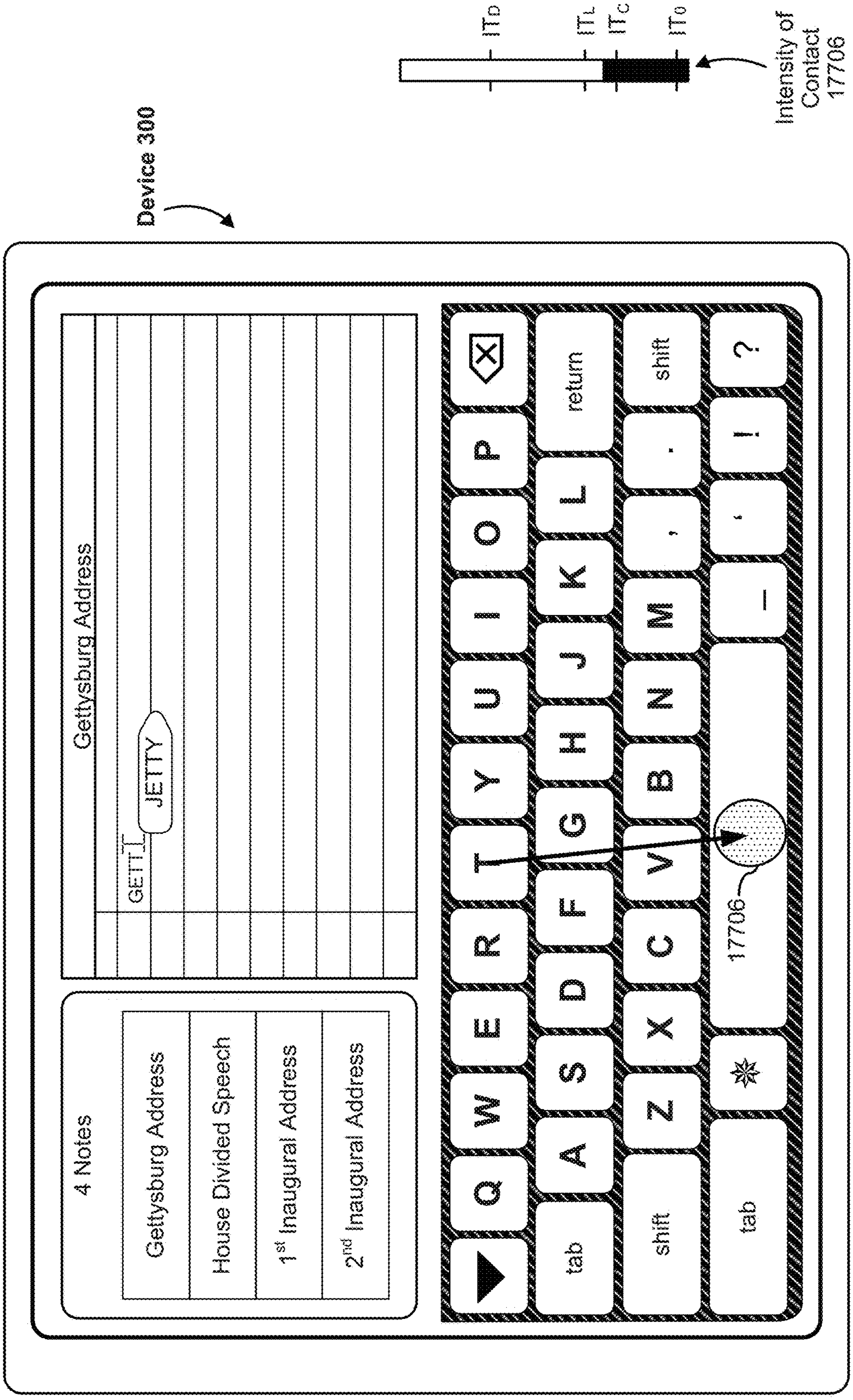

FIGS. 11J-11M illustrate exemplary user interfaces for sequentially outputting more than one instance of the same character. FIG. 11J illustrates contact 17706 at a location over the key corresponding to character "T." FIG. 11K illustrates the intensity of contact 17706 above $IT_L$ and the resulting output of the character "T" as described above. FIG. 11L shows a decrease in intensity below $IT_C$. FIG. 11M illustrates a subsequent intensity of contact 17706 above $IT_L$ (e.g., contact 17706 has an intensity above $IT_L$ for a second time with an intermediate detection of contact 17706 with an intensity below $IT_C$). As a result, a second instance of the character "T" is outputted in notepad app 17702.

Figure 11O:
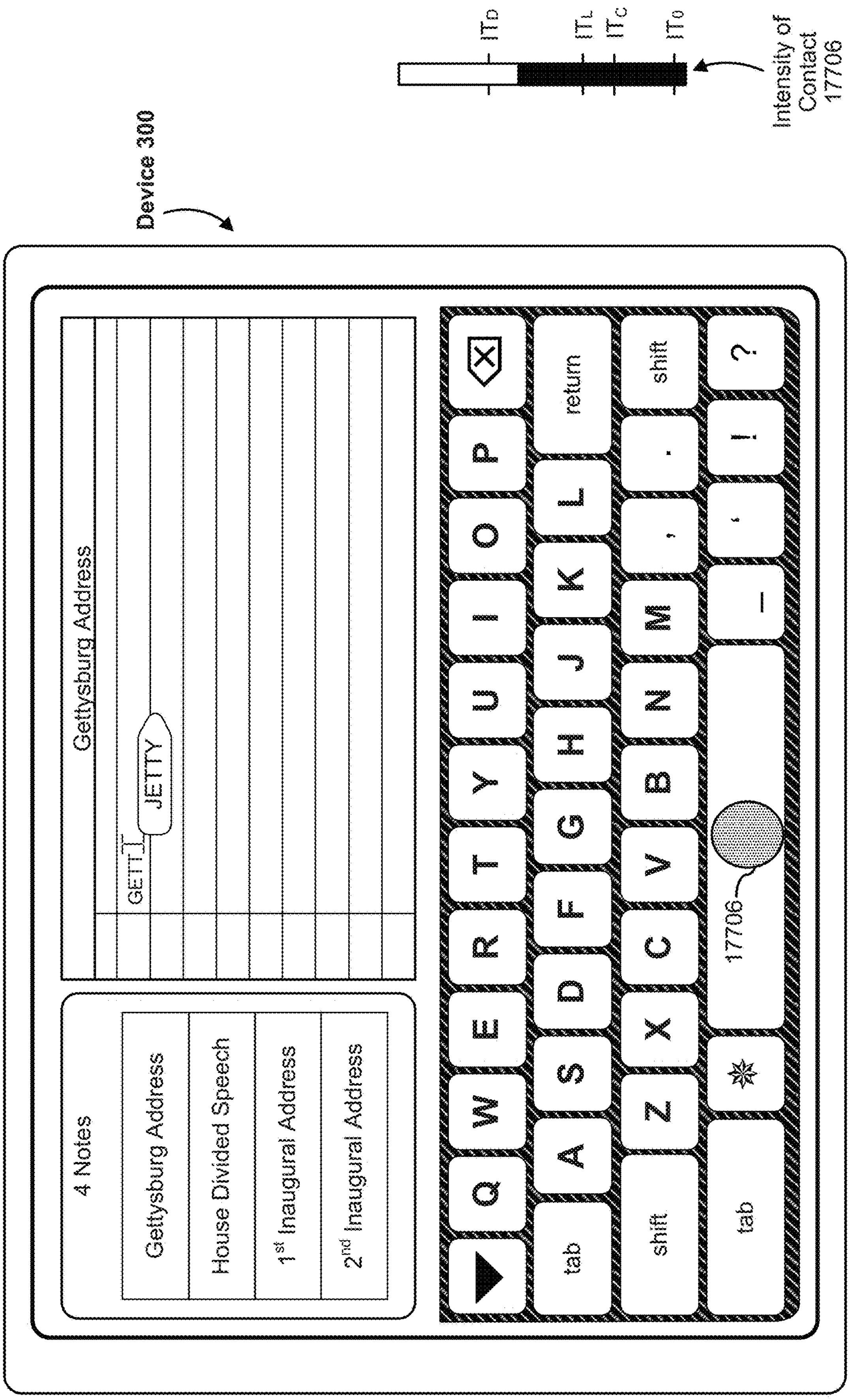

FIG. 11M also illustrates display of an autocorrect and/or auto-complete interface displaying a suggested correction and/or completion to a user outputted string of characters (e.g., "GETT" in the instant example). In this example, the device suggests the correction and completion "JETTY" to replace the outputted "GETT." FIG. 11M also illustrates subsequent movement of contact 17706 to a location over a space-bar (it is not necessarily required that the intensity of contact 17706 is above any particular threshold during movement of contact 17706). In this example, the space-bar is a predefined affordance for accepting or declining the autocorrect/auto-complete suggestion. In some embodiments, detection of a light press input (e.g., an increase in intensity of contact 17706 from an intensity below $IT_L$ to an intensity above $IT_L$, optionally followed by a decrease in intensity of contact 17706 below $IT_L$) while contact 17706 is over the predefined affordance (e.g., the space-bar) results in acceptance (and output) of the suggestion (shown in FIGS. 11O-11P). In some embodiments, detection of a deep press input (e.g., an increase in intensity of contact 17706 from an intensity below ITS to an intensity above $IT_D$, optionally followed by a decrease in intensity of contact 17706 below $IT_D$) while contact 17706 is over the predefined affordance preempts (declines) the suggestion and results in continued display of the user outputted string of characters (shown in FIGS. 11Q-11R). Alternatively, in some embodiments, a deep press results in acceptance of the suggestion and a light press results in preemption (e.g., rejection) of the suggestion (e.g., the functionality is reversed compared with the embodiments described with reference to FIGS. 11M-11S).

FIG. 11T illustrates an intensity of a contact 17710 above the deep press intensity threshold ITS. In some embodiments, detection of an intensity of contact 17710 above $IT_D$ results in display of a special character interface displaying special characters (e.g., an "e" character with: grave accent, acute accent, dot above, ogonek, and diaeresis). In some embodiments, selection of a particular displayed special character results in the output of the particular displayed special character in notepad 17702 (e.g., in lieu of outputting the character "E").

FIGS. 12A-12D are flow diagrams illustrating a method 17800 of typing characters on a virtual keyboard in accordance with some embodiments. The method 17800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 17800 are, optionally, combined and/or the order of some operations is, optionally, changed.

As described below, the method 17800 provides an intuitive way to typing characters on a virtual keyboard. The method reduces the cognitive burden on a user when typing characters on a virtual keyboard, thereby creating a more efficient human-machine interface. For battery-operated electronic devices, enabling a user to type characters on a virtual keyboard faster and more efficiently conserves power and increases the time between battery charges.

The device displays (17802) a virtual keyboard on the display (e.g., an alphanumeric keyboard for entering text on the device shown in FIG. 11A). The device detects (17804) a contact on the touch-sensitive surface (e.g., contact 17706, FIG. 11B). While continuously detecting (17806) the contact on the touch-sensitive surface, the device detects (17808) one or more movements of the contact on the touch-sensitive surface that correspond to movement of a focus selector over the virtual keyboard (e.g., a single continuous movement over multiple keys of the virtual keyboard such as contact 17706 in FIG. 11B, and/or a plurality of discrete movements from one key to another such as contact 17706 in FIG. 11E). For each respective key of a plurality of keys of the virtual keyboard, while detecting the focus selector over a respective key of the plurality of keys, in accordance with a determination that character-output criteria for outputting a character that corresponds to the respective key have been met, where the character-output criteria include that a respective intensity of the contact is above a first intensity threshold, while detecting the focus selector over the respective key, the device outputs (17810) the character, and in accordance with a determination that the character-output criteria have not been met, the device forgoes outputting the character that corresponds to the respective key. In some embodiments, the first intensity threshold is an intensity threshold that is higher than an input-detection intensity threshold at which the contact is initially detected. In some embodiments, the character is output in response to detecting an increase in intensity of the contact from an intensity below the first intensity threshold to an intensity above the first intensity threshold.

In some embodiments, the character-output criteria for outputting the character that corresponds to the respective key include (17811) that, while the focus selector is over the respective key, the contact corresponding to the focus selector increases from an intensity below the first intensity threshold (e.g., the character is output in response to detecting an increase in intensity of the contact from an intensity below the first intensity threshold to an intensity above the first intensity threshold).

In some embodiments, the character-output criteria for outputting the character that corresponds to the respective key include (17812) that, while the focus selector is over the respective key, the contact corresponding to the focus selector decreases from an intensity above the first intensity threshold to an intensity below a character-output intensity threshold. In some embodiments, the character-output intensity threshold is the same as the first intensity threshold. In some embodiments, the character-output intensity threshold is below the first intensity threshold.

In some embodiments, the character-output criteria for outputting the character that corresponds to the respective key include (17813) that, while the focus selector is continuously detected over the respective key, the contact corresponding to the focus selector increases from an intensity below the first intensity and subsequently decreases from an intensity above the first intensity threshold to an intensity below a character-output intensity threshold (e.g., the character-output criteria include detection of a down-stroke and an up-stroke while the contact is continuously over a respective key).

In some embodiments, while continuously detecting the contact on the touch-sensitive surface, the device detects (17814) a first press input that includes detecting an increase in intensity of the contact above the first intensity threshold while the focus selector is over a first key. In response to detecting the first press input, the device outputs (17815) a character that corresponds to the first key. In some embodiments, the device outputs the character in response to detecting the increase in intensity of the contact above the first intensity threshold (e.g., the "down-stroke" of the press input). In some embodiments, the device outputs the character in response to detecting the decrease in intensity of the contact below the character-output intensity threshold (e.g., the "up-stroke" of the press input).

In some embodiments, while continuously detecting the contact on the touch-sensitive surface, the device detects a decrease in intensity of the contact below the first intensity threshold. After detecting the decrease in intensity of the contact below the first intensity threshold, the device detects (17816) a decrease in intensity of the contact below the first intensity threshold (or, optionally, the character-output intensity threshold). After detecting the decrease in intensity of the contact below the first intensity threshold, the device detects (17818) a second press input (or, in some circumstances a third, fourth, etc.) that includes detecting an increase in intensity of the contact above the first intensity threshold while the focus selector is over the first key. In response to detecting the second press input, the device outputs (17820) a character that corresponds to the first key again as an additional output (e.g., output of a second character "T," FIGS. 11J-11M). Thus, in some embodiments, the first key can be selected twice as an output for the keyboard without detecting liftoff of the contact. For example, a user can keep a contact over the "A" key and perform an increase pressure, decrease pressure, increase pressure sequence to select the key twice (e.g., to type "AA"). Similarly, the user can use a single continuous contact with multiple increase pressure, decrease pressure cycles while the focus selector is over multiple keys (e.g., the "A" key and the "B" key) to type sequences of characters (e.g., "ABAB"). In some embodiments, the device outputs the character in response to detecting the increase in intensity of the contact above the first intensity threshold (e.g., the "down-stroke" of the press input). In some embodiments, the device outputs the character in response to detecting the decrease in intensity of the contact below the character-output intensity threshold (e.g., the "up-stroke" of the press input).

In some embodiments, while continuously detecting the contact on the touch-sensitive surface, the device detects (17822) a second press input that includes detecting an increase in intensity of the contact above the first intensity threshold while the focus selector is over a second key. In response to detecting the second press input (17824) a character that corresponds to the second key (e.g., as the user moves the focus selector around the keyboard, multiple different keys can be selected by increasing the intensity of the contact while the focus selector is over different keys in the keyboard). In some embodiments, the device outputs the character in response to detecting the increase in intensity of the contact above the first intensity threshold (e.g., the "down-stroke" of the press input). In some embodiments, the device outputs the character in response to detecting the decrease in intensity of the contact below the character-output intensity threshold (e.g., the "up-stroke" of the press input).

In some embodiments, while continuously detecting the contact on the touch-sensitive surface, the device detects (17826) movement of the contact that corresponds to movement of the focus selector over a second key, and a maximum intensity of the contact is below the first intensity threshold while the focus selector is over the second key. In response to detecting movement of the contact that corresponds to movement of the focus selector over the second key, wherein the maximum intensity of the contact is below the first intensity threshold while the focus selector is over the second key, the device forgoes (17828) outputting a character that corresponds to the second key.

In some embodiments, while continuously detecting the contact on the touch-sensitive surface, the device detects (17830) a plurality of inputs that correspond to entering a sequence of characters (e.g., sequence of characters "GETT," FIG. 11M). In response to detecting the plurality of inputs, the device displays (17832) an autocorrect user interface for changing the sequence of characters to a modified sequence of characters (e.g., display an autocorrected sequence of characters such as autocorrected sequence "JETTY," FIG. 11M, with a cancellation affordance or display one or more autocorrect options for replacing the sequence of characters). While displaying the autocorrect user interface, the device detects (17834) an autocorrect input that includes an increase in intensity of the contact above the first intensity threshold while the focus selector is over a respective affordance (e.g., a space bar or a delete key) in the user interface. In response to detecting the autocorrect input, in accordance with a determination that the contact included in the autocorrect input has an intensity above a second intensity threshold that is higher than the first intensity threshold, the device performs (17836) a first operation associated with the sequence of characters.

In some embodiments, in response to detecting the autocorrect input, in accordance with a determination that the contact included in the autocorrect input has an intensity between the first intensity threshold and the second intensity threshold, the device performs (17838) a second operation associated with the sequence of characters, the second operation being different from the first operation.

Figure 11P:
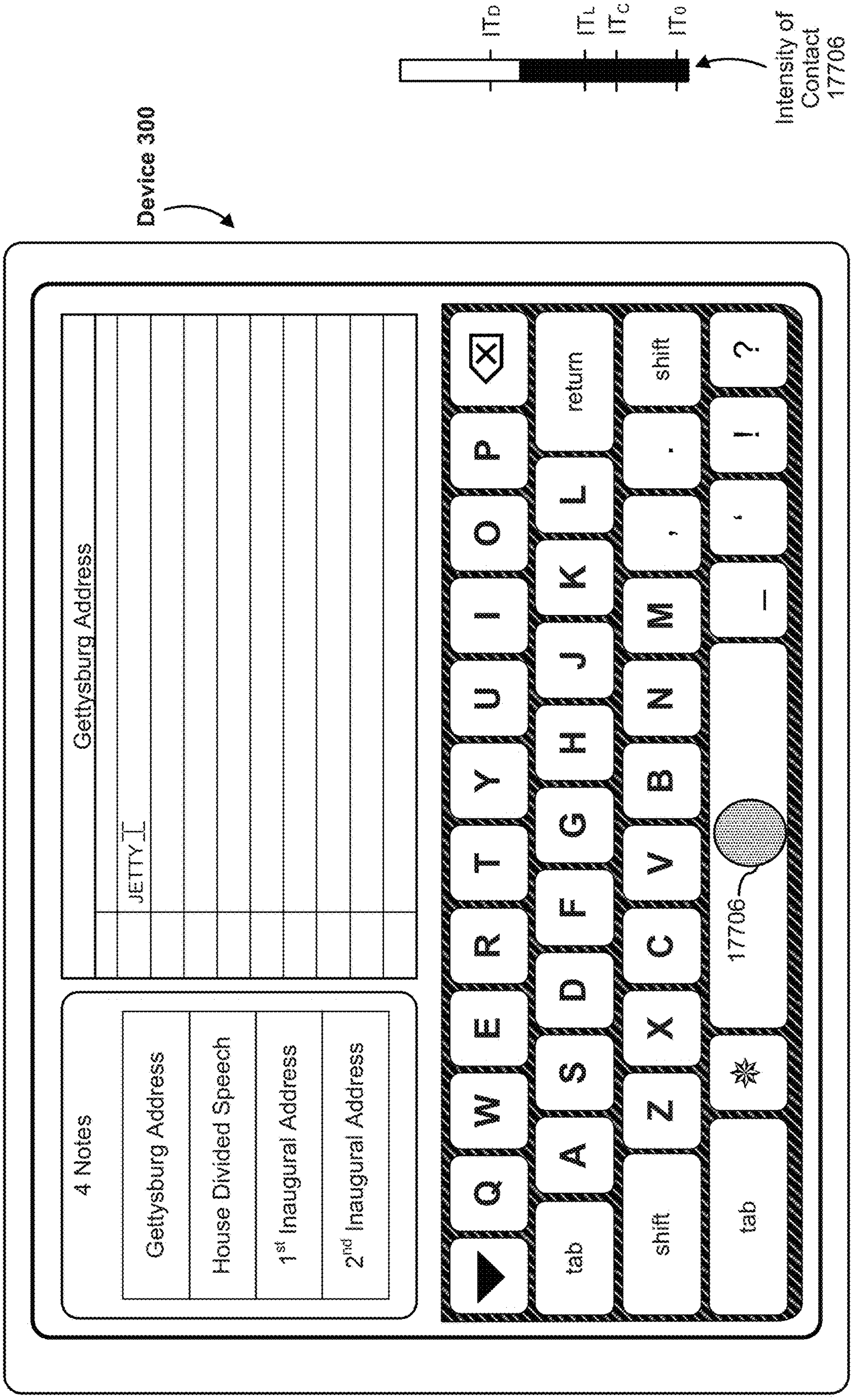
Figure 11Q:
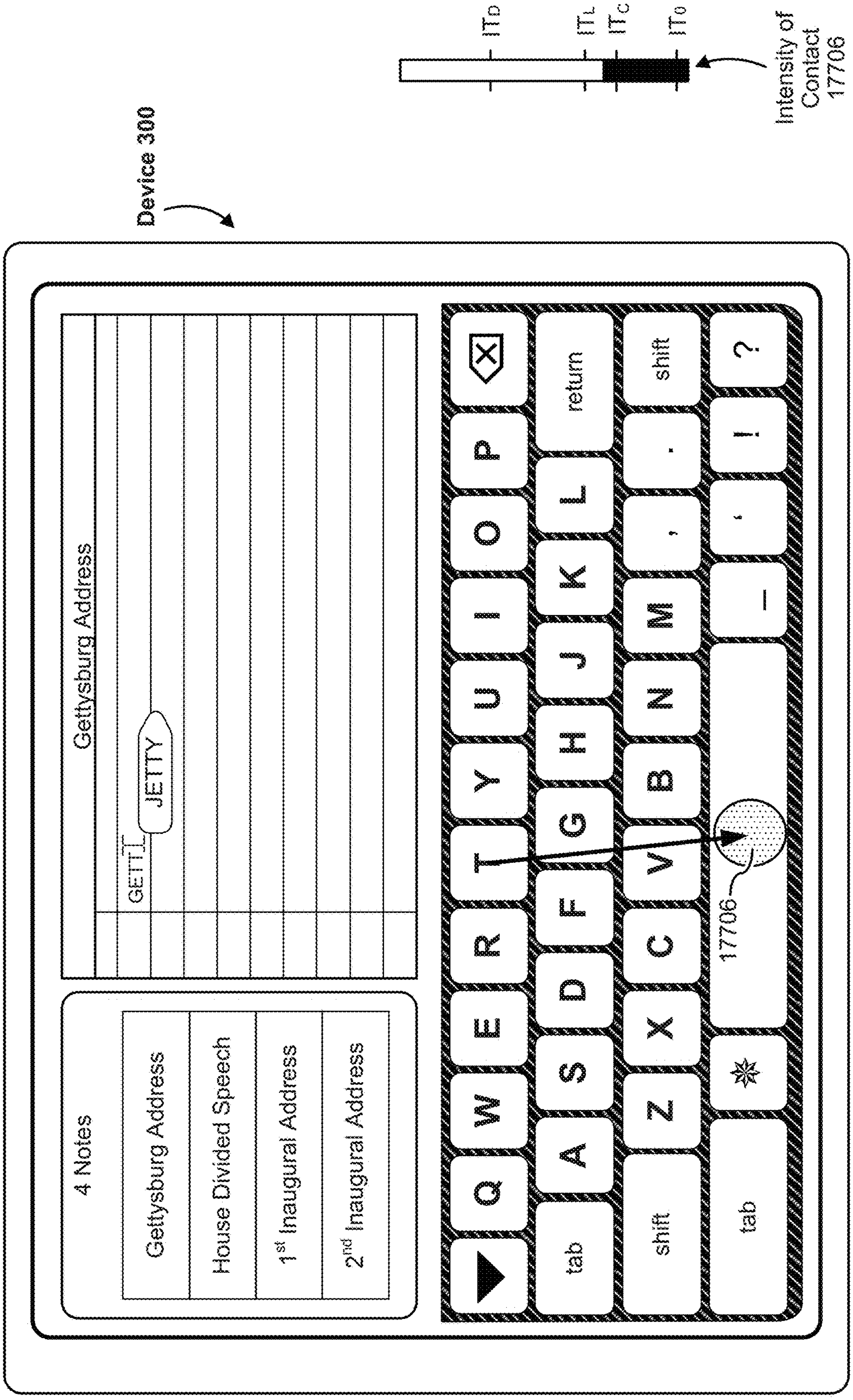
Figure 11R:
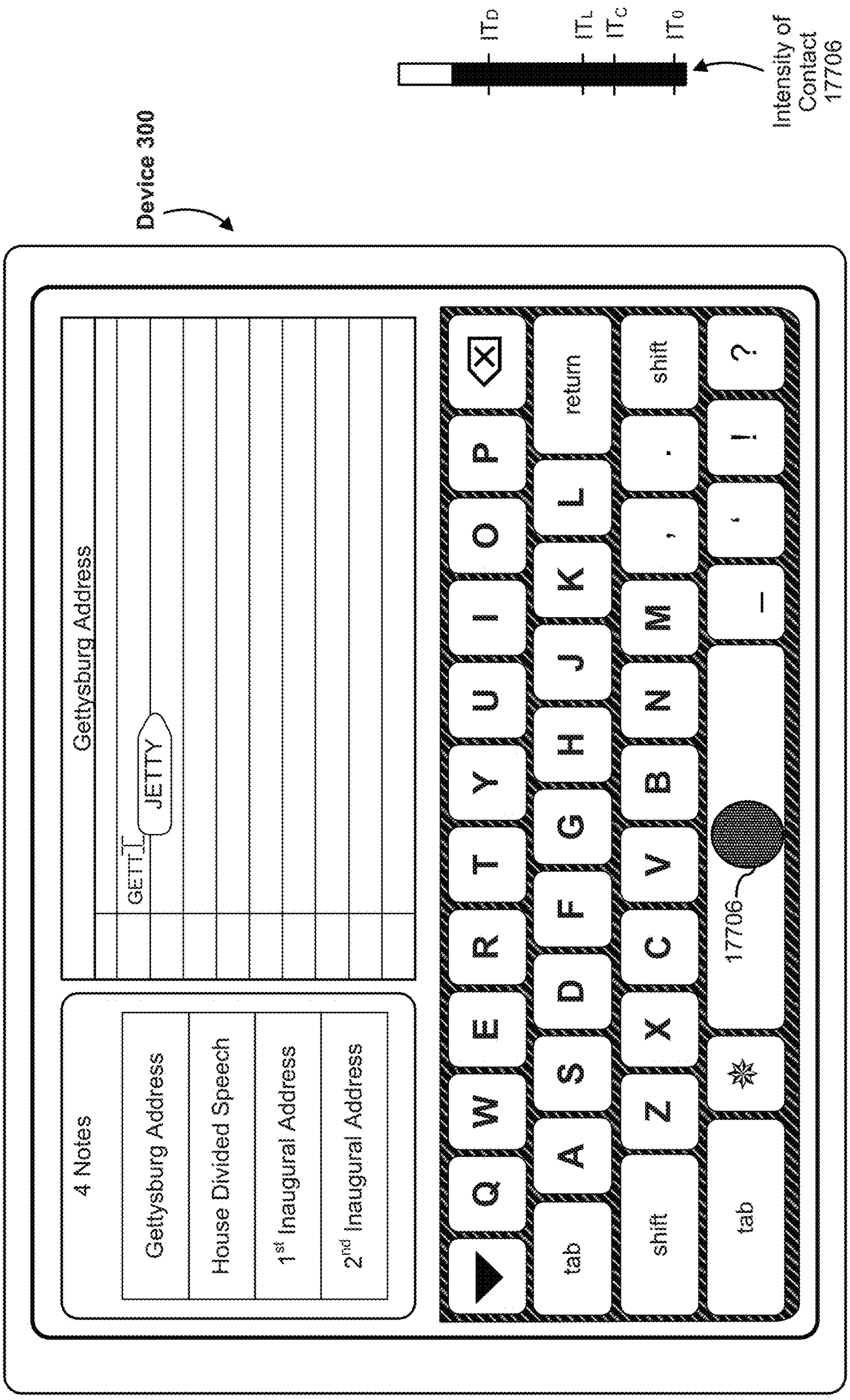
Figure 11S:
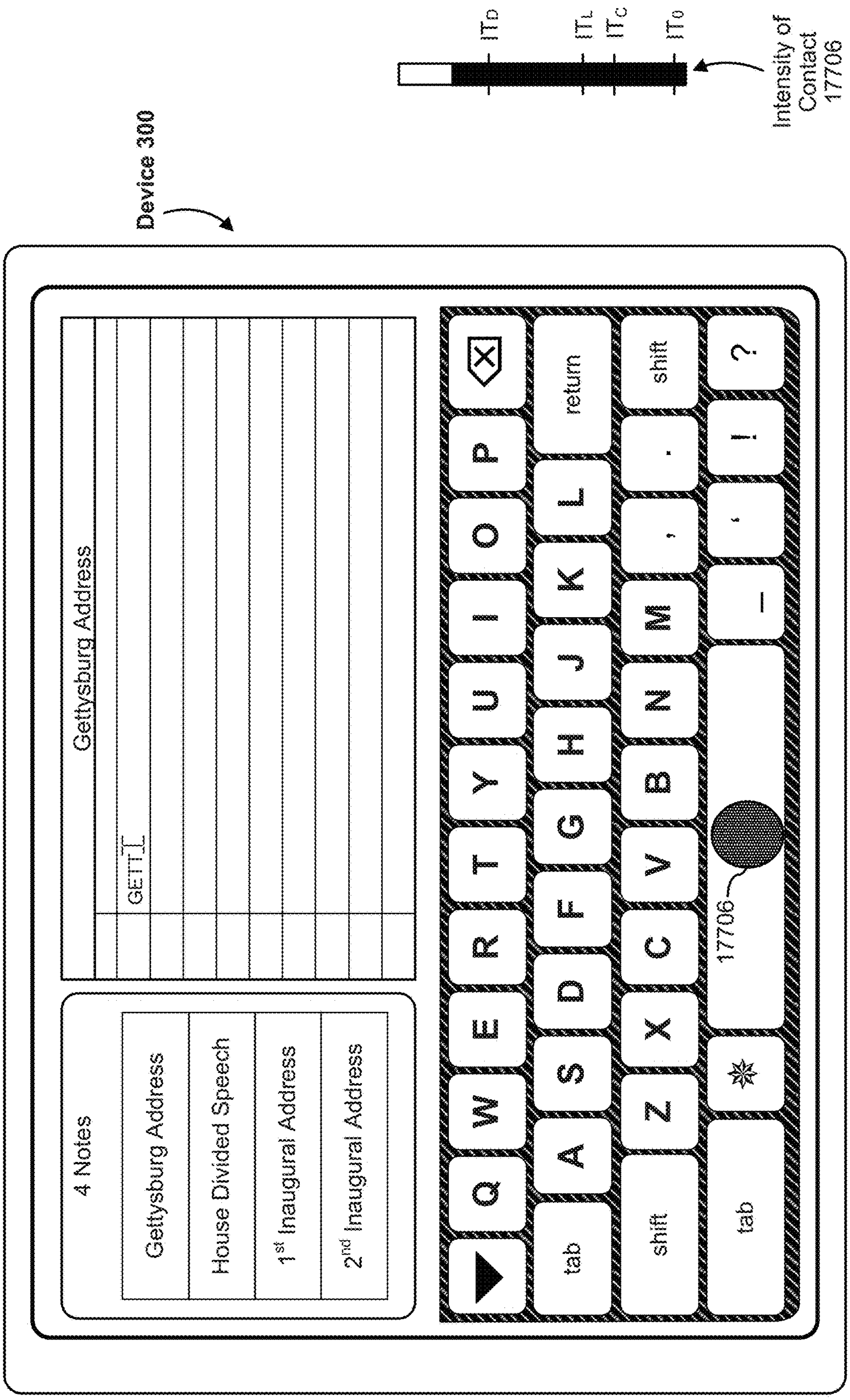
Figure 11T:
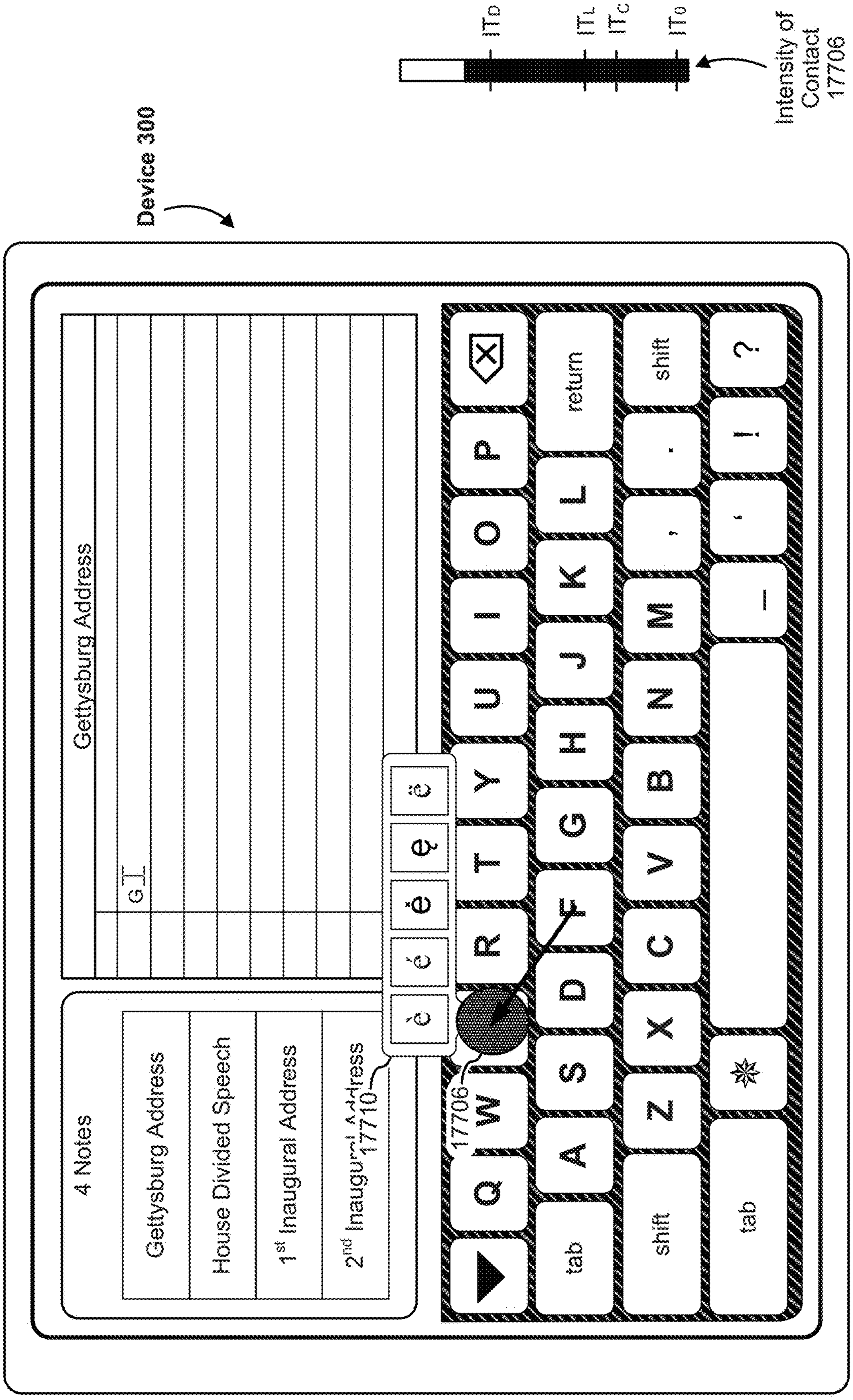
Figure 12A:
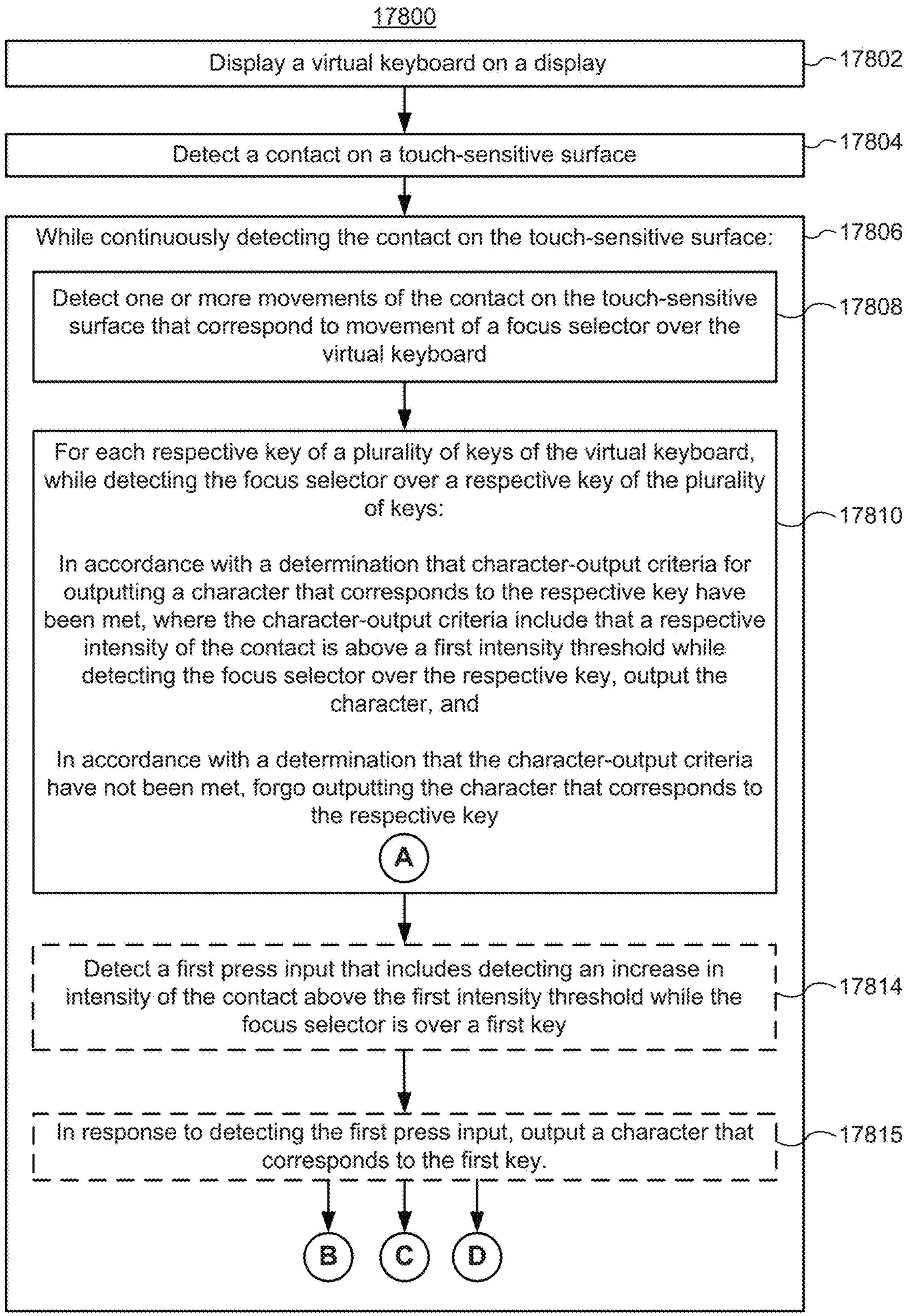
Figure 12C:
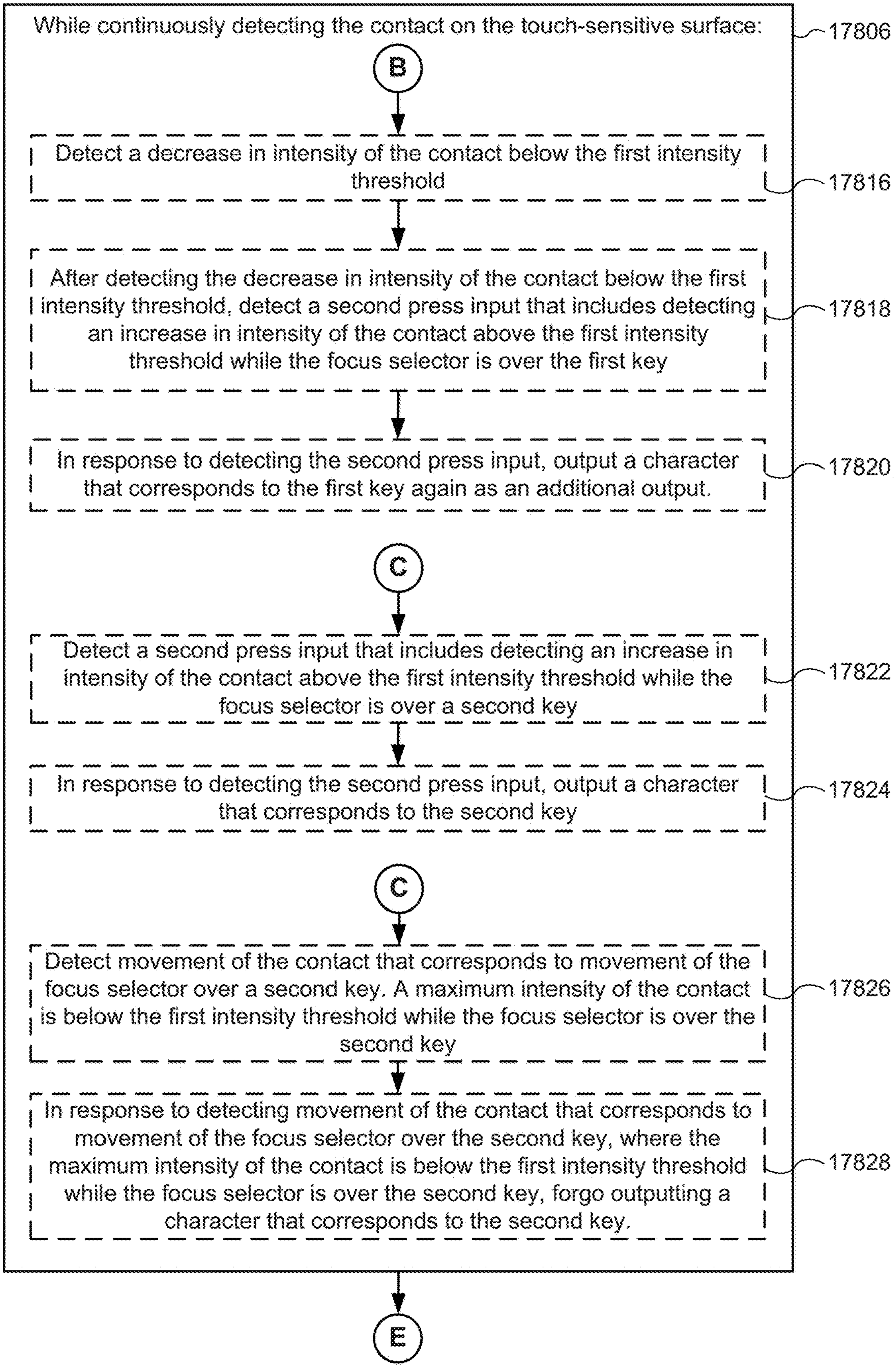
Figure 12D:
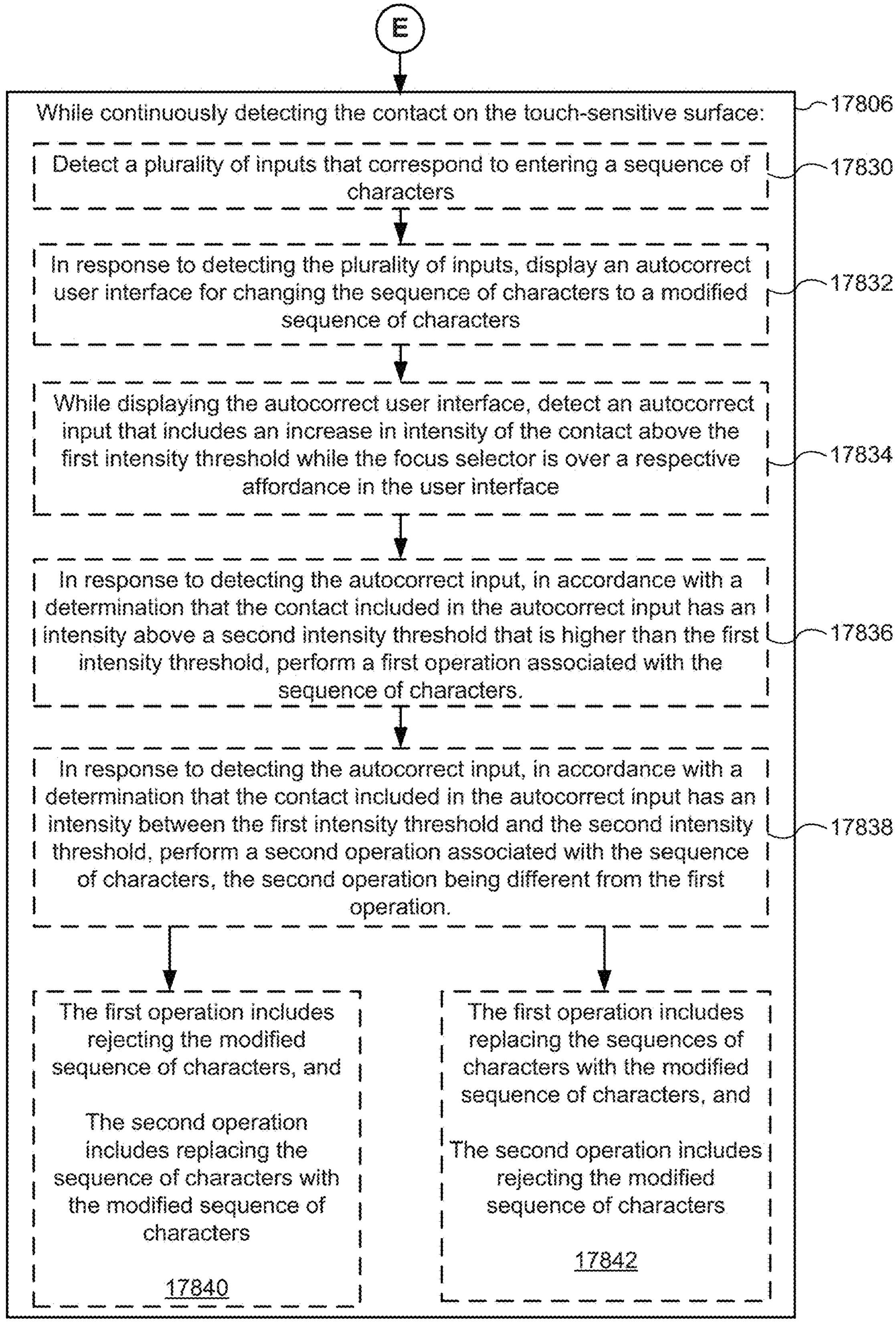

In some embodiments, the first operation includes (17840) rejecting the modified sequence of characters (e.g., rejecting the suggested auto-correction, FIGS. 11Q-11*s*), and the second operation includes replacing the sequence of characters with the modified sequence of characters (e.g., accepting the suggested auto-correction, FIGS. 110-11P).

Alternatively, in some embodiments, the first operation includes (17842) replacing the sequences of characters with the modified sequence of characters, and the second operation includes rejecting the modified sequence of characters.

It should be understood that the particular order in which the operations in FIGS. 12A-12D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 17800 described above with respect to FIGS. 12A-12D. For example, the contacts, gestures, characters, intensity thresholds, and focus selectors described above with reference to method 17800 optionally have one or more of the characteristics of the contacts, gestures, characters, intensity thresholds, and focus selectors described herein with reference to other methods described herein (e.g., those listed in the fifth paragraph of the Description of Embodiments). For brevity, these details are not repeated here.

Figure 13:
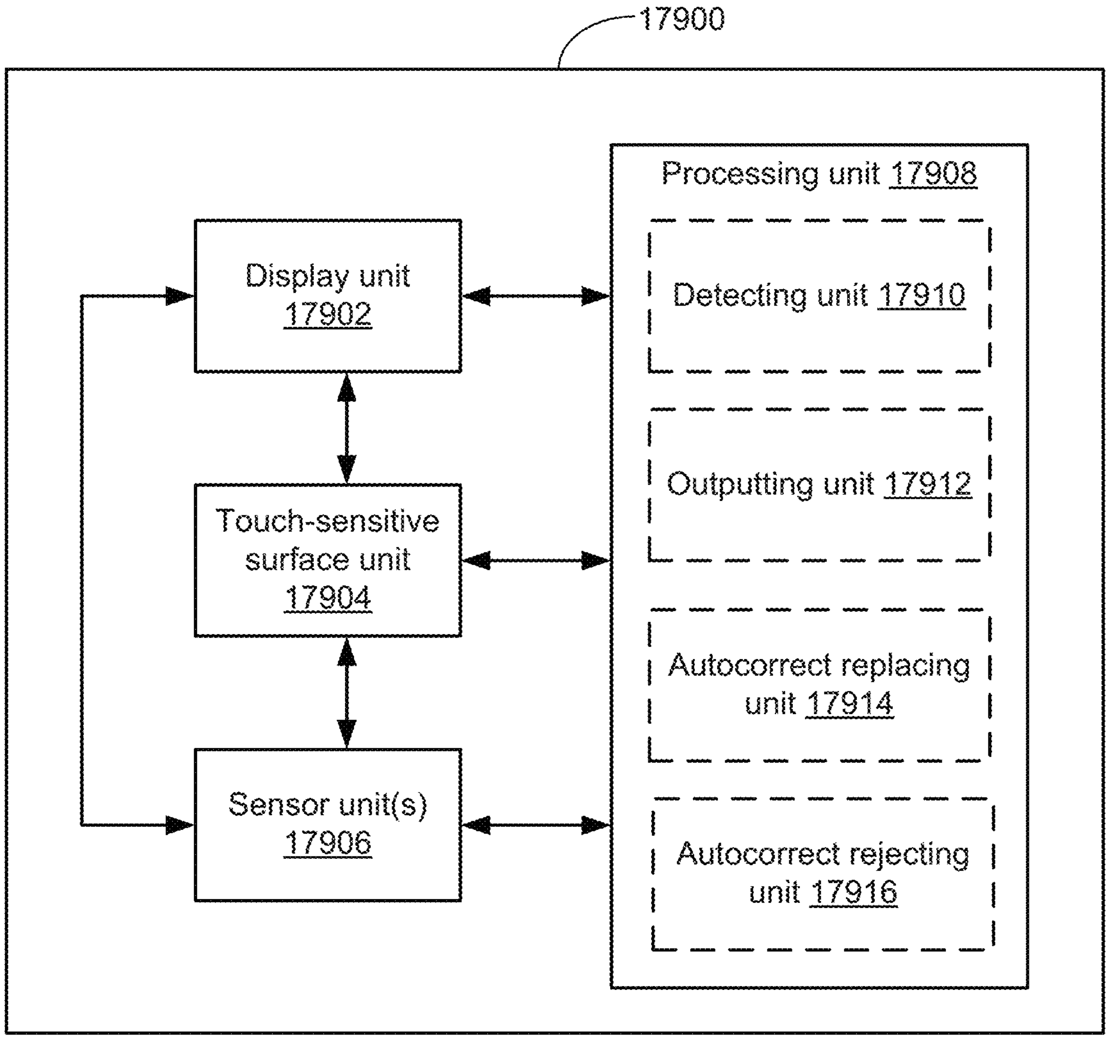
FIG. 13 is a functional block diagram of an electronic device in accordance with some embodiments.

In accordance with some embodiments, FIG. 13 shows a functional block diagram of an electronic device 17900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 17900 includes a display unit 17902 configured to display a virtual keyboard, a touch-sensitive surface unit 17904 configured to receive contacts, one or more sensor units 17906 configured to detect intensity of contacts with the touch-sensitive surface unit 17904; and a processing unit 17908 coupled to the display unit 17902, the touch-sensitive surface unit 17904 and the one or more sensor units 17906. In some embodiments, the processing unit 17908 includes a detecting unit 17910, an outputting unit 17912, an autocorrect replacing unit 17914, and an autocorrect rejecting unit 17916.

The processing unit 17908 is configured to: while continuously detecting a contact on the touch-sensitive surface unit 17904: detect one or more movements of the contact on the touch-sensitive surface unit 17904 that correspond to movement of a focus selector over the virtual keyboard; and for each respective key of a plurality of keys of the virtual keyboard, while detecting the focus selector over a respective key of the plurality of keys (e.g., with detecting unit 17910): in accordance with a determination that character-output criteria for outputting a character that corresponds to the respective key have been met, wherein the character-output criteria include that a respective intensity of the contact is above a first intensity threshold while detecting the focus selector over the respective key, output the character; and (e.g., with outputting unit 17912); and in accordance with a determination that the character-output criteria have not been met, forgo outputting the character that corresponds to the respective key.

In some embodiments, the character-output criteria for outputting the character that corresponds to the respective key include that, while the focus selector is over the respective key: the contact corresponding to the focus selector increases from an intensity below the first intensity threshold.

In some embodiments, the character-output criteria for outputting the character that corresponds to the respective key include that, while the focus selector is over the respective key: the contact corresponding to the focus selector decreases from an intensity above the first intensity threshold to an intensity below a character-output intensity threshold.

In some embodiments, the character-output criteria for outputting the character that corresponds to the respective key include that, while the focus selector is continuously detected over the respective key: the contact corresponding to the focus selector increases from an intensity below the first intensity and subsequently decreases from an intensity above the first intensity threshold to an intensity below a character-output intensity threshold.

In some embodiments, the processing unit 17908 is further configured to, while continuously detecting the contact on the touch-sensitive surface unit 17904: detect an increase in intensity of the contact above the first intensity threshold while the focus selector is over a first key; and in response to detecting the increase in intensity of the contact, output a character that corresponds to the first key.

In some embodiments, the processing unit 17908 is further configured to, while continuously detecting the contact on the touch-sensitive surface unit 17904: detect movement of the contact that corresponds to movement of the focus selector over a second key, wherein a maximum intensity of the contact is below the first intensity threshold while the focus selector is over the second key; and in response to detecting movement of the contact that corresponds to movement of the focus selector over the second key, wherein the maximum intensity of the contact is below the first intensity threshold while the focus selector is over the second key, forgo outputting a character that corresponds to the second key.

In some embodiments, the processing unit 17908 is further configured to while continuously detecting the contact on the touch-sensitive surface unit 17904 and after outputting a character that corresponds to the first key: detect a second press input that includes detecting an increase in intensity of the contact above the first intensity threshold while the focus selector is over a second key; and in response to detecting the second press input, output a character that corresponds to the second key.

In some embodiments, the processing unit 17908 is further configured to, while continuously detecting the contact on the touch-sensitive surface unit 17904 and after outputting a character that corresponds to the first key: detect a decrease in intensity of the contact below the first intensity threshold; after detecting the decrease in intensity of the contact below the first intensity threshold, detect a second press input that includes detecting an increase in intensity of the contact above the first intensity threshold while the focus selector is over the first key; and in response to detecting the second press input, output a character that corresponds to the first key again as an additional output.

In some embodiments, the processing unit 17908 is further configured to, while continuously detecting the contact on the touch-sensitive surface unit 17904: detect a plurality of inputs that correspond to entering a sequence of characters; in response to detecting the plurality of inputs, display an autocorrect user interface for changing the sequence of characters to a modified sequence of characters; while displaying the autocorrect user interface, detect an autocorrect input that includes an increase in intensity of the contact above the first intensity threshold while the focus selector is over a respective affordance in the user interface; and in response to detecting the autocorrect input, in accordance with a determination that the contact included in the autocorrect input has an intensity above a second intensity threshold that is higher than the first intensity threshold, perform a first operation associated with the sequence of characters.

In some embodiments, the processing unit 17908 is further configured to, in response to detecting the autocorrect input, in accordance with a determination that the contact included in the autocorrect input has an intensity between the first intensity threshold and the second intensity threshold, perform a second operation associated with the sequence of characters, wherein the second operation is different from the first operation.

In some embodiments, the first operation includes rejecting the modified sequence of characters (e.g., rejecting an autocorrect suggestion with the autocorrect reject unit 17916); and the second operation includes replacing the sequences of characters with the modified sequence of characters (e.g., accepting the autocorrect suggestion with the autocorrect replacing unit 17914).

Alternatively, in some embodiments, the first operation includes replacing the sequences of characters with the modified sequence of characters; and the second operation includes rejecting the modified sequence of characters.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12D are, optionally, implemented by components depicted in FIGS. 1A-1B or FIG. 13. For example, detection operation 17804, output operation 17810, and autocorrect operation 17836 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should be understood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A method, comprising:

at an electronic device with a touch-sensitive surface and a display, wherein the electronic device includes one or more sensors to detect intensities of contacts with the touch-sensitive surface:

displaying, on the display, a plurality of user interface objects, including a first user interface object and a second user interface object;

detecting a first press input that corresponds to an increase in intensity of a first contact above a first intensity threshold on the touch-sensitive surface while a focus selector is over the first user interface object;

in response to detecting the first press input, selecting the first user interface object; and after selecting the first user interface object and while continuing to detect the first contact on the touch-sensitive surface and maintaining selection of the first user interface object:

detecting movement of the first contact corresponding to movement of the focus selector from the first user interface object to the second user interface object;

detecting a second press input that corresponds to an increase in intensity of the first contact above a second intensity threshold on the touch-sensitive surface while the focus selector is over the second user interface object; and in response to detecting the second press input, selecting the second user interface object and maintaining selection of the first user interface object.

2. The method of claim 1, further including, after selecting the first user interface object and the second user interface object:

detecting liftoff of the first contact;

after detecting the liftoff of the first contact, detecting a third press input corresponding to a second contact; and in response to detecting the third press input, deselecting the first user interface object and the second user interface object.

3. The method of claim 1, further including, after selecting the first user interface object and the second user interface object:

detecting liftoff of the first contact; and in response to detecting the liftoff of the first contact, deselecting the first user interface object and the second user interface object.

4. The method of claim 1, wherein:

the first press input and the second press input are portions of a single gesture, and the single gesture includes an intermediate portion between the first press input and the second press input that includes movement of the first contact corresponding to movement of the focus selector from the first user interface object to the second user interface object.

5. The method of claim 1, wherein the electronic device is configured to detect a range of contact intensity values and compare detected intensity values against a plurality of different intensity thresholds including:

an alternative-mode intensity threshold that is used by the electronic device to transition from a single object selection mode to a multiple object selection mode; and a selection intensity threshold that is used by the electronic device to differentiate between inputs that correspond to movement of the focus selector on the display and inputs that correspond to selection of a user interface object at a location on the display at or near a location of the focus selector, wherein the selection intensity threshold is different from the alternative-mode intensity threshold.

6. The method of claim 5, further including, after selecting the first user interface object and the second user interface object:

detecting a fourth press input that includes an increase in intensity of a third contact above the alternative-mode intensity threshold; and in response to detecting the fourth press input, deselecting the first user interface object and the second user interface object.

7. The method of claim 5, wherein:

the first intensity threshold is the alternative-mode intensity threshold; and the second intensity threshold is the selection intensity threshold.

8. The method of claim 7, wherein:

the plurality of user interface objects includes a third user interface object that is representative of a collection of user interface objects; and the method includes, after selecting the first user interface object and the second user interface object:

detecting a fifth press input that corresponds to an increase in intensity of a fourth contact on the touch-sensitive surface while the focus selector is over the third user interface object; and in response to detecting the fifth press input:

in accordance with a determination that the fifth press input includes an increase in intensity above the first intensity threshold, displaying a user interface with a region for adding the first user interface object and the second user interface object to the collection of user interface objects represented by the third user interface object; and in accordance with a determination that the fifth press input includes an increase in intensity to a maximum intensity that is above the second intensity threshold and below the first intensity threshold, selecting the third user interface object in addition to the first user interface object and the second user interface object.

9. The method of claim 1, further including:

after selecting the first user interface object and while continuing to detect the first contact on the touch-sensitive surface, moving the first user interface object in accordance with movement of the first contact on the touch-sensitive surface, and displaying a first residual image at an original location of the first user interface object; and after selecting the second user interface object and while continuing to detect the first contact on the touch-sensitive surface, moving the second user interface object in accordance with movement of the first contact on the touch-sensitive surface, and displaying a second residual image at an original location of the second user interface object.

10. The method of claim 9, further including, after displaying the first residual image and the second residual image:

detecting an end of selection of the first user interface object and the second user interface object; and in response to detecting the end of selection of the first user interface object and the second user interface object, displaying an animation of a representation of the first user interface object moving back to the first residual image and displaying an animation of a representation of the second user interface object moving back to the second residual image.

11. The method of claim 9, further including, after displaying the first residual image and the second residual image:

detecting a sixth press input on a respective residual image; and in response to detecting the sixth press input on the respective residual image, deselecting a user interface object corresponding to the respective residual image.

12. An electronic device, comprising:

a display;

a touch-sensitive surface;

one or more sensors to detect intensities of contacts with the touch-sensitive surface;

one or more processors;

memory; and one or more programs, wherein the one or more programs are stored in the memory and configured to be executed by the one or more processors, the one or more programs including instructions for:

displaying, on the display, a plurality of user interface objects, including a first user interface object and a second user interface object;

detecting a first press input that corresponds to an increase in intensity of a first contact above a first intensity threshold on the touch-sensitive surface while a focus selector is over the first user interface object;

in response to detecting the first press input, selecting the first user interface object;

after selecting the first user interface object and while continuing to detect the first contact on the touch-sensitive surface and maintaining selection of the first user interface object:

detecting movement of the first contact corresponding to movement of the focus selector from the first user interface object to the second user interface object;

detecting a second press input that corresponds to an increase in intensity of the first contact above a second intensity threshold on the touch-sensitive surface while the focus selector is over the second user interface object; and in response to detecting the second press input, selecting the second user interface object and maintaining selection of the first user interface object.

13. The electronic device of claim 12, wherein the one or more programs include instructions for, after selecting the first user interface object and the second user interface object:

detecting liftoff of the first contact;

after detecting the liftoff of the first contact, detecting a third press input corresponding to a second contact; and in response to detecting the third press input, deselecting the first user interface object and the second user interface object.

14. The electronic device of claim 12, wherein the one or more programs include instructions for, after selecting the first user interface object and the second user interface object:

detecting liftoff of the first contact; and in response to detecting the liftoff of the first contact, deselecting the first user interface object and the second user interface object.

15. The electronic device of claim 12, wherein:

the first press input and the second press input are portions of a single gesture, and the single gesture includes an intermediate portion between the first press input and the second press input that includes movement of the first contact corresponding to movement of the focus selector from the first user interface object to the second user interface object.

16. The electronic device of claim 12, wherein the electronic device is configured to detect a range of contact intensity values and compare detected intensity values against a plurality of different intensity thresholds including:

an alternative-mode intensity threshold that is used by the electronic device to transition from a single object selection mode to a multiple object selection mode; and a selection intensity threshold that is used by the electronic device to differentiate between inputs that correspond to movement of the focus selector on the display and inputs that correspond to selection of a user interface object at a location on the display at or near a location of the focus selector, wherein the selection intensity threshold is different from the alternative-mode intensity threshold.

17. A non-transitory computer readable storage medium storing one or more programs, the one or more programs comprising instructions which, when executed by an electronic device with a display, a touch-sensitive surface and one or more sensors to detect intensities of contacts with the touch-sensitive surface, cause the electronic device to:

display, on the display, a plurality of user interface objects, including a first user interface object and a second user interface object;

detect a first press input that corresponds to an increase in intensity of a first contact above a first intensity threshold on the touch-sensitive surface while a focus selector is over the first user interface object;

in response to detecting the first press input, select the first user interface object; and after selecting the first user interface object and while continuing to detect the first contact on the touch-sensitive surface and maintaining selection of the first user interface object:

detect movement of the first contact corresponding to movement of the focus selector from the first user interface object to the second user interface object;

detect a second press input that corresponds to an increase in intensity of the first contact above a second intensity threshold on the touch-sensitive surface while the focus selector is over the second user interface object; and in response to detecting the second press input, select the second user interface object and maintaining selection of the first user interface object.

18. The non-transitory computer readable storage medium of claim 17, wherein the one or more programs include instructions, which, when executed by the electronic device, cause the electronic device to:

detect liftoff of the first contact;

after detecting the liftoff of the first contact, detect a third press input corresponding to a second contact; and in response to detecting the third press input, deselect the first user interface object and the second user interface object.

19. The non-transitory computer readable storage medium of claim 17, wherein the one or more programs include instructions, which, when executed by the electronic device, cause the electronic device to, after selecting the first user interface object and the second user interface object:

detect liftoff of the first contact; and in response to detecting the liftoff of the first contact, deselect the first user interface object and the second user interface object.

20. The non-transitory computer readable storage medium of claim 17, wherein:

the first press input and the second press input are portions of a single gesture, and the single gesture includes an intermediate portion between the first press input and the second press input that includes movement of the first contact corresponding to movement of the focus selector from the first user interface object to the second user interface object.

21. The non-transitory computer readable storage medium of claim 17, wherein the electronic device is configured to detect a range of contact intensity values and compare detected intensity values against a plurality of different intensity thresholds including:

an alternative-mode intensity threshold that is used by the electronic device to transition from a single object selection mode to a multiple object selection mode; and a selection intensity threshold that is used by the electronic device to differentiate between inputs that correspond to movement of the focus selector on the display and inputs that correspond to selection of a user interface object at a location on the display at or near a location of the focus selector, wherein the selection intensity threshold is different from the alternative-mode intensity threshold.

* * * * *